United States Patent
Tanaka et al.

(10) Patent No.: US 11,535,426 B2
(45) Date of Patent: Dec. 27, 2022

(54) BAG

(71) Applicant: DAI NIPPON PRINTING CO., LTD., Tokyo (JP)

(72) Inventors: Daisuke Tanaka, Tokyo (JP); Yasunari Iio, Tokyo (JP); Kaoru Watanabe, Tokyo (JP); Kazuhiro Takushima, Tokyo (JP); Kiyoshi Toda, Tokyo (JP); Shiomi Nakagawa, Tokyo (JP); Kaeko Hayashi, Tokyo (JP); Satomi Ishida, Tokyo (JP); Keita Goto, Tokyo (JP); Mariko Nakatsuka, Tokyo (JP); Koki Akutsu, Tokyo (JP); Yuki Tatsuta, Tokyo (JP); Hideaki Takahashi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/642,691

(22) PCT Filed: Aug. 30, 2018

(86) PCT No.: PCT/JP2018/032263
§ 371 (c)(1),
(2) Date: Feb. 27, 2020

(87) PCT Pub. No.: WO2019/045019
PCT Pub. Date: Mar. 7, 2019

(65) Prior Publication Data
US 2020/0198841 A1    Jun. 25, 2020

(30) Foreign Application Priority Data

Aug. 31, 2017  (JP) .............................. JP2017-166916
Sep. 19, 2017  (JP) .............................. JP2017-179489

(Continued)

(51) Int. Cl.
*B65D 33/01*    (2006.01)
*B32B 1/00*    (2006.01)
(Continued)

(52) U.S. Cl.
CPC ................ *B65D 33/01* (2013.01); *B32B 1/00* (2013.01); *B32B 27/08* (2013.01); *B32B 27/32* (2013.01);
(Continued)

(58) Field of Classification Search
CPC ........ B65D 33/01; B65D 65/40; B65D 81/34; B32B 1/00; B32B 27/08; B32B 27/32;
(Continued)

(56) References Cited

U.S. PATENT DOCUMENTS 4,759,472 A * 7/1988 Strenger ............ B65D 75/5822
222/541.4
4,890,744 A * 1/1990 Lane, Jr. ............ B65D 75/5822
206/484

(Continued)

FOREIGN PATENT DOCUMENTS

EP    1870350    12/2007
JP    09-328145    12/1997
(Continued)

OTHER PUBLICATIONS

International Preliminary Report on Patentability, issued in the corresponding PCT application No. PCT/JP2018/032263, dated Mar. 3, 2020, 9 pages.
(Continued)

*Primary Examiner* — Peter N Helvey
(74) *Attorney, Agent, or Firm* — Hamre, Schumann, Mueller & Larson, P.C.

(57) ABSTRACT

To suppress damage such as the formation of holes and wrinkles in laminated bodies constituting a bag.

(Continued)

A bag having a storage section includes: laminated bodies that include a sealant film positioned on an inner surface of the bag and at least one plastic film positioned on an outer surface side of the sealant film; and a seal section where inner surfaces of one pair of laminated bodies are joined together. The seal section has an outer edge seal part that is positioned along an outer edge of the bag, and a steam-releasing seal part that is positioned closer to a center point side of the storage section than the outer edge seal part and peels off due to an increase in pressure in the storage section. The steam-releasing seal part peels off when the pressure in the storage section is 130 kPa or lower.

14 Claims, 71 Drawing Sheets

(30) Foreign Application Priority Data

| Dec. 20, 2017 | (JP) | JP2017-244337 |
|---|---|---|
| Jan. 31, 2018 | (JP) | JP2018-015915 |
| Feb. 28, 2018 | (JP) | JP2018-035600 |
| Mar. 20, 2018 | (JP) | JP2018-053336 |

(51) Int. Cl.
| | |
|---|---|
| B32B 27/08 | (2006.01) |
| B32B 27/32 | (2006.01) |
| B65D 65/40 | (2006.01) |
| B65D 81/34 | (2006.01) |
| C08L 53/00 | (2006.01) |

(52) U.S. Cl.
CPC .............. *B65D 65/40* (2013.01); *B65D 81/34* (2013.01); *C08L 53/00* (2013.01); *B32B 2270/00* (2013.01); *B32B 2439/46* (2013.01); *B32B 2439/70* (2013.01); *C08L 2205/03* (2013.01)

(58) Field of Classification Search
CPC .............. B32B 2270/00; B32B 243/46; B32B 2439/70; C08L 53/00; C08L 2205/03
USPC ........................................................ 383/103
See application file for complete search history.

(56) References Cited

U.S. PATENT DOCUMENTS

| 5,195,658 | A * | 3/1993 | Hoshino | B65D 75/48 |
| | | | | 206/219 |
| 8,153,216 | B2 * | 4/2012 | Fenn-Barrabaß | B65D 81/3453 |
| | | | | 428/35.7 |
| 10,486,878 | B2 * | 11/2019 | Yajima | B65D 75/30 |
| 2005/0255200 | A1 * | 11/2005 | Takahagi | B65D 75/008 |
| | | | | 426/113 |
| 2005/0276885 | A1 * | 12/2005 | Bennett | B65D 81/3461 |
| | | | | 426/118 |
| 2006/0251838 | A1 * | 11/2006 | Inoue | B32B 27/306 |
| | | | | 428/35.7 |
| 2009/0035424 | A1 * | 2/2009 | Mita | B32B 27/08 |
| | | | | 426/113 |
| 2010/0163446 | A1 * | 7/2010 | Suzuki | B32B 27/325 |
| | | | | 206/438 |
| 2010/0266732 | A1 * | 10/2010 | Thomas | B65D 77/225 |
| | | | | 426/113 |
| 2013/0123739 | A1 * | 5/2013 | Yoshikawa | A61J 1/1475 |
| | | | | 604/408 |
| 2014/0363104 | A1 | 12/2014 | Kondo et al. | |
| 2017/0239921 | A1 * | 8/2017 | Menning | B32B 27/08 |
| 2018/0304587 | A1 * | 10/2018 | Muraki | B65D 5/42 |
| 2019/0193904 | A1 * | 6/2019 | Toyoshima | B32B 27/32 |
| 2019/0344945 | A1 * | 11/2019 | Yasuda | B32B 15/09 |
| 2020/0017276 | A1 * | 1/2020 | Hongou | B65D 77/225 |

FOREIGN PATENT DOCUMENTS

| JP | 10101154 | 4/1998 |
|---|---|---|
| JP | 10264303 | 10/1998 |
| JP | 11279392 | 10/1999 |
| JP | 2004-074586 | 3/2004 |
| JP | 2007-284118 | 11/2007 |
| JP | 2011-037459 | 2/2011 |
| JP | 2013-023283 | 2/2013 |
| JP | 2013-079085 | 5/2013 |
| JP | 2013-136403 | 7/2013 |
| JP | 2013-256323 | 12/2013 |
| JP | 2014-118194 | 6/2014 |
| JP | 2015-120550 | 7/2015 |
| JP | 2015-168766 | 9/2015 |
| JP | 2015-196512 | 11/2015 |
| JP | 2016-074457 | 5/2016 |
| JP | 2016-108000 | 6/2016 |
| JP | 5941569 | 6/2016 |
| JP | 2017-024746 | 2/2017 |
| JP | 2017-057008 | 3/2017 |
| JP | 2017-071424 | 4/2017 |
| JP | 2017-145057 | 8/2017 |
| JP | 6277485 | 2/2018 |
| WO | 2006/057378 | 6/2006 |
| WO | 2006/107048 | 10/2006 |

OTHER PUBLICATIONS

International Search Report, issued in the corresponding PCT application No. PCT/JP2018/032263, dated Oct. 23, 2018, 4 pages.
Extended European Search Report, issued in the corresponding European patent application No. 18849976.8, dated May 11, 2021, 8 pages.
Japanese Office Action, issued in the corresponding Japanese patent application No. 2017-179489, dated Jun. 15, 2021, 7 pages (including translation).
Japanese Office Action, issued in the corresponding Japanese patent application No. 2018-053336, dated Feb. 8, 2022, 12 pages (including translation).
Japanese Office Action, issued in the corresponding Japanese patent application No. 2017-244337, dated Aug. 6, 2021, 9 pages (including translation).
Japanese Office Action, issued in the corresponding Japanese patent application No. 2017-166916, dated Nov. 24, 2021, 9 pages (including translation).
Japanese Office Action, issued in the corresponding Japanese patent application No. 2018-035600, dated Sep. 7, 2021, 7 pages (including translation).
Japanese Office Action, issued in the corresponding Japanese patent application No. 2018-053336, dated Oct. 12, 2021, 9 pages (including translation).
Japanese Office Action, issued in the corresponding Japanese patent application No. 2018-162076 dated May 27, 2022, 10 pages (including translation).
Japanese Office Action, issued in the corresponding Japanese patent application No. 2021-198851, dated Sep. 9, 2022, 10 pages (including translation).
Japanese Office Action, issued in the corresponding Japanese patent application No. 2021-202749, dated Sep. 9, 2022, 10 pages (including translation).
Japanese Office Action, issued in the corresponding Japanese patent application No. 2018-162076, dated Nov. 7, 2022, 6 pages (including translation).

* cited by examiner

| | LAYER CONFIGURATION | NORMAL-TEMPERATURE SEAL STRENGTH | SIZE OF BAG | TYPE OF BAG | OUTPUT OF MICROWAVE OVEN | REACHED TEMPERATURE | PEELING OFF PRESSURE | REQUIRED TIME |
|---|---|---|---|---|---|---|---|---|
| EXAMPLE A1 | PET 12μm / NYLON 15μm / POLYPROPYLENE(ZK-500) 60μm | 65N | S | 1 | 500W | 102°C | 116.1kPa | 145s |
| EXAMPLE A2 | PET 12μm / NYLON 15μm / POLYPROPYLENE(ZK-500) 60μm | 65N | M | 1 | 500W | 100°C | 113.5kPa | 131s |
| EXAMPLE A3 | PET 12μm / NYLON 15μm / POLYPROPYLENE(ZK-500) 60μm | 55N | S | 1 | 500W | 102°C | 110kPa | 160s |
| EXAMPLE A4 | PET 12μm / NYLON 15μm / POLYPROPYLENE(ZK-500) 60μm | 55N | M | 1 | 500W | 102°C | 110.5kPa | 163s |
| EXAMPLE A5 | PET 12μm / NYLON 15μm / POLYPROPYLENE(ZK-500) 60μm | 55N | S | 1 | 1600W | 98.9°C | 117.7kPa | 52s |
| EXAMPLE A6 | PET 12μm / NYLON 15μm / POLYPROPYLENE(ZK-500) 60μm | 55N | M | 1 | 1600W | 99.7°C | 117.9kPa | 54s |
| EXAMPLE A7 | PET 12μm / PET 12μm / POLYPROPYLENE(ZK-500) 60μm | 55N | M | 1 | 1600W | 102°C | 114.8kPa | 63s |
| COMPARATIVE EXAMPLE A1 | PET 12μm / PET 12μm / POLYPROPYLENE(ZK-207) 70μm | 65N | S | 1 | 500W | 101°C | 130.7kPa | 147s |
| COMPARATIVE EXAMPLE A2 | PET 12μm / PET 12μm / POLYPROPYLENE(ZK-207) 70μm | 65N | M | 1 | 500W | 102°C | 132.5kPa | 125s |
| EXAMPLE A8 | PET 12μm / PET 12μm / POLYPROPYLENE(ZK-207) 70μm | 55N | S | 1 | 500W | 101°C | 124.9kPa | 144s |
| EXAMPLE A9 | PET 12μm / PET 12μm / POLYPROPYLENE(ZK-207) 70μm | 55N | M | 1 | 500W | 102°C | 125.5kPa | 141s |
| EXAMPLE A10 | PET 12μm / PET 12μm / POLYPROPYLENE(ZK-207) 70μm | 55N | M | 1 | 1600W | 99°C | 124.8kPa | 45s |
| EXAMPLE A11 | PET 12μm / NYLON 15μm / POLYPROPYLENE(ZK-500) 60μm | 65N | S | 2 | 500W | 101°C | 110.8kPa | 142s |
| EXAMPLE A12 | PET 12μm / PET 12μm / POLYPROPYLENE(ZK-207) 70μm | 65N | S | 2 | 500W | 99°C | 124.2kPa | 145s |
| EXAMPLE A13 | PET 12μm / NYLON 15μm / POLYPROPYLENE(ZK-500) 60μm | 65N | S | 3 | 500W | 101°C | 108.9kPa | 130s |
| EXAMPLE A14 | PET 12μm / PET 12μm / POLYPROPYLENE(ZK-207) 70μm | 65N | S | 3 | 500W | 102°C | 122.1kPa | 131s |

FIG.11

|  | SIZE OF BAG | TYPE OF BAG | DISTANCE H1 | DISTANCE H2 | H1/H2 | OUTPUT OF MICROWAVE OVEN | REACHED TEMPERATURE | PEELING OFF PRESSURE |
| --- | --- | --- | --- | --- | --- | --- | --- | --- |
| EXAMPLE B1 | S | 1 | 67mm | 60mm | 1.12 | 500W | 100°C | 118.7kPa |
| EXAMPLE B2 | S | 1 | 62mm | 63mm | 0.98 | 500W | 101°C | 125.0kPa |
| EXAMPLE B3 | S | 1 | 57mm | 65mm | 0.88 | 500W | 103°C | 136.2kPa |

FIG.15

| SEAL TEMPERATURE [°C] | 170 | 175 | 180 | 185 | 190 | 195 | 200 | 205 | 210 | 215 | 220 |
|---|---|---|---|---|---|---|---|---|---|---|---|
| NORMAL-TEMPERATURE SEAL STRENGTH[N/15mm] (PRE-RETORT TREATMENT) | 25.40 | 33.58 | 47.42 | 50.35 | 53.28 | 54.53 | 55.15 | 56.72 | 58.95 | 61.85 | 61.60 |
| NORMAL-TEMPERATURE SEAL STRENGTH[N/15mm] (POST-RETORT TREATMENT) | 18.40 | 27.40 | 38.20 | 43.20 | 48.15 | 49.38 | 50.45 | 52.10 | 52.90 | 54.90 | 56.47 |
| HOT SEAL STRENGTH[N/15mm] (PRE-RETORT TREATMENT) | 3.14 | 3.00 | 2.55 | 4.90 | 6.93 | 7.50 | 7.60 | 8.16 | 9.23 | 11.46 | 11.52 |
| HOT SEAL STRENGTH[N/15mm] (POST-RETORT TREATMENT) | 3.84 | 3.71 | 3.85 | 6.16 | 6.17 | 6.99 | 7.20 | 7.19 | 8.46 | 9.98 | 10.80 |

| | LAYER CONFIGURATION | NORMAL-TEMPERATURE SEAL STRENGTH (PRE-RETORT TREATMENT) | NORMAL-TEMPERATURE SEAL STRENGTH (POST-RETORT TREATMENT) | HOT SEAL STRENGTH (PRE-RETORT TREATMENT) | HOT SEAL STRENGTH (POST-RETORT TREATMENT) | SIZE OF BAG | TYPE OF BAG | OUTPUT OF MICROWAVE OVEN | PEELING OFF PRESSURE | HEAT RESISTANCE |
|---|---|---|---|---|---|---|---|---|---|---|
| EXAMPLE D1 | PET 12μm / NYLON 15μm / POLYPROPYLENE(ZK-500) 60μm | 62N | 58N | 9.2N | 8.5N | S | 1 | 500W | 116.1kPa | great |
| EXAMPLE D2 | PET 12μm / NYLON 15μm / POLYPROPYLENE(ZK-500) 80μm | | | — | | M | 1 | 500W | 113.5kPa | great |
| EXAMPLE D3 | PET 12μm / NYLON 15μm / POLYPROPYLENE(ZK-500) 60μm | 55N | 50N | 7.6N | 7.2N | S | 1 | 500W | 110kPa | great |
| EXAMPLE D4 | PET 12μm / NYLON 15μm / POLYPROPYLENE(ZK-500) 60μm | | | — | | M | 1 | 500W | 110.5kPa | great |
| EXAMPLE D5 | PET 12μm / NYLON 15μm / POLYPROPYLENE(ZK-500) 60μm | | | — | | S | 1 | 1600W | 117kPa | great |
| EXAMPLE D6 | PET 12μm / NYLON 15μm / POLYPROPYLENE(ZK-500) 60μm | | | — | | M | 1 | 1600W | 117.9kPa | great |
| EXAMPLE D7 | PET 12μm / NYLON 15μm / POLYPROPYLENE(ZK-500) 60μm | 55N | 50N | 7.6N | 7.2N | M | 1 | 1600W | 114.8kPa | great |
| EXAMPLE D8 | PET 12μm / NYLON 15μm / POLYPROPYLENE(ZK-500) 60μm | 65N | 60N | 11.5N | 10.8N | S | 1 | 500W | 122.5kPa | good |
| COMPARATIVE EXAMPLE D1 | PET 12μm / NYLON 15μm / POLYPROPYLENE(ZK-207) 70μm | 65N | 60N | 23N | 23N | S | 1 | 500W | 130.7kPa | bad |
| COMPARATIVE EXAMPLE D2 | PET 12μm / NYLON 15μm / POLYPROPYLENE(ZK-207) 70μm | | | — | | M | 1 | 500W | 132.5kPa | bad |
| EXAMPLE D9 | PET 12μm / NYLON 15μm / POLYPROPYLENE(ZK-500) 60μm | | | — | | S | 2 | 500W | 110.8kPa | great |
| EXAMPLE D10 | PET 12μm / NYLON 15μm / POLYPROPYLENE(ZK-500) 60μm | | | — | | S | 3 | 500W | 108.9kPa | great |

FIG.21

| SEAL TEMPERATURE [°C] | 170 | 175 | 180 | 185 | 190 | 195 | 200 | 205 | 210 | 215 | 220 |
|---|---|---|---|---|---|---|---|---|---|---|---|
| NORMAL-TEMPERATURE SEAL STRENGTH[N/15mm] (PRE-RETORT TREATMENT) | 19.20 | 32.21 | 52.15 | 58.50 | 61.65 | 63.02 | 64.38 | 65.81 | 67.42 | 67.40 | 68.50 |
| NORMAL-TEMPERATURE SEAL STRENGTH[N/15mm] (POST-RETORT TREATMENT) | 7.18 | 25.07 | 41.05 | 49.20 | 54.42 | 56.22 | 56.93 | 58.85 | 61.70 | 61.50 | 62.20 |
| HOT SEAL STRENGTH[N/15mm] (PRE-RETORT TREATMENT) | 5.05 | 4.86 | 6.65 | 11.29 | 14.95 | 17.10 | 19.30 | 23.97 | 24.77 | 26.75 | 26.56 |
| HOT SEAL STRENGTH[N/15mm] (POST-RETORT TREATMENT) | 5.92 | 6.65 | 8.17 | 13.49 | 16.64 | 17.05 | 20.13 | 23.62 | 24.43 | 26.39 | 25.84 |

| | LAYER CONFIGURATION | NORMAL-TEMPERATURE SEAL STRENGTH (PRE-RETORT TREATMENT) | NORMAL-TEMPERATURE SEAL STRENGTH (POST-RETORT TREATMENT) | HOT SEAL STRENGTH (PRE-RETORT TREATMENT) | HOT SEAL STRENGTH (POST-RETORT TREATMENT) | SIZE OF BAG | TYPE OF BAG | OUTPUT OF MICROWAVE OVEN | PEELING OFF PRESSURE | HEAT RESISTANCE |
|---|---|---|---|---|---|---|---|---|---|---|
| EXAMPLE F1 | PET 12 μm / PET 12 μm / POLYPROPYLENE(ZK-207) 70 μm | 65N | 60N | 23 N | 23 N | S | 1 | 500W | 130.7kPa | good |
| EXAMPLE F2 | PET 12 μm / PET 12 μm / POLYPROPYLENE(ZK-207) 70 μm | | | | | M | 1 | 500W | 132.5kPa | good |
| EXAMPLE F3 | PET 12 μm / PET 12 μm / POLYPROPYLENE(ZK-207) 70 μm | | | — | | S | 1(inclined) | 500W | 129.4kPa | great |
| EXAMPLE F4 | PET 12 μm / PET 12 μm / POLYPROPYLENE(ZK-207) 70 μm | 60 N | 55 N | 15N | 15 N | S | 1 | 500W | 127.3kPa | great |
| EXAMPLE F5 | PET 12 μm / PET 12 μm / POLYPROPYLENE(ZK-207) 70 μm | 55N | 45 N | 10 N | 9 N | S | 1 | 500W | 124.9kPa | great |
| EXAMPLE F6 | PET 12 μm / PET 12 μm / POLYPROPYLENE(ZK-207) 70 μm | | | — | | M | 1 | 500W | 125.5kPa | great |
| EXAMPLE F7 | PET 12 μm / PET 12 μm / POLYPROPYLENE(ZK-207) 70 μm | | | — | | M | 1 | 1600W | 124.8kPa | great |
| EXAMPLE F8 | PET 12 μm / NYLON 15 μm / POLYPROPYLENE(ZK-207) 70 μm | 58N | 50 N | 11 N | 11 N | S | 1 | 500W | 125.9kPa | great |
| EXAMPLE F9 | PET 12 μm / NYLON 15 μm / POLYPROPYLENE(ZK-207) 70 μm | 53N | 45 N | 10 N | 9 N | S | 1 | 500W | 122.2kPa | great |
| EXAMPLE F10 | PET 12 μm / NYLON 15 μm / POLYPROPYLENE(ZK-207) 70 μm | 50N | 38 N | 7 N | 7 N | S | 1 | 500W | 120.2kPa | great |
| EXAMPLE F11 | PET 12 μm / NYLON 15 μm / POLYPROPYLENE(ZK-207) 70 μm | 45N | 32 N | 6 N | 6 N | S | 1 | 500W | 118.9kPa | great |
| COMPARATIVE EXAMPLE F1 | PET 12 μm / PET 12 μm / POLYPROPYLENE(ZK-207) 70 μm | 70N | 65 N | 26 N | 26 N | S | 1 | 500W | 133.2kPa | bad |
| COMPARATIVE EXAMPLE F2 | PET 12 μm / NYLON 15 μm / POLYPROPYLENE(ZK-207) 70 μm | 35N | 25 N | 5 N | 5 N | S | 1 | 1600W | 115.4kPa | great |
| EXAMPLE F12 | PET 12 μm / PET 12 μm / POLYPROPYLENE(ZK-207) 70 μm | | | — | | S | 2 | 500W | 124.2kPa | great |
| EXAMPLE F13 | PET 12 μm / PET 12 μm / POLYPROPYLENE(ZK-207) 70 μm | | | — | | S | 3 | 500W | 122.1kPa | great |

FIG. 25

BAG

TECHNICAL FIELD

The present invention relates to a bag having a steam-releasing seal part that peels off due to an increase in internal pressure.

BACKGROUND ART

Conventionally, many bags constituted by a laminated body made of plastic, which are filled and sealed with cooked or semi-cooked liquids, viscous substances, or contents containing a mixture of liquid and solid, are on the market. In the bag, a non-seal section where the laminated bodies are not joined together constitutes a storage section in which the contents are stored. In addition, a seal section where the laminated bodies are joined together seals the storage section. The contents are, for example, cooked foods such as curries, stews, and soups. The contents are heated by a microwave oven or the like while being stored in the bag.

However, when the contents stored in the sealed bag are heated using the microwave oven, moisture contained in the contents evaporates by the heating, and a pressure in the storage section increases. If the pressure in the storage section of the bag increases, the bag may be ruptured, so the contents are scattered to contaminate the microwave oven. In consideration of such a problem, for example, Patent Literature 1 proposes to provide a mechanism that automatically communicates the storage section with the outside when the pressure in the storage section increases and allows steam in the storage section to be released to the outside. The mechanism includes a steam-releasing seal part that peels off as the pressure in the storage section increases.

CITATION LIST

Patent Literature

Patent Literature 1: JP 2015-120550 A

SUMMARY OF INVENTION

As a result of intensive examination by the present inventors, the present inventors found that in the conventional bag, the pressure or the temperature of the storage section becomes too high when the steam-releasing seal part peels off, and as a result, damage such as holes or wrinkles may be formed in the laminated body constituting the bag.

An embodiment of the present invention is to provide a bag that can effectively solve such a problem.

According to an embodiment of the present invention, a bag having a storage section is a bag including: laminated bodies that include a sealant film positioned on an inner surface of the bag and at least one plastic film positioned on an outer surface side of the sealant film; and a seal section where inner surfaces of a pair of the laminated bodies are joined together, in which the seal section has an outer edge seal part positioned along an outer edge of the bag, and a steam-releasing seal part that is positioned closer to a center point side of the storage section than the outer edge seal part and peels off due to an increase in pressure in the storage section, and the steam-releasing seal part peels off when the pressure in the storage section is 130 kPa or lower.

The bag according to the embodiment of the present invention may include a non-seal section that is isolated from the storage section by the steam-releasing seal part and extends to the outer edge of the bag.

In the bag according to the embodiment of the present invention, a tensile elongation (%) of the sealant film in a machine direction may be 800% or more, and a tensile elongation (%) of the sealant film in a transverse direction may be 1050% or more.

In the bag according to the embodiment of the present invention, a product of the tensile elongation (%) of the sealant film in the machine direction and a thickness (μm) of the sealant film may be 45,000 or more, and a product of the tensile elongation (%) of the sealant film in the transverse direction and the thickness (μm) of the sealant film may be 53,000 or more.

In the bag according to the embodiment of the present invention, the sealant film may include a propylene/ethylene block copolymer and an elastomer.

According to the embodiment of the present invention, it is possible to suppress the damage such as the formation of holes and wrinkles in the laminated body constituting the bag.

BRIEF DESCRIPTION OF DRAWINGS

FIG. 11 is a diagram illustrating evaluation results of Examples and Comparative Examples in the first embodiment.

FIG. 15 is a diagram illustrating evaluation results of Examples in the first embodiment.

FIG. 21 is a diagram illustrating evaluation results of Examples and Comparative Examples in the second embodiment.

FIG. 25 is a table illustrating evaluation results of Examples and Comparative Examples in the third embodiment.

DESCRIPTION OF EMBODIMENTS

First Embodiment

Figure 1:
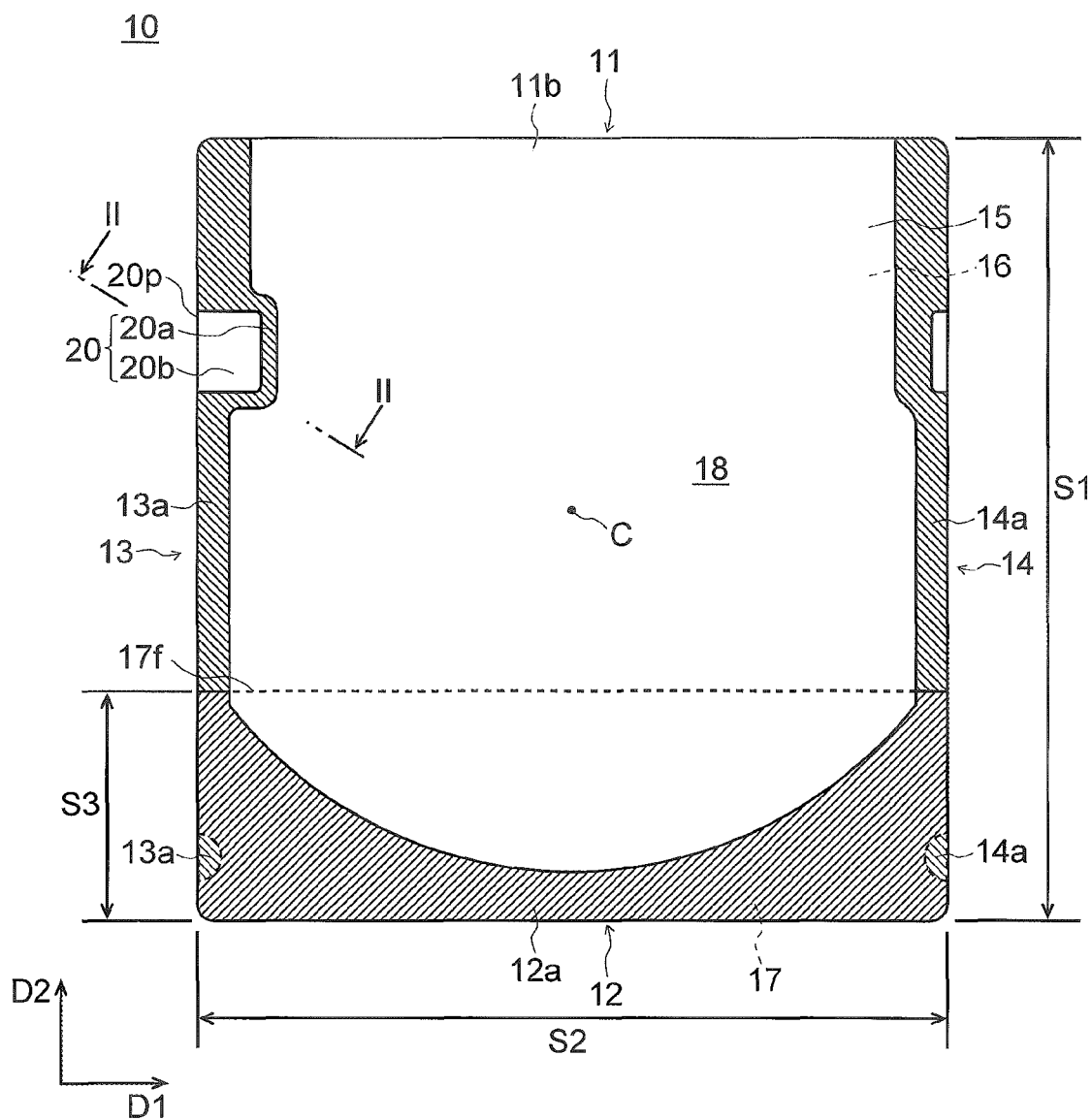
FIG. 1 is a front view illustrating a bag according to a first embodiment of the present invention.

A first embodiment of the present invention will be described with reference to FIGS. 1 to 5. Note that in the drawings attached to the present specification, scales, vertical and horizontal dimensional ratios, and the like are appropriately changed and exaggerated from those of actual products for convenience of illustration and understanding.

Further, in this specification, terms, values of lengths or angles, and the like such as "parallel", "orthogonal", "identical", and the like that specify shapes or geometric conditions and degrees thereof are not to be constrained as being strict meanings, but should be construed to include a range in which similar functions can be expected.

FIG. 1 is a front view illustrating a bag 10 according to the first embodiment. The bag 10 has a storage section 18 that stores contents. Note that in FIG. 1, the bag 10 that does not store the contents is illustrated. The bag 10 according to the first embodiment is configured to be suitably used as a pouch for a microwave oven in which contents are heated by the microwave oven.

As illustrated in FIG. 1, the bag 10 according to the first embodiment includes a steam-releasing mechanism 20 that releases, to the outside, steam generated during heating of the contents stored in the bag 10. The steam-releasing mechanism 20 is configured to communicate with an inside and outside of the bag 10 when a pressure of steam is a predetermined value or greater in order to release the steam, and suppress the steam from being released from locations other than the steam-releasing mechanism 20. Hereinafter, the configuration of the bag 10 will be described.

Bag

In the first embodiment, the bag 10 is a gusset-type bag configured to be self-standing. The bag 10 includes an upper portion 11, a lower portion 12, and a pair of side portions 13 and 14, and has a substantially rectangular outline in a front view. Note that names such as the "upper portion", the "lower portion", and the "side portion", and terms such as "above" and "below" are merely relative representations of locations or directions of the bag 10 or components thereof based on a state in which a gusset part faces down and the bag 10 is self-standing. A posture of the bag 10 during transportation or use is not limited by the names and terms in this specification.

In the first embodiment, a width direction of the bag 10 is also referred to as a first direction D1. The above-described pair of side portions 13 and 14 is opposite to each other in the first direction D1. Further, a direction orthogonal to the first direction D1 is also referred to as a second direction D2. In the bag 10 according to the first embodiment, the usage form in which after the contents of the bag 10 are heated by a microwave oven, a consumer tears the bag 10 in the first direction D1 to open the bag 10 is assumed. Note that in the embodiment described later, the width direction of the bag 10 may be referred to as a horizontal direction or a left-right direction. Further, a direction orthogonal to the width direction of the bag 10 may be referred to as a vertical direction.

As illustrated in FIG. 1, the bag 10 includes a front surface film 15 forming a front surface, a back surface film 16 forming a back surface, and a lower film 17 forming a lower portion 12. The lower film 17 is disposed between the front surface film 15 and the back surface film 16 in a state in which the lower film 17 is folded at a folded part 17f.

Note that the terms such as "front surface film", "back surface film", and "lower film" described above are merely those in which each film is partitioned according to a positional relationship, and a method for providing a film at the time of manufacturing the bag 10 is not limited to the terms described above. For example, the bag 10 may be manufactured using a sheet of film in which the front surface film 15, the back surface film 16, and the lower film 17 are consecutively connected, may be manufactured using a total of two sheets of films of a sheet of film in which the front surface film 15 and the lower film 17 are connected and a sheet of back surface film 16, and may be manufactured using a total of three sheets of films of a sheet of front surface film 15, a sheet of back surface film 16, and a sheet of lower film 17.

Inner surfaces of the front surface film 15, the back surface film 16, and the lower film 17 are joined together by a seal section. In the plan view of the bag 10 of FIG. 1 and the like, the seal section is hatched.

As illustrated in FIG. 1, the seal section has an outer edge seal part extending along an outer edge of the bag 10, and a steam-releasing seal part 20a constituting the steam-releasing mechanism 20. The outer edge seal part includes a lower seal section 12a that extends over the lower portion 12, and a pair of side seal sections 13a and 14a that extend along the pair of side portions 13 and 14. Note that in the bag 10 that does not store the contents, as illustrated in FIG. 1, the upper portion 11 of the bag 10 is an opening 11b. After the contents are stored in the bag 10, the inner surface of the front surface film 15 and the inner surface of the back surface film 16 are joined at the upper portion 11, so an upper seal section is formed to seal the bag 10.

The side seal sections 13a and 14a, the steam-releasing seal part 20a, and the upper seal section are seal sections that are configured by joining the inner surface of the front surface film 15 and the inner surface of the back surface film 16. On the other hand, the lower seal section 12a includes a seal section that is configured by joining the inner surface of the front surface film 15 and the inner surface of the lower film 17, and a seal section that is configured by joining the inner surface of the back surface film 16 and the inner surface of the lower film 17.

The method for forming a seal section is not particularly limited as long as the bag 10 can be sealed by joining the opposing films together. For example, the seal section may be formed by melting the inner surface of the film by heating or the like and fusing the inner surfaces together, that is, by heat sealing. Alternatively, the seal section may be formed by bonding the inner surfaces of the opposing films together using an adhesive or the like.

Steam-Releasing Mechanism

Figure 2:
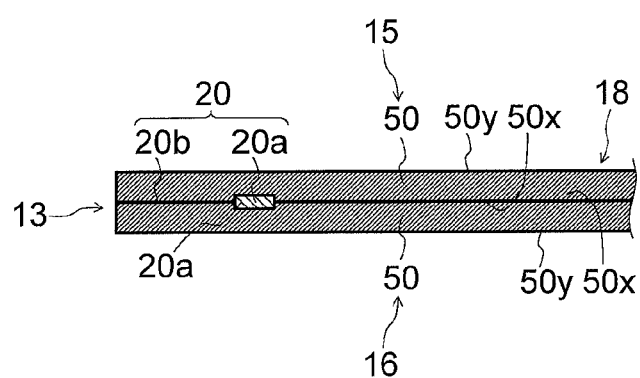
FIG. 2 is a cross-sectional view of the bag illustrated in FIG. 1 taken along line II-II.

Hereinafter, a configuration of the steam-releasing mechanism 20 will be described. FIG. 2 is a cross-sectional view of the steam-releasing mechanism 20 of the bag 10 illustrated in FIG. 1 taken along line II-II.

The steam-releasing seal part 20a of the steam-releasing mechanism 20 has a shape that easily peels off as the pressure in the storage section 18 increases. For example, the steam-releasing seal part 20a has a shape that protrudes from the first side seal section 13a toward the inside of the bag 10. Thereby, when the pressure in the storage section 18 increases, a force applied to the steam-releasing seal part 20a can be greater than a force applied to the first side seal section 13a. In addition, a width of the steam-releasing seal part 20a is smaller than that of the first side seal section 13a. Further, as illustrated in FIGS. 1 and 2, a non-seal section 20b isolated from the storage section 18 by the steam-releasing seal part 20a is formed between the steam-releasing seal part 20a and the outer edge of the first side portions 13.

When the contents of the bag 10 are heated, if moisture contained in the contents evaporates and the pressure in the storage section 18 increases, the bag 10 expands around a center point C of the storage section 18. In this case, a force in a direction from the center point C to the seal section is applied to the seal sections such as the seal sections 13a and 14a and the steam-releasing seal part 20a. The force applied to each position of the seal section increases as a distance from the center point C decreases. The above-described steam-releasing seal part 20a protrudes from the first side seal section 13a toward the storage section 18, and therefore, the force applied to the steam-releasing seal part 20a is greater than the force applied to the first side seal section 13a. Therefore, compared to the first side seal section 13a, in the steam-releasing seal part 20a, the storage section 18 and the outside can easily communicate with each other due to the peeling off of the seal section.

Figure 4:
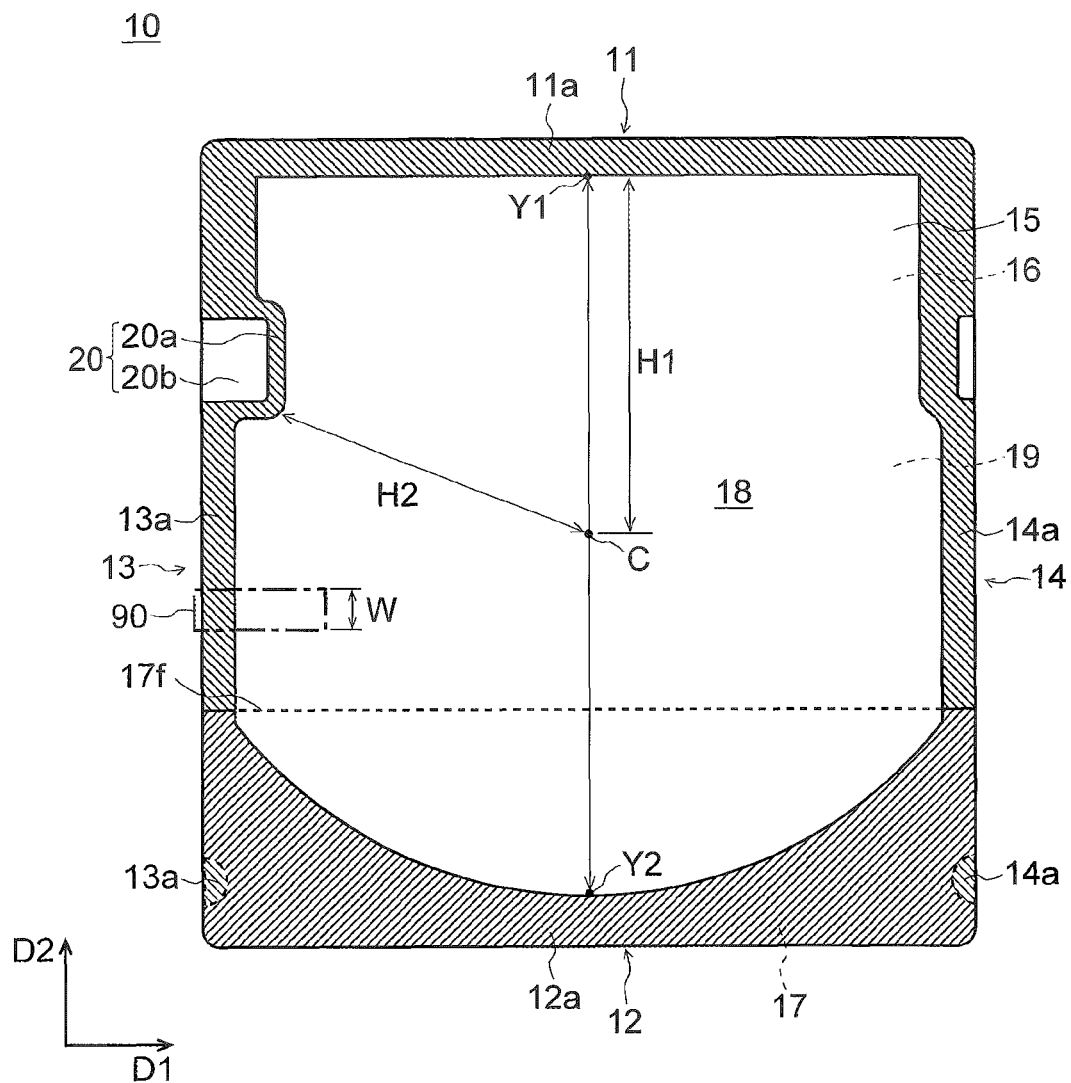
FIG. 4 is a front view illustrating the bag of which the upper portion is sealed.

In the example illustrated in FIGS. 1 and 2, the non-seal section 20b of the steam-releasing mechanism 20 extends to a side edge of the bag 10. Therefore, a portion overlapping with the non-seal section 20b in the side edge of the bag 10 is opened. In this case, the steam flowing from the storage section 18 into the non-seal section 20b through the peeling-off portion of the steam-releasing seal part 20a can be smoothly released to the outside of the bag 10 through an opening 20p on the side edge of the bag 10. In the following description, as illustrated in FIGS. 1 and 2 or FIG. 4 described below, the bag of the type in which the non-seal section 20b of the steam-releasing mechanism 20 extends to the outer edge such as the side edge of the bag 10 may also be referred to as a type 1 bag.

However, when the contents of the bag 10 are heated using a microwave oven or the like, a portion of the contents can splash out and reach the inner surface of the laminated body constituting the bag 10. When the contents attached to the inner surface of the laminated body contain moisture, the contents attached to the inner surface of the laminated body are further heated by the microwave oven. In this case, it is considered that a temperature of the laminated body in contact with the contents also increases, and holes are formed in the laminated body or wrinkles are formed in the laminated body.

In consideration of such a problem, in the first embodiment, when the contents of the bag 10 are heated using the microwave oven or the like, there is proposed the steam-releasing seal part 20a configured to peel off the steam-releasing seal part 20a before the pressure in the storage section 18 increases to 130 kPa. As a result, before a temperature of the contents attached to the inner surface of the bag 10 becomes excessively high, the steam-releasing seal part 20a can peel off to discharge the steam in the storage section 18 to the outside and decrease the pressure and temperature of the storage section 18. By doing so, it is possible to suppress damage such as the formation of holes and wrinkles in the laminated body of the bag 10. In the following description, when the steam-releasing seal part 20a peels off and the storage section 18 communicates with the outside of the bag 10, the pressure in the storage section 18 is also referred to as a peeling off pressure.

Factors that determine the peeling off pressure in the steam-releasing seal part 20a can include a shape and a dimension of the steam-releasing seal part 20a, mechanical properties of a sealant film described below positioned on the inner surface of the laminated body. In addition, when the steam-releasing seal part 20a is formed by heat seal treatment, the peeling off pressure in the steam-releasing seal part 20a can change depending on the conditions of the heat seal treatment such as the temperature. In the first embodiment, the peeling off pressure in the steam-releasing seal part 20a is controlled to 130 kPa or lower by appropriately adjusting these factors. The peeling off pressure in the steam-releasing seal part 20a is more preferably 120 kPa or lower.

It is considered that if the peeling off pressure in the steam-releasing seal part 20a is too low, the steam-releasing seal part 20a peels off before the contents are sufficiently heated and pressurized, and the pressure and temperature of the storage section 18 decrease. Considering this point, the peeling off pressure in the steam-releasing seal part 20a is preferably 105 kPa or greater, and more preferably 110 kPa or greater.

Layer Configuration of Front Surface Film and Back Surface Film

Figure 3:
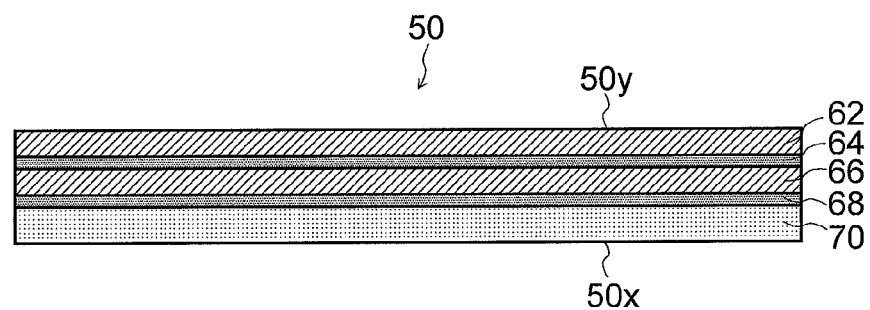
FIG. 3 is a cross-sectional view illustrating an example of a layer configuration of a laminated body constituting the bag.

Next, a layer configuration of the front surface film 15 and the back surface film 16 will be described. FIG. 3 is a cross-sectional view illustrating an example of a layer configuration of the laminated body 50 constituting the front surface film 15 and the back surface film 16.

As illustrated in FIG. 3, the laminated body 50 includes at least a first plastic film 62, a first adhesive layer 64, a second plastic film 66, a second adhesive layer 68, and a sealant film 70 in this order. The first plastic film 62 is positioned on an outer surface $50y$ side, and the sealant film 70 is positioned on an inner surface $50x$ side opposite to the outer surface $50y$. The inner surface $50x$ is a surface positioned on the storage section 18 side.

Hereinafter, each layer of the laminated body 50 will be described in detail.

(First Plastic Film)

The first plastic film 62 is, for example, a stretched plastic film stretched in a predetermined direction. The first plastic film 62 functions as a base layer that gives the laminated body 50 predetermined strength. The first plastic film 62 may be a uniaxially stretched film stretched in a predetermined one direction or a biaxially stretched film stretched in predetermined two directions. The stretching direction of the first plastic film 62 is not particularly limited. For example, the first plastic film 62 may be stretched in the direction in which the side portions 13 and 14 extend or may be stretched in a direction orthogonal to the direction in which the side portions 13 and 14 extend. A stretching ratio of the first plastic film 62 is, for example, 1.05 times or more.

The first plastic film 62 contains, for example, polyester as a main component. For example, the first plastic film 62 contains 51% by mass or more of polyester. Examples of the polyester can include polyethylene terephthalate (hereinafter, also referred to as PET), polybutylene terephthalate (hereinafter, also referred to as PBT), and the like. Note that in the first plastic film 62, 51% by mass or more of polyester may be composed of one type of polyester, or may be composed of two or more types of polyester.

When the first plastic film 62 contains polyester as a main component, a thickness of the first plastic film 62 is preferably 9 μm or more, and more preferably 12 μm or more. In addition, when the first plastic film 62 contains polyester as a main component, the thickness of the first plastic film 62 is preferably 25 μm or less, and more preferably 20 μm or less. By setting the thickness of the first plastic film 62 to be 9 μm or more, the first plastic film 62 has sufficient strength. Further, by setting the thickness of the first plastic film 62 to be 25 μm or less, the first plastic film 62 exhibits excellent moldability. Therefore, the process of manufacturing the bag 10 by processing the laminated body 50 can be efficiently performed.

The first plastic film 62 may contain polyamide as a main component. For example, the first plastic film 62 includes 51% by mass or more of polyamide. Examples of the polyamide include aliphatic polyamide, aromatic polyamide, or the like. Examples of the aliphatic polyamide include nylon-6, nylon-6,6, nylon such as a copolymer of nylon-6 and nylon-6,6, and the like, and examples of the aromatic polyamide include polymethaxylene adipamide (MXD6) and the like. When the first plastic film 62 contains polyamide as a main component, piercing strength of the laminated body 50 including the first plastic film 62 can increase.

When the first plastic film 62 contains polyamide as a main component, the thickness of the first plastic film 62 is preferably 12 μm or more, and more preferably 15 μm or more. In addition, when the first plastic film 62 contains polyamide as a main component, the thickness of the first plastic film 62 is preferably 25 μm or less, and more preferably 20 μm or less.

The first plastic film 62 may be constituted by a single layer, or may be constituted by a plurality of layers. When the first plastic film 62 includes a plurality of layers, the first plastic film 62 is, for example, a co-extrusion film produced by co-extrusion. The first plastic film 62 produced by the co-extrusion includes, for example, a first layer made of polyester such as PET, a second layer made of polyamide such as nylon, and a third layer made of polyester such as PET that are sequentially laminated. Note that when the mass of the second layer made of polyamide such as nylon is 51% or more with respect to a total mass of the first plastic film 62, the main component of the first plastic film 62 produced by the co-extrusion is polyamide.

(First Adhesive Layer)

The first adhesive layer 64 includes an adhesive that bonds the first plastic film 62 to the second plastic film 66 by a dry lamination method. The adhesive constituting the first adhesive layer 64 is produced from an adhesive composition prepared by mixing a first composition containing a main agent and a solvent with a second composition containing a curing agent and a solvent. Specifically, the adhesive includes a cured product produced by a reaction between the main agent and the solvent in the adhesive composition.

Examples of the adhesive can include polyurethane and the like. Polyurethane is a cured product produced by reacting polyol as the main agent with an isocyanate compound as a curing agent. Examples of the polyurethane can include polyether polyurethane, polyester polyurethane, and the like. Polyether polyurethane is a cured product produced by reacting polyether polyol as the main agent with the isocyanate compound as the curing agent. The polyester polyurethane is a cured product produced by reacting polyester polyol as the main agent with the isocyanate compound as the curing agent.

As the isocyanate compound, aromatic-based isocyanate compounds such as tolylene diisocyanate (TDI), 4,4'-diphenylmethane diisocyanate (MDI), and xylylene diisocyanate (XDI), aliphatic-based isocyanate compounds such as hexamethylene diisocyanate (HDI) and isophorone diisocyanate (IPDI), or an adduct or a multimer of the above-described various isocyanate compounds can be used.

The thickness of the first adhesive layer 64 is preferably 2 μm or more, and more preferably 3 μm or more. In addition, the thickness of the first adhesive layer 64 is preferably 6 μm or less, and more preferably 5 μm or less.

(Second Plastic Film)

Similar to the first plastic film 62, the second plastic film 66 is, for example, a plastic film stretched in a predetermined direction. Similar to the first plastic film 62, the second plastic film 66 also functions as the base layer that gives the laminated body 50 the predetermined strength. The stretching direction of the second plastic film 66 is not particularly limited as in the first plastic film 62.

Similar to the first plastic film 62, the second plastic film 66 contains polyester or polyamide as a main component. In order for the laminated body 50 to have heat resistance, it is preferable that at least one of the first plastic film 62 and the second plastic film 66 contains polyester as a main component. Therefore, when the first plastic film 62 contains polyamide as a main component, the second plastic film 66 contains polyester as a main component. When the first plastic film 62 contains polyester as a main component, the second plastic film 66 may contain polyester as a main component, or may contain polyamide as a main component.

When the second plastic film 66 contains polyester as a main component, for example, when the second plastic film 66 contains 51% by mass or more of polyester, examples of the polyester can include PET, PBT, and the like, in the same manner as in the first plastic film 62. The thickness of the second plastic film 66 is preferably 9 μm or more, and more preferably 12 μm or more. In addition, when the second plastic film 66 contains polyester as a main component, the thickness of the second plastic film 66 is preferably 25 μm or less, and more preferably 20 μm or less. When the second plastic film 66 contains polyester as a main component, thermal conductivity, a melting point, and the like of the second plastic film 66 are the same as those of the first plastic film 62 containing polyester as a main component.

When the second plastic film 66 contains polyamide as a main component, for example, when the second plastic film 66 contains 51% by mass or more of polyamide, examples of the polyamide can include aliphatic polyamide, aromatic polyamide, or the like, in the same manner as in the first plastic film 62. The thickness of the second plastic film 66 is preferably 12 μm or more, and more preferably 15 μm or more. In addition, when the second plastic film 66 contains polyamide as a main component, the thickness of the second plastic film 66 is preferably 25 μm or less, and more preferably 20 μm or less.

(Second Adhesive Layer)

The second adhesive layer 68 includes an adhesive that bonds the second plastic film 66 to the sealant film 70 by the dry lamination method. An example of the adhesive of the second adhesive layer 68 can include polyurethane or the like, in the same manner as in the first adhesive layer 64. In addition to the configuration, material, and characteristics described below, the same configuration, material, and characteristics of the second adhesive layer 68 as those of the first adhesive layer 64 can be employed.

A thickness of the second adhesive layer 68 is preferably 2 μm or more, and more preferably 3 μm or more. In addition, the thickness of the second adhesive layer 68 is preferably 6 μm or less, and more preferably 5 μm or less.

However, as described above, the aromatic-based isocyanate compounds and the aliphatic-based isocyanate compounds exist as the isocyanate compound constituting the curing agent of the adhesive. Among these, in the aromatic-based isocyanate compound, components that cannot be used for food use are eluted under the high temperature environment such as heat sterilization. However, the second adhesive layer 68 is in contact with the sealant film 70. For this reason, when the second adhesive layer 68 contains the aromatic-based isocyanate compounds, components eluted from the aromatic-based isocyanate compounds adhere to contents that are stored in the storage section 18 in contact with the sealant film 70.

In consideration of such a problem, preferably, as the adhesive constituting the second adhesive layer 68, the cured product produced by reacting the polyol as the main agent with the aliphatic-based isocyanate compounds as the curing agent is used. As a result, it is possible to prevent the components that cannot be used for food use due to the second adhesive layer 68 from being attached to the contents.

(Sealant Film)

Next, the sealant film 70 will be described. As a material forming the sealant film 70, one or more types of resins selected from polyethylene such as low density polyethylene and linear low density polyethylene, and polypropylene can be used. The sealant film 70 may be a single layer or a multilayer. In addition, the sealant film 70 is preferably made of an unstretched film. The term "unstretched" is a concept that includes not only a film that has not been stretched at all, but also a film that has been slightly stretched due to tension applied during film formation.

The bag 10 constituted by the laminated body 50 is subjected to sterilization treatment, such as boil treatment or retort treatment, at high temperature. Therefore, as the sealant film 70, those having heat resistance to withstand these high-temperature treatments are used.

A melting point of a material forming the sealant film 70 is preferably 150° C. or higher and more preferably 160° C. or higher. By increasing the melting point of the sealant film 70, the bag 10 can be subjected to the retort treatment at high temperature, so the time required for the retort treatment can be shortened. Note that the melting point of the material forming the sealant film 70 is lower than that of the resin forming the plastic films 62 and 66.

From the viewpoint of the retort treatment, a material containing propylene as a main component can be used as the material forming the sealant film 70. Here, the material containing propylene "as a main component" means a material in which a content of propylene is 90% by mass or more. Specific examples of the material containing propylene as a main component can include polypropylene such as a propylene/ethylene block copolymer, a propylene/ethylene random copolymer, a homopolypropylene, a mixture of polypropylene and polyethylene, or the like. Here, the "propylene/ethylene block copolymer" means a material having a structural formula represented by the following Formula (I). In addition, the "propylene/ethylene random copolymer" means a material having a structural formula represented by the following Formula (II). In addition, the "homopolypropylene" means a material having a structural formula represented by the following Formula (III).

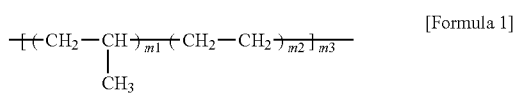

[Formula 1]

In the above Formula (I), m1, m2, and m3 denote an integer of 1 or more

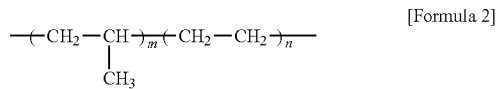

[Formula 2]

In the above Formula (II), m and n denote an integer of 1 or more

[Formula 3]

In the above formula (III), m denotes an integer of 1 or more

When the mixture of polypropylene and polyethylene is used as the material containing propylene as a main component, the material may have a sea-island structure. Here, the "sea-island structure" refers to a structure in which polyethylene is discontinuously dispersed in a region where polypropylene is continuous.

From the viewpoint of the boil treatment, examples of the material forming the sealant film 70 can include polyethylene, polypropylene, or combinations thereof. Examples of the polyethylene can include medium density polyethylene, linear low density polyethylene, or combinations thereof. For example, as the materials forming the sealant film 70 from the viewpoint of the above-described retort treatment, the materials listed can be used. The material forming the sealant film 70 has a melting point of, for example, 100° C. or higher, more preferably 105° C. or higher, and still more preferably 110° C. or higher. When polyethylene is used as the material forming the sealant film 70, a melting point of 100° C. or higher can be realized, for example, when the density of polyethylene is 0.920 g/cm³ or more. In addition, specific examples of the sealant film 70 having a melting point of 100° C. or higher can include TUX-HC manufactured by Mitsui Chemicals Tohcello Inc., L6101 manufactured by Toyobo Co. Ltd., and LS700C manufactured by Idemitsu Unitech Co., Ltd., and the like. Specific examples of the sealant film 70 having a melting point of 105° C. or higher include NB-1 manufactured by Tamapoly Co., Ltd., and the like. Specific examples of the sealant film 70 having a melting point of 110° C. or higher can include LS760C manufactured by Idemitsu Unitech Co., Ltd., TUX-HZ manufactured by Mitsui Chemicals Tohcello Inc., and the like.

Preferably, the sealant film 70 is a single-layer film containing a propylene/ethylene block copolymer. For example, the sealant film 70 is a single-layer unstretched film containing a propylene/ethylene block copolymer as a main component. By using the propylene/ethylene block copolymer, impact resistance of the sealant film 70 can increase, and as a result, it is possible to suppress the bag 10 from being broken due to the impact during dropping. In addition, the piercing resistance of the laminated body 50 can increase.

In addition, by using the propylene/ethylene block copolymer, the strength (hereinafter, also referred to as hot seal strength) of the seal section constituted by the sealant film 70 at high temperature, for example, at 100° C. or higher is extremely smaller than the seal strength at low temperature, for example, at room temperature. For example, the hot seal strength at 100° C. is one-fourth or less of the seal strength at 25° C. (hereinafter, also referred to as seal strength at room temperature). Since the hot seal strength is low, when the bag 10 is heated using the microwave oven, the steam-releasing seal part 20a easily peels off, and the steam in the storage section 18 is easily released to the outside of the bag 10. For this reason, it is possible to suppress the internal pressure of the storage section 18 from becoming excessive, thereby suppressing the damage from being occurring in the laminated body 50 during heating. The seal strength can be measured according to JIS Z1707 7.5. As a measuring instrument, for example, a tensile tester RTC-1310A with a thermostat manufactured by Orientec Co., Ltd., can be used.

The propylene/ethylene block copolymer includes, for example, a sea component composed of polypropylene and an island component composed of an ethylene/propylene copolymer rubber component. The sea component can contribute to increasing blocking resistance, heat resistance, rigidity, seal strength, and the like of the propylene/ethylene block copolymer. In addition, the island component can contribute to increasing the impact resistance of the propylene/ethylene block copolymer. Therefore, the mechanical properties of the sealant film 70 containing the propylene/ethylene block copolymer can be adjusted by adjusting the ratio of the sea component and the island component.

In the propylene/ethylene block copolymer, a mass ratio of the sea component composed of polypropylene is higher than that of the island component composed of the ethylene/propylene copolymer rubber component. For example, in the propylene/ethylene block copolymer, the mass ratio of the sea component composed of polypropylene is at least 51% by mass or more, preferably 60% by mass or more, and more preferably 70% by mass or more.

The single-layer sealant film 70 may further contain a second thermoplastic resin in addition to a first thermoplastic resin composed of a propylene/ethylene block copolymer. Examples of the second thermoplastic resin can include an α-olefin copolymer, polyethylene, and the like. The α-olefin copolymer is, for example, linear low density polyethylene. Examples of the polyethylene can include low density polyethylene, medium density polyethylene, and high density polyethylene. The second thermoplastic resin can contribute to increasing the impact resistance of the sealant film 70.

The low density polyethylene is polyethylene having a density of 0.910 g/cm³ or more and 0.925 g/cm³ or less. The medium density polyethylene is polyethylene having a density of 0.926 g/cm³ or more and 0.940 g/cm³ or less. The high density polyethylene is polyethylene having a density of 0.941 g/cm³ or more and 0.965 g/cm³ or less. The low density polyethylene is obtained, for example, by polymerizing ethylene at high pressure of 1,000 atm or greater and lower than 2,000 atm. The medium density polyethylene and the high density polyethylene are obtained, for example, by polymerizing ethylene at a medium pressure or a low pressure of 1 atm or greater and lower than 1000 atm.

Note that the medium density polyethylene and the high density polyethylene may partially contain a copolymer of ethylene and α-olefin. Further, even when ethylene is polymerized at a medium pressure or a low pressure, when a copolymer of ethylene and α-olefin is contained, medium density or low density polyethylene can be produced. Such polyethylene is referred to as the above-described linear low density polyethylene. The linear low density polyethylene is obtained by copolymerizing α-olefin with a linear polymer obtained by polymerizing ethylene at a medium pressure or a low pressure and introducing short-chain branch. Examples of the α-olefins can include 1-butene ($C_4$), 1-hexene ($C_6$), 4-methylpentene ($C_6$), 1-octene ($C_8$), and the like. The density of the linear low density polyethylene is, for example, 0.915 g/cm³ or more and 0.945 g/cm³ or less.

Note that the α-olefin copolymer forming the second thermoplastic resin of the propylene/ethylene block copolymer is not limited to the above-described linear low density polyethylene. The α-olefin copolymer means a material having a structural formula represented by the following Formula (IV).

[Formula 4]

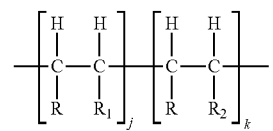

Both $R_1$ and $R_2$ are a hydrogen atom (H) or an alkyl group such as $CH_3$ and $C_2H_5$. In addition, both j and k are an integer of 1 or more. In addition, j is greater than k. That is, the α-olefin copolymer represented by Formula (IV) is based on a left structure including $R_1$. $R_1$ is, for example, H, and $R_2$ is, for example, $C_2H_5$.

In the sealant film 70, the mass ratio of the first thermoplastic resin made of the propylene/ethylene block copolymer is higher than that of the second thermoplastic resin containing at least the α-olefin copolymer or polyethylene. For example, in the single-layer sealant film 70, the mass ratio of the first thermoplastic resin composed of the propylene/ethylene block copolymer is at least 51% by mass or more, preferably 60% by mass or more, and more preferably 70% by mass or more.

As described above, the second thermoplastic resin can contribute to increasing the impact resistance of the sealant film 70. Therefore, the mechanical properties of the sealant film 70 can be adjusted by adjusting the mass ratio of the second thermoplastic resin containing at least the α-olefin copolymer or polyethylene in the single-layer sealant film 70.

Further, the sealant film 70 may further include a thermoplastic elastomer. By using the thermoplastic elastomer, the impact resistance or piercing resistance of the sealant film 70 can be further improved.

The thermoplastic elastomer is, for example, a hydrogenated styrene-based thermoplastic elastomer. The hydrogenated styrene-based thermoplastic elastomer has a structure composed of a polymer block A mainly composed of at least one vinyl aromatic compound and a polymer block B mainly composed of at least one hydrogenated conjugated diene compound. Further, the thermoplastic elastomer may be an ethylene/α-olefin elastomer. The ethylene/α-olefin elastomer is a low crystalline or amorphous copolymer elastomer, and is a random copolymer of 50 to 90% by mass of ethylene as a main component and α-olefin as a copolymerization monomer.

A content of the propylene/ethylene block copolymer in the sealant film 70 is, for example, 80% by mass or more, and preferably 90% by mass or more.

Examples of the method for preparing a propylene/ethylene block copolymer include a method for polymerizing propylene, ethylene, or the like as a raw material using a catalyst. As the catalyst, a Ziegler-Natta type, a metallocene catalyst, or the like can be used.

The thickness of the sealant film 70 is preferably 30 μm or more, and more preferably 40 μm or more. In addition, the thickness of the sealant film 70 is preferably 100 μm or less, and more preferably 80 μm or less.

Hereinafter, preferable mechanical properties of the single-layer sealant film 70 containing the propylene/ethylene block copolymer will be described.

The tensile elongation of the sealant film 70 at 25° C. in a machine direction (MD) is preferably 600% or more and 1,300% or less. In addition, a product of the tensile elongation (%) of the sealant film 70 in the machine direction (MD) and the thickness (μm) of the sealant film 70 is preferably 35,000 or more and 80,000 or less. In addition, the tensile elongation of the sealant film 70 at 25° C. in a transverse direction (TD) is preferably 700% or more and 1,400% or less. In addition, the product of the tensile elongation (%) of the sealant film 70 in the transverse direction (TD) and the thickness (μm) of the sealant film 70 is preferably 40,000 or more and 85,000 or less.

The tensile modulus of elasticity of the sealant film 70 at 25° C. in the machine direction (MD) is preferably 400 MPa or more and 1,100 MPa or less. In addition, a product of the tensile modulus of elasticity (MPa) of the sealant film 70 in the machine direction (MD) and the thickness (μm) of the sealant film 70 is preferably 30,000 or more and 55,000 or less. The tensile modulus of elasticity of the sealant film 70 at 25° C. in the transverse direction (TD) is preferably 250 MPa or more and 900 MPa or less. In addition, the product of the tensile modulus of elasticity (MPa) of the sealant film 70 in the transverse direction (TD) and the thickness (μm) of the sealant film 70 is preferably 20,000 or more and 45,000 or less.

The tensile modulus of elasticity and the tensile elongation can be measured according to JIS K7127. As the measuring instrument, for example, a tensile tester RTC-1310A with a thermostat manufactured by Orientec Co., Ltd., can be used. Note that in the bag 10 illustrated in FIG. 1, the direction in which the upper portion 11 and the lower portion 12 extend is the machine direction of the sealant film 70, and the direction in which the side portions 13 and 14 extend is the transverse direction of the sealant film 70. Although not illustrated, the bag 10 may be configured so that the direction in which the upper portion 11 and the lower portion 12 extend is the transverse direction of the sealant film 70, and the direction in which the side portions 13 and 14 extend is the machine direction of the sealant film 70.

As the type of the single-layer sealant film 70 including the propylene/ethylene block copolymer, two types are mainly considered.

A first type is a type having high tensile elongation and impact resistance like ZK500 described later. Preferably, the first type sealant film 70 further has the property of low hot seal strength. As a result, it is possible to suppress the internal pressure of the storage section 18 from becoming excessive during the heating of the bag 10, thereby suppressing the damage from occurring in the laminated body 50.

The second type is a type having a high tensile modulus of elasticity like ZK207 described later. By using the second type sealant film 70, tearability of the bag 10 when a consumer opens the bag 10 by tearing the bag 10 along the first direction D1 can be enhanced.

The product of the tensile elongation (%) of the first type sealant film 70 in the machine direction (MD) and the thickness (μm) of the sealant film 70 may be preferably 45,000 or more, more preferably 50,000 or more, 55,000 or more, or 60,000 or more. In addition, the product of the tensile elongation (%) of the first type sealant film 70 in the transverse direction (TD) and the thickness (μm) of the sealant film 70 may be preferably 53,000 or more and more preferably 60,000 or more. By making the sealant film 70 have the high tensile elongation, it is possible to prevent the bag 10 from being broken due to the impact during dropping.

In addition, the product of the tensile modulus of elasticity (MPa) of the first type sealant film 70 in the machine direction (MD) and the thickness (μm) of the sealant film 70 may be preferably 38,000 or less and more preferably 35,000 or less. In addition, the product of the tensile modulus of elasticity (MPa) of the first type sealant film 70 in the transverse direction (TD) and the thickness (μm) of the sealant film 70 may be preferably 30,000 or less and more preferably 25,000 or less.

The product of the tensile modulus of elasticity (MPa) of the second type sealant film 70 in the machine direction (MD) and the thickness (μm) of the sealant film 70 may be preferably 35,000 or more, more preferably 38,000 or more, and still more preferably 45,000 or more. In addition, the product of the tensile modulus of elasticity (MPa) of the second type sealant film 70 in the transverse direction (TD) and the thickness (μm) of the sealant film 70 may be preferably 25,000 or more, more preferably 30,000 or more, and still more preferably 35,000 or more and 38,000 or more. By making the sealant film 70 have a high tensile modulus of elasticity, the tearability when opening the bag 10 can be enhanced.

In addition, the product of the tensile elongation (%) of the second type sealant film 70 in the machine direction (MD) and the thickness (μm) of the sealant film 70 is preferably 55,000 or less and more preferably 50,000 or less. In addition, the product of the tensile elongation (%) of the second type sealant film 70 in the transverse direction (TD) and the thickness (μm) of the sealant film 70 is preferably 60,000 or less and more preferably 55,000 or less.

(Other Layers)

The laminated body 50 may further include a layer not illustrated in FIG. 3. Hereinafter, an example of an additional layer will be described.

The laminated body 50 may further include a printing layer. The printing layer is a layer provided on the laminated body 50 in order to show product information on the bag 10 or impart aesthetics, and is printed on the first plastic film 62, for example. The printing layer expresses characters, numbers, symbols, figures, patterns, and the like. As a material forming the printing layer, an ink for gravure printing or an ink for flexographic printing can be used. Specific examples of the gravure printing ink can include Finart manufactured by DIC Graphics Co.

Further, the laminated body 50 may further include a transparent gas barrier layer. The transparent gas barrier layer is formed on the surfaces and the like of the plastic films 62 and 66, and includes at least a transparent vapor deposition layer made of an inorganic material having transparency. Further, the transparent gas barrier layer may be formed on a surface of the transparent vapor deposition layer, and may further include a transparent gas barrier coating film having transparency.

The transparent vapor deposition layer functions as a layer having a gas barrier function of preventing permeation of oxygen gas, water vapor, and the like. Note that two or more transparent vapor deposition layers may be provided. When the transparent vapor deposition layer has two or more layers, each layer may have the same composition or different compositions. Examples of the method for forming a transparent vapor deposition layer can include physical vapor deposition methods (PVD methods) such as a vacuum deposition method, a sputtering method, and an ion plating method, or chemical vapor deposition methods (CVD methods) such as a plasma chemical vapor deposition method, a thermal chemical vapor deposition method, and a photochemical vapor deposition method. Specifically, a vapor deposition layer can be formed on a film forming roller using a roller type vapor-deposited film forming apparatus. Examples of the inorganic material forming the transparent vapor deposition layer can include aluminum oxide, silicon oxide, and the like. The thickness of the transparent vapor deposition layer is preferably 40 Å or more and 130 Å or less, and more preferably 50 Å or more and 120 Å or less.

The transparent gas barrier coating film is a layer that functions as a layer that suppresses permeation of oxygen gas, water vapor, and the like. The transparent gas barrier coating film contains at least one or more alkoxides represented by a general formula $R^1{}_nM(OR^2)_m$ (In the above general formula, $R^1$ and $R^2$ represent an organic group having 1 to 8 carbon atoms, M represents a metal atom, n represents an integer of 0 or more, m represents an integer of 1 or more, and n+m represents a valence of M) and a polyvinyl alcohol-based resin and/or an ethylene/vinyl alcohol copolymer as described above, and furthermore, the transparent gas barrier coating film is obtained by a transparent gas barrier composition that is polycondensed by a sol-gel method in the presence of a sol-gel method catalyst, acid, water, and an organic solvent.

Layer Configuration of Lower Film

Next, the layer configuration of the lower film 17 will be described.

The layer configuration of the lower film 17 is arbitrary as long as the layer has an inner surface that can be joined to the inner surface of the front surface film 15 and the inner surface of the back surface film 16. For example, similar to the front surface film 15 and the back surface film 16, the above-described laminated body 50 may be used as the lower film 17. Alternatively, a film having an inner surface constituted by a sealant layer and having a different configuration from the laminated body 50 may be used as the lower film 17.

Method for Manufacturing Laminated Body

Next, an example of a method for manufacturing a laminated body 50 will be described.

First, the first plastic film 62 and the second plastic film 66 described above are prepared. Subsequently, the first plastic film 62 and the second plastic film 66 are laminated via the first adhesive layer 64 by the dry lamination method. Thereafter, the laminated body including the first plastic film 62 and the second plastic film 66 and the sealant film 70 are laminated via the second adhesive layer 68 by the dry lamination method. As a result, the laminated body 50 including the first plastic film 62, the second plastic film 66, and the sealant film 70 can be obtained.

Alternatively, first, the second plastic film 66 and the sealant film 70 are laminated via the second adhesive layer 68 by the dry lamination method, and thereafter, the laminated body including the first plastic film 62, the second plastic film 66, and the sealant film 70 is laminated via the first adhesive layer 64 by the dry lamination method, so the laminated body 50 may be produced.

In the dry lamination method, first, an adhesive composition is applied to one of two films to be laminated. Subsequently, the applied adhesive composition is dried to volatilize a solvent. Thereafter, two films are laminated via the dried adhesive composition. Subsequently, in a state in which the two laminated films are wound up, aging is performed for 24 hours or more in an environment of, for example, 20° C. or higher.

Method for Manufacturing Bag

Next, a method for manufacturing a bag 10 using the above-described laminated body 50 will be described. First, the front surface film 15 and the back surface film 16 constituting the laminated body 50 are prepared. In addition, the folded lower film 17 is inserted between the front surface film 15 and the back surface film 16. Subsequently, the inner surfaces of each film are heat-sealed together to form the seal section of the lower seal section 12a, the side seal sections 13a and 14a, the steam-releasing seal part 20a, and the like. Further, the films joined to each other by the heat sealing are cut into an appropriate shape to obtain the bag 10 illustrated in FIG. 1. Subsequently, contents 19 are filled into the bag 10 via the opening 11b of the upper portion 11. The contents 19 are, for example, cooked foods including moisture such as curries, stews, and soups. In addition, the contents 19 may contain a material containing a large amount of oil content, such as meat, fish, and a seasoning therefor. In addition, in addition to foods, those that can be heated by double-boiling or the like can be stored in the bag 10 as contents. Thereafter, the upper portion 11 is heat-sealed to form the upper seal section. In this way, as illustrated in FIG. 4, the sealed bag 10 in which the contents 19 are stored can be obtained. Thereafter, the sterilization treatment such as the boil treatment or the retort treatment is performed on the bag 10 storing the contents 19 as necessary.

In FIG. 4, reference sign H1 denotes a distance in the second direction D2 from the upper seal section 11a to the center point C of the storage section 18. In addition, reference numeral H2 denotes a shortest distance from the steam-releasing seal part 20a to the center point C of the storage section 18. In the type 1 bag as illustrated in FIG. 4, a ratio (=H1/H2) of the distance H1 to the distance H2 is, for example, 1.05 or more and 4.0 or less, and more preferably 1.1 or more and 4.0 or less. By setting the distance H1 and the distance H2 in this way, it is possible to suppress the upper seal section 11a from peeling off before the steam-releasing seal part 20a peels off when the bag 10 is heated. Note that the center point C of the storage section 18 is defined as a middle point of a line segment connecting between a middle point Y1 of the inner edge of the upper seal section 11a and a middle point Y2 of the inner edge of the lower seal section 12a.

When the seal section such as the steam-releasing seal part 20a is formed by the heat seal treatment, the conditions of the heat seal treatment are set according to the material of the sealant film 70 so that the peeling off pressure in the steam-releasing seal part 20a becomes 130 kPa or lower.

Method for Measuring Peeling Off Pressure

Figure 5:
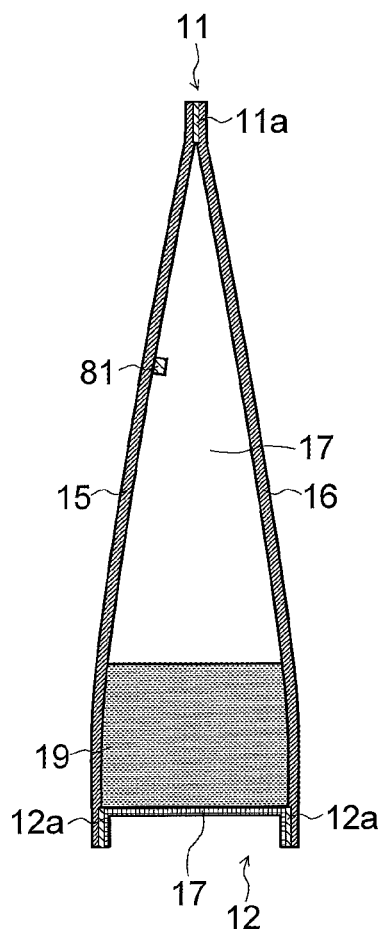
FIG. 5 is a diagram illustrating an example of a method for measuring a pressure in a storage section.

Next, a method for measuring a peeling off pressure in a steam-releasing seal part 20a will be described. First, as illustrated in FIG. 1 described above, when the bag 10 in the state in which the upper seal section 11a is not formed in the upper portion 11 is available, the method for measuring a peeling-off pressure in a steam-releasing seal part 20a will be described with reference to FIG. 5. FIG. 5 is a longitudinal cross-sectional view illustrating the bag 10 in which a sensor 81 for measuring the peeling off pressure is provided in the storage section 18.

First, as illustrated in FIG. 1 described above, the bag 10 in the state in which the upper seal section 11a is not formed in the upper portion 11 and the upper portion 11 is the opening 11b is prepared. Subsequently, the sensor 81 of a data logger capable of measuring a pressure is provided inside the bag 10. For example, the sensor 81 is attached to the inner surface of the bag 10. In addition, the storage section 18 of the bag 10 is filled with a predetermined amount of water, for example, 100 ml of water. Thereafter, the seal section is formed in the opening of the bag 10 to seal the bag 10. As the data logger, for example, PicoVACQ PT manufactured by TMI-ORION can be used. PicoVACQ PT can also measure the temperature in addition to the pressure.

Subsequently, while measuring the pressure in the storage section 18 at a predetermined time interval using the sensor 81, the water in the bag 10 is heated using the microwave oven or the like. As the microwave oven, any microwave oven having an output in the range of 500 W to 1500 W can be used. The time interval is, for example, 0.1 seconds or more and 10 seconds or less, for example, 1.0 seconds.

As the water evaporates and the pressure in the storage section 18 increases, the steam-releasing seal part 20a begins to peel off. When the peeling off of the steam-releasing seal part 20a progresses to the outer edge of the bag 10 and the storage section 18 communicates with the non-seal section 20b and the outside of the bag 10, the pressure in the storage section 18 measured by the sensor 81 decreases sharply. The pressure in storage section 18 measured just before the pressure begins to decrease sharply is recorded as the peeling off pressure in the steam-releasing seal part 20a. The temperature of the storage section 18 just before the pressure begins to drop sharply is, for example, 80° C. or higher and 120° C. or lower.

Next, as illustrated in FIG. 4, a method for measuring a peeling off pressure in the steam-releasing seal part 20a using a bag 10 in a state in which the contents are stored and the upper portion 11 is sealed will be described with reference to FIGS. 12A to 12D.

Figure 12A:
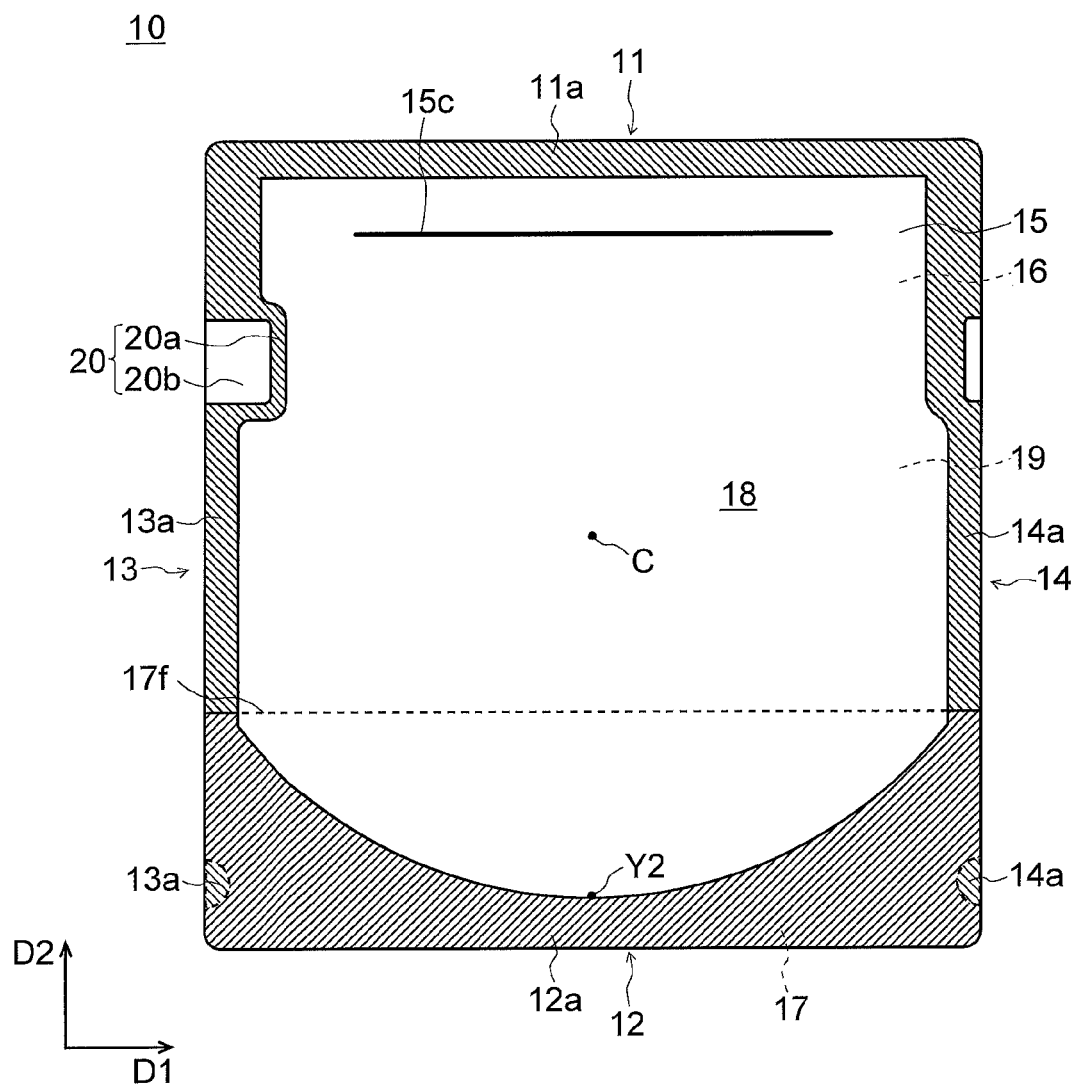
FIG. 12A is a diagram illustrating another example of the method for measuring a pressure in a storage section.

The bag 10 that is partially opened is prepared. Specifically, first, as illustrated in FIG. 4, the bag 10 in the state in which the contents are stored and the upper portion 11 is sealed is prepared. Subsequently, an opening for taking out contents is provided on one of the front surface film 15 and the back surface film 16. For example, as illustrated in FIG. 12A, an opening 15c is provided on the front surface film 15 by forming a cut penetrating through the front surface film 15 in the front surface film 15. The opening 15c is positioned below the upper seal section 11a and above the steam-releasing seal part 20a. In addition, the opening 15c extends in the first direction D1 so as not to reach the left and right side seal sections 13a and 14a. Thereafter, the contents stored in the bag 10 are taken out to the outside via the opening 15c. Thereafter, the inside of the bag 10 may be washed to further remove contents attached to the inner surface of the bag 10.

Subsequently, a film 15d that can be thermally fused to an inner surface 50x of the front surface film 15 provided with the opening 15c is prepared. The film 15d can be introduced into the storage section 18 of the bag 10 via the opening 15c, and has a shape that can cover the opening 15c. The same laminated body as the front surface film 15 can be used as the film 15d. Such a film 15d can be prepared by, for example, purchasing the bag 10 and cutting out the front surface film 15 of the bag 10 when the bag 10 is commercially available with the contents stored therein.

Figure 12B:
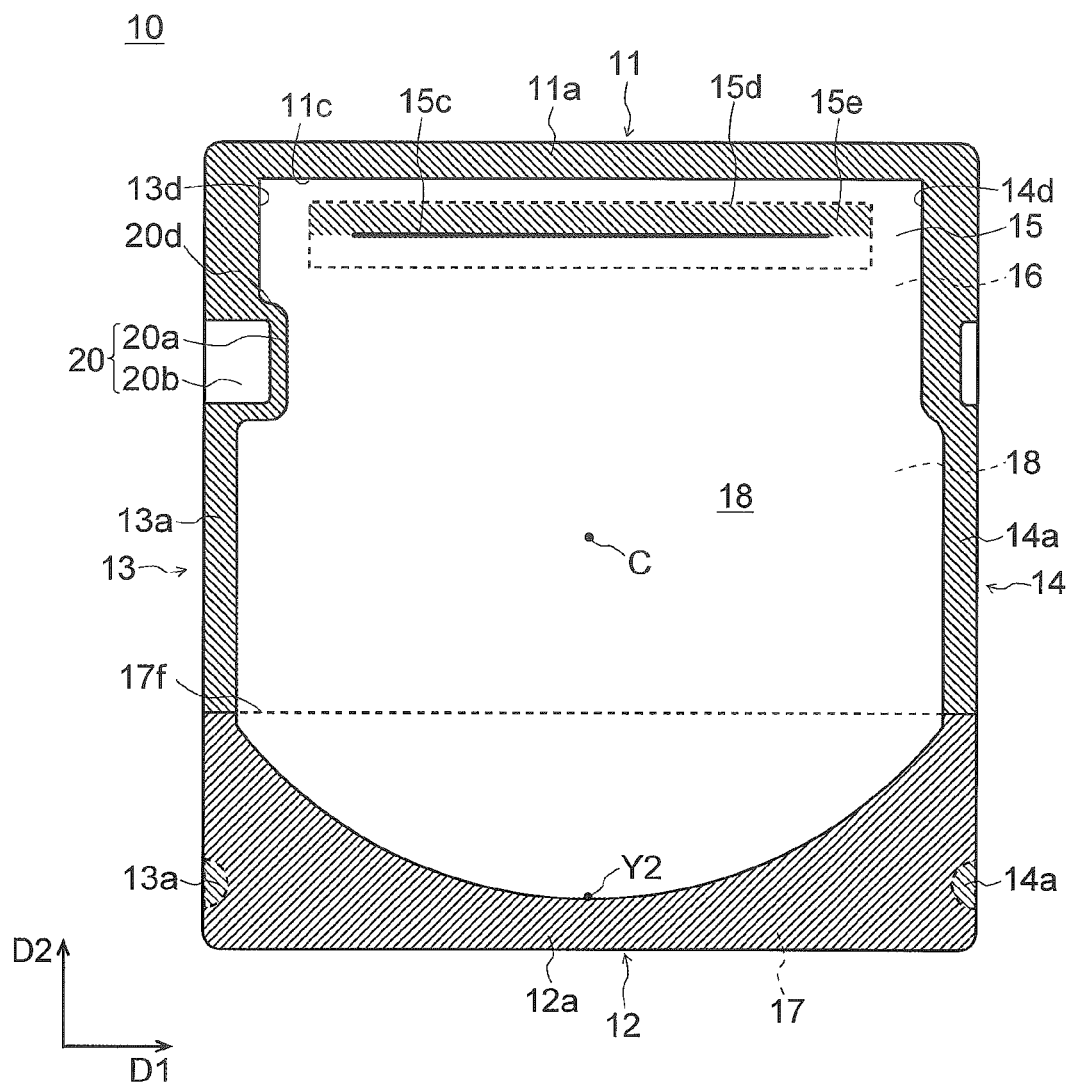
FIG. 12B is a diagram illustrating another example of the method for measuring a pressure in a storage section.

Subsequently, as illustrated in FIG. 12B, the film 15d is introduced into the storage section 18 of the bag 10 via the opening 15c. At this time, the inner surface of the film 15d is directed to the inner surface 50x side of the front surface film 15. The film 15d is positioned between an inner edge 11c of the upper seal section 11a of the bag 10 and an upper edge 20d of the steam-releasing seal part 20a, in the second direction D2. In addition, the film 15d is positioned between an inner edge 13d of the first side seal section 13a and an inner edge 14d of the second side seal section 14a. In addition, the film 15d covers the entire area of the opening 15c. Thereafter, the inner surface of the portion positioned above the opening 15c in the film 15d is thermally welded to the inner surface 50x of the front surface film 15. In FIG. 12B, the seal section 15e formed by heat welding is hatched.

Figure 12C:
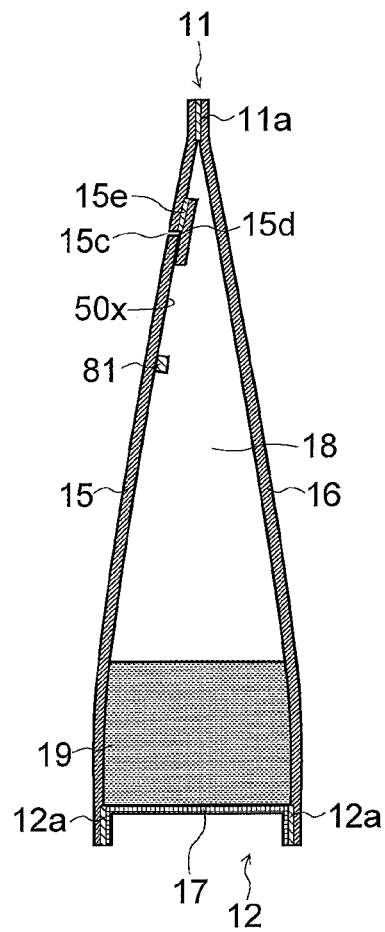
FIG. 12C is a diagram illustrating another example of the method for measuring a pressure in a storage section.
Figure 12D:
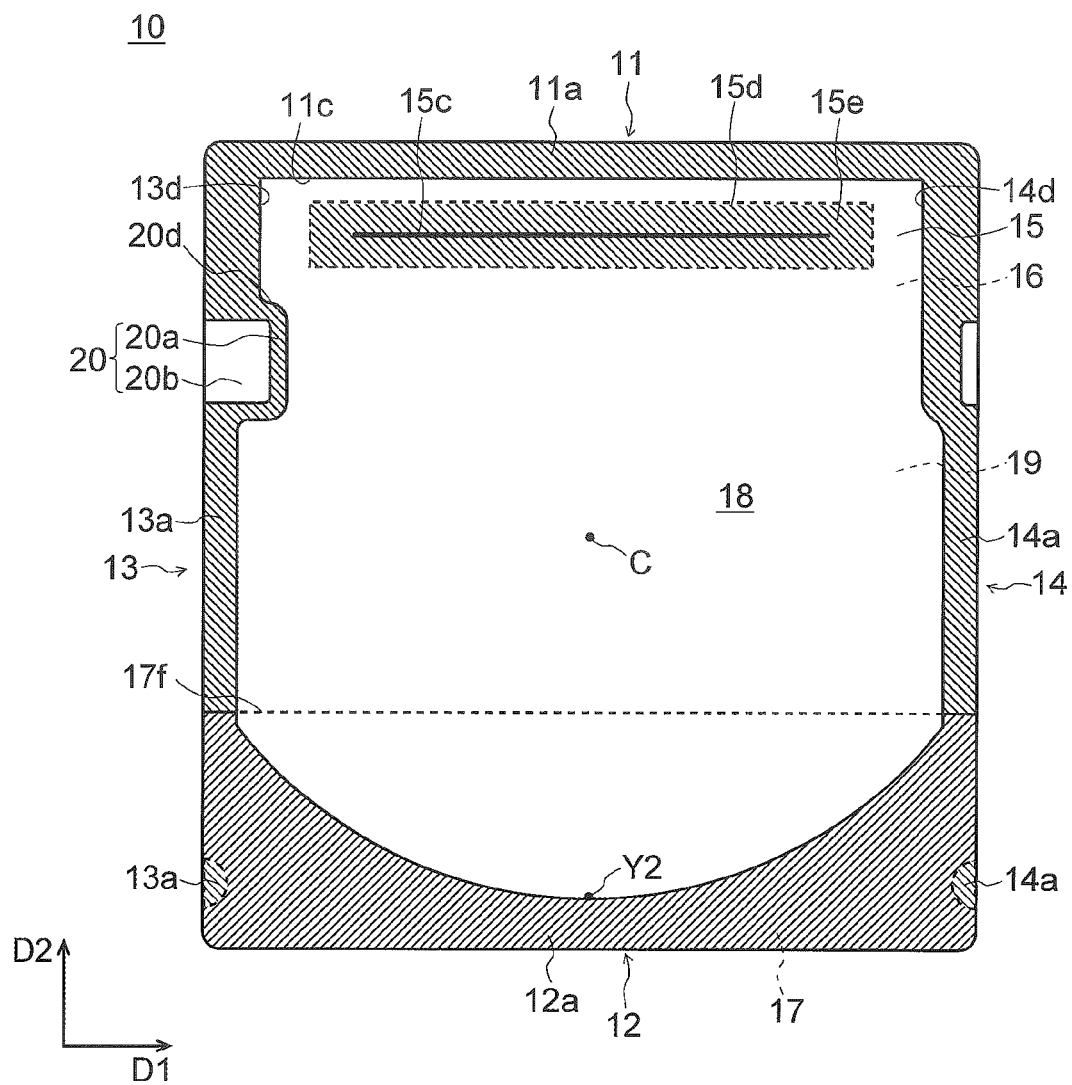
FIG. 12D is a diagram illustrating another example of the method for measuring a pressure in a storage section.

Subsequently, as illustrated in FIG. 12C, the sensor 81 of the data logger capable of measuring a pressure is introduced into the bag 10 via the opening 15c. For example, the sensor 81 is attached to the inner surface of the bag 10. In addition, the storage section 18 of the bag 10 is filled with a predetermined amount of water, for example, 100 ml of water via the opening 15c. Thereafter, the inner surface of the film 15d is heat-welded to the inner surface 50x of the front surface film 15 so as to seal the bag 10 from the outside. For example, a portion of the inner surface of the film 15d that has not yet been thermally welded to the inner surface 50x of the front surface film 15 is heated and pressed. Thereby, as illustrated in FIG. 12D, the opening 15c of the bag 10 can be sealed. Thereafter, as described above, the water in the bag 10 is heated using the microwave oven or the like while measuring the pressure in the storage section 18 at a predetermined time interval using the sensor 81, so the peeling off pressure can be measured.

Method for Heating Contents

Next, an example of a method for heating contents 19 stored in a bag 10 will be described.

First, the bag 10 is put inside the microwave oven in the state in which the lower portion 12 faces down and the bag 10 is self-standing. Next, the contents are heated using the microwave oven. As a result, the temperature of the contents 19 increases, so the moisture contained in the contents 19 evaporates, and the pressure in the storage section 18 increases.

When the pressure in the storage section 18 increases, the front surface film 15 and the back surface film 16 expand outward due to the force applied from the storage section 18. Here, in the first embodiment, the steam-releasing mechanism 20 is configured so that the peeling off pressure in the steam-releasing seal part 20a is 130 kPa or lower. For this reason, the steam-releasing seal part 20a peels off before the pressure in the storage section 18 increases to 130 kPa. Therefore, it is possible to suppress the formation of holes in the laminated body 50 of the bag 10 or the formation of wrinkles in the laminated body 50 during the heating.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

(First Modified Example of Bag)

Figure 6:
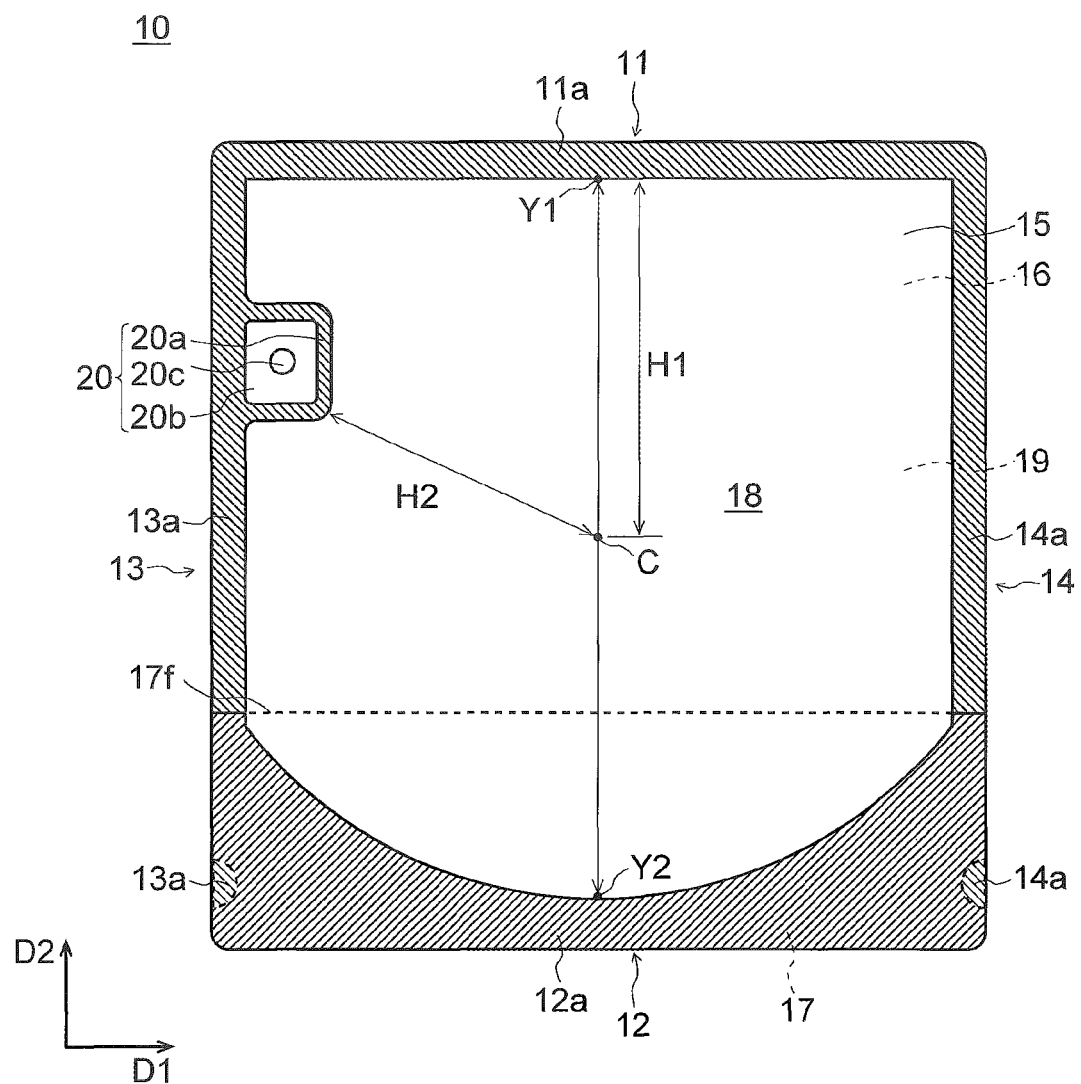
FIG. 6 is a front view illustrating a modified example of the bag.

In the steam-releasing mechanism 20 of the first embodiment described above, an example has been described in which the non-seal section 20b isolated from the storage section 18 by the steam-releasing seal part 20a extends to the outer edge of the bag 10. However, the present embodiment is not limited thereto, and as illustrated in FIG. 6, a non-seal section 20b may be surrounded by a steam-releasing seal part 20a and a first side seal section 13a. In this case, the non-seal section 20b is formed with a through hole 20c penetrating through at least one of a front surface film 15 and a back surface film 16. In this case, steam that has flowed into the non-seal section 20b from a storage section 18 through a peeling-off portion of the steam-releasing seal part 20a is released to an outside of the bag 10 through the through hole 20c. In the following description, as illustrated in FIG. 6, a bag of a type in which the non-seal section 20b of the steam-releasing mechanism 20 is surrounded by the steam-releasing seal part 20a and the first side seal section 13a is called a type 2 bag.

In the bag 10 illustrated in FIG. 6, the non-seal section 20b is positioned closer to the storage section 18 side than the first side seal section 13a. For this reason, when widths of the non-seal sections 20b in a first direction D1 are the same, a distance H2 from a steam-releasing seal part 20a of the type 2 bag 10 of the first modified example to a center point C is shorter than a distance H2 from the steam-releasing seal part 20a of the type 1 bag 10 illustrated in FIG. 1 or 4 to the center point C. For this reason, when contents of the bag 10 are heated using a microwave oven or the like, a force is easily applied to the steam-releasing seal part 20a, and a peeling off pressure in the steam-releasing seal part 20a is likely to decrease. In the type 2 bag as illustrated in FIG. 6, a ratio (=H1/H2) of a distance H1 to the distance H2 is, for example, 1.05 or more and 5.0 or less.

Also in the first modified example, the steam-releasing mechanism 20 is configured so that the peeling off pressure in the steam-releasing seal part 20a is 130 kPa or lower. For this reason, the steam-releasing seal part 20a peels off before the pressure in the storage section 18 increases to 130 kPa. Therefore, it is possible to suppress the formation of holes in the laminated body 50 of the bag 10 or the formation of wrinkles in the laminated body 50 during the heating.

(Second Modified Example of Bag)

Figure 7:
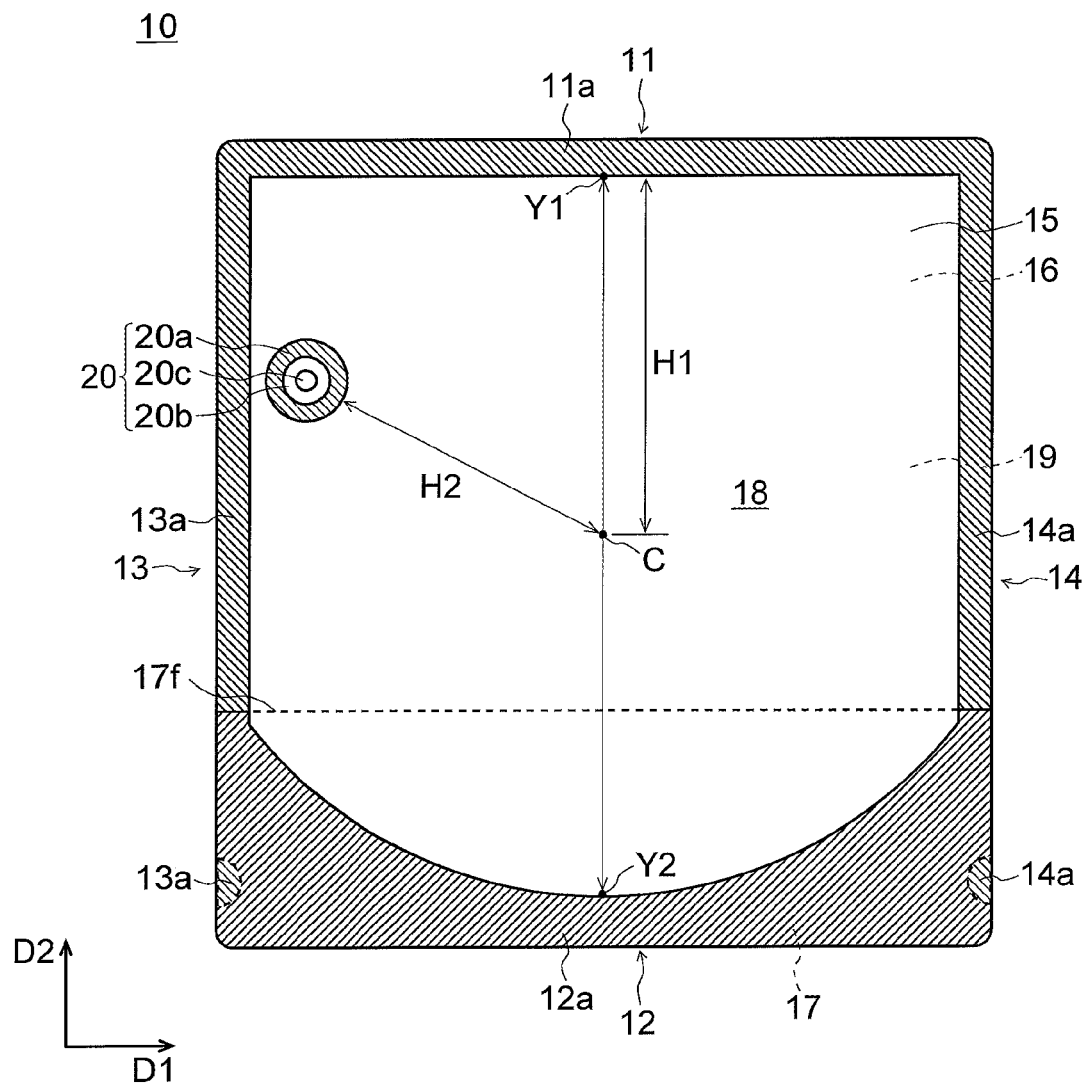
FIG. 7 is a front view illustrating a modified example of the bag.

In the steam-releasing mechanism 20 of the first embodiment and the first modified example described above, an example has been described in which the steam-releasing seal part 20a is connected to the first side seal section 13a. However, the present embodiment is not limited thereto, and as illustrated in FIG. 7, a steam-releasing seal part 20a may be separated from side seal sections 13a and 14a. In this case, a non-seal section 20b surrounded by the steam-releasing seal part 20a is formed with a through hole 20c penetrating through at least one of a front surface film 15 and a back surface film 16. In the same manner as in the first modified example, steam that has flowed into the non-seal section 20b from a storage section 18 through a peeling-off portion of the steam-releasing seal part 20a is released to an outside of the bag 10 through the through hole 20c. In the following description, as illustrated in FIG. 7, a bag of a type in which the steam-releasing seal part 20a of the steam-releasing mechanism 20 is separated from the side seal sections 13a and 14a is also called a type 3 bag.

In the bag 10 illustrated in FIG. 6, the non-seal section 20b is separated from the side seal sections 13a and 14a. For this reason, when widths of the non-seal sections 20b in a first direction D1 are the same, a distance H2 from a steam-releasing seal part 20a of a type 3 bag 10 of the second modified example to a center point C is shorter than the distance H2 from the steam-releasing seal part 20a of the type 2 bag 10 illustrated in FIG. 6 to the center point C. For this reason, when contents of the bag 10 are heated using a microwave oven or the like, a force is easily applied to the steam-releasing seal part 20a, and a peeling off pressure in the steam-releasing seal part 20a is likely to decrease. In the type 3 bag as illustrated in FIG. 7, a ratio (=H1/H2) of a distance H1 to the distance H2 is, for example, 1.05 or more and 6.0 or less.

Also in the first modified example, the steam-releasing mechanism 20 is configured so that the peeling off pressure in the steam-releasing seal part 20a is 130 kPa or lower. For this reason, the steam-releasing seal part 20a peels off before the pressure in the storage section 18 increases to 130 kPa. Therefore, it is possible to suppress the formation of holes in the laminated body 50 of the bag 10 or the formation of wrinkles in the laminated body 50 during the heating.

Note that when the distance H2 from the steam-releasing seal part 20a to the center point C is short, a force is easily applied to the steam-releasing seal part 20a other than when the contents of the bag 10 are heated using the microwave oven or the like. For example, even when the bag 10 is transported in a state in which a plurality of bags 10 are stacked, a force is easily applied to the steam-releasing seal part 20a, and unintended peeling off of the steam-releasing seal part 20a is likely to occur. In other words, the shorter the distance H2 from the steam-releasing seal part 20a to the center point C, the lower the withstanding load of the bag 10. Accordingly, in terms of the withstanding load of the bag 10, the type 2 bag 10 is more preferable than the type 3 bag 10, and the type 1 bag 10 is more preferable.

(Third Modified Example of Bag)

Figure 13:
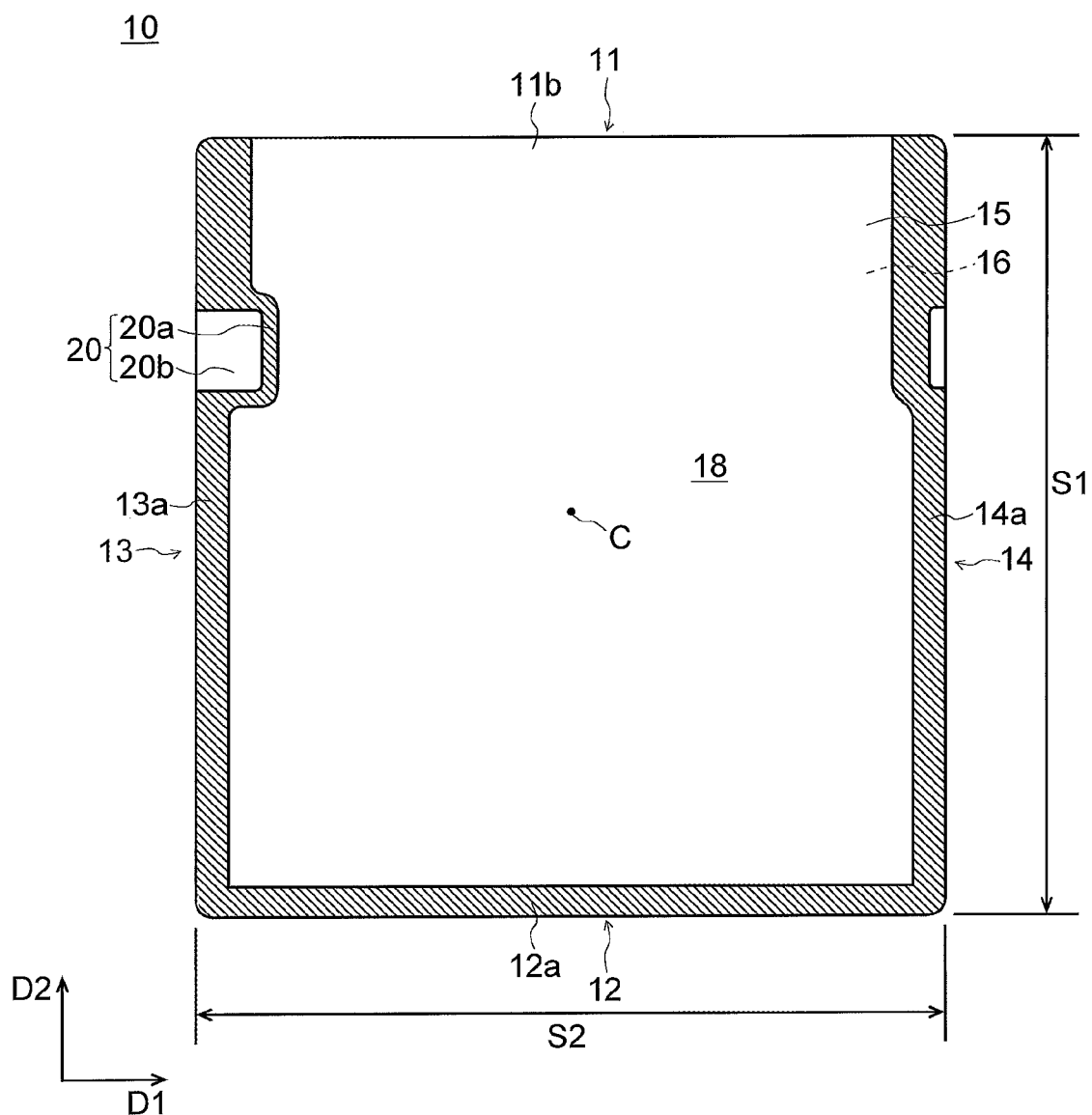
FIG. 13 is a front view illustrating a modified example of the bag.

In the above-described embodiment, an example has been illustrated in which the bag 10 is the gusset-type pouch including the front surface film 15, the back surface film 16, and the lower film 17. However, the present embodiment is not limited thereto, and as illustrated in FIG. 13, a bag 10 may be a so-called flat pouch including a front surface film 15 and a back surface film 16. In this case, the bag 10 is heated by a microwave oven in a state in which a posture of the bag 10 is maintained so that the steam-releasing seal part 20a is positioned above a center point C of a storage section 18 in a vertical direction. For example, when the bag 10 is sold in a state of being stored in a paper box (not illustrated), a box can be used to maintain the bag 10 in a predetermined posture.

EXAMPLES

Next, the present embodiment will be described more specifically by way of examples, but the present embodiment is not limited to the description of the following examples unless it exceeds the gist. Here, seal strength of a laminated body 50 constituting a bag 10 and a peeling off pressure in a steam-releasing seal part 20a of the bag 10 were evaluated.

Example A1

As a first plastic film 62, a stretched PET film having a thickness of 12 μm was prepared. In addition, as a second plastic film 66, a stretched nylon film having a thickness of 15 μm was prepared. In addition, as a sealant film 70, an unstretched polypropylene film ZK500 manufactured by Toray Film Processing Co., Ltd., was prepared. ZK500 contains the above-described propylene/ethylene block copolymer and elastomer. A thickness of the sealant film 70 was 60 μm.

The ZK500 has higher tensile elongation compared to a general unstretched polypropylene film. Specifically, the tensile elongation of the ZK500 in the machine direction (MD) is 1180% when the thickness is 50 μm and 1100% when the thickness is 60 μm. In addition, the tensile elongation of the ZK500 in a transverse direction (TD) is 1,240% when the thickness is 50 μm and 1,150% when the thickness is 60 μm. Therefore, a product of the tensile elongation (%) of the ZK500 in the machine direction and the thickness (μm) of the ZK500 is 59,000 when the thickness is 50 μm and 66,000 when the thickness is 60 μm. In addition, a product of the tensile elongation (%) of the ZK500 in the transverse direction and the thickness (μm) of the ZK500 is 62,000 when the thickness is 50 μm and 69,000 when the thickness is 60 μm.

In addition, the ZK500 has lower tensile modulus of elasticity compared to the general unstretched polypropylene film. Specifically, the tensile modulus of elasticity of the ZK500 in the machine direction (MD) is 640 MPa when the thickness is 50 μm and 550 MPa when the thickness is 60 μm. In addition, the tensile modulus of elasticity of the ZK500 in the transverse direction (TD) is 480 MPa when the thickness is 50 μm and 400 MPa when the thickness is 60 μm. Accordingly, the product of the tensile modulus of elasticity (MPa) of the ZK500 in the machine direction and the thickness (μm) of the ZK500 is 32,000 when the thickness is 50 μm and 33,000 when the thickness is 60 μm. In addition, the product of the tensile modulus of elasticity (MPa) of the ZK500 in the transverse direction and the thickness (μm) of the ZK500 is 24,000 when the thickness is 50 μm and 35,000 when the thickness is 60 μm.

Subsequently, the first plastic film 62, the second plastic film 66, and the sealant film 70 were laminated by a dry lamination method to produce the laminated body 50. As a first adhesive layer 64 and a second adhesive layer 68, a two-pack type polyurethane-based adhesive (main agent: RU-40, curing agent: H-4) manufactured by Rock Paint Co., Ltd., was used. Note that the RU-40 of the main agent is polyester polyol. Thicknesses of the first adhesive layer 64 and the second adhesive layer 68 were 3.5 μm.

(Evaluation of Seal Strength)

Figure 8:
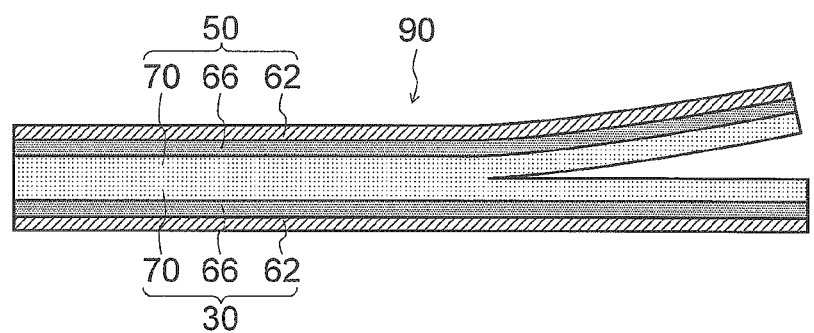
FIG. 8 is a diagram illustrating an example of a method for measuring seal strength.
Figure 9:
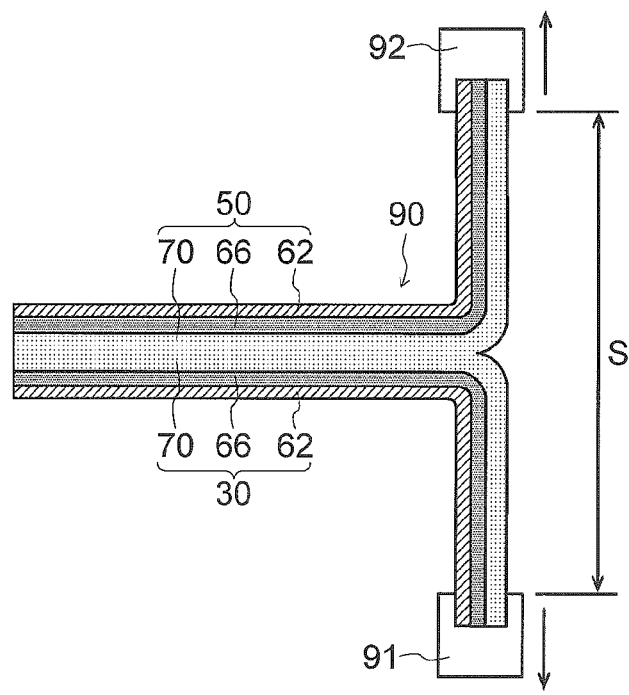
FIG. 9 is a diagram illustrating an example of a method for measuring seal strength.
Figure 10:
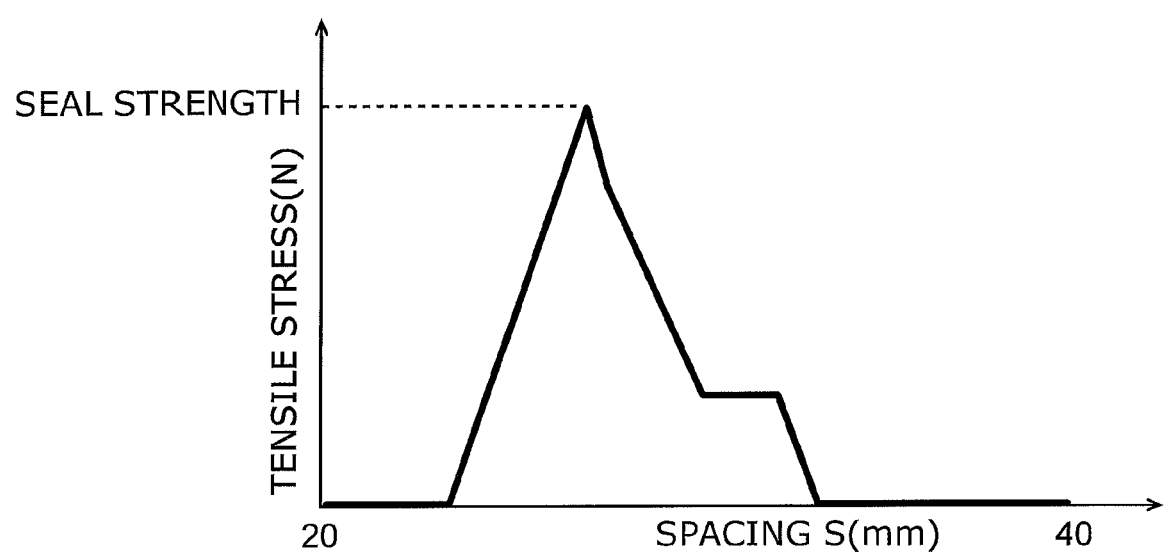
FIG. 10 is a diagram illustrating a change in tensile stress with respect to a spacing between a pair of grippers for drawing a laminated film for measuring seal strength.

Subsequently, inner surfaces 50x of two sheets of laminated bodies 50 were partially heat-sealed together at 210° C. Thereafter, seal strength between the laminated bodies 50 was measured in an atmosphere of 23° C. in accordance with JIS 1707 7.5. As a measuring instrument, for example, a tensile tester RTC-1310A with a thermostat manufactured by Orientec Co., Ltd., was used. Specifically, first, two sheets of heat-sealed laminated bodies 50 were cut out to produce a rectangular test piece 90 having a width (short side) of 15 mm. In the test piece 90, as illustrated in FIG. 8, the two sheets of laminated bodies 50 peel off over 15 mm from one tip in a long side direction thereof. Thereafter, as illustrated in FIG. 9, each of the already peeled off portions in the two sheets of laminated bodies 50 was gripped by a gripper 91 and gripper 92 of the measuring instrument. In addition, each of the grippers 91 and 92 was pulled at a speed of 300 mm/min in opposite directions in a direction orthogonal to a plane direction of a portion where the two sheets of laminated bodies 50 are still joined to measure a maximum value of tensile stress (see FIG. 10). FIG. 10 is a diagram illustrating a change in the tensile stress with respect to a spacing S.

The maximum value of the tensile stress was measured for five test pieces 90, and the average value thereof was set to be the sealed strength of the laminated body 50. When the pulling starts, the spacing S between the grippers 91 and 92 was set to be 20 mm, and when the pulling ends, the spacing S between the grippers 91 and 92 was set to be 40 mm. The environment during the measurement was a temperature of 23° C. and a relative humidity of 50%. As a result, the seal strength (hereinafter, also referred to as room-temperature seal strength) at a width of 15 mm was 65 N.

Note that as described in a second embodiment described later, the test piece 90 obtained by cutting out a portion including a first side seal section 13a in a front surface film 15 and a back surface film 16 of a bag 10 may be used to measure the seal strength.

(Evaluation of Peeling Off Pressure)

Subsequently, the type 1 bag 10 including the steam-releasing mechanism 20 illustrated in FIGS. 1 and 4 was manufactured by using the laminated body 50. In the manufactured bag 10, an upper seal section 11a is not formed in an upper portion 11, and the upper portion 11 is an opening 11b. A height S1 of the bag 10 was 145 mm, and a width S2 thereof was 140 mm. In addition, a height S3 of a folded lower film 17, that is, a height from a lower end portion of the bag 10 to a folded part 17f was 40 mm. In the following description, the bag 10 having the height S1 of 145 mm, the width S2 of 140 mm, and the height S3 of 40 mm is also referred to as an S-sized bag 10. Subsequently, the bag 10 was filled with 100 ml of water, and furthermore, a sensor 81 of a data logger was disposed inside the bag 10, and the upper portion 11 of the bag 10 was heat-sealed to form an upper seal section 11a. A distance H1 in the second direction D2 from the upper seal section 11a to a center point C of the storage section 18 was 67 mm. In addition, a shortest distance H2 from the steam-releasing seal part 20a to the center point C of the storage section 18 was 60 mm. In this case, a ratio (=H1/H2) of the distance H1 to the distance H2 is 1.12.

Subsequently, the water in the bag 10 was heated using a microwave oven having an output of 500 W while the pressure in the storage section 18 is measured every second using the sensor 81. As the microwave oven having an output of 500 W, NE-MS261 manufactured by Panasonic Corporation was used. When the pressure in the storage section 18 increases and the peeling off of the steam-releasing seal part 20a reaches an outer edge of the bag 10, the steam in the storage section 18 began to be discharged to the outside of the bag 10, and the pressure in the storage section 18 dropped sharply. The peeling off pressure, which is the pressure in the storage section 18 just before the pressure begins to drop sharply, was 116.1 kPa. In addition, the temperature (hereinafter, also referred to as reached temperature) reached by the storage section 18 just before the pressure begins to drop sharply was 102° C. In addition, the time (hereinafter, also referred to as required time) from the start of heating to the time when the pressure began to decrease sharply was 145 seconds. In addition, in the heated bag 10, holes and wrinkles were not formed in the laminated body 50.

Example A2

A type 1 bag 10 was manufactured using the same laminated body 50 as in Example A1. A height S1 of a bag 10 was 145 mm, a width S2 thereof was 150 mm, and a height S3 of a folded lower film 17 was 43 mm. In the following description, the bag 10 having the height S1 of 145 mm, the width S2 of 150 mm, and the height S3 of 43 mm is also referred to as an M-sized bag 10. Subsequently, in the same manner as in Example A1, 100 ml of water was filled into the bag 10, and the upper portion 11 was heat-sealed to form an upper seal section. In the same manner as in Example A1, a temperature of the heat seal treatment was set to be 210° C. In this case, in the same manner as in Example A1, room-temperature seal strength is 65 N. A distance H1 in the second direction D2 from an upper seal section 11a to a center point C of a storage section 18 was 68 mm. In addition, a shortest distance H2 from a steam-releasing seal part 20a to a center point C of the storage section 18 was 65 mm. In this case, a ratio (=H1/H2) of the distance H1 to the distance H2 is 1.04.

Thereafter, in the same manner as in Example A1, the water in the bag 10 was heated using the microwave oven having the output of 500 W while the pressure in the storage section 18 is measured using the sensor 81. A peeling off pressure was 113.5 kPa, reached temperature was 100° C., and a required time was 131 seconds. In addition, in the heated bag 10, holes and wrinkles were not formed in the laminated body 50.

Example A3

Seal strength between laminated bodies 50 was measured using a test piece 90 produced by heat-sealing the same laminated body 50 as in Example A1 at 200° C. As a result, room-temperature seal strength was 55 N.

In addition, except that a temperature of heat seal treatment was set to be 200° C., an S-sized type 1 bag 10 was manufactured in the same manner as in Example A1. Thereafter, in the same manner as in Example A1, the water in the bag 10 was heated using the microwave oven having the output of 500 W while the pressure in the storage section 18 is measured using the sensor 81. A peeling off pressure was 110 kPa, reached temperature was 102° C., and a required time was 160 seconds. In addition, in the heated bag 10, holes and wrinkles were not formed in the laminated body 50.

Example A4

Except that a temperature of heat seal treatment was set to be 200° C. in the same manner as in Example A3, an M-sized type 1 bag 10 was manufactured in the same manner as in Example A2. Thereafter, in the same manner as in Example A1, the water in the bag 10 was heated using the microwave oven having the output of 500 W while the pressure in the storage section 18 is measured using the sensor 81. A peeling off pressure was 110.5 kPa, reached temperature was 102° C., and a required time was 163 seconds. In addition, in the heated bag 10, holes and wrinkles were not formed in the laminated body 50. Note that in the same manner as in Example A3, in Example A4, room-temperature seal strength is 55 N.

Example A5

An S-sized type 1 bag 10 was manufactured in the same manner as in Example A3 by heat-sealing the same laminated body 50 as in Example A3 at 200° C. Subsequently, the water in the bag 10 was heated using a microwave oven having an output of 1,600 W while the pressure in the storage section 18 is measured using the sensor 81. As the microwave oven having an output of 1,600 W, NE-1801 manufactured by Panasonic Corporation was used. A peeling off pressure was 117 kPa, reached temperature was 98.9° C., and a required time was 52 seconds. In addition, in the heated bag 10, holes and wrinkles were not formed in the laminated body 50.

Example A6

An M-sized type 1 bag 10 was manufactured in the same manner as in Example A4 by heat-sealing the same laminated body 50 as in Example A4 at 200° C. Subsequently, in the same manner as in Example A5, the water in the bag 10 was heated using a microwave oven having an output of 1,600 W while the pressure in the storage section 18 is measured using the sensor 81. A peeling off pressure was 117.9 kPa, reached temperature was 99.7° C., and a required time was 54 seconds. In addition, in the heated bag 10, holes and wrinkles were not formed in the laminated body 50.

Example A7

As a first plastic film 62, a stretched PET film having a thickness of 12 μm was prepared. In addition, as a second plastic film 66, a stretched PET film having a thickness of 12 μm was prepared. In addition, as a sealant film 70, an unstretched polypropylene film ZK500 manufactured by Toray Film Processing Co., Ltd., was prepared. A thickness of the sealant film 70 was 60 μm.

Subsequently, in the same manner as in Example A1, seal strength between laminated bodies 50 was measured by using a test piece 90 produced by partially heat-sealing inner surfaces 50x of two sheets of laminated bodies 50 together at 200° C. As a result, room-temperature seal strength was 55 N.

In addition, in the same manner as in Example A1, an S-sized type 1 bag 10 was manufactured. A temperature of the heat seal treatment was 200° C. Thereafter, in the same manner as in Example A5, water in the bag 10 was heated using a microwave oven having an output of 1,600 W while a pressure in a storage section 18 is measured using the sensor 81. A peeling off pressure was 114.8 kPa, reached temperature was 102° C., and a required time was 63 seconds. In addition, in the heated bag 10, holes and wrinkles were not formed in the laminated body 50.

Comparative Example A1

As a first plastic film 62, a stretched PET film having a thickness of 12 μm was prepared. In addition, as a second plastic film 66, a stretched PET film having a thickness of 12 µm was prepared. In addition, as a sealant film 70, an unstretched polypropylene film ZK207 manufactured by Toray Film Processing Co., Ltd., was prepared. A thickness of the sealant film 70 was 70 µm.

The ZK207 has a lower tensile elongation than ZK500. Specifically, the tensile elongation of the ZK207 in a machine direction (MD) is 790% when the thickness is 50 µm and 730% when the thickness is 60 µm.

In addition, the tensile elongation of the ZK207 in a transverse direction (TD) is 1,020% when the thickness is 50 µm and 870% when the thickness is 60 µm. Therefore, a product of the tensile elongation (%) of the ZK207 in the machine direction and the thickness (µm) of the ZK207 is 39,500 when the thickness is 50 µm and 43,800 when the thickness is 60 µm. In addition, the product of the tensile elongation (%) of the ZK207 in the transverse direction and the thickness (µm) of the ZK207 is 51,000 when the thickness is 50 µm and 52,200 when the thickness is 60 µm.

In addition, the ZK207 has a higher tensile modulus of elasticity than ZK500. Specifically, the tensile modulus of elasticity of the ZK207 in the machine direction (MD) is 780 MPa when the thickness is 50 µm and 680 MPa when the thickness is 60 µm. In addition, the tensile modulus of elasticity of the ZK207 in the transverse direction (TD) is 630 MPa when the thickness is 50 µm and 560 MPa when the thickness is 60 µm. Accordingly, the product of the tensile modulus of elasticity (MPa) of the ZK207 in the machine direction and the thickness (µm) of the ZK207 is 39,000 when the thickness is 50 µm and 40,800 when the thickness is 60 µm. In addition, the product of the tensile modulus of elasticity (MPa) of the ZK207 in the transverse direction and the thickness (µm) of the ZK207 is 31,500 when the thickness is 50 µm and 33,600 when the thickness is 60 µm.

Subsequently, in the same manner as in Example A1, seal strength between laminated bodies 50 was measured by using a test piece 90 produced by partially heat-sealing inner surfaces 50x of two sheets of laminated bodies 50 together at 210° C. As a result, room-temperature seal strength was 65 N.

In addition, in the same manner as in Example A1, an S-sized type 1 bag 10 was manufactured. A temperature of heat seal treatment was 210° C. Thereafter, in the same manner as in Example A1, the water in the bag 10 was heated using the microwave oven having the output of 500 W while the pressure in the storage section 18 is measured using the sensor 81. A peeling off pressure was 130.7 kPa, reached temperature was 101° C., and a required time was 147 seconds. In addition, in the heated bag 10, holes and wrinkles were formed in the laminated body 50.

Comparative Example A2

An M-sized type 1 bag 10 was manufactured using the same laminated body 50 as in Comparative Example A1. A temperature of heat seal treatment was 210° C. Thereafter, in the same manner as in Example A1, the water in the bag 10 was heated using the microwave oven having the output of 500 W while the pressure in the storage section 18 is measured using the sensor 81. A peeling off pressure was 132.5 kPa, reached temperature was 102° C., and a required time was 125 seconds. In addition, in the heated bag 10, holes and wrinkles were formed in the laminated body 50.

Example A8

Seal strength between laminated bodies 50 was measured using a test piece 90 produced by heat-sealing the same laminated body 50 as in Comparative Example A1 at 200° C. As a result, room-temperature seal strength was 55 N.

In addition, except that a temperature of heat seal treatment was set to be 200° C., an S-sized type 1 bag 10 was manufactured in the same manner as in Comparative Example A1. Thereafter, in the same manner as in Example A1, the water in the bag 10 was heated using the microwave oven having the output of 500 W while the pressure in the storage section 18 is measured using the sensor 81. A peeling off pressure was 124.9 kPa, reached temperature was 101° C., and a required time was 144 seconds. In addition, in the heated bag 10, wrinkles were formed in the laminated body 50, but holes were not formed therein.

Example A9

Except that a temperature of heat seal treatment was set to be 200° C. in the same manner as in Example A8, an M-sized type 1 bag 10 was manufactured in the same manner as in Comparative Example A2. Thereafter, in the same manner as in Example A1, the water in the bag 10 was heated using the microwave oven having the output of 500 W while the pressure in the storage section 18 is measured using the sensor 81. A peeling off pressure was 125.5 kPa, reached temperature was 102° C., and a required time was 141 seconds. In addition, in the heated bag 10, wrinkles were formed in the laminated body 50, but holes were not formed therein. Note that in the same manner as in Example A8, in Example A, room-temperature seal strength is 55 N.

Example A10

An M-sized type 1 bag 10 was manufactured in the same manner as in Example A9 by heat-sealing the same laminated body 50 as in Example A9 at 200° C. Subsequently, in the same manner as in Example A5, the water in the bag 10 was heated using a microwave oven having an output of 1,600 W while the pressure in the storage section 18 is measured using the sensor 81. A peeling off pressure was 124.8 kPa, reached temperature was 99° C., and a required time was 45 seconds. In addition, in the heated bag 10, wrinkles were formed in the laminated body 50, but holes were not formed therein.

Example A11

An S-sized type 2 bag 10 was manufactured using the same laminated body 50 as in Example A1. Subsequently, in the same manner as in Example A1, 100 ml of water was filled into the bag 10, and the upper portion 11 was heat-sealed to form an upper seal section. In the same manner as in Example A1, a temperature of the heat seal treatment was set to be 210° C. In this case, in the same manner as in Example A1, room-temperature seal strength is 65 N.

Thereafter, in the same manner as in Example A1, the water in the bag 10 was heated using the microwave oven having the output of 500 W while the pressure in the storage section 18 is measured using the sensor 81. A peeling off pressure was 110.8 kPa, reached temperature was 101° C., and a required time was 142 seconds. In addition, in the heated bag 10, holes and wrinkles were not formed in the laminated body 50.

Example A12

An S-sized type 2 bag 10 was manufactured using the same laminated body 50 as in Comparative Example A1.

Subsequently, in the same manner as in Comparative Example A1, 100 ml of water was filled into the bag 10, and an upper portion 11 was heat-sealed to form an upper seal section. In the same manner as in Comparative Example A1, a temperature of heat seal treatment was set to be 210° C. In this case, in the same manner as in Comparative Example A1, room-temperature seal strength is 65 N.

Thereafter, in the same manner as in Example A1, the water in the bag 10 was heated using the microwave oven having the output of 500 W while the pressure in the storage section 18 is measured using the sensor 81. A peeling off pressure was 124.2 kPa, reached temperature was 99° C., and a required time was 145 seconds. In addition, in the heated bag 10, wrinkles were formed in the laminated body 50, but holes were not formed therein.

Example A13

An S-sized type 3 bag 10 was manufactured using the same laminated body 50 as in Example A1. Subsequently, in the same manner as in Example A1, 100 ml of water was filled into the bag 10, and the upper portion 11 was heat-sealed to form an upper seal section. In the same manner as in Example A1, a temperature of the heat seal treatment was set to be 210° C. In this case, in the same manner as in Example A1, room-temperature seal strength is 65 N.

Thereafter, in the same manner as in Example A1, the water in the bag 10 was heated using the microwave oven having the output of 500 W while the pressure in the storage section 18 is measured using the sensor 81. A peeling off pressure was 108.9 kPa, reached temperature was 101° C., and a required time was 130 seconds. In addition, in the heated bag 10, holes and wrinkles were not formed in the laminated body 50.

Example A14

An S-sized type 3 bag 10 was manufactured using the same laminated body 50 as in Comparative Example A1. Subsequently, in the same manner as in Comparative Example A1, 100 ml of water was filled into the bag 10, and an upper portion 11 was heat-sealed to form an upper seal section. In the same manner as in Comparative Example A1, a temperature of heat seal treatment was set to be 210° C. In this case, in the same manner as in Comparative Example A1, room-temperature seal strength is 65 N.

Thereafter, in the same manner as in Example A1, the water in the bag 10 was heated using the microwave oven having the output of 500 W while the pressure in the storage section 18 is measured using the sensor 81. A peeling off pressure was 122.1 kPa, reached temperature was 102° C., and a required time was 131 seconds. In addition, in the heated bag 10, wrinkles were formed in the laminated body 50, but holes were not formed therein.

FIG. 11 illustrates evaluation results in Examples and Comparative Examples. As can be seen from the comparison between Examples A1 to A7, A11, A13 and Comparative Examples A1 to A5, by using an unstretched polypropylene film ZK500 manufactured by Toray Film Processing Co., Ltd., as a sealant film 70, the peeling off pressure during the heating of the bag 10 could be set to be 120 kPa or lower. Therefore, it was possible to suppress the formation of holes in the laminated body 50 of the bag 10 or the formation of wrinkles in the laminated body 50 during the heating.

Further, as can be seen from the comparison between Example A8 and Comparative Example A1, or the comparison between Example A9 and Comparative Example A2, even when an unstretched polypropylene film ZK207 manufactured by Toray Film Processing Co., Ltd., was used as the sealant film 70, the peeling off pressure during the heating of the bag 10 could be set to be 130 kPa or lower by lowering the temperature of the heat seal treatment. As a result, it was possible to suppress the formation of holes in the laminated body 50 of the bag 10 during the heating.

Further, as can be seen from the comparison between Example A12 and Comparative Example A1, even when the unstretched polypropylene film ZK207 manufactured by Toray Film Processing Co., Ltd. was used as the sealant film 70, the type 2 as illustrated in FIG. 6 is adopted as the bag type, and as a result, the peeling off pressure during the heating of the bag 10 could be set to be 130 kPa or lower. As a result, it was possible to suppress the formation of holes in the laminated body 50 of the bag 10 during the heating.

Further, as can be seen from the comparison between Example A14 and Comparative Example A1, even when the unstretched polypropylene film ZK207 manufactured by Toray Film Processing Co., Ltd. was used as the sealant film 70, the type 3 as illustrated in FIG. 7 is adopted as the bag type, and as a result, the peeling off pressure during the heating of the bag 10 could be set to be 130 kPa or lower. As a result, it was possible to suppress the formation of holes in the laminated body 50 of the bag 10 during the heating.

Examples B1 to B3

Figure 14:
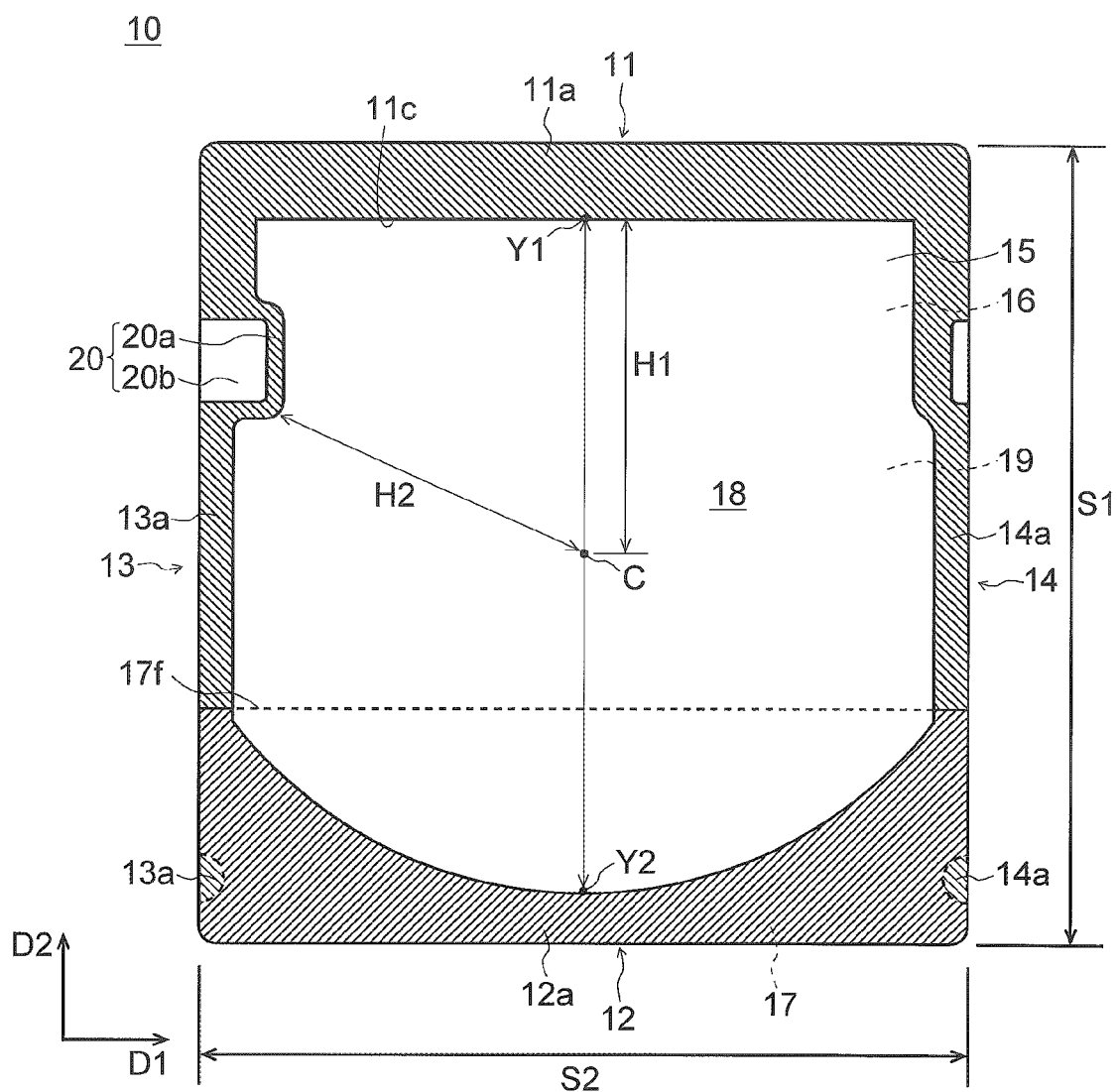
FIG. 14 is a front view illustrating a bag of Examples in the first embodiment.

As illustrated in FIG. 14, a plurality of S-sized type 1 bags 10 having a plurality of different positions of an inner edge 11c of an upper seal section 11a in a second direction D2 were manufactured. As a laminated body 50, the same laminated body 50 as in Example A1 was used. In the same manner as in Example A1, a temperature of the heat seal treatment was set to be 210° C.

By changing a position of an inner edge 11c of an upper seal section 11a, a distance H1 in the second direction D2 from the upper seal section 11a to a center point C of a storage section 18, and a shortest distance H2 from a steam-releasing seal part 20a to the center point C of the storage section 18 is changed. The distances H1 and H2 in Examples B1 to B3 were as follows.

Example B1: H1=67 mm, H2=60 mm
Example B2: H1=62 mm, H2=63 mm
Example B3: H1=57 mm, H2=65 mm Subsequently, in the same manner as in Example A1, the water in the bag 10 was heated using the microwave oven having an output of 500 W and the peeling off pressure was measured while the pressure in the storage section 18 is measured using a sensor 81. The results are illustrated in FIG. 15. As illustrated in FIG. 15, there was a tendency that the smaller H1/H2, the higher the peeling off pressure was.

Second Embodiment

Next, a second embodiment of the present invention will be described. In the same manner as in the above-described first embodiment, even an object of the second embodiment is to solve a problem in that a pressure or temperature of a storage section when a steam-releasing seal part peels off becomes too high, and thus damage such as holes or wrinkles is formed in a laminated body constituting a bag.

Next, means for solving the problem will be described.

According to the second embodiment, a bag having a storage section is a bag including: laminated bodies that include a sealant film that is positioned on an inner surface of the bag and is constituted by a single layer and at least one plastic film that is positioned on an outer surface side of the sealant film; and a seal section where inner surfaces of a pair of the laminated bodies are joined together, in which a product of a tensile elongation (%) of the sealant film in a machine direction and a thickness (μm) of the sealant film is 45,000 or more, the seal section has an outer edge seal part that is positioned on the outer edge of the bag and a steam-releasing seal part that is positioned closer to a center point side of the storage section than the outer edge seal part and peels off due to an increase in pressure in the storage section, and seal strength of the seal section at 100° C. is 15 N or less.

In the bag according to the second embodiment, a peeling off pressure in the steam-releasing seal part may be 130 kPa or lower.

In the bag according to the second embodiment, the seal strength of the seal section at 100° C. may be 10 N or less.

In the bag according to the second embodiment, the peeling off pressure in the steam-releasing seal part may be 120 kPa or lower.

In the bag according to the second embodiment, the sealant film may include a propylene/ethylene block copolymer and an α-olefin copolymer as main components.

The bag according to the second embodiment may further include a non-seal section isolated from the storage section by the steam-releasing seal part, in which the non-seal section may extend from a position closer to the center point side of the storage section than the outer edge seal part to the outer edge of the bag.

According to the second embodiment, it is possible to suppress the damage such as the formation of holes and wrinkles in the laminated body constituting the bag.

Hereinafter, the second embodiment will be described in detail. Note that a shape of the bag 10 of the second embodiment is the same as that of the bag 10 of the first embodiment illustrated in FIG. 1 and the like, and a detailed description thereof will be omitted.

As described in the first embodiment, when contents of the bag 10 are heated using a microwave oven or the like, a portion of the contents can jump and reach the inner surface of the laminated body constituting the bag 10. When the contents attached to the inner surface of the laminated body contain moisture, the contents attached to the inner surface of the laminated body are further heated by the microwave oven. In this case, it is considered that a temperature of the laminated body in contact with the contents also increases, and holes are formed in the laminated body or wrinkles are formed in the laminated body.

In consideration of such a problem, in the second embodiment, the seal section is configured so that the seal strength of the seal section of the bag 10 heated to a high temperature has an appropriately low value. For example, the seal section is configured so that the seal strength (hereinafter, also referred to as hot seal strength) of the seal section of the bag 10 at 100° C. is 15 N or less. In this case, when the contents of the bag 10 are heated using the microwave oven or the like, the steam-releasing seal part 20a of the seal section easily peels off based on a force applied from the pressure of steam generated in the storage section 18. That is, the steam-releasing seal part 20a peels off at a lower pressure. As a result, before a temperature of the contents attached to the inner surface of the bag 10 becomes excessively high, the steam-releasing seal part 20a can peel off to discharge the steam in the storage section 18 to the outside and decrease the pressure and temperature of the storage section 18. By doing so, it is possible to suppress damage such as the formation of holes and wrinkles in the laminated body of the bag 10. In the following description, when the steam-releasing seal part 20a peels off and the storage section 18 communicates with the outside of the bag 10, the pressure in the storage section 18 is also referred to as a peeling off pressure.

Factors that determine the hot seal strength of the seal section can include mechanical properties, thickness, or the like of the sealant film described below positioned on the inner surface of the laminated body. In addition, when the seal section such as the steam-releasing seal part 20a is formed by heat seal treatment, the seal strength of the seal section of the bag 10 may change depending on the conditions of the heat seal treatment such as the temperature. In addition, the seal strength of the seal section of the bag 10 may also change even by sterilization treatment such as boil treatment or retort treatment. In the second embodiment, the seal section having the hot seal strength of 15 N or less is formed by appropriately adjusting and considering these factors. Note that when the bag 10 is subjected to the treatment such as the boil treatment or the retort treatment, unless otherwise specified, the seal strength of the seal section of the bag 10 means the seal strength of the seal section of the treated bag 10.

Note that the retort treatment is treatment of filling the bag 10 with contents, sealing the bag 10, and then heating the bag 10 in a pressurized state using steam or heated hot water. A temperature of the retort treatment is, for example, 120° C. or higher. The boil treatment is treatment of filling the bag 10 with the contents, sealing the bag 10, and then double-boiling the bag 10 under the atmospheric pressure. A temperature of the boiling temperature is, for example, 90° C. or higher and 100° C. or lower.

In addition, factors that determine the peeling off pressure of the steam-releasing seal part 20a can include the shape, a dimension, hot seal strength, and the like of the steam-releasing seal part 20a. The peeling off pressure in the steam-releasing seal part 20a is preferably 130 kPa or lower, and more preferably 120 kPa or lower.

It is considered that if the peeling off pressure in the steam-releasing seal part 20a is too low, the steam-releasing seal part 20a peels off before the contents are sufficiently heated and pressurized, and the pressure and temperature of the storage section 18 decrease. Considering this point, the peeling off pressure in the steam-releasing seal part 20a is preferably 105 kPa or greater, and more preferably 110 kPa or greater.

The hot seal strength of the seal section of the bag 10 at a width of 15 mm at 100° C. is preferably 15 N or less, more preferably 11 N or less, and still more preferably 10 N or less. In addition, the hot seal strength of the seal section of the bag 10 may be 9 N or less or 8 N or less. Note that it is considered that if the hot seal strength is too low, the steam-releasing seal part 20a may peel off before the contents are sufficiently heated and pressurized, and the pressure and temperature of the storage section 18 may decrease. In consideration of this point, the hot seal strength of the seal section of the bag 10 is preferably 4 N or more, and more preferably 5 N or more.

In addition, room-temperature seal strength of the seal section of the bag 10 at a width of 15 mm at 25° C. is preferably 65 N or less, more preferably 60 N or less, and still more preferably 55 N or less. In addition, the room-temperature seal strength of the seal section of the bag 10 at a width of 15 mm at 25° C. is preferably 35 N or more, more preferably 40 N or more, and still more preferably 45 N or more and 50 N or more. By forming the seal section so that the room-temperature seal strength is a predetermined value or greater, it is possible to suppress the peeling off of the seal section of the bag 10 due to a force applied to the bag 10 during transportation and the like.

In the second embodiment, the conditions of the heat seal treatment when the inner surfaces of each film are heat-sealed together to form seal sections such as a lower seal section 12a, side seal sections 13a and 14a, and a steam-releasing seal part 20a are set according to materials of the sealant film 70 so that the hot seal strength of the seal section is 15 N or less.

Layer Configuration of Front Surface Film and Back Surface Film

Hereinafter, the laminated body 50 constituting the front surface film 15 and the back surface film 16 will be described. Note that a layer configuration of the laminated body 50 is the same as that of the laminated body 50 of the first embodiment illustrated in FIG. 3, and a detailed description thereof will be omitted.

The layer other than the sealant film 70 in the laminated body 50 is the same as in the first embodiment. For example, as a first plastic film 62, a first adhesive layer 64, a second plastic film 66, and a second adhesive layer 68, those similar to those in the first embodiment can be used.

In the same manner as in the first embodiment, also in the second embodiment, a single-layer sealant film 70 containing a propylene/ethylene block copolymer is used as the sealant film 70 of the laminated body 50. A content of the propylene/ethylene block copolymer in the sealant film 70 is, for example, 80% by mass or more, and preferably 90% by mass or more. The thickness of the sealant film 70 is preferably 30 μm or more, and more preferably 40 μm or more. In addition, the thickness of the sealant film 70 is preferably 100 μm or less, and more preferably 80 μm or less.

Further, in the second embodiment, the first type sealant film 70 of the first type sealant film 70 and the second type sealant film 70 described in the first embodiment is used. As described in the first embodiment, the first type sealant film 70 has a high tensile elongation and impact resistance, like ZK500. Preferably, the first type sealant film 70 further has the property of low hot seal strength. As a result, it is possible to suppress the internal pressure of the storage section 18 from becoming excessive during the heating of the bag 10, thereby suppressing the damage from occurring in the laminated body 50.

Hereinafter, in the second embodiment, preferred mechanical properties of the single-layer sealant film 70 containing the propylene/ethylene block copolymer will be described.

The tensile elongation of the sealant film 70 at 25° C. in a machine direction (MD) may be preferably 800% or more, more preferably 900% or more, 1,000% or more, or 1,100% or more. In addition, the product of the tensile elongation (%) of the sealant film 70 in the machine direction (MD) and the thickness (μm) of the sealant film 70 may be preferably 45,000 or more, more preferably 50,000 or more, 55,000 or more, or 60,000 or more. In addition, the tensile elongation of the sealant film 70 at 25° C. in a transverse direction (TD) is preferably 1,050% or more and more preferably 1,100% or more. In addition, the product of the tensile elongation (%) of the sealant film 70 in the transverse direction (TD) and the thickness (μm) of the sealant film 70 may be preferably 53,000 or more and more preferably 60,000 or more. By making the sealant film 70 have the high tensile elongation, it is possible to prevent the bag 10 from being broken due to the impact during dropping.

In addition, a tensile modulus of elasticity of the sealant film 70 at 25° C. in the machine direction (MD) is preferably 670 MPa or less and more preferably 650 MPa or less. In addition, a product of the tensile modulus of elasticity (MPa) of the sealant film 70 in the machine direction (MD) and the thickness (μm) of the sealant film 70 is preferably 38,000 or less and more preferably 35,000 or less. In addition, a tensile modulus of elasticity of the sealant film 70 at 25° C. in the transverse direction (TD) is preferably 550 MPa or less and more preferably 500 MPa or less. In addition, a product of the tensile modulus of elasticity (MPa) of the sealant film 70 in the transverse direction (TD) and the thickness (μm) of the sealant film 70 is preferably 30,000 or less and more preferably 25,000 or less.

Note that the layer configuration of the laminated body 50 is not limited to the above as long as the hot seal strength can be set to be 15 N or less. For example, the laminated body 50 may include only one plastic film.

Method for Measuring Seal Strength

Next, a method for measuring seal strength of a seal section of a bag 10 will be described. The seal strength can be measured according to JIS Z1707 7.5. As a measuring instrument, for example, a tensile tester RTC-1310A with a thermostat manufactured by Orientec Co., Ltd., can be used.

First, a test piece 90 for measuring the seal strength of the seal section is prepared. For example, as illustrated by a dashed-dotted frame denoted by reference numeral 90 in FIG. 4, the test piece 90 extending along a first direction D1 is obtained by cutting out a portion including the first side seal section 13a in the front surface film 15 and the back surface film 16 of the bag 10. A width W of the test piece 90 in a second direction D2 orthogonal to the first direction D1 is 15 mm.

Figure 16:
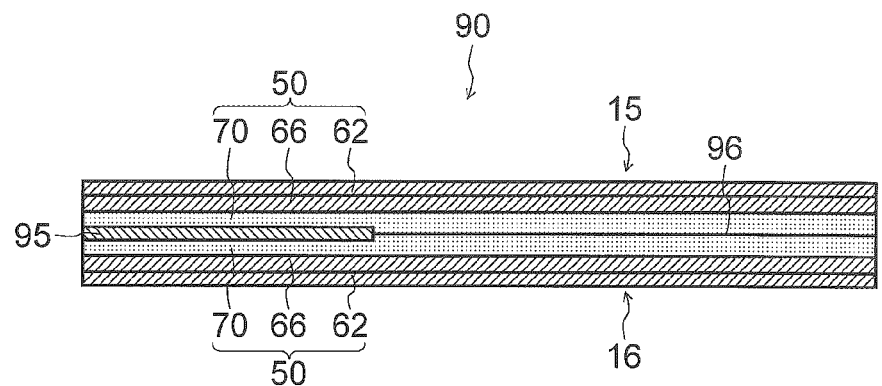
FIG. 16 is a cross-sectional view illustrating a test piece for measuring seal strength in a second embodiment.

FIG. 16 is a cross-sectional view illustrating the test piece 90. The test piece 90 includes a seal section 95, such as the side seal section, to which the sealant film 70 of the front surface film 15 and the sealant film 70 of the back surface film 16 are joined, and a non-seal section 96 in which the sealant film 70 of the front surface film 15 and the sealant film 70 of the back surface film 16 are not joined.

Figure 17:
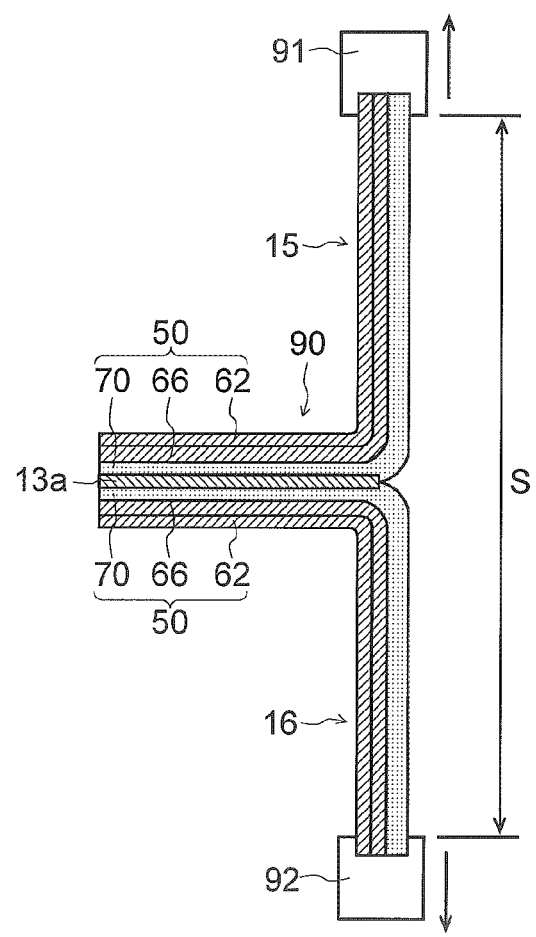
FIG. 17 is a diagram illustrating an example of a method for measuring seal strength in the second embodiment.

FIG. 17 is a diagram illustrating a state of measuring the seal strength using the test piece 90. First, in the non-seal section 96, the front surface film 15 and the back surface film 16 are each gripped by a gripper 91 and a gripper 92 of a measuring instrument. Further, each of the grippers 91 and 92 is pulled at a speed of 300 mm/min in opposite directions in a direction orthogonal to a plane direction of the seal section 95 of the test piece 90, and in the same manner as in the first embodiment illustrated in FIG. 10, a maximum value of tensile stress is measured.

The maximum value of the tensile stress is measured for the plurality of test pieces 90, and an average value thereof can be to be the seal strength. When the pulling starts, a spacing S between the grippers 91 and 92 is set to be 20 mm, and when the pulling ends, the spacing S between the grippers 91 and 92 is set to be 40 mm. In the case of measuring the above-described hot seal strength, the environment during the measurement is, for example, a temperature of 100° C. and a relative humidity of 50%. In addition, in the case of measuring the above-described room-temperature seal strength, the environment during the measurement is, for example, a temperature of 25° C. and a relative humidity of 50%.

Method for Heating Contents

Next, an example of a method for heating contents 19 stored in a bag 10 will be described.

First, the bag 10 is put inside the microwave oven in the state in which the lower portion 12 faces down and the bag 10 is self-standing. Next, the contents are heated using the microwave oven. As a result, the temperature of the contents 19 increases, so the moisture contained in the contents 19 evaporates, and the pressure in the storage section 18 increases.

When the pressure in the storage section 18 increases, the front surface film 15 and the back surface film 16 expand outward due to the force applied from the storage section 18. Here, in the second embodiment, the seal section is configured so that the hot seal strength is 15 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

(First Modified Example of Bag)

In the steam-releasing mechanism 20 of the first embodiment described above, an example has been described in which the non-seal section 20b isolated from the storage section 18 by the steam-releasing seal part 20a extends to the outer edge of the bag 10. However, the present embodiment is not limited thereto, and in the same manner as in the first modified example of the first embodiment illustrated in FIG. 6, the non-seal section 20b may be surrounded by the steam-releasing seal part 20a and a first side seal section 13a.

Also in the modified embodiment, the seal section is configured so that hot seal strength is 15 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

(Second Modified Example of Bag)

In the steam-releasing mechanism 20 of the second embodiment and the first modified example described above, an example has been described in which the steam-releasing seal part 20a is connected to the first side seal section 13a. However, the present embodiment is not limited thereto, and in the same manner as in the second modified example of the first embodiment illustrated in FIG. 7, the steam-releasing seal part 20a is separated from the side seal sections 13a and 14a.

Also in the modified embodiment, the seal section is configured so that hot seal strength is 15 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

(Third Modified Example of Bag)

Figure 18:
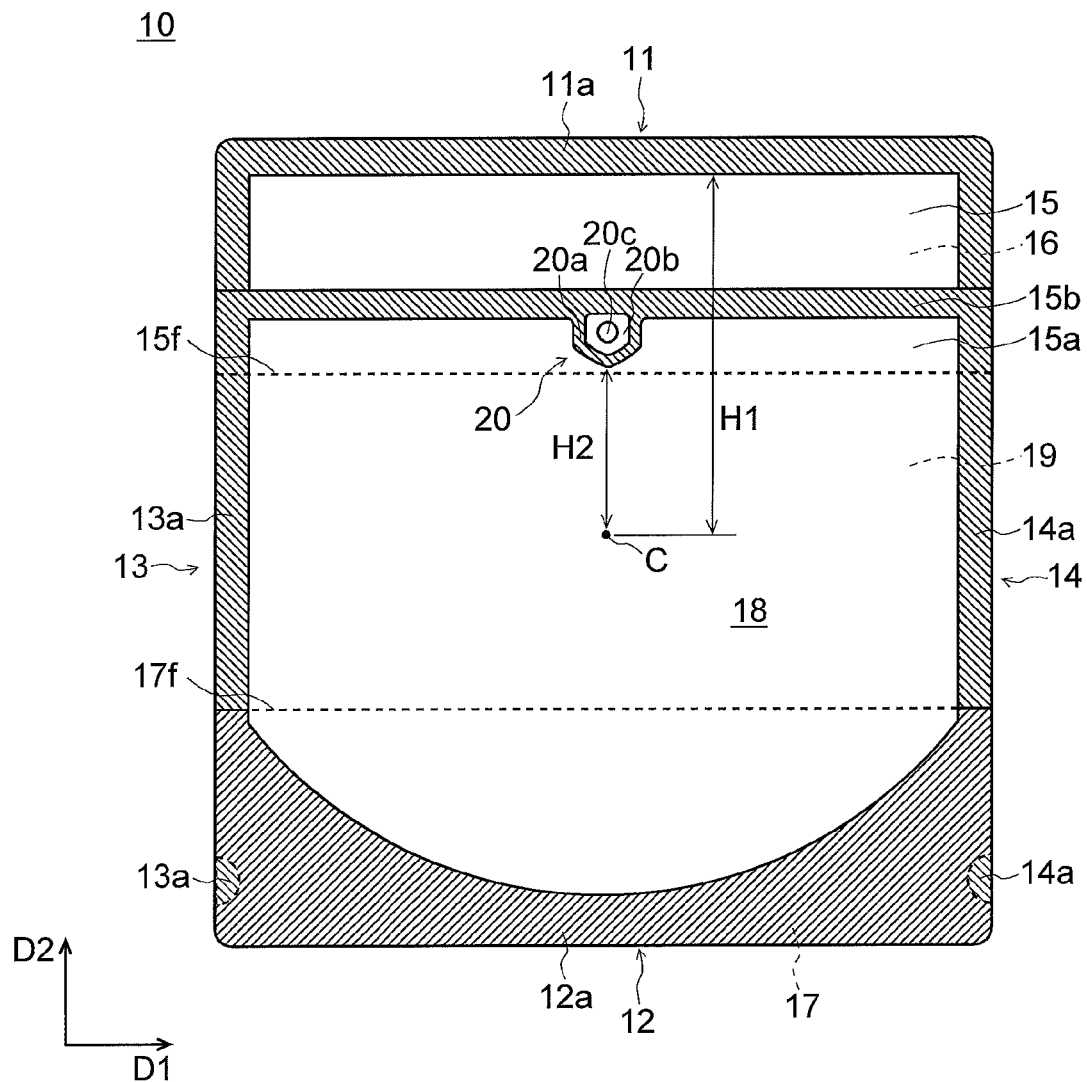
FIG. 18 is a front view illustrating a modified example of a bag in the second embodiment.

FIG. 18 is a front view illustrating a modified example of the bag 10. As illustrated in FIG. 18, the front surface film 15 may include a overlap part 15a where the inner surfaces of the front surface film 15 partially overlap with each other. The overlap part 15a can be configured, for example, by folding the front surface film 15 with a folded part 15f so as to form a gusset on a sheet of front surface film 15. Further, the overlap part 15a may be configured by partially overlapping two sheets of front surface films 15 with each other.

The overlap part 15a is formed with a overlap seal section 15b extending from the first side seal section 13a to the second side seal section 14a. In this case, the steam-releasing mechanism 20 has, for example, a steam-releasing seal part 20a protruding from the overlap seal section 15b toward the storage section 18, a non-seal section 20b surrounded by the steam-releasing seal part 20a and the overlap seal section 15b, and a through hole 20c formed on the front surface film 15 in the non-seal section 20b.

Also in the third modified example, when the pressure in the storage section 18 increases, the steam-releasing seal part 20a peels off, and the storage section 18 and the non-seal section 20b communicate with each other. Steam that has flowed into the non-seal section 20b from the storage section 18 through a peeling-off portion of the steam-releasing seal part 20a is released to an outside of the bag 10 through the through hole 20c. In the following description, the bag of the type in which the steam-releasing mechanism 20 is provided in the overlap part 15a as illustrated in FIG. 18 is also referred to as a type 4 bag. In the type 4 bag as illustrated in FIG. 18, a ratio (=H1/H2) of a distance H1 to a distance H2 is, for example, 1.10 or more and 6.0 or less.

Also in the modified embodiment, the seal section is configured so that hot seal strength is 15 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

EXAMPLES

Next, examples of the second embodiment will be described in more detail, but the second embodiment is not limited to the description of the following examples unless it exceeds the gist.

Example C1

As a first plastic film 62, a stretched PET film having a thickness of 12 μm was prepared. In addition, as a second plastic film 66, a stretched nylon film having a thickness of 15 μm was prepared. In addition, as a sealant film 70, an unstretched polypropylene film ZK500 manufactured by Toray Film Processing Co., Ltd., was prepared. ZK500 contains the above-described propylene/ethylene block copolymer and elastomer. A thickness of the sealant film 70 was 60 μm.

As described in the example of the first embodiment, ZK500 has a higher tensile elongation than a general unstretched polypropylene film. In addition, as described in the example of the first embodiment, the ZK500 has a higher tensile modulus of elasticity than a general unstretched polypropylene film.

Subsequently, the first plastic film 62, the second plastic film 66, and the sealant film 70 were laminated by a dry lamination method to produce the laminated body 50. As a first adhesive layer 64 and a second adhesive layer 68, a two-pack type polyurethane-based adhesive (main agent: RU-40, curing agent: H-4) manufactured by Rock Paint Co., Ltd., was used. Note that the RU-40 of the main agent is polyester polyol. Thicknesses of the first adhesive layer 64 and the second adhesive layer 68 were 3.5 µm.

Subsequently, inner surfaces 50s of two sheets of laminated bodies 50 were partially heat-sealed together to form a seal section. A temperature (hereinafter, also referred to as a seal temperature) during heat seal treatment was 170° C. Subsequently, a portion including the seal section in the two sheets of laminated bodies 50 was cut out, and the above-described test piece 90 for measuring seal strength was produced. Thereafter, the room-temperature seal strength of the laminated body 50 was measured in the environment of a temperature of 25° C. and a relative humidity of 50% in accordance with JIS 1707 7.5. As a measuring instrument, for example, a tensile tester RTC-1310A with a thermostat manufactured by Orientec Co., Ltd., was used.

Note that in Example C1, before the measurement of the seal strength, heat simulating the treatment such as retort treatment or boil treatment was not applied to the test piece 90. In the following description, the state of the laminated body 50 and the test piece 90 to which heat to simulate treatments such as the retort treatment or the boil treatment is not applied is also referred to as pre-retort treatment.

Figures 19, 20:
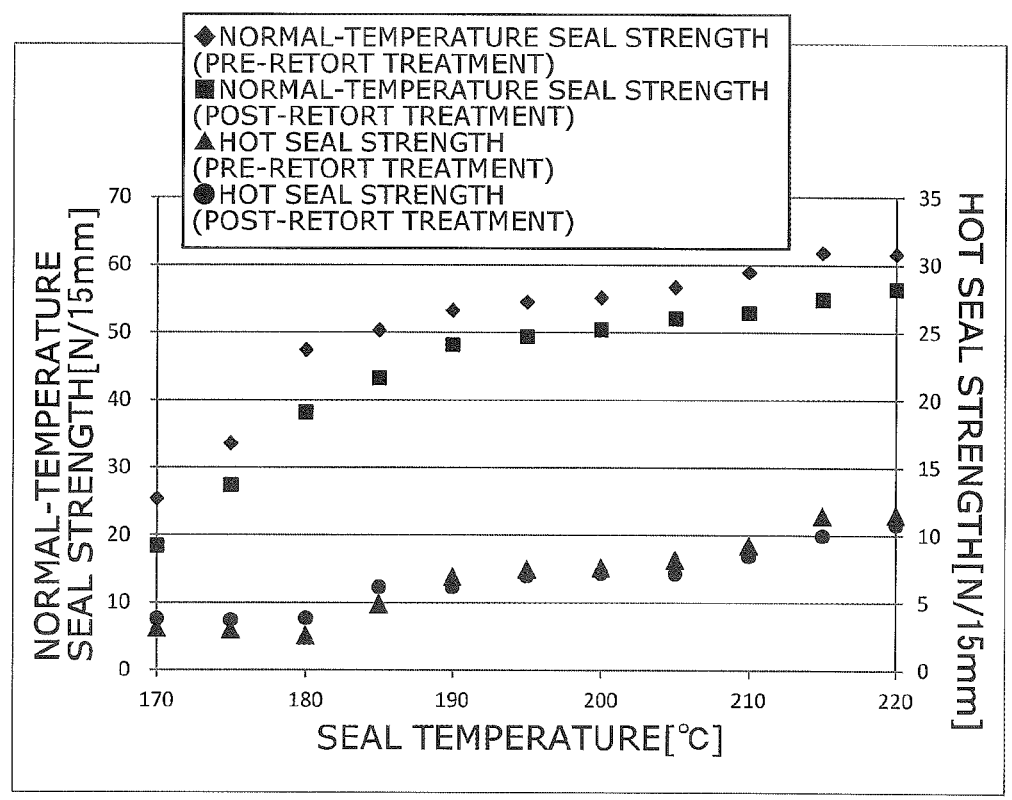
FIG. 19 is a table illustrating evaluation results of a relationship between seal temperature and seal strength in the second embodiment.
FIG. 20 is a graph illustrating the evaluation results of the relationship between the seal temperature and the seal strength in the second embodiment.

In addition, the test pieces 90 produced at different seal temperatures were prepared, and room-temperature seal strength was measured. Here, the test pieces 90 having different seal temperatures from 175° C. to 220° C. at 5° C. intervals were prepared. The results are shown in the row of "room-temperature seal strength (pre-retort treatment)" in FIG. 19. In addition, FIG. 20 illustrates a graph obtained by plotting the seal strength against the seal temperature.

Example C2

The room-temperature seal strength of the test piece 90 was measured in the same manner as in Example C1, except that the test piece 90 was produced using the laminated body 50 to which heat to simulate the retort treatment was applied. The results are shown in the row of the "room-temperature seal strength (post-retort treatment)" in FIG. 19. In addition, FIG. 20 illustrates a graph obtained by plotting the seal strength against the seal temperature.

The processing added to the laminated body 50 constituting the test piece 90 is as follows.
Heating temperature: 121° C.
Heating time: 40 minutes
Pressure: 0.2 MPa Example C3

Hot seal strengths of test pieces 90 were each measured in the same manner as in Example C1, except that the measurement of the seal strength was performed in the environment of a temperature of 100° C. and a relative humidity of 50%. The results are shown in the row of the "heat seal strength (pre-retort treatment)" in FIG. 19. In addition, FIG. 20 illustrates a graph obtained by plotting the seal strength against the seal temperature.

Example C4

Hot seal strengths of test pieces 90 were each measured in the same manner as in Example C2, except that the test pieces 90 were produced using the laminated body 50 to which heat to simulate the retort treatment was applied. The results are shown in the row of the "heat seal strength (post-retort treatment)" in FIG. 19. In addition, FIG. 20 illustrates a graph obtained by plotting the seal strength against the seal temperature.

As illustrated in FIGS. 19 and 20, there was a tendency that the room-temperature seal strength increased as the seal temperature increased. In particular, when the room-temperature seal strength after the retort treatment was less than 40 N, the dependence of the room-temperature seal strength on the seal temperature was large. Therefore, it can be said that the room-temperature seal strength after the retort treatment is preferably 40 N or more. Thereby, it is possible to suppress the variation in the room-temperature seal strength after the retort treatment due to the variation in the seal temperature.

The hot seal strength also tended to increase as the seal temperature increased, or the dependence on the seal temperature was smaller than in the case of the room-temperature seal strength.

As illustrated in FIGS. 19 and 20, the room-temperature seal strength of the test piece 90 that is subjected to the retort treatment tended to be smaller than the room-temperature seal strength of the test piece 90 that is not subjected to the retort treatment. The difference between the room-temperature seal strength of the test piece 90 that is subjected to the retort treatment and the room-temperature seal strength of the test piece 90 that is not subjected to the retort treatment was in the range of 4 N to 10 N. On the other hand, the difference between the hot seal strength of the test piece 90 that is subjected to the retort treatment and the hot seal strength of the test piece 90 that is not subjected to the retort treatment was smaller than the room-temperature seal strength, that is, 2 N or less.

Example D1

As a first plastic film 62, a stretched PET film having a thickness of 12 µm was prepared. In addition, as a second plastic film 66, a stretched nylon film having a thickness of 15 µm was prepared. In addition, as a sealant film 70, an unstretched polypropylene film ZK500 manufactured by Toray Film Processing Co., Ltd., was prepared. ZK500 contains the above-described propylene/ethylene block copolymer and elastomer. A thickness of the sealant film 70 was 60 µm.

Subsequently, the first plastic film 62, the second plastic film 66, and the sealant film 70 were laminated by a dry lamination method to produce the laminated body 50. As a first adhesive layer 64 and a second adhesive layer 68, a two-pack type polyurethane-based adhesive (main agent: RU-40, curing agent: H-4) manufactured by Rock Paint Co., Ltd., was used. Note that the RU-40 of the main agent is polyester polyol. Thicknesses of the first adhesive layer 64 and the second adhesive layer 68 were 3.5 µm.

[Evaluation of Seal Strength]

Subsequently, the inner surfaces 50s of the two sheets of laminated bodies 50 were partially heat-sealed together at a first seal temperature to form the seal section. Subsequently, the portion including the seal section in the two sheets of laminated bodies 50 was cut out, and the above-described test piece 90 for measuring the seal strength was produced.

Here, the plurality of test pieces 90 that are not subjected to the retort treatment as in the above-described Example C1 and the plurality of test pieces 90 that are subjected to the retort treatment as in the above-described Example C2 were each prepared. Subsequently, the room-temperature seal strength and the hot seal strength were each measured using the test piece 90 that is not subjected to the retort treatment. As a result, the room-temperature seal strength and the hot seal strength were 62 N and 9.2 N, respectively. In addition, the room-temperature seal strength and the hot seal strength were each measured using the test piece 90 that is subjected to the retort treatment. As a result, the room-temperature seal strength and the hot seal strength were 58 N and 8.5 N, respectively.

[Evaluation of Peeling Off Pressure]

Subsequently, the type 1 bag 10 including the steam-releasing mechanism 20 illustrated in FIGS. 1 and 4 was manufactured by using the laminated body 50. A height S1 of the bag 10 was 145 mm, and a width S2 thereof was 140 mm. In addition, a height S3 of a folded lower film 17, that is, a height from a lower end portion of the bag 10 to a folded part 17f was 40 mm. In the following description, the bag 10 having the height S1 of 145 mm, the width S2 of 140 mm, and the height S3 of 40 mm is also referred to as an S-sized bag 10. Subsequently, the bag 10 was filled with 100 ml of water, and furthermore, a sensor 81 of a data logger was disposed inside the bag 10, and the upper portion 11 of the bag 10 was heat-sealed to form an upper seal section 11a.

Subsequently, the water in the bag 10 was heated using a microwave oven having an output of 500 W while the pressure in the storage section 18 is measured every second using the sensor 81. As the microwave oven having an output of 500 W, NE-MS261 manufactured by Panasonic Corporation was used. When the pressure in the storage section 18 increases and the peeling off of the steam-releasing seal part 20a reaches an outer edge of the bag 10, the steam in the storage section 18 began to be discharged to the outside of the bag 10, and the pressure in the storage section 18 dropped sharply. The peeling off pressure, which is the pressure in the storage section 18 just before the pressure begins to drop sharply, was 116.1 kPa.

[Evaluation of Heat Resistance]

In the same manner as in the evaluation of the peeling off pressure, the S-sized bag 10 was manufactured using the laminated body 50. Subsequently, 100 g of contents containing a large amount of oil content was filled into the S-sized bag 10, and the upper portion 11 was heat-sealed to form the upper seal section 11a.

Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were not formed in the laminated body 50.

Example D2

A type 1 bag 10 was manufactured using the same laminated body 50 as in Example D1. A height S1 of a bag 10 was 145 mm, a width S2 thereof was 150 mm, and a height S3 of a folded lower film 17 was 43 mm. In the following description, the bag 10 having the height S1 of 145 mm, the width S2 of 150 mm, and the height S3 of 43 mm is also referred to as an M-sized bag 10.

Subsequently, in the same manner as in Example D1, 100 ml of water was filled into the bag 10, and an upper portion 11 was heat-sealed to form an upper seal section. Subsequently, in the same manner as in Example D1, the water in the bag 10 was heated using a microwave oven having an output of 500 W and a peeling off pressure was measured while a pressure in a storage section 18 is measured using a sensor 81. As a result, the peeling off pressure was 113.5 kPa.

In addition, in the same manner as in Example D1, 100 g of contents containing a large amount of oil content was filled into an M-sized bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were not formed in the laminated body 50.

Example D3

The seal strength was measured using the produced test piece 90 by heat-sealing the same laminated body 50 as in Example D1 at a second seal temperature lower than the above-described first seal temperature. In the test piece 90 that is subjected to the retort treatment, the room-temperature seal strength and the hot seal strength were 55 N and 7.6 N, respectively. In addition, in the test piece 90 that is subjected to the retort treatment, the room-temperature seal strength and the hot seal strength were 50 N and 7.2 N, respectively.

In addition, except that the seal temperature was set to be the above-described second seal temperature, an S-sized type 1 bag 10 was manufactured in the same manner as in Example D1. Subsequently, in the same manner as in Example D1, the water in the bag 10 was heated using a microwave oven having an output of 500 W and a peeling off pressure was measured while a pressure in a storage section 18 is measured using a sensor 81. As a result, the peeling off pressure was 110 kPa.

In addition, except that the seal temperature was set to be the above-described second seal temperature, in the same manner as in Example D1, 100 g of contents containing a large amount of oil content was filled into the S-sized type 1 bag 10, and the upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were not formed in the laminated body 50.

Example D4

Except that a temperature of heat seal treatment was set to be the second seal temperature in the same manner as in Example D3, an M-sized type 1 bag 10 was manufactured in the same manner as in Example D2. Subsequently, in the same manner as in Example D1, the water in the bag 10 was heated using a microwave oven having an output of 500 W and a peeling off pressure was measured while a pressure in a storage section 18 is measured using a sensor 81. As a result, a peeling off pressure was 110.5 kPa.

In addition, except that the temperature of the heat seal treatment was set to be the second seal temperature as in Example D3, in the same manner as in Example D2, 100 g of contents containing a large amount of oil content was filled into the M-sized bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were not formed in the laminated body 50.

Example D5

The same laminated body 50 as in Example D3 was heat-sealed at the above-described second seal temperature to manufacture the same S-sized type 1 bag 10 as in Example D3. Subsequently, the water in the bag 10 was heated using a microwave oven having an output of 1,600 W and a peeling off pressure was measured, while a pressure in a storage section 18 is measured using the sensor 81. As the microwave oven having an output of 1,600 W, NE-1801 manufactured by Panasonic Corporation was used. As a result, the peeling off pressure was 117 kPa.

In addition, the same laminated body 50 as in Example D3 was heat-sealed at the above-described second seal temperature to manufacture the same S-sized type 1 bag 10 as in Example D3. Subsequently, 100 g of contents containing a large amount of oil content was filled into the S-sized type 1 bag 10, and an upper portion 11 was heat-sealed to form an upper seal section 11a. Thereafter, the water in the bag 10 was heated for 40 seconds using a microwave oven having an output of 1,600 W, and it was confirmed whether the laminated body 50 constituting the bag 10 was damaged. As a result, in the heated bag 10, holes and wrinkles were not formed in the laminated body 50.

Example D6

The same laminated body 50 as in Example D4 was heat-sealed at a second seal temperature to manufacture the same M-sized type 1 bag 10 as in Example D4. Subsequently, in the same manner as in Example D5, water in the bag 10 was heated using a microwave oven having an output of 1,600 W and a peeling off pressure was measured while a pressure in a storage section 18 is measured using a sensor 81. As a result, the peeling off pressure was 117.9 kPa.

In addition, the same laminated body 50 as in Example D4 was heat-sealed at the above-described second seal temperature to manufacture the same M-sized type 1 bag 10 as in Example D4. Subsequently, 100 g of contents containing a large amount of oil content was filled into the M-sized type 1 bag 10, and an upper portion 11 was heat-sealed to form an upper seal section 11a. Thereafter, the water in the bag 10 was heated for 40 seconds using a microwave oven having an output of 1,600 W, and it was confirmed whether the laminated body 50 constituting the bag 10 was damaged. As a result, in the heated bag 10, holes and wrinkles were not formed in the laminated body 50.

Example D7

As a first plastic film 62, a stretched PET film having a thickness of 12 µm was prepared. In addition, as a second plastic film 66, a stretched PET film having a thickness of 12 µm was prepared. In addition, as a sealant film 70, an unstretched polypropylene film ZK500 manufactured by Toray Film Processing Co., Ltd., was prepared. A thickness of the sealant film 70 was 60 µm.

Subsequently, in the same manner as in Example D1, seal strength between laminated bodies 50 was measured by using a test piece 90 produced by partially heat-sealing inner surfaces 50s of two sheets of laminated bodies 50 together. In the test piece 90 that is subjected to the retort treatment, the room-temperature seal strength and the hot seal strength were 55 N and 7.6 N, respectively. In addition, in the test piece 90 that is subjected to the retort treatment, the room-temperature seal strength and the hot seal strength were 50 N and 7.2 N, respectively.

In addition, in the same manner as in Example D1, an M size type 1 bag 10 was manufactured. Subsequently, in the same manner as in Example D5, the water in the bag 10 was heated using a microwave oven having an output of 1,600 W and a peeling off pressure was measured while a pressure in a storage section 18 is measured using a sensor 81. As a result, the peeling off pressure was 114.8 kPa.

In the same manner as in the evaluation of the peeling off pressure, the M-sized bag 10 was manufactured using the laminated body 50. Subsequently, 100 g of contents containing a large amount of oil content was filled into the bag 10, and an upper portion 11 was heat-sealed to form an upper seal section 11a. Thereafter, the bag 10 storing the contents was heated for 40 seconds using the microwave oven having an output of 1,600 W, and it was confirmed whether the laminated body 50 constituting the bag 10 was damaged. As a result, in the heated bag 10, holes and wrinkles were not formed in the laminated body 50.

Example D8

The seal strength was measured using the produced test piece 90 by heat-sealing the same laminated body 50 as in Example D1 at a third seal temperature lower than the above-described first seal temperature. In the test piece 90 that is subjected to the retort treatment, room-temperature seal strength and hot seal strength were 65 N and 11.5 N, respectively. In addition, in a test piece 90 that is subjected to retort treatment, the room-temperature seal strength and the hot seal strength were 60 N and 10.8 N, respectively.

In addition, except that the seal temperature was set to be the above-described third seal temperature, an S-sized type 1 bag 10 was manufactured in the same manner as in Example D1. Subsequently, in the same manner as in Example D1, the water in the bag 10 was heated using a microwave oven having an output of 500 W and a peeling off pressure was measured while a pressure in a storage section 18 is measured using a sensor 81. As a result, a peeling off pressure was 112.5 kPa.

In addition, except that the seal temperature was set to be the above-described third seal temperature, in the same manner as in Example D1, 100 g of contents containing a large amount of oil content was filled into the S-sized type 1 bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, wrinkles were formed in the laminated body 50, but holes were not formed therein.

Comparative Example D1

As a first plastic film 62, a stretched PET film having a thickness of 12 µm was prepared. In addition, as a second plastic film 66, a stretched PET film having a thickness of 12 µm was prepared. In addition, as a sealant film 70, an unstretched polypropylene film ZK207 manufactured by Toray Film Processing Co., Ltd., was prepared. A thickness of the sealant film 70 was 70 µm.

The ZK207 has a lower tensile elongation than ZK500. Specifically, the tensile elongation of the ZK207 in a machine direction (MD) is 790% when the thickness is 50 µm and 730% when the thickness is 60 µm.

In addition, the tensile elongation of the ZK207 in a transverse direction (TD) is 1,020% when the thickness is 50 µm and 870% when the thickness is 60 µm. Therefore, a product of the tensile elongation (%) of the ZK207 in the machine direction and the thickness (µm) of the ZK207 is 39,500 when the thickness is 50 µm and 43,800 when the thickness is 60 µm. In addition, the product of the tensile elongation (%) of the ZK207 in the transverse direction and the thickness (µm) of the ZK207 is 51,000 when the thickness is 50 µm and 52,200 when the thickness is 60 µm.

In addition, the ZK207 has a higher tensile modulus of elasticity than ZK500. Specifically, the tensile modulus of elasticity of the ZK207 in the machine direction (MD) is 780 MPa when the thickness is 50 µm and 680 MPa when the thickness is 60 µm. In addition, the tensile modulus of elasticity of the ZK207 in the transverse direction (TD) is 630 MPa when the thickness is 50 µm and 560 MPa when the thickness is 60 µm. Accordingly, the product of the tensile modulus of elasticity (MPa) of the ZK207 in the machine direction and the thickness (µm) of the ZK207 is 39,000 when the thickness is 50 µm and 40,800 when the thickness is 60 µm. In addition, the product of the tensile modulus of elasticity (MPa) of the ZK207 in the transverse direction and the thickness (µm) of the ZK207 is 31,500 when the thickness is 50 µm and 33,600 when the thickness is 60 µm.

Subsequently, in the same manner as in Example D1, seal strength between laminated bodies 50 was measured by using a test piece 90 produced by heat-sealing inner surfaces 50s of two sheets of laminated bodies 50 together. In the test piece 90 that is subjected to retort treatment, room-temperature seal strength and hot seal strength were 65 N and 23 N, respectively. In addition, in the test piece 90 that is subjected to the retort treatment, the room-temperature seal strength and the hot seal strength were 60 N and 23 N, respectively.

In addition, in the same manner as in Example D1, an S-sized type 1 bag 10 was manufactured. Subsequently, in the same manner as in Example D1, the water in the bag 10 was heated using a microwave oven having an output of 500 W and a peeling off pressure was measured while a pressure in a storage section 18 is measured using a sensor 81. As a result, a peeling off pressure was 130.7 kPa.

In addition, as in the evaluation of the peeling off pressure, the S-sized type 1 bag 10 was manufactured using the laminated body 50. Subsequently, 100 g of contents containing a large amount of oil content was filled into the S-sized bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were formed in the laminated body 50.

Comparative Example D2

An M-sized type 1 bag 10 was manufactured using the same laminated body 50 as in Comparative Example D1. Subsequently, in the same manner as in Example D1, the water in the bag 10 was heated using a microwave oven having an output of 500 W and a peeling off pressure was measured while a pressure in a storage section 18 is measured using a sensor 81. As a result, a peeling off pressure was 132.5 kPa.

In addition, as in the evaluation of the peeling off pressure, the M-sized type 1 bag 10 was manufactured using the laminated body 50. Subsequently, 100 g of contents containing a large amount of oil content was filled into the M-sized bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were formed in the laminated body 50.

Example D9

An S-sized type 2 bag 10 was manufactured using the same laminated body 50 as in Example D1. Subsequently, in the same manner as in Example D1, 100 ml of water was filled into the bag 10, and an upper portion 11 was heat-sealed to form an upper seal section. Subsequently, in the same manner as in Example D1, the water in the bag 10 was heated using a microwave oven having an output of 500 W and a peeling off pressure was measured while a pressure in a storage section 18 is measured using a sensor 81. As a result, a peeling off pressure was 110.8 kPa.

In addition, as in the evaluation of the peeling off pressure, the S-sized type 2 bag 10 was manufactured using the laminated body 50. Subsequently, 100 g of contents containing a large amount of oil content was filled into the bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were not formed in the laminated body 50.

Example D10

An S-sized type 3 bag 10 was manufactured using the same laminated body 50 as in Example D1. Subsequently, in the same manner as in Example D1, 100 ml of water was filled into the bag 10, and an upper portion 11 was heat-sealed to form an upper seal section. Subsequently, in the same manner as in Example D1, the water in the bag 10 was heated using a microwave oven having an output of 500 W and a peeling off pressure was measured while a pressure in a storage section 18 is measured using a sensor 81. As a result, a peeling off pressure was 108.9 kPa.

In addition, as in the evaluation of the peeling off pressure, the S-sized type 3 bag 10 was manufactured using the laminated body 50. Subsequently, 100 g of contents containing a large amount of oil content was filled into the bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, in the heated bag 10, holes and wrinkles were not formed in the laminated body 50.

FIG. 21 collectively illustrates a layer configuration of a laminated body, measurement results of seal strength, measurement results of a peeling off pressure, evaluation results of heat resistance, and the like of Examples D1 to D10 and Comparative Examples D1 and D2. In FIG. 21, components of the laminated body are described in a column of the "layer configuration" in order from an outer surface side layer. Also, in the column of "heat resistance", a case where holes and wrinkles are not formed in the laminated body 50 was described as "great", and a case where wrinkles were formed in the laminated body 50 but holes are not formed in the laminated body 50 was described as "good", and a case where holes and wrinkles are formed in the laminated body 50 was described as "bad".

As can be seen from the comparison between Examples D1 to D10 and Comparative Examples D1 to D2, by using an unstretched polypropylene film ZK500 manufactured by Toray Film Processing Co., Ltd. as the sealant film 70, the hot seal strength of the seal section that is subjected to the retort treatment could be set to be 15 N or less. Thereby, the peeling off pressure during the heating of the bag 10 could be set to be 130 kPa or lower. As a result, it was possible to suppress the formation of holes in the laminated body 50 of the bag 10 during the heating. Further, by adjusting the seal temperature so that the hot seal strength of the seal section after the retort treatment was 10 N or less, the peeling off pressure during the heating of the bag 10 could be set to be 120 kPa or lower. As a result, it was possible to suppress the formation of holes or wrinkles in the laminated body 50 of the bag 10 during the heating.

Third Embodiment

Next, a third embodiment of the present invention will be described. In the same manner as in the above-described first embodiment, even an object of the third embodiment is to solve a problem in that a pressure or temperature of a storage section when a steam-releasing seal part peels off becomes too high, and thus damage such as holes or wrinkles is formed in a laminated body constituting a bag.

Next, means for solving the problem will be described.

According to the third embodiment, a bag having a storage section is a bag including: laminated bodies that include a sealant film that is positioned on an inner surface of the bag and is constituted by a single layer and at least one plastic film that is positioned on an outer surface side of the sealant film; and a seal section where inner surfaces of one pair of the laminated bodies are joined together, in which the seal section has an outer edge seal part that is positioned on an outer edge of the bag and a steam-releasing seal part that is positioned closer to a center point side of the storage section than the outer edge seal part and peels off due to an increase in pressure in the storage section, and seal strength of the seal section at 25° C. is 60 N or less and the seal strength of the seal section at 100° C. is 23 N or less.

In the bag according to the third embodiment, a product of a tensile modulus of elasticity (MPa) of the sealant film in a machine direction and a thickness (μm) of the sealant film may be 35,000 or more.

In the bag according to the third embodiment, the seal strength of the seal section at 25° C. may be 55 N or less.

In the bag according to the third embodiment, the seal strength of the seal section at 25° C. may be 40 N or more and 45 N or more.

In the bag according to the third embodiment, the sealant film may include a propylene/ethylene block copolymer as a main component.

In the bag according to the third embodiment, the sealant film may include a propylene/ethylene block copolymer and an α-olefin copolymer as main components.

The bag according to the third embodiment further includes a non-seal section isolated from the storage section by the steam-releasing seal part, and the non-seal section extends from a position closer to a center point side of the storage section than the outer edge seal part to the outer edge of the bag.

In the bag according to the third embodiment, the peeling off pressure in the steam-releasing seal part may be 133 kPa or lower and 130 kPa or lower.

According to the third embodiment, a method for manufacturing a bag is a method for manufacturing a bag having a storage section including: preparing laminated bodies that include a sealant film that is positioned on an inner surface of the bag and at least one plastic film that is positioned on an outer surface side of the sealant film, sealing a seal section by heat-sealing the inner surfaces of the pair of laminated bodies together at a predetermined seal temperature, the seal section having an outer edge seal part positioned on an outer edge of the bag and a steam-releasing seal part that is positioned closer to a center point side of the storage section than the outer edge seal part and peels off due to an increase in pressure in the storage section, and obtaining the plurality of bags by cutting the laminated bodies in which the seal section is formed, in which the seal temperature in the sealing is set so that seal strength of the seal section at 100° C. is 23 N or less.

According to the third embodiment, it is possible to suppress the damage such as the formation of holes and wrinkles in the laminated body constituting the bag.

Hereinafter, the third embodiment will be described in detail. Note that a shape of the bag 10 of the third embodiment is the same as that of the bag 10 of the first embodiment illustrated in FIG. 1 and the like, and a detailed description thereof will be omitted.

As described in the first embodiment, when contents of the bag 10 are heated using a microwave oven or the like, a portion of the contents can jump and reach the inner surface of the laminated body constituting the bag 10. When the contents attached to the inner surface of the laminated body contain moisture, the contents attached to the inner surface of the laminated body are further heated by the microwave oven. In this case, it is considered that a temperature of the laminated body in contact with the contents also increases, and holes are formed in the laminated body or wrinkles are formed in the laminated body.

In consideration of such a problem, in the third embodiment, the seal section is configured so that the seal strength of the seal section of the bag 10 heated to a high temperature has an appropriately low value. For example, the seal section is configured so that the seal strength (hereinafter, also referred to as hot seal strength) of the seal section of the bag 10 at 100° C. is 23 N or less. In this case, when the contents of the bag 10 are heated using the microwave oven or the like, the steam-releasing seal part 20*a* of the seal section easily peels off based on a force applied from the pressure of steam generated in the storage section 18. That is, the steam-releasing seal part 20*a* peels off at a lower pressure. As a result, before a temperature of the contents attached to the inner surface of the bag 10 becomes excessively high, the steam-releasing seal part 20*a* can peel off to discharge the steam in the storage section 18 to the outside and decrease the pressure and temperature of the storage section 18. By doing so, it is possible to suppress damage such as the formation of holes and wrinkles in the laminated body of the bag 10. In the following description, when the steam-releasing seal part 20*a* peels off and the storage section 18 communicates with the outside of the bag 10, the pressure in the storage section 18 is also referred to as a peeling off pressure.

As the method for configuring a seal section so that the hot seal strength of the seal section of the bag 10 is 23 N or less, in the third embodiment, a method for appropriately managing seal strength (hereinafter, also referred to as room-temperature seal strength) of a seal section of a bag 10 at a low temperature, for example, at 25° C. is employed. As a result of intensive studies conducted by the present inventors, in the bag 10 of the third embodiment, by configuring the seal section so that the room-temperature seal strength is 60 N or less, the hot seal strength of the seal section can be set to be 23 N or less. Based on such knowledge, in the third embodiment, by setting the configuration conditions of the seal section so that the room-temperature seal strength is 60 N or less, it is possible to manufacture the bag 10 including the seal section having the hot seal strength of 23 N or less. Therefore, it is possible to stably provide the bag 10 in which the damage such as holes and wrinkles is suppressed from occurring.

Factors that determine the room-temperature seal strength of the seal section can include mechanical properties, thickness, or the like of the sealant film described below positioned on the inner surface of the laminated body. In addition, when the seal section such as the steam-releasing seal part 20a is formed by heat seal treatment, the seal strength of the seal section of the bag 10 may change depending on the conditions of the heat seal treatment such as the temperature. In addition, the seal strength of the seal section of the bag 10 may also change even by sterilization treatment such as boil treatment or retort treatment. In the third embodiment, the seal section having the room-temperature seal strength of 60 N or less is formed by appropriately adjusting and considering these factors. Note that when the bag 10 is subjected to the treatment such as the boil treatment or the retort treatment, unless otherwise specified, the seal strength of the seal section of the bag 10 means the seal strength of the seal section of the treated bag 10.

Note that the retort treatment is treatment of filling the bag 10 with contents, sealing the bag 10, and then heating the bag 10 in a pressurized state using steam or heated hot water. A temperature of the retort treatment is, for example, 120° C. or higher. The boil treatment is treatment of filling the bag 10 with the contents, sealing the bag 10, and then double-boiling the bag 10 under the atmospheric pressure. A temperature of the boiling temperature is, for example, 90° C. or higher and 100° C. or lower.

In addition, factors that determine the peeling off pressure of the steam-releasing seal part 20a can include the shape, a dimension, hot seal strength, and the like of the steam-releasing seal part 20a. The peeling off pressure in the steam-releasing seal part 20a is preferably 133 kPa or lower, more preferably 130 kPa or lower, and still more preferably 126 kPa or lower.

It is considered that if the peeling off pressure in the steam-releasing seal part 20a is too low, the steam-releasing seal part 20a peels off before the contents are sufficiently heated and pressurized, and the pressure and temperature of the storage section 18 decrease. Considering this point, the peeling off pressure in the steam-releasing seal part 20a is preferably 105 kPa or greater, and more preferably 110 kPa or greater.

The hot seal strength of the seal section of the bag 10 at a width of 15 mm at 100° C. is preferably 23 N or less, more preferably 20 N or less, and still more preferably 15 N or less. In addition, the hot seal strength of the seal section of the bag 10 may be 11 N or less or 10 N or less. Note that it is considered that if the hot seal strength is too low, the steam-releasing seal part 20a may peel off before the contents are sufficiently heated and pressurized, and the pressure and temperature of the storage section 18 may decrease. In consideration of this point, the hot seal strength of the seal section of the bag 10 is preferably 4 N or more, and more preferably 5 N or more.

In addition, the room-temperature seal strength of the seal section of the bag 10 at a width of 15 mm at 25° C. may be preferably 60 N or less, more preferably 55 N or less, and still more preferably 50 N or less. By forming the seal section so that the room-temperature seal strength is 60 N or less, the hot seal strength of the seal section can be 23 N or less. In addition, the room-temperature seal strength of the seal section of the bag 10 at a width of 15 mm at 25° C. is preferably 35 N or more, more preferably 40 N or more, and still more preferably 45 N or more and 50 N or more. By forming the seal section so that the room-temperature seal strength is 35 N or more, it is possible to suppress the peeling off of the seal section of the bag 10 due to a force applied to the bag 10 during transportation and the like. Further, by forming the seal section so that the room-temperature seal strength is 40 N or more, as shown in the examples described later, it is possible to suppress the variation of the room-temperature seal strength due to the variation of the seal temperature.

In the third embodiment, the conditions of the heat seal treatment when the inner surfaces of each film are heat-sealed together to form seal sections such as a lower seal section 12a, side seal sections 13a and 14a, and a steam-releasing seal part 20a are set according to materials of the sealant film 70 so that the room-temperature seal strength of the seal section is 60 N or less and thus the hot seal strength is 23 N or less.

Layer Configuration of Front Surface Film and Back Surface Film

Hereinafter, the laminated body 50 constituting the front surface film 15 and the back surface film 16 will be described. Note that a layer configuration of the laminated body 50 is the same as that of the laminated body 50 of the first embodiment illustrated in FIG. 3, and a detailed description thereof will be omitted.

The layer other than the sealant film 70 in the laminated body 50 is the same as in the first embodiment. For example, as a first plastic film 62, a first adhesive layer 64, a second plastic film 66, and a second adhesive layer 68, those similar to those in the first embodiment can be used.

In the same manner as in the first embodiment, also in the third embodiment, a single-layer sealant film 70 containing a propylene/ethylene block copolymer is used as the sealant film 70 of the laminated body 50. A content of the propylene/ethylene block copolymer in the sealant film 70 is, for example, 80% by mass or more, and preferably 90% by mass or more. The thickness of the sealant film 70 is preferably 30 µm or more, and more preferably 40 µm or more. In addition, the thickness of the sealant film 70 is preferably 100 µm or less, and more preferably 80 µm or less.

Further, in the third embodiment, the second type sealant film 70 of the first type sealant film 70 and the second type sealant film 70 described in the first embodiment is used. As described in the first embodiment, the second type sealant film 70 has a high tensile modulus of elasticity like ZK207. By using the second type sealant film 70, tearability of the bag 10 when a consumer opens the bag 10 by tearing the bag 10 along the first direction D1 can be enhanced.

Hereinafter, in the third embodiment, preferred mechanical properties of the single-layer sealant film 70 containing the propylene/ethylene block copolymer will be described.

The tensile modulus of elasticity (MPa) of the sealant film 70 at 25° C. in a machine direction (MD) may be preferably 500 MPa or more, more preferably 600 MPa or more, 650 MPa or more, or 700 MPa or more. In addition, the product of the tensile modulus of elasticity (MPa) of the sealant film 70 in the machine direction (MD) and the thickness (μm) of the sealant film 70 is preferably 35,000 or more, more preferably 38,000 or more, and still more preferably 45,000 or more. In addition, the tensile modulus of elasticity (MPa) of the sealant film 70 at 25° C. in a transverse direction (TD) may be preferably 450 MPa or more, more preferably 500 MPa or more, 550 MPa or more, or 600 MPa or more. In addition, the product of the tensile modulus of elasticity (MPa) of the sealant film 70 in the transverse direction (TD) and the thickness (μm) of the sealant film 70 may be preferably 25,000 or more, more preferably 30,000 or more, and still more preferably 35,000 or more and 38,000 or more. By making the sealant film 70 have a high tensile modulus of elasticity, the tearability when opening the bag 10 can be enhanced.

In addition, the tensile elongation (%) of the sealant film 70 at 25° C. in the machine direction (MD) is preferably 1,100(%) or less, more preferably 1,000(%) or less, or 900(%) or less or 800(%) or less. In addition, the product of the tensile elongation (%) of the sealant film 70 in the machine direction (MD) and the thickness (μm) of the sealant film 70 may be preferably 55,000 or less and more preferably 50,000 or less. In addition, the tensile elongation (%) of the sealant film 70 at 25° C. in the transverse direction (TD) is preferably 1,200(%) or less, more preferably 1,100 (%) or less, 1,000(%), or 900(%) or less. In addition, the product of the tensile elongation (%) of the sealant film 70 in the transverse direction (TD) and the thickness (μm) of the sealant film 70 may be preferably 60,000 or less and more preferably 55,000 or less.

Note that the layer configuration of the laminated body 50 is not limited to the above as long as the room-temperature seal strength can be set to be 60 N or less. For example, the laminated body 50 may include only one plastic film.

Method for Measuring Seal Strength

As the method for measuring seal strength of a seal section of a bag 10, the method described in the above-described second embodiment can be used.

Method for Heating Contents

Next, an example of a method for heating contents 19 stored in a bag 10 will be described.

First, the bag 10 is put inside the microwave oven in the state in which the lower portion 12 faces down and the bag 10 is self-standing. Next, the contents are heated using the microwave oven. As a result, the temperature of the contents 19 increases, so the moisture contained in the contents 19 evaporates, and the pressure in the storage section 18 increases.

When the pressure in the storage section 18 increases, the front surface film 15 and the back surface film 16 expand outward due to the force applied from the storage section 18. Here, in the third embodiment, the seal section is configured so that the room-temperature seal strength is 60 N or less. As a result, it is possible to obtain the bag 10 having a seal section having a hot seal strength of 23 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

(First Modified Example of Bag)

Figure 22:
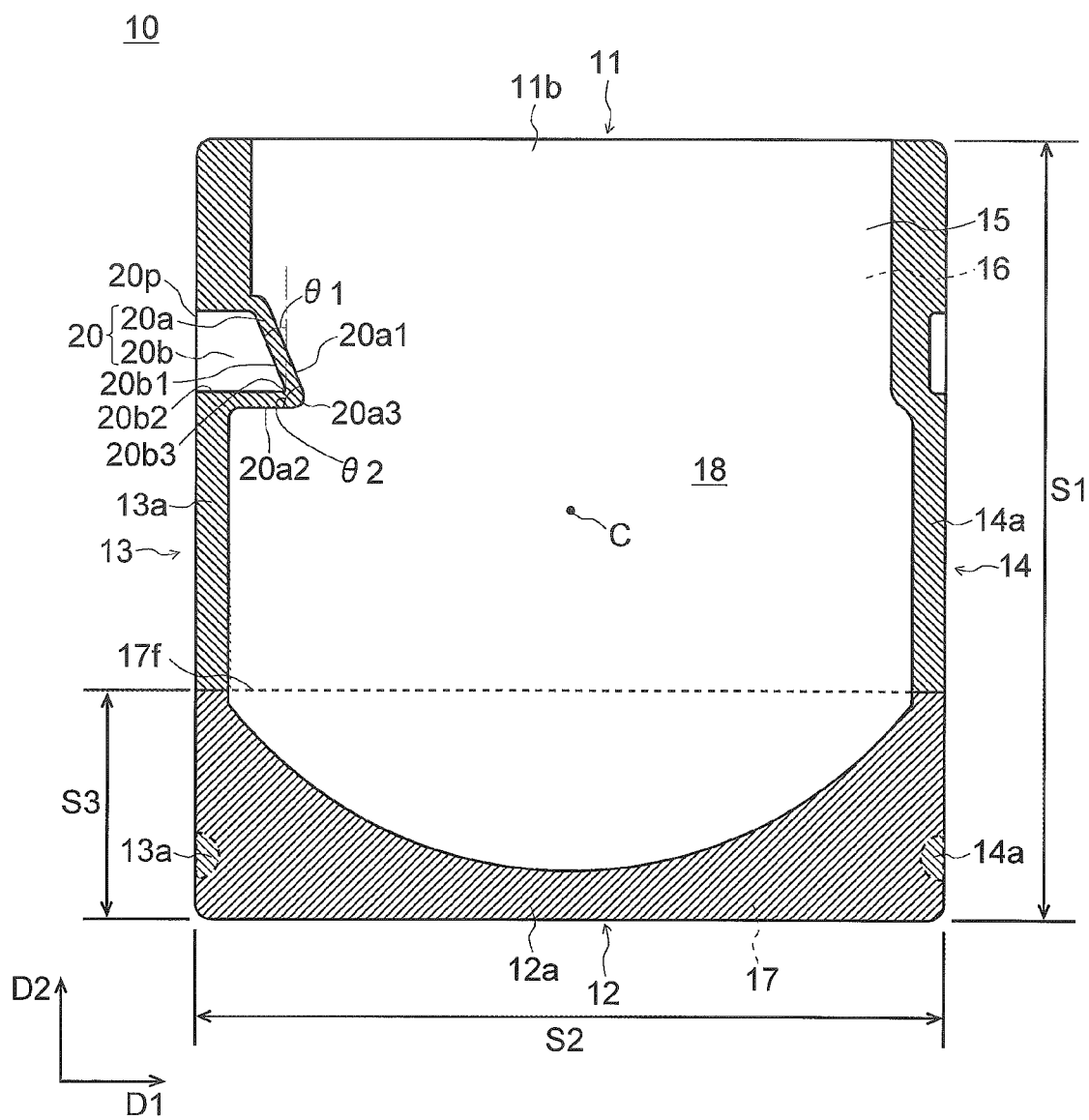
FIG. 22 is a front view illustrating a modified example of a bag in a third embodiment.

In the steam-releasing mechanism 20 of the third embodiment described above, an example has been described in which a portion opposite to an opening 20p at a side edge of an edge portion of the non-seal section 20b in the first direction D1 extends in parallel with the second direction D2 orthogonal to the first direction D1. However, the present embodiment is not limited thereto, and as illustrated in FIG. 22, a portion opposite to the opening 20p at the side edge of the edge portion of the non-seal section 20b in the first direction D1 extends in a direction inclined with respect to the second direction D2. In the following description, a portion opposite to the opening 20p at the side edge of the edge portion of the non-seal section 20b in the first direction D1 is also referred to as a first edge portion 20b1. Further, of the edge portion of the non-seal section 20b, a portion connected to a lower end of the first edge portion 20b1 via a connection part 20b3 and extending toward the side edge of the bag 10 is also referred to as a second edge portion 20b2.

In the example illustrated in FIG. 22, the first edge portion 20b1 extends in a direction inclined with respect to the second direction D2 so that the first edge portion 20b1 is displaced to the opening 20p side of the side edge toward the upper portion 11. Thereby, the steam flowing from the storage section 18 into the non-seal section 20b through the position of the connection part 20b3 can be smoothly guided to the opening 20p. An angle θ1 formed by the direction in which the first edge portion 20b1 extends and the second direction D2 is, for example, 1° or more, preferably 10 or more, or 20° or more, and more preferably 30° or more. In addition, the angle θ1 formed by the direction in which the first edge portion 20b1 extends and the second direction D2 may be, for example, 700 or less and 60° or less. In the following description, the bag 10 in which the first edge portion 20b1 extends in a direction inclined with respect to the second direction D2 is also referred to as a type 1 (inclined) bag.

In the example illustrated in FIG. 22, reference numeral 20a1 denotes an inner edge of a portion corresponding to the first edge portion 20b1 of the non-seal section 20b in the steam-releasing seal part 20a, and is also referred to as a first inner edge in the following description. In addition, reference numeral 20a2 denotes an inner edge of a portion corresponding to the second edge 20b2 of the non-seal section 20b in the steam-releasing seal part 20a, and is also referred to as a second inner edge in the following description. Reference numeral 20a1 denotes a connection part 20a3 to which the first inner edge 20a1 and the second inner edge 20a2 are connected.

In the example illustrated in FIG. 22, an angle θ2 formed by the direction in which the first inner edge 20a1 extends and the direction in which the second inner edge 20a2 extends is less than 90°. Thereby, when the pressure in the storage section 18 increases, a force is easily applied to the connection part 20a3. As a result, the steam-releasing seal part 20a easily peels off from the connection part 20a3 to the position of the connection part 20b3 of the non-seal section 20b. An angle θ2 formed by the direction in which the first inner edge 20a1 extends and the direction in which the second inner edge 20a2 extends is preferably 89° or less, and more preferably 80° or less 70° or less.

(Second Modified Example of Bag)

In the steam-releasing mechanism 20 of the third embodiment described above, an example has been described in which the non-seal section 20b isolated from the storage section 18 by the steam-releasing seal part 20a extends to the outer edge of the bag 10. However, the present embodiment is not limited thereto, and in the same manner as in the first modified example of the first embodiment illustrated in FIG. 6, the non-seal section 20b may be surrounded by the steam-releasing seal part 20a and a first side seal section 13a.

Also in the second modified example, a seal section is configured so that room-temperature seal strength is 60 N or less. As a result, it is possible to obtain the bag 10 having a seal section having a hot seal strength of 23 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

(Third Modified Example of Bag)

In the steam-releasing mechanism 20 of the third embodiment and the first modified example described above, an example has been described in which the steam-releasing seal part 20a is connected to the first side seal section 13a. However, the present embodiment is not limited thereto, and in the same manner as in the second modified example of the first embodiment illustrated in FIG. 7, the steam-releasing seal part 20a is separated from the side seal sections 13a and 14a.

Also in the second modified example, a seal section is configured so that room-temperature seal strength is 60 N or less. As a result, it is possible to obtain the bag 10 having a seal section having a hot seal strength of 23 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

(Fourth Modified Example of Bag)

Also in a fourth modified example, in the same manner as the third modified example of the second embodiment illustrated in FIG. 18, a front surface film 15 may include an overlap part 15a where inner surfaces of the front surface film 15 partially overlap with each other.

Also in the second modified example, a seal section is configured so that room-temperature seal strength is 60 N or less. As a result, it is possible to obtain the bag 10 having a seal section having a hot seal strength of 23 N or less. Therefore, the steam-releasing seal part 20a can peel off before the temperature of the contents 19 stored in the bag 10 becomes excessively high or the pressure of the contents 19 becomes excessively high. Therefore, it is possible to suppress the formation of holes in the laminated body 50 of the bag 10 or the formation of wrinkles in the laminated body 50 during the heating.

EXAMPLES

Next, the third embodiment will be described in more detail with reference to examples, but the third embodiment is not limited to the description of the following examples unless the third embodiment exceeds the gist.

Example E1

As a first plastic film 62, a stretched PET film having a thickness of 12 μm was prepared. In addition, as a second plastic film 66, a stretched PET film having a thickness of 12 μm was prepared. In addition, as a sealant film 70, an unstretched polypropylene film ZK207 manufactured by Toray Film Processing Co., Ltd., was prepared. ZK207 contains the above-described propylene/ethylene block copolymer. A thickness of the sealant film 70 was 70 μm.

The ZK207 has a high tensile modulus of elasticity as described in the example of the first embodiment. In addition, the ZK207 has a low tensile modulus of elasticity as described in the example of the first embodiment.

Subsequently, the first plastic film 62, the second plastic film 66, and the sealant film 70 were laminated by a dry lamination method to produce the laminated body 50. As a first adhesive layer 64 and a second adhesive layer 68, a two-pack type polyurethane-based adhesive (main agent: RU-40, curing agent: H-4) manufactured by Rock Paint Co., Ltd., was used. Note that the RU-40 of the main agent is polyester polyol. Thicknesses of the first adhesive layer 64 and the second adhesive layer 68 were 3.5 μm.

Subsequently, inner surfaces 50s of two sheets of laminated bodies 50 were partially heat-sealed together to form a seal section. A temperature (hereinafter, also referred to as seal temperature) during heat seal treatment was 170° C. Subsequently, a portion including the seal section in the two sheets of laminated bodies 50 was cut out, and the above-described test piece 90 for measuring seal strength was produced. Thereafter, the room-temperature seal strength of the laminated body 50 was measured in the environment of a temperature of 25° C. and a relative humidity of 50% in accordance with JIS 1707 7.5. As a measuring instrument, for example, a tensile tester RTC-1310A with a thermostat manufactured by Orientec Co., Ltd., was used.

Note that in Example C1, before the measurement of the seal strength, heat simulating the treatment such as retort treatment or boil treatment was not applied to the test piece 90. In the following description, the state of the laminated body 50 and the test piece 90 to which heat to simulate treatments such as the retort treatment or the boil treatment is not applied is also referred to as pre-retort treatment.

Figures 23, 24:
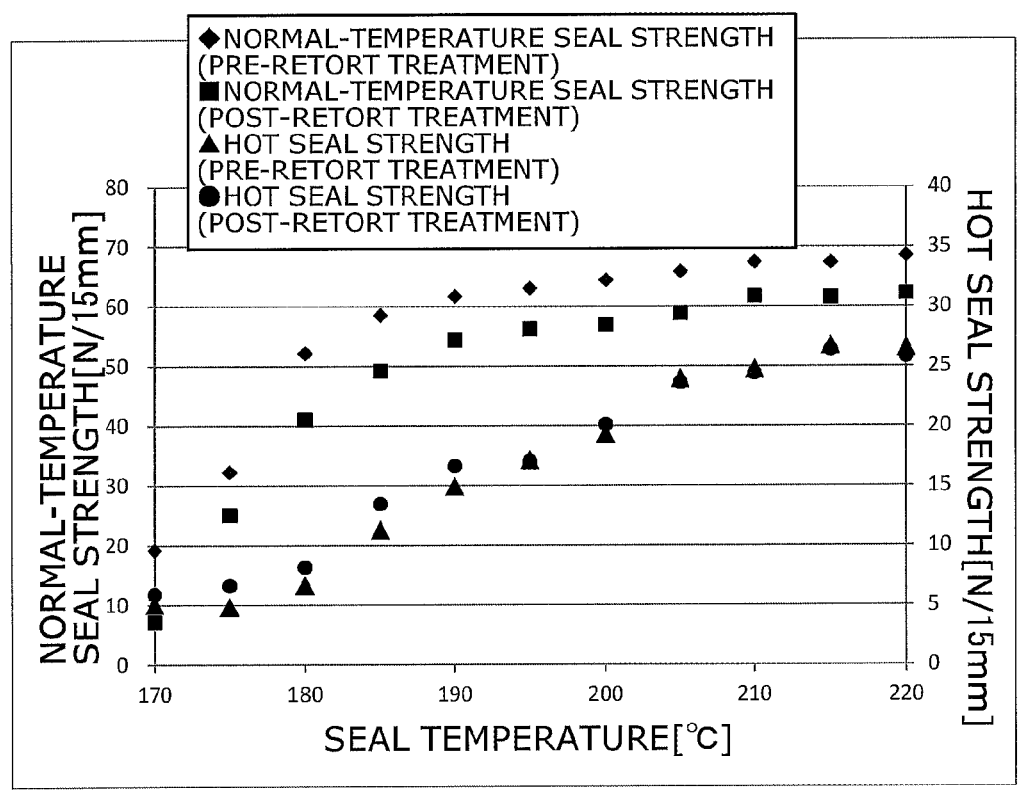
FIG. 23 is a table illustrating evaluation results of a relationship between seal temperature and seal strength in the third embodiment.
FIG. 24 is a graph illustrating the evaluation results of the relationship between the seal temperature and the seal strength in the third embodiment.

In addition, the test pieces 90 produced at different seal temperatures were prepared, and room-temperature seal strength was measured. Here, the test pieces 90 having different seal temperatures from 175° C. to 220° C. at 5° C. intervals were prepared. The results are shown in the row of the "room-temperature seal strength (pre-retort treatment)" in FIG. 23. In addition, FIG. 24 illustrates a graph obtained by plotting the seal strength against the seal temperature.

Example E2

Room-temperature seal strength of a test piece 90 was measured in the same manner as in Example E1, except that the test piece 90 was produced using a laminated body 50 to which heat to simulate retort treatment was applied. The results are shown in the row of the "room-temperature seal strength (post-retort treatment)" in FIG. 23. In addition, FIG. 24 illustrates a graph obtained by plotting the seal strength against the seal temperature.

The processing added to the laminated body 50 constituting the test piece 90 is as follows.
Heating temperature: 121° C.
Heating time: 40 minutes
Pressure: 0.2 MPa Example E3

Hot seal strengths of test pieces 90 were each measured in the same manner as in Example E1, except that the measurement of the seal strength was performed in the environment of a temperature of 100° C. and a relative humidity of 50%. The results are shown in the row of the "hot seal strength (pre-retort treatment)" in FIG. 23. In addition, FIG. 24 illustrates a graph obtained by plotting the seal strength against the seal temperature.

Example E4

Hot seal strengths of test pieces 90 were each measured in the same manner as in Example E2, except that the test pieces 90 were produced using a laminated body 50 to which heat to simulate retort treatment was applied. The results are shown in the row of the "hot seal strength (post-retort treatment)" in FIG. 23. In addition, FIG. 24 illustrates a graph obtained by plotting the seal strength against the seal temperature.

As illustrated in FIGS. 23 and 24, there was a tendency that room-temperature seal strength increased as the seal temperature increased. In particular, when the room-temperature seal strength after the retort treatment was less than 40 N, the dependence of the room-temperature seal strength on the seal temperature was large. Therefore, from the viewpoint of stability of the room-temperature seal strength, the room-temperature seal strength after the retort treatment is preferably 40 N or more, more preferably 45 N or more, and still more preferably 50 N or more. Thereby, it is possible to suppress the variation in the room-temperature seal strength after the retort treatment due to the variation in the seal temperature.

The hot seal strength also tended to increase as the seal temperature increases, in the same manner as in the room-temperature seal strength.

As illustrated in FIGS. 23 and 24, the room-temperature seal strength of the test piece 90 that is subjected to the retort treatment tended to be smaller than the room-temperature seal strength of the test piece 90 that is not subjected to the retort treatment. A difference between the room-temperature seal strength of the test piece 90 that is subjected to the retort treatment and the room-temperature seal strength of the test piece 90 that is not subjected to the retort treatment was in the range of 5 N to 13 N. On the other hand, the difference between the hot seal strength of the test piece 90 that is subjected to the retort treatment and the hot seal strength of the test piece 90 that is not subjected to the retort treatment was smaller as compared to the case of the room-temperature seal strength, that is, 3 N or less.

Example F1

As a first plastic film 62, a stretched PET film having a thickness of 12 μm was prepared. In addition, as a second plastic film 66, a stretched PET film having a thickness of 12 μm was prepared. In addition, as a sealant film 70, an unstretched polypropylene film ZK207 manufactured by Toray Film Processing Co., Ltd., was prepared. ZK207 contains the above-described propylene/ethylene block copolymer. A thickness of the sealant film 70 was 70 μm.

Subsequently, the first plastic film 62, the second plastic film 66, and the sealant film 70 were laminated by a dry lamination method to produce the laminated body 50. As a first adhesive layer 64 and a second adhesive layer 68, a two-pack type polyurethane-based adhesive (main agent: RU-40, curing agent: H-4) manufactured by Rock Paint Co., Ltd., was used. Note that the RU-40 of the main agent is polyester polyol. Thicknesses of the first adhesive layer 64 and the second adhesive layer 68 were 3.5 μm.

[Evaluation of Seal Strength]

Subsequently, the inner surfaces 50s of the two sheets of laminated bodies 50 were partially heat-sealed together at a first seal temperature to form the seal section. Subsequently, the portion including the seal section in the two sheets of laminated bodies 50 was cut out, and the above-described test piece 90 for measuring the seal strength was produced. Here, the plurality of test pieces 90 that are not subjected to the retort treatment as in Example E1 and the plurality of test pieces 90 that are subjected to the retort treatment as in Example E2 were prepared. Subsequently, the room-temperature seal strength and the hot seal strength were each measured using the test piece 90 that is not subjected to the retort treatment. As a result, the room-temperature seal strength and the hot seal strength were 65 N and 23 N, respectively. In addition, the room-temperature seal strength and the hot seal strength were each measured using the test piece 90 that is subjected to the retort treatment. As a result, the room-temperature seal strength and the hot seal strength were 60 N and 23 N, respectively.

[Evaluation of Peeling Off Pressure]

Subsequently, the type 1 bag 10 including the steam-releasing mechanism 20 illustrated in FIGS. 1 and 4 was manufactured by using the laminated body 50. A height S1 of the bag 10 was 145 mm, and a width S2 thereof was 140 mm. In addition, a height S3 of a folded lower film 17, that is, a height from a lower end portion of the bag 10 to a folded part 17f was 40 mm. In the following description, the bag 10 having the height S1 of 145 mm, the width S2 of 140 mm, and the height S3 of 40 mm is also referred to as an S-sized bag 10. Subsequently, the bag 10 was filled with 100 ml of water, and furthermore, a sensor 81 of a data logger was disposed inside the bag 10, and the upper portion 11 of the bag 10 was heat-sealed to form an upper seal section 11a.

Subsequently, the water in the bag 10 was heated using a microwave oven having an output of 500 W while the pressure in the storage section 18 is measured every second using the sensor 81. As the microwave oven having an output of 500 W, NE-MS261 manufactured by Panasonic Corporation was used. When the pressure in the storage section 18 increases and the peeling off of the steam-releasing seal part 20a reaches an outer edge of the bag 10, the steam in the storage section 18 began to be discharged to the outside of the bag 10, and the pressure in the storage section 18 dropped sharply. The peeling off pressure, which is the pressure in the storage section 18 just before the pressure began to drop sharply, was 130.7 kPa.

[Evaluation of Heat Resistance]

In the same manner as in the evaluation of the peeling off pressure, the S-sized bag 10 was manufactured using the laminated body 50. Subsequently, 100 g of contents containing a large amount of oil content was filled into the S-sized bag 10, and the upper portion 11 was heat-sealed to form the upper seal section 11a.

Thereafter, the bag 10 storing the contents was heated for 2 minutes using the microwave oven having an output of 500 W, and it was confirmed whether the laminated body 50 constituting the bag 10 was damaged. The test was performed on 10 bags 10. As a result, it was confirmed that there were no holes in the laminated body 50 in seven out of ten bags 10.

Example F2

A type 1 bag 10 was manufactured using the same laminated body 50 as in Example F1. A height S1 of a bag 10 was 145 mm, a width S2 thereof was 150 mm, and a height S3 of a folded lower film 17 was 43 mm. In the following description, the bag 10 having the height S1 of 145 mm, the width S2 of 150 mm, and the height S3 of 43 mm is also referred to as an M-sized bag 10.

Subsequently, in the same manner as in Example F1, 100 ml of water was filled into the bag 10, and an upper portion 11 was heat-sealed to form an upper seal section. Thereafter, in the same manner as in Example F1, while measuring a pressure in a storage section 18 using a sensor 81, the water in the bag 10 was heated using a microwave oven having an output of 500 W, and a peeling off pressure was measured. As a result, a peeling off pressure was 132.5 kPa.

Further, in the same manner as in Example F1, 100 g of contents containing a large amount of oil content was filled into an M-sized bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F3

An S-sized type 1 (inclined) bag 10 illustrated in FIG. 22 was manufactured using the same laminated body 50 as in Example F1. An angle θ1 formed by a direction in which a first edge portion 20b1 extends and a second direction D2 was 30°. In addition, an angle θ2 formed by a direction in which a first inner edge 20a1 extends and a direction in which a second inner edge 20a2 extends was 70°.

Subsequently, in the same manner as in Example F1, 100 ml of water was filled into the bag 10, and an upper portion 11 was heat-sealed to form an upper seal section. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 129.4 kPa.

Further, in the same manner as in Example F1, 100 g of contents containing a large amount of oil content was filled into the S-sized bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F4

The seal strength was measured using the produced test piece 90 by heat-sealing the same laminated body 50 as in Example F1 at a second seal temperature lower than the above-described first seal temperature. In the test piece 90 that is not subjected to retort treatment, room-temperature seal strength and hot seal strength were 60 N and 15 N, respectively. In addition, in the test piece 90 that is subjected to the retort treatment, the room-temperature seal strength and the hot seal strength were 55 N and 15 N, respectively.

In addition, except that the seal temperature was set to be the above-described second seal temperature, the S-sized type 1 bag 10 was manufactured in the same manner as in Example F1. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 127.3 kPa.

Further, except that the seal temperature was set to be the above-described second seal temperature, in the same manner as in Example F1, 100 g of contents containing a large amount of oil content was filled into the S-sized type 1 bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F5

The seal strength was measured using the produced test piece 90 by heat-sealing the same laminated body 50 as in Example F1 at a third seal temperature lower than the second seal temperature in the case of Example F4. In the test piece 90 that is not subjected to retort treatment, room-temperature seal strength and hot seal strength were 55 N and 10 N, respectively. In addition, in the test piece 90 that is subjected to the retort treatment, the room-temperature seal strength and the hot seal strength were 45 N and 9 N, respectively.

In addition, except that the seal temperature was set to be the above-described third seal temperature, the S-sized type 1 bag 10 was manufactured in the same manner as in Example F1. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 124.9 kPa.

Further, except that the seal temperature was set to be the above-described third seal temperature, in the same manner as in Example F1, 100 g of contents containing a large amount of oil content was filled into the S-sized type 1 bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F6

Except that a temperature of heat seal treatment is set to be a third seal temperature in the same manner as Example F5, an M-sized type 1 bag 10 was manufactured in the same manner as in Example F2. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 125.5 kPa.

In addition, except that the temperature of the heat seal treatment is set to be the third seal temperature in the same manner as Example F5, 100 g of contents containing a large amount of oil content was filled into the M-sized bag 10 in the same manner as in Example F2 and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F7

The same M-sized type 1 bag 10 as in Example F6 was manufactured by heat-sealing the same laminated body 50 as in Example F5 at the above-described third seal temperature. Subsequently, the water in the bag 10 was heated using a microwave oven having an output of 1,600 W and a peeling off pressure was measured, while a pressure in a storage section 18 is measured using the sensor 81. As the microwave oven having an output of 1,600 W, NE-1801 manufactured by Panasonic Corporation was used. As a result, the peeling off pressure was 124.8 kPa.

In addition, the same M-sized type 1 bag 10 as in Example F6 was manufactured by heat-sealing the same laminated body 50 as in Example F5 at the above-described third seal temperature. Subsequently, 100 g of contents containing a large amount of oil content was filled into the M-sized type 1 bag 10, and an upper portion 11 was heat-sealed to form an upper seal section 11a. Thereafter, the water in the bag 10 was heated for 40 seconds using a microwave oven having an output of 1,600 W, and it was confirmed whether the laminated body 50 constituting the bag 10 was damaged. As a result, it was confirmed that there were no holes in the laminated body 50 in all ten bags 10.

Example F8

As a first plastic film 62, a stretched PET film having a thickness of 12 μm was prepared. In addition, as a second plastic film 66, a stretched nylon film having a thickness of 15 μm was prepared. In addition, as a sealant film 70, an unstretched polypropylene film ZK207 manufactured by Toray Film Processing Co., Ltd., was prepared. A thickness of the sealant film 70 was 70 μm.

Subsequently, seal strength between two sheets of laminated bodies 50 was measured as in the same manner as in Example F1 using the produced test piece 90 by partially heat-sealing inner surfaces 50s of the laminated bodies 50 together at a fourth seal temperature. In the test piece 90 that is not subjected to retort treatment, room-temperature seal strength and hot seal strength were 58 N and 11N, respectively. In addition, in the test piece 90 that is subjected to the retort treatment, the room-temperature seal strength and the hot seal strength were 50 N and 11 N, respectively.

In addition, an S-sized type 1 bag 10 was produced using the laminated body 50 at the fourth seal temperature. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 125.9 kPa.

In addition, the S-sized bag 10 was produced using the laminated body 50 at the fourth seal temperature. Subsequently, 100 g of contents containing a large amount of oil content was filled into the bag 10, and an upper portion 11 was heat-sealed to form an upper seal section 11a. Thereafter, the bag 10 storing the contents was heated for 40 seconds using the microwave oven having an output of 500 W, and it was confirmed whether the laminated body 50 constituting the bag 10 was damaged. As a result, it was confirmed that there were no holes in the laminated body 50 in all ten bags 10.

Example F9

Seal strength was measured using the produced test piece 90 by heat-sealing the same laminated body 50 as in Example F8 at a fifth seal temperature lower than the above-described fourth seal temperature. In the test piece 90 that is not subjected to retort treatment, room-temperature seal strength and hot seal strength were 55 N and 10 N, respectively. In addition, in the test piece 90 that is subjected to the retort treatment, the room-temperature seal strength and the hot seal strength were 45 N and 9 N, respectively.

In addition, except that the seal temperature was set to be the above-described fifth seal temperature, the S-sized type 1 bag 10 was manufactured in the same manner as in Example F8. Thereafter, in the same manner as in Example F8, while measuring a pressure in a storage section 18 using a sensor 81, the water in the bag 10 was heated using a microwave oven having an output of 500 W, and a peeling off pressure was measured. As a result, the peeling off pressure was 122.2 kPa.

Further, except that the seal temperature was set to be the above-described fifth seal temperature, in the same manner as in Example F8, 100 g of contents containing a large amount of oil content was filled into the S-sized type 1 bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F10

The seal strength was measured using the produced test piece 90 by heat-sealing the same laminated body 50 as in Example F8 at a sixth seal temperature lower than the above-described fifth seal temperature. In the test piece 90 that is not subjected to retort treatment, room-temperature seal strength and hot seal strength were 50 N and 7 N, respectively. In addition, in the test piece 90 that is subjected to the retort treatment, the room-temperature seal strength and the hot seal strength were 38 N and 7 N, respectively.

In addition, except that the seal temperature was set to be the above-described sixth seal temperature, the S-sized type 1 bag 10 was manufactured in the same manner as in Example F8. Thereafter, in the same manner as in Example F8, while measuring a pressure in a storage section 18 using a sensor 81, the water in the bag 10 was heated using a microwave oven having an output of 500 W, and a peeling off pressure was measured. As a result, the peeling off pressure was 120.2 kPa.

Further, except that the seal temperature was set to be the above-described sixth seal temperature, in the same manner as in Example F8, 100 g of contents containing a large amount of oil content was filled into the S-sized type 1 bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F11

The seal strength was measured using the produced test piece 90 by heat-sealing the same laminated body 50 as in Example F8 at a seventh seal temperature lower than the above-described sixth seal temperature. In the test piece 90 that is not subjected to retort treatment, room-temperature seal strength and hot seal strength were 45 N and 6 N, respectively. In addition, in the test piece 90 that is subjected to the retort treatment, the room-temperature seal strength and the hot seal strength were 32 N and 6 N, respectively.

In addition, except that the seal temperature was set to be the above-described seventh seal temperature, the S-sized type 1 bag 10 was manufactured in the same manner as in Example F8. Thereafter, in the same manner as in Example F8, while measuring a pressure in a storage section 18 using a sensor 81, the water in the bag 10 was heated using a microwave oven having an output of 500 W, and a peeling off pressure was measured. As a result, the peeling off pressure was 118.9 kPa.

Further, except that the seal temperature was set to be the above-described seventh seal temperature, in the same manner as in Example F8, 100 g of contents containing a large amount of oil content was filled into the S-sized type 1 bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Comparative Example F1

The seal strength was measured using the produced test piece 90 by heat-sealing the same laminated body 50 as in Example F1 at an eighth seal temperature higher than the above-described first seal temperature. In the test piece 90 that is not subjected to retort treatment, room-temperature seal strength and hot seal strength were 70 N and 26 N, respectively. In addition, in the test piece 90 that is subjected to the retort treatment, the room-temperature seal strength and the hot seal strength were 65 N and 26 N, respectively.

In addition, except that the seal temperature was set to be the above-described eighth seal temperature, the S-sized type 1 bag 10 was manufactured in the same manner as in Example F1. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 133.2 kPa.

Further, except that the seal temperature was set to be the above-described third seal temperature, in the same manner as in Example F1, 100 g of contents containing a large amount of oil content was filled into the S-sized type 1 bag 10, and the upper portion 11 was heat-sealed to form the upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were holes in the laminated body 50 in six out of ten bags 10.

Comparative Example F2

The seal strength was measured using the produced test piece 90 by heat-sealing the same laminated body 50 as in Example F8 at a ninth seal temperature lower than the above-described seventh seal temperature. In the test piece 90 that is not subjected to retort treatment, room-temperature seal strength and hot seal strength were 35 N and 5 N, respectively. In addition, in the test piece 90 that is subjected to the retort treatment, the room-temperature seal strength and the hot seal strength were 25 N and 5 N, respectively.

In addition, except that the seal temperature was set to be the above-described ninth seal temperature, the S-sized type 1 bag 10 was manufactured in the same manner as in Example F8. Thereafter, in the same manner as in Example F7, while measuring a pressure in a storage section 18 using a sensor 81, the water in the bag 10 was heated using a microwave oven having an output of 1,600 W, and a peeling off pressure was measured. As a result, the peeling off pressure was 115.4 kPa.

Further, except that the seal temperature was set to be the above-described ninth seal temperature, in the same manner as in Example F8, 100 g of contents containing a large amount of oil content was filled into the S-sized type 1 bag 10, and the upper portion 11 was heat-sealed to form the upper seal section 11a. Thereafter, the bag 10 storing the contents was heated for 40 seconds using the microwave oven having an output of 1,600 W, and it was confirmed whether the laminated body 50 constituting the bag 10 was damaged. As a result, it was confirmed that there were no holes in the laminated body 50 in all ten bags 10.

Example F12

An S-sized type 2 bag 10 was manufactured using the same laminated body 50 as in Example F1. Subsequently, in the same manner as in Example F1, 100 ml of water was filled into the bag 10, and an upper portion 11 was heat-sealed to form an upper seal section. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 124.2 kPa.

In addition, as in the evaluation of the peeling off pressure, the S-sized type 2 bag 10 was manufactured using the laminated body 50. Subsequently, 100 g of contents containing a large amount of oil content was filled into the bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

Example F13

An S-sized type 3 bag 10 was manufactured using the same laminated body 50 as in Example F1. Subsequently, in the same manner as in Example F1, 100 ml of water was filled into the bag 10, and an upper portion 11 was heat-sealed to form an upper seal section. Thereafter, in the same manner as in Example F1, while measuring a pressure in a storage section 18 using a sensor 81, the water in the bag 10 was heated using a microwave oven having an output of 500 W, and a peeling off pressure was measured. As a result, the peeling off pressure was 122.1 kPa.

In addition, as in the evaluation of the peeling off pressure, the S-sized type 3 bag 10 was manufactured using the laminated body 50. Subsequently, 100 g of contents containing a large amount of oil content was filled into the bag 10, and an upper portion 11 was heat-sealed to form an upper seal section 11a. Thereafter, the bag 10 storing the contents was heated for 2 minutes using the microwave oven having an output of 500 W, and it was confirmed whether the laminated body 50 constituting the bag 10 was damaged. As a result, it was confirmed that there were no holes in the laminated body 50 in all ten bags 10.

FIG. 25 collectively illustrates a layer configuration of a laminated body, measurement results of seal strength, measurement results of a peeling off pressure, evaluation results of heat resistance, and the like of Examples F1 to F13 and Comparative Examples F1 to F2. In FIG. 25, components of the laminated body are described in a column of the "layer configuration" in order from an outer surface side layer. In addition, in the column of the "heat resistance", a case where there are no holes formed in the laminated body 50 in all ten bags 10 was described as "great", a case where there are no holes in the laminated body 50 in five to nine out of ten bags 10 was described as "good", and a case where there are holes in the laminated body 50 in six out of ten bags 10 was described as "bad".

As can be seen from the comparison between Examples F1 to F13 and Comparative Example F1, by constituting the seal section so that the room-temperature seal strength after the retort treatment is 60 N or less, the hot seal strength of the seal section that is subjected to the retort treatment can be 23 N or less, and furthermore, the peeling off pressure could be set to be 133 kPa or lower. In addition, by constituting the seal section so that the room-temperature seal strength after the retort treatment is 55 N or less, the hot seal strength of the seal section that is subjected to the retort treatment can be 15 N or less, and furthermore, the peeling off pressure could be set to be 130 kPa or lower. In addition, by constituting the seal section so that the room-temperature seal strength after the retort treatment is 50 N or less, the hot seal strength of the seal section that is subjected to the retort treatment can be 11 N or less, and furthermore, the peeling off pressure could be set to be 126 kPa or lower. In this way, by setting the formation conditions of the seal section or the layer configuration of the laminated body 50 so that the room-temperature seal strength after the retort treatment becomes a predetermined value or less, the bag 10 having the hot seal strength of the predetermined value or less after the retort treatment could be manufactured. As a result, it was possible to suppress the formation of holes in the laminated body 50 of the bag 10 during the heating.

Fourth Embodiment

Next, a fourth embodiment of the present invention will be described. The fourth embodiment relates to a standing type pouch (bag) capable of storing contents such as retort food and frozen food. The pouch is configured to be self-standing in a microwave oven, and includes a steam-releasing mechanism that automatically releases steam generated by heating in the microwave oven to an outside of the pouch as in the case of each embodiment described above.

Next, a problem to be solved by the fourth embodiment will be described.

In recent years, microwave ovens having various sizes have been sold, and a height of an inside of the microwave oven varies depending on the microwave oven. Therefore, a height of the pouch may be higher than the height of the inside of the microwave oven. However, when the height of the pouch is higher than the height of the inside of the microwave oven, since an upper portion of the pouch is in contact with a ceiling of the inside of the microwave oven, when a turntable of the microwave oven rotates, the upper portion of the pouch may be caught on the ceiling, and the pouch may overturn. Also, when the pouch overturns, contents may be spilled from the steam port of the steam-releasing mechanism.

The fourth embodiment has been made to solve the above problem. That is, an object of the fourth embodiment is to provide a pouch that can normally release steam from a steam-releasing mechanism and that is unlikely to overturn during the heating.

Next, means for solving the problem will be described.

According to one aspect of the fourth embodiment, a self-standing pouch includes a front surface film, a back surface film opposite to the front surface film, and a lower film disposed between the front surface film and the back surface film, has a storage space storing contents, and includes a steam-releasing mechanism automatically releasing steam in the storage space during heating, in which when a height of the pouch is 149 mm or less, a height of the pouch is set to be S1, a width of the pouch is set to be S2, and S2/S1 is 1.11 or less.

The pouch according to the fourth embodiment further includes a first side seal section that seals between a first side portion of the front surface film and a first side portion of the back surface film that is opposite to the first side of the front surface film, and a second side seal section that seals between a second side portion on an opposite side to the first side portions of the front surface film and a second side portion of the back surface film opposite to the second side portion of the front surface film, in which the steam-releasing mechanism includes a non-seal section isolated from the storage space and a protruding seal section (steam-releasing seal part) that isolates the non-seal section from the storage space and protrudes to the storage space from the first side seal section, and the protruding seal section is consecutively connected to the first side seal section.

The pouch according to the fourth embodiment further includes a lower seal section that seals between the lower portion of the front surface film and the lower film and between the lower portion of the back surface film and the lower film, in which the lower film includes a folding portion that is folded to the storage space side between the front surface film and the back surface film, and when a distance from a lower edge of the pouch to the folding portion of the lower film is set to be D11 and a minimum distance from a lower end of the pouch to an inner edge of the lower seal section is D12, D12/D11 may be 0.15 or more and 0.25 or less.

In the pouch according to the fourth embodiment, when the distance from the protruding seal section to the inner edge of the second side seal section is D13, D13/S2 may be 0.76 or more.

According to one aspect of the fourth embodiment, since the height S1 of the pouch is 149 mm or less and the ratio S2/S1 of the width S2 of the pouch to the height S1 of the pouch is 1.11 or less, it is possible to normally release the steam from the steam-releasing mechanism and provide the pouch that is unlikely to overturn during the heating.

Figure 26:
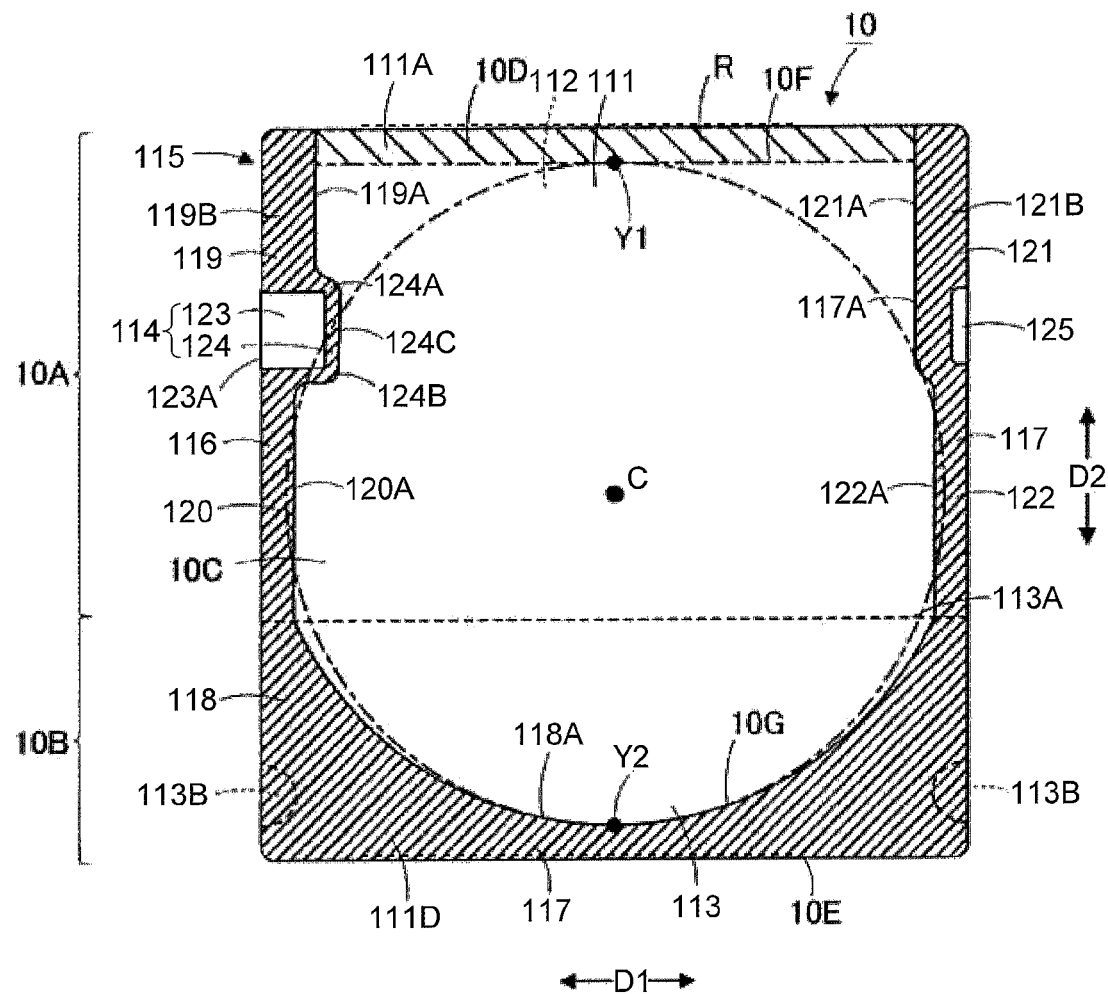
FIG. 26 is a front view of a pouch according to a fourth embodiment.
Figure 27:
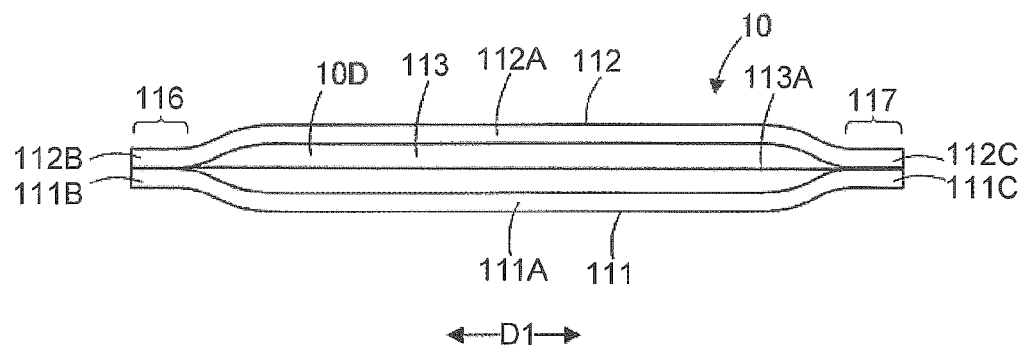
FIG. 27 is a top view of the pouch illustrated in FIG. 26.
Figure 28:
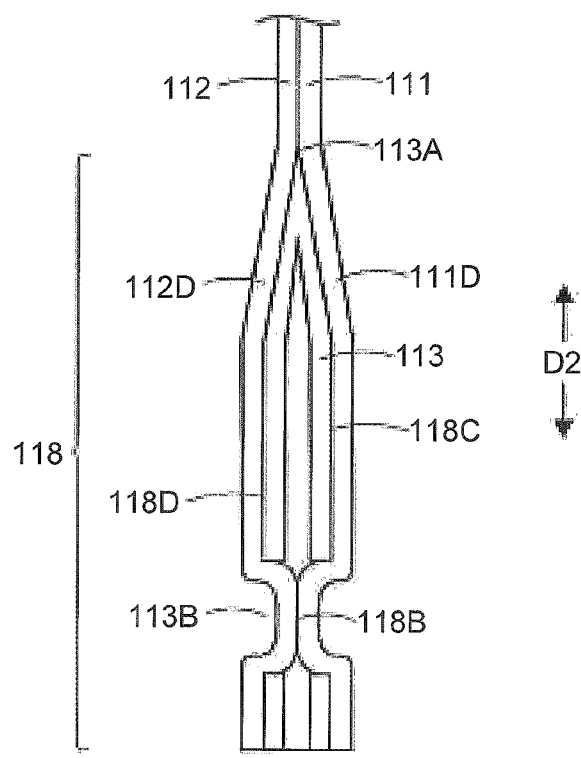
FIG. 28 is an enlarged side view of a part of the pouch illustrated in FIG. 26.
Figure 29:
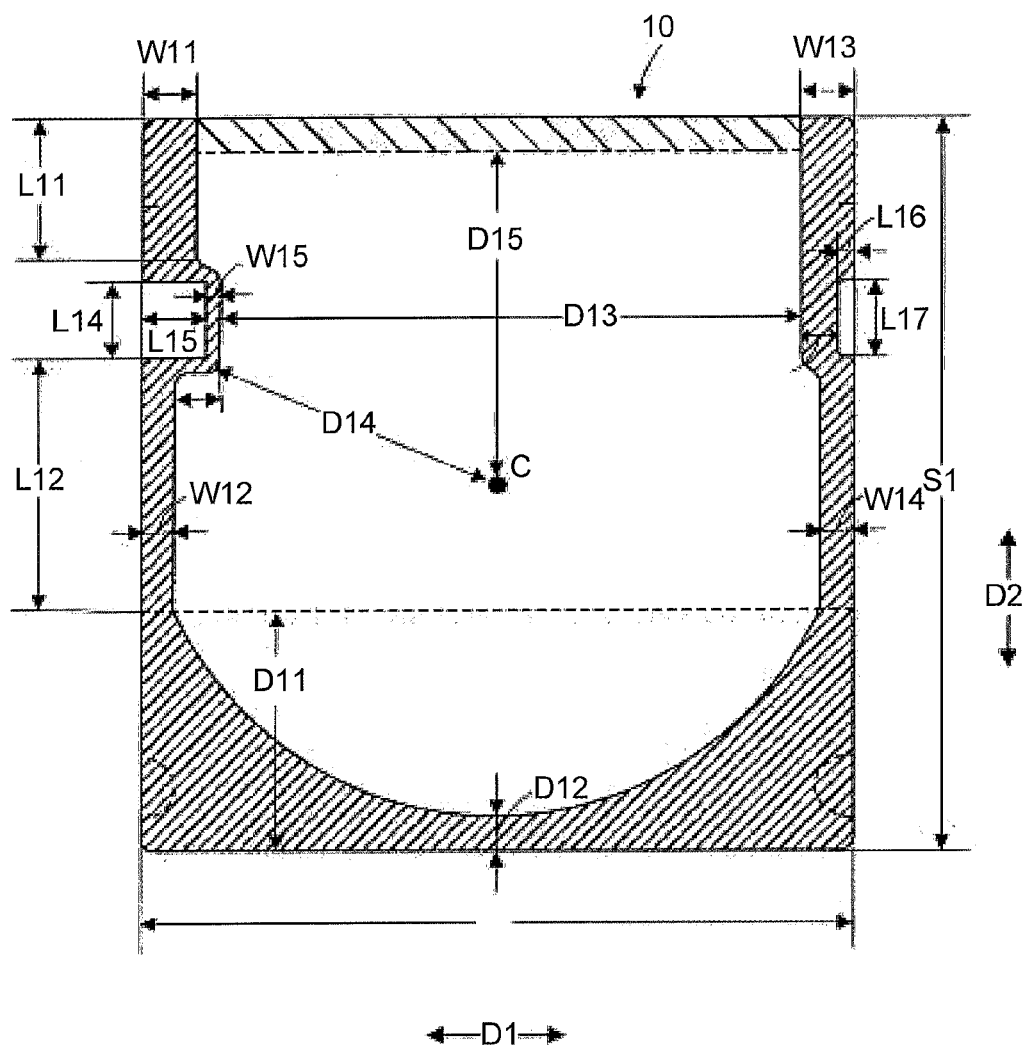
FIG. 29 is a plan view for explaining dimensions of each component of the pouch illustrated in FIG. 26.
Figure 30:
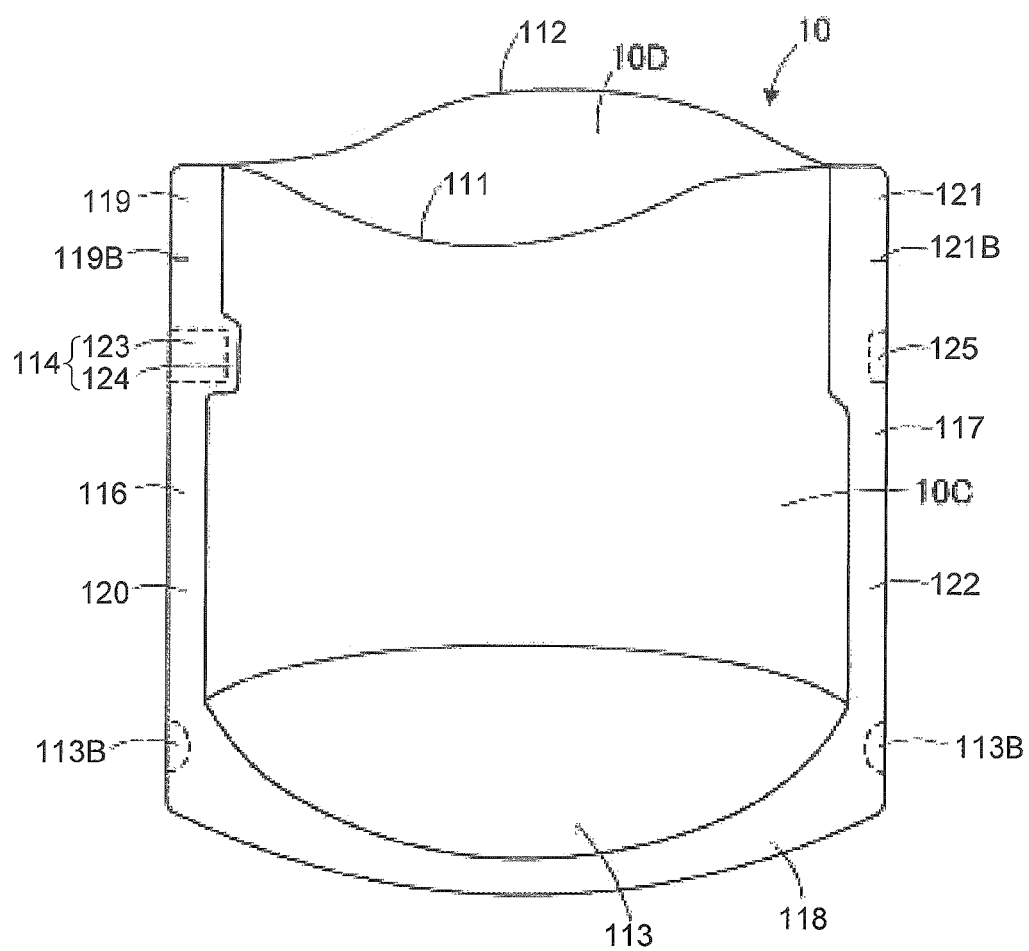
FIG. 30 is a perspective view of the pouch illustrated in FIG. 26 in an unfolded state.
Figure 31:
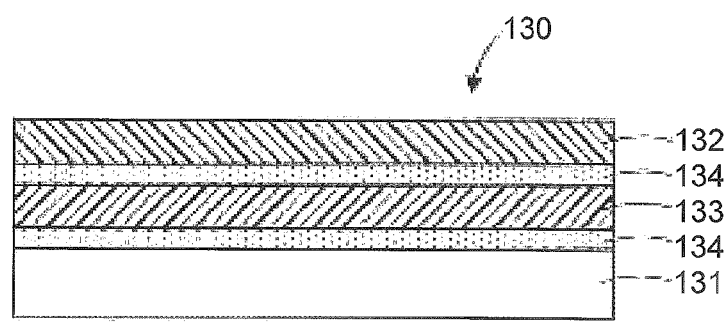
FIG. 31 is a cross-sectional view of a laminated film according to a fourth embodiment.
Figure 32:
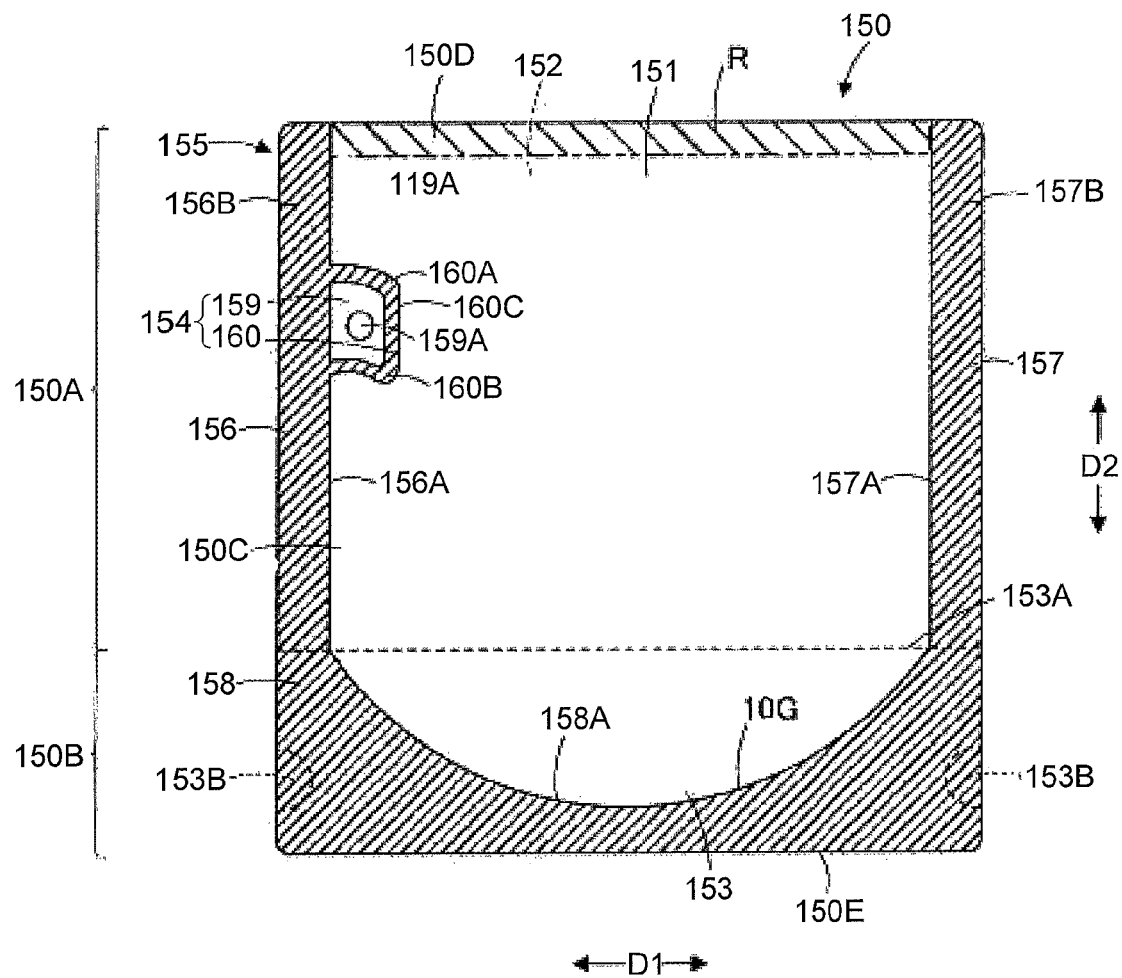
FIG. 32 is a front view of another pouch according to the fourth embodiment.
Figure 33:
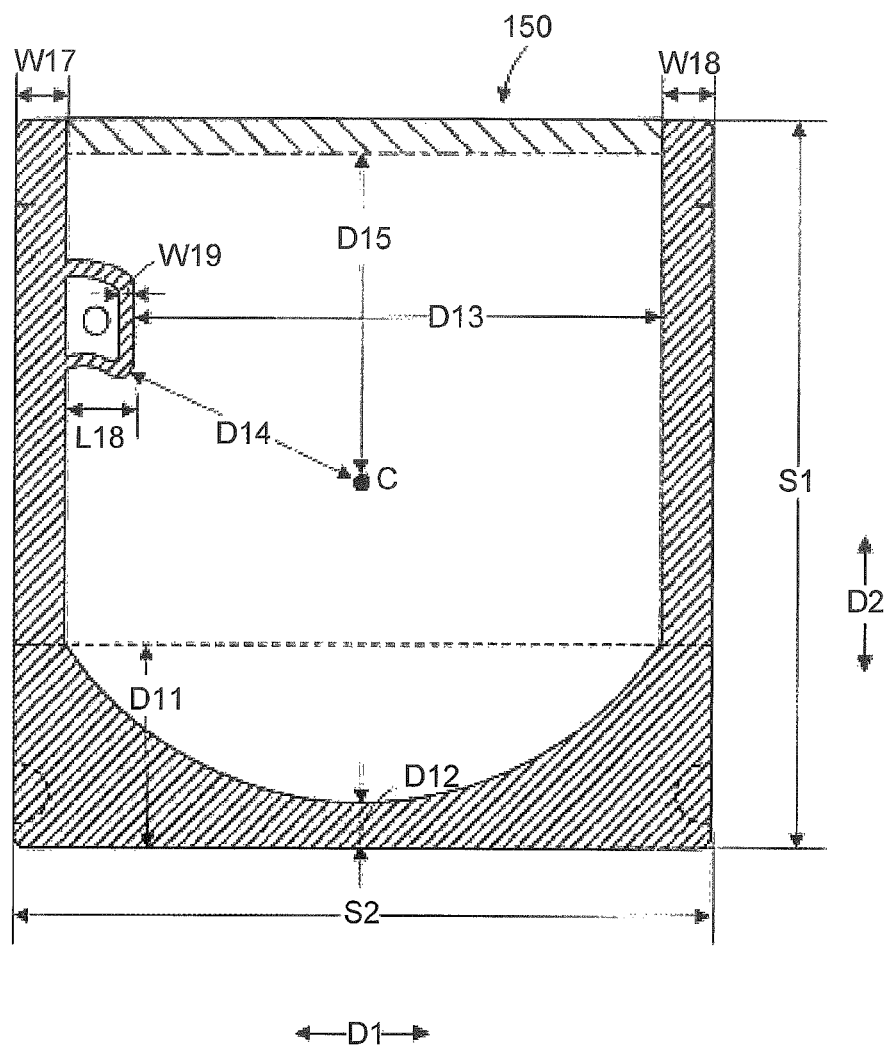
FIG. 33 is a plan view for explaining dimensions of each component of the pouch illustrated in FIG. 32.

Hereinafter, the fourth embodiment will be described in detail. FIG. 26 is a front view of the pouch according to the embodiment, FIG. 27 is a top view of the pouch illustrated in FIG. 26, and FIG. 28 is an enlarged side view of a portion of the pouch illustrated in FIG. 26. FIG. 29 is a plan view for explaining dimensions of each component of the pouch illustrated in FIG. 26, FIG. 30 is a perspective view of the pouch illustrated in FIG. 26 which is in an unfolded state, and FIG. 31 is a cross-sectional view of a laminated film. FIG. 32 is a front view of another pouch according to the embodiment, and FIG. 33 is a plan view for explaining dimensions of each component of the pouch illustrated in FIG. 32.

<<<Pouch>>>

The pouch (bag) 10 illustrated in FIG. 26 is a standing type pouch constituted by a body portion 10A and a bottom portion 10B, and has a storage space 10C that stores contents. The contents include, but are not particularly limited to, solids, liquids, and mixtures thereof. Specific contents include retort foods, frozen foods, and the like.

As illustrated in FIGS. 26 and 27, the pouch 10 has the bottom portion 10B folded in a gusset type. By employing the gusset type, an area of the bottom portion 10B becomes large when the contents are stored, and the pouch can be self-standing. Note that when the bottom portion 10B of the pouch 10 in FIG. 26 extends, the pouch 10 is in a state illustrated in FIG. 30.

The pouch 10 is constituted by the body portion 10A and the bottom portion 10B. The pouch 10 includes a front surface film 111, a back surface film 112 opposite to the front surface film 111, a lower film 113 that is disposed between the front surface film 111 and the back surface film 112, and a steam-releasing mechanism 114 that automatically releases steam in the storage space 10C during the heating. In the pouch 10, peripheral portions of the front surface film 111, the back surface film 112, and the lower film 113 are heat-sealed, and a peripheral seal section 115 is formed.

As illustrated in FIG. 27, the pouch 10 has an opening 10D formed by an upper portion 111A of the front surface film 111 and an upper portion 112A of the back surface film 112. The opening 10D functions as a filling port for filling contents. After the contents are filled into the pouch 10, the storage space 10C can be sealed by heat-sealing the upper portion 111A of the front surface film 111 and the upper portion 112A of the back surface film 112.

The height S1 (see FIG. 29) of the pouch 10 is 149 mm or less. Since a microwave oven whose inside has the lowest height among microwave ovens currently on the market has an inside height of 150 mm, even in the microwave oven having the lowest inside height which is currently on the market, the upper portion of the pouch 10 can be suppressed from being in contact with the ceiling of the inside of the microwave oven. The height of the pouch is a length from a lower end to an upper end of the pouch in a vertical direction (second direction) D2, and when the height of the pouch is not constant, the height of the pouch is the largest value of the length from the lower end to the upper end of the pouch in the vertical direction D2. In addition, the lower limit of the height S1 of the pouch 10 is preferably 145 mm or more, and the upper limit of the height S1 of the pouch 10 may be 147 mm or less. The dimensions of the pouch and the dimensions of each component constituting the pouch in this specification are all values measured in a state in which the lower films folded into two are in contact with each other, that is, in a state in which the pouch is not unfolded and is substantially flat.

The width S2 (see FIG. 29) of the pouch 10 is preferably 165 mm or less from the viewpoint of the easy steam-releasing. The width of the pouch is a length between both ends of the pouch in a horizontal direction (first direction) D1, and when the width of the pouch is not constant, the width of the pouch is the largest value of the lengths between both ends of the pouch in the horizontal direction. The lower limit of the width S2 of the pouch 10 is preferably 130 mm or more, and the upper limit of the width S2 of the pouch 10 may be 160 mm or less.

The S2/S1, which is the ratio of the width S2 of the pouch 10 to the height S1 of the pouch 10, is 1.11 or less. If this ratio is 1.11 or less, the steam can normally be released from the steam-releasing mechanism 114 during the heating. The lower limit of the S2/S1 is preferably 0.87 or more, and furthermore, the upper limit of S2/S1 is preferably 1.10 or less.

<<Front Surface Film, Back Surface Film, and Lower Film>>

The front surface film 111 and the back surface film 112 are quadrangular films, and each have substantially the same size. The lower film 113 is also a quadrangular film, but the lower film 113 includes a folding portion 113A folded toward the storage space 10C between the front surface film 111 and the back surface film 112. The folding portion 113A is formed by folding the lower film 113 into two. By forming such a folding portion 113A, the area of the bottom portion 10B can increase, and a volume of the storage space 10C can increase. The folding portion 113A is formed along the horizontal direction D1.

The lower film 113 has a semicircular cutout 13B near the lower end on both edges in the horizontal direction D1. Since the lower film 113 is folded into two, the cutout 13B is provided so that the overlapping portion of the lower film 113 penetrates. By providing such a cutout 13B, the front surface film 111 and the back surface film 112 can be directly heat-sealed in the lower seal section 118 as described later. In FIG. 26, the shape of the cutout 13B is a semicircle, but the shape thereof is not limited. For example, the cutout 13B may be a polygon such as a triangle or a quadrangle.

The front surface film 111, the back surface film 112, and the lower film are each constituted by a laminated body 130 illustrated in FIG. 31.

<Laminated Body>

As illustrated in FIG. 31, the laminated body 130 includes a base layer 131, and a sealant layer 132 that has sealing property and provided closer to the storage space 10C than the base layer 131. The laminated body 130 illustrated in FIG. 31 further includes, an intermediate layer 133 between the base layer 131 and the sealant layer 132 to impart various functions required for the pouch for the microwave oven, and a joint layer 134 interposed between the base layer 131 and the intermediate layer 133 and between the intermediate layer 133 and the sealant layer 132. Note that the laminated body may include the base layer, the joint layer, and the sealant layer in this order. In addition, as the laminated body 130, the laminated body 50 described in the first embodiment, the second embodiment, or the third embodiment described above may be used.

(Base Layer)

Since the pouch 10 for the microwave oven is heated, the base layer 131 is preferably made of a material having heat resistance. As the base layer 131, for example, a stretched polyethylene terephthalate film, a silica-deposited stretched polyethylene terephthalate film, an alumina-deposited stretched polyethylene terephthalate film, a stretched nylon film, a stretched polypropylene film, or a polypropylene/ethylene-vinyl alcohol copolymer co-pressed co-stretched film, or a composite film obtained by laminating two or more of these films can be used. Further, the base layer 131 may include the first plastic film 62 described in the first embodiment, the second embodiment, or the third embodiment described above, and may include the second plastic film 66, and may include the first plastic film 62 and the second plastic film 66.

The base layer 131 is preferably subjected to biaxial stretching processing. Thereby, molecules constituting the base layer 131 are arranged in a stretching direction by the stretching processing, and the base layer 131 exhibits excellent dimensional stability. Further, the base layer 131 can be easily opened by the biaxial stretching processing.

A thickness of the base layer 131 can be, for example, 10 μm or more and 50 μm or less. If the thickness of the base layer 131 is 10 μm or more, the heat resistance required for the pouch 10 can be satisfied, and if the thickness of the base layer 131 is 50 μm or less, product costs can be reduced. The thickness of the base layer 131 is obtained by randomly measuring the thicknesses of ten locations from a cross-sectional photograph of the base layer taken using an optical microscope, and calculating an arithmetic average value of the measured thickness. Note that in the front surface film 111, the back surface film 112, and the lower film 113, the base layer 131 is arranged so as to be the outermost.

(Sealant Layer)

The sealant layer 132 is provided so that two sheets of laminated bodies 130 overlap with each other and the vicinity of the opposing peripheral portions is heat-sealed to bond and seal the peripheral portions. For this reason, in the front surface film 111, the back surface film 112, and the lower film 113, the sealant layer is disposed closest to the storage space 10C, and the sealant layers 132 are arranged so as to be in contact with each other. By applying heat and pressure in the state in which the front surface film 111 and the like are arranged in this manner, the sealant layers 132 can be heat-sealed together, so a peripheral seal section 115 can be formed.

As the sealant layer 132, a heat-resistant film made of a polyolefin-based resin such as polyethylene, polypropylene, an ethylene-vinyl acetate copolymer, and an ethylene-propylene block copolymer, an easy peel film, and the like can be used. The sealant layer 132 may have a single-layer structure or a multilayer structure. In addition, the sealant layer 132 may include the sealant film 70 described in the first embodiment, the second embodiment, or the third embodiment described above.

When the pouch 10 requiring heat resistance such as the pouch for the microwave oven is used, the sealant layer 132 is preferably a non-stretched (cast) polypropylene layer (CPP layer) mainly containing non-stretched (cast) polypropylene (CPP), or a linear low density polyethylene layer (LLDPE layer) mainly containing linear low density polyethylene (LLDPE).

A thickness of the sealant layer 132 is preferably 40 μm or more 200 μm or less. If the thickness of the sealant layer 132 is 40 μm or more, then impact resistance strength against falling that can occur during the distribution process of the pouch 10 is excellent, and if the thickness of the sealant layer 132 is 200 μm or less, the contents are easily filled and handleability such as easy refilling of the contents is excellent. The thickness of the sealant layer 132 can be measured by the same method as the thickness of the base layer 131.

(Intermediate Layer)

The intermediate layer 133 is a layer for supplementing various functions required for the pouch for the microwave oven. For example, when the pouch 10 stores food as contents, the intermediate layer 133 has vapor barrier property for preventing permeation of water vapor and gas barrier property for preventing permeation of gases such as oxygen gas so that the contents can be preserved while preventing degeneration such as oxidation of the contents. In addition, since the standing type pouch 10 is displayed in a state in which the pouch 10 is self-standing on a merchandise shelf at a sales floor, the intermediate layer 133 may have bending resistance and impact resistance so that the pouch 10 can sufficiently withstand the impact and the like when the pouch 10 falls from the merchandise shelf. Further, the intermediate layer 133 may have a function of sufficiently increasing concealment so that the contents of the pouch 10 are not visible in order to increase consumer's buying intention.

As the intermediate layer 133, for example, a film made of polyethylene terephthalate, polyamide, polyethylene, polyolefin such as polypropylene, polyvinyl chloride, polycarbonate, polyvinyl alcohol, an ethylene-propylene copolymer, a saponified ethylene-vinyl acetate copolymer, and the like, a film coated with polyvinylidene chloride, a film on which inorganic substances such as silicon oxide or aluminum oxide are deposited, a film made of polyvinylidene chloride, or the like can be used. In addition, one or more of these base layers may be used in combination.

(Joint Layer)

As the joint layer 134, for example, an adhesive generally used in a dry lamination method known per se can be used, and for example, a polyvinyl acetate adhesive, a polyacrylate ester-based adhesive, a cyanoacrylate-based adhesive, an ethylene copolymer-based adhesive, a cellulose-based adhesive, a polyester-based adhesive, a polyamide-based adhesive, an amino resin-based adhesive, an epoxy-based adhesive, a polyurethane-based adhesive, or the like can be used. The polyurethane-based adhesive is a cured product of a polyol compound and an isocyanate compound.

<<Peripheral Seal Section>>

The peripheral seal section is a portion sealed along the outer peripheral portion of the front surface film and the back surface film, but when the peripheral seal section is sealed enough to store contents in the storage space, a portion where the peripheral seal section is not formed may exist in a part of the outer peripheral portion of the front surface film and the back surface film. The peripheral seal section 115 illustrated in FIG. 26 is formed along the outer peripheral portion other than the upper portion 111A of the front surface film 111 and the upper portion 112A of the back surface film 112. The peripheral seal section 115 includes a first side seal section 116 and a second side seal section 117 positioned in the side portions of the body portion 10A of the pouch 10, and a lower seal section 118 positioned in the bottom portion 10B of the pouch 10, as illustrated in FIG. 26. Note that in FIG. 26, the upper portion of the pouch 10 is opened, but the contents are filled into the storage space 10C and then heat-sealed, the upper seal section is formed in an upper seal section forming region R surrounded by a two-dot chain line in FIG. 26, and the pouch 10 is sealed. In the state in which the pouch is sealed, the peripheral seal section includes a first side seal section, a second side seal section, a lower seal section, and an upper seal section.

<First Side Seal Section>

The first side seal section 116 seals between a first side portion 111B of the front surface film 111 and a first side portion 112B of the back surface film 112 opposite to the first side portion 111B of the front surface film 111, as illustrated in FIG. 27. The first side seal section 116 is formed by heat-sealing the first side portion 111B of the front surface film 111 and the first side portion 112B of the back surface film 112.

The first side seal section 116 has an upper side seal section 119 positioned above a first non-seal section 123 described later, and a lower side seal section 120 positioned below the first non-seal section 123. The upper side seal section 119 extends along the vertical direction D2 and is connected to the upper seal section. On the other hand, the lower side seal section 120 extends along the vertical direction D2 and is connected to the lower seal section 118.

An inner edge 119A of the upper side seal section 119 is positioned closer to the storage space 10C than an inner edge 120A of the lower side seal section 120. That is, a width W11 (see FIG. 29) of the upper side seal section 119 is larger than a width W12 (see FIG. 29) of the lower side seal section 120. By making the width W11 of the upper side seal section 119 larger than the width W12 of the lower side seal section 120, when the pouch 10 is heated, a portion where the upper side seal section 119 does not become hotter than the lower side seal section 120 can increase. For this reason, even if the upper side seal section 119 is picked out with a finger, since it is harder to feel the heat than the lower side seal section 120 picked out with a finger, the upper side seal section 119 is picked out with a finger, and the pouch 10 can be opened from a notch 119B described later provided in the upper side seal section 119. Thereby, the contents stored in the storage space 10C can be taken out while suppressing the feeling of excessive heat. In addition, since the width W12 of the lower side seal section 120 is smaller than the width W11 of the upper side seal section 119, the storage space 10C can be formed widely as compared with the case where the width W12 of the lower side seal section 120 is equal to the width W11 of the upper side seal section 119. In this specification, "width" in each seal section means a length in a direction orthogonal to a direction in which the seal section extends. Note that when the width of the seal section is not constant, the width of the seal section is set to be the largest value of the lengths in the direction orthogonal to the direction in which the seal section extends.

As an example, the width W11 of the upper side seal section 119 is set to be, for example, 8 mm or more and 15 mm or less, and the width W12 of the lower side seal section 120 is set to be, for example, 5 mm or more and 8 mm or less. If the width W11 of the upper side seal section is 8 mm or more, after finishing the heating by the microwave oven, the upper side seal section 119 can be picked out with a finger without feeling excessive heat, and furthermore, if the width W11 of the upper side seal section 119 is 15 mm or less, the storage space 10C storing contents can be formed widely by using the body portion 10A having a limited size. In addition, in the vertical direction D2, a length L11 (see FIG. 29) of the upper side seal section 119 is shorter than a length L12 (see FIG. 29) of the lower side seal section 120.

The upper side seal section 119 is formed with a notch 119B that can be a starting point for opening. By forming the notch 119B in the upper side seal section 119, the pouch 10 can be easily opened. The notch 119B illustrated in FIG. 26 penetrates through the front surface film 111 and the back surface film 112, but the notch may be a nick formed in the upper side seal section or a cutout having a predetermined width.

In addition, not only the notch but various easy opening means known per se can be provided. As another example of the easy opening means, there is an example in which a plurality of fine small holes are provided in the upper side seal section. By providing the plurality of fine small holes in the upper side seal section, easy opening property can be provided.

<Second Side Seal Section>

The second side seal section 117 seals between a second side portion 111C opposite to the first side portion 111B of the front surface film 111 and a second side portion 112C of the back surface film 112 opposite to the second side portion 111C of the front surface film 111, as illustrated in FIG. 27. Therefore, the first side seal section 116 and the second side seal section 117 are opposite to each other in the horizontal direction D1. The second side seal section 117 is formed by heat-sealing the second side portion 111C of the front surface film 111 and the second side portion 112C of the back surface film 112.

The second side seal section 117 has an upper side seal section 121 relatively positioned near the upper portion and a lower side seal section 122 relatively positioned near the bottom portion. The upper side seal section 121 extends along the vertical direction D2 and is connected to the upper seal section. On the other hand, the lower side seal section 122 extends along the vertical direction D2 and is connected to the lower seal section 118.

An inner edge 121A of the upper side seal section 121 is positioned closer to the storage space 10C than an inner edge 122A of the lower side seal section 122. That is, a width W13 (see FIG. 29) of the upper side seal section 121 is larger than a width W14 (see FIG. 29) of the lower side seal section 122. Therefore, a step is formed between an inner edge 121A of the upper side seal section 121 and an inner edge 122A of the lower side seal section 122. In the pouch 10 illustrated in FIG. 26, this step is positioned near a second non-seal section 125 described later.

As an example, the width W13 (see FIG. 29) of the upper side seal section 121 is set to be, for example, 8 mm or more and 15 mm or less, and the width W14 (see FIG. 29) of the lower side seal section 122 is set to be, for example, 5 mm or more and 8 mm or less.

A notch 121B is also formed in the upper side seal section 121. By forming the notch 121B in the upper side seal section 121, the pouch 10 can be easily opened. The notch 121B illustrated in FIG. 26 penetrates through the front surface film 111 and the back surface film 112, but the notch may be a nick formed in the upper side seal section or a cutout having a predetermined width.

<Lower Seal Section>

The lower seal section 118 seals between a lower portion 111D of the front surface film 111 and the lower film 113 and between a lower portion 112D of the back surface film 112 and the lower film 113, as illustrated in FIG. 28. The lower seal section 118 is formed by heat-sealing the lower portion 111D of the front surface film 111 and the lower film 113 and heat-sealing the lower portion 112D of the back surface film 112 and the lower film 113.

The ratio D12/D11 of the minimum distance D12 (see FIG. 29) from a lower edge 10E of the pouch 10 to an inner edge 118A of the lower seal section 118 to the distance D11 (see FIG. 29) from the lower edge 10E of the pouch 10 to the folding portion 113A of the lower film 113 is preferably 0.15 or more and 0.25 or less. If the height of the pouch is low, since the storage space is narrow, it is considered to make the folding portion of the lower film deeper in order to increase the storage space. However, if the folding portion is too deep, when the pouch is heated with the microwave oven, a material forming the lower film is softened, so that a bottom surface of the pouch comes into contact with a turntable due to a weight of the contents, and when steam is released from the pouch, the pouch may rotate. If the D12/D11 is 0.15 or more, the lower film 113 can be suppressed from being in contact with the turntable of the microwave oven during the heating, and furthermore, if D12/D11 is 0.25 or less, the storage space having a desired volume can be obtained. The lower limit of D12/D11 is more preferably 0.20 or more, and the upper limit of D12/D11 is more preferably 0.24 or less.

The lower seal section 118 includes an auxiliary seal section 118B formed near the lower ends of both edges in the horizontal direction D1 by directly heat-sealing the front surface film 111 and the back surface film 112, as illustrated in FIG. 28. The auxiliary seal section 118B is formed by heat-sealing the front surface film 111 and the back surface film 112 in the cutout 13B of the lower film 113. In the lower film 113, since the base layer 131 is folded into two so that the base layer 131 is an inner side, the lower seal section 118 includes a front surface portion 118C including the front surface film 111 and the lower film 113 and a back surface portion 118D including the back surface film 112 and the lower film 113 as illustrated in FIG. 28. Here, from the viewpoint of increasing the folding portion when the storage space is filled with contents, it is necessary that the front surface portion and the back surface portion are separated in a center portion of the bottom portion, but if the front surface portion and the back surface portion are completely separated, when the storage space is filled with contents, the front surface portion and the back surface portion do not withstand the weight of the contents and therefore the front surface portion and the back surface portion are opened, so that the pouch may be difficult to be self-standing. In addition, since the base layers cannot be heat-sealed together, the front surface portion and the back surface portion where the base layers are opposite to each other cannot be heat-sealed as they are. For this reason, by forming the auxiliary seal section 118B near the lower end of both edges in the horizontal direction D1, only the both ends of the front surface portion 118C and the back surface portion 118D are joined. Therefore, when filling the contents, the pouch 10 can be stably self-standing without inhibiting the lower film 113 from extending.

<<Steam-Releasing Mechanism>>

The steam-releasing mechanism 114 is provided to release the steam in the pouch 10 to the outside when the pressure in the pouch 10 increases due to steam generated by heating in the microwave oven. The steam-releasing mechanism 114 illustrated in FIG. 26 includes the first non-seal section 123 that is isolated from the storage space 10C and is not sealed, and the protruding seal section 124 that isolates the first non-seal section 123 from the storage space 10C and protrudes from the first side seal section 116 toward the storage space 10C.

<First Non-Seal Section>

The first non-seal section 123 has an opening 123A serving as a steam port reaching the side edges of the front surface film 111 and the back surface film 112, and communicates with the outside via the opening 123A.

<Protruding Seal Section>

The protruding seal section 124 is consecutively connected to the first side seal section 116. The protruding seal section 124 illustrated in FIG. 26 has one end connected to the upper side seal section 119 and the other end connected to the lower side seal section 120. Thereby, the first non-seal section 123 is isolated from the storage space 10C.

The protruding seal section 124 peels off when the pressure in the pouch 10 reaches a predetermined pressure due to the heating, and as a result, the storage space 10C communicates with the first non-seal section 123, and the steam in the storage space 10C is automatically discharged to the outside of the pouch 10 via the first non-seal section 123. In addition, since the protruding seal section 124 protrudes from the first side seal section 116 toward the storage space 10C, when the pressure in the pouch 10 increases due to heating by the microwave oven, stress tends to concentrate on the protruding seal section 124. In addition, since the peeling off from the protruding seal section 124 easily progresses, the progress of the peeling off from the peripheral seal section 115 or the upper seal section can be suppressed.

The D13/S2, which is the ratio of the distance D13 (see FIG. 29) from the protruding seal section 124 to the inner edge 117A of the second side seal section 117 to the width S2 of the pouch 10, is preferably 0.76 or more. The distance D13 is the shortest distance from the protruding seal section to the inner edge of the second side seal section. Since the protruding seal section protrudes from the first side seal section, if the protruding seal section is provided, the filling port becomes narrow, and as a result, it may be difficult to fill the contents. However, if the D13/S2 is 0.76 or more, even when the protruding seal section 124 is provided, the filling port can be kept wide, so the contents can be easily filled when being filled. The lower limit of D13/S2 is more preferably 0.80 or more.

Since the protruding seal section 124 has an upper corner 124A on the opening 10D side and has a lower corner 124B on the lower seal section 118 side, the protruding seal section 124 forms a step with the upper side seal section 119 and forms a step with the lower side seal section 120. Therefore, an inner edge 124C of the most protruding portion of the protruding seal section 124 in the horizontal direction D1 is positioned closer to the storage space 10C than the inner edge 119A of the upper side seal section 119 or the inner edge 120A of the lower side seal section 120. By forming such a step, the pressure tends to concentrate on the protruding seal section 124. For this reason, since the area where the protruding seal section 124 can peel off and the steam can be released without increasing the pressure in the pouch 10, the safety is excellent.

A length L13 (see FIG. 29) of the step between the protruding seal section 124 and the lower side seal section 120 is set to be, for example, 3 mm or more and 15 mm or less, and preferably 7 mm or more and 12 mm or less. More specifically, the distance in the horizontal direction D1 between the inner edge 124C of the most protruding portion of the protruding seal section 124 and the inner edge 120A of the lower side seal section 120 is 3 mm or more and 15 mm or less. By setting the step to be 3 mm or more and 15 mm or less, when the pressure in the pouch 10 increases, the stress tends to concentrate on the protruding seal section 124, so the progress of the peeling off from the peripheral seal section 115 and the upper seal section can be suppressed.

A width W15 (see FIG. 29) of the protruding seal section 124 is smaller than the width W11 (see FIG. 29) of the upper side seal section 119 and the width W12 (see FIG. 29) of the lower side seal section 120. By making the width W15 of the protruding seal section 124 smaller than the width W12 of the lower side seal section 120, the protruding seal section 124 can more easily peel off than the lower side seal section 120. In addition, the width W15 of the protruding seal section 124 is smaller than the width W16 of the portion of the second side seal section 117 positioned between the second non-seal section 125 and the storage space 10C described later. As an example, the width W15 of the protruding seal section 124 is set to be, for example, 2.5 mm or more and 5 mm or less. In addition, in the vertical direction D2, a length L14 (see FIG. 29) of the first non-seal section 123 is shorter than the length L11 of the upper side seal section 119 and the length L12 of the lower side seal section 120.

The storage space 10C that expands with heating can be considered to expand from a center point C positioned near the center of the pouch 10. Accordingly, each position of the peripheral seal section 115 and the protruding seal section 124 is strongly subjected to a load in the direction from the center point C toward each position due to the heating. That is, the pressure applied to the peripheral seal section 115 or the protruding seal section 124 due to the heating strongly depends on the positional relationship with the center point C. Specifically, the closer to the center point C, the higher the pressure. Therefore, in the pouch 10 having a low height as in the present embodiment, the position of the upper seal section from the center point C is close, and therefore, in order to progress the peeling off from the protruding seal section 124, the distance H2 (see FIG. 29) from the center point C positioned at the center of the pouch 10 to the protruding seal section 124 is preferably shorter than the distance H1 (see FIG. 29) from the center point C to the upper seal section forming region R. The center point C is obtained as follows. First, as illustrated in FIG. 26, in plan view of the pouch 10, a point as a center of an upper edge 10F (lower end of the upper seal section forming region R) of the storage space 10C is defined as an upper middle point Y1 and a point as a center of a lower edge 10G of the storage space 10C is defined as a lower middle point Y2 to draw a virtual circle C passing through the upper middle point Y1 and the lower middle point Y2 and set the center point of the virtual circle C as the center point C.

From the viewpoint of more reliably peeling off from the protruding seal section 124, the heat seal strength at the protruding seal section 124 is preferably 50 N/15 mm or less at 100° C. When the heat seal strength is within this range, the possibility that the pouch 10 may be broken when the pressure in the pouch 10 increases due to the heating by the microwave oven can be reduced. The "heat seal strength" in the present specification means a value of the heat seal strength (N/15 mm) measured according to JIS Z0238:1998. Note that when it is not possible to have a width of 15 mm for a sample piece, a sample piece having a width smaller than 15 mm is extracted, and the heat seal strength of the extracted heat seal strength is measured, a value obtained by multiplying the obtained value by (15 mm/width mm of sample piece) is adopted as the value (N/15 mm) of heat seal strength. The heat seal strength of the protruding seal section is more preferably 35 N/15 mm or less at 100° C., and still more preferably 30 N/15 mm or less at 100° C.

Note that in the pouch 10, the second non-seal section 125 is formed in the second side seal section 117. The second non-seal section 125 can ensure that when the pouch 10 is manufactured, the opening 123A is formed by the first non-seal section 123 on the side edges of the front surface film 111 and the back surface film 112. That is, the second non-seal section 125 is provided to increase the manufacturing efficiency of the pouch 10. The second non-seal section 125 opens to the side edges of the front surface film 111 and the back surface film 112. Note that the second non-seal section 125 does not necessarily have to be provided.

A length L15 (see FIG. 29) of the first non-seal section 123 in the horizontal direction D1 is longer than a length L16 (see FIG. 29) of the second non-seal section in the horizontal direction D1. On the other hand, the length L14 (see FIG. 29) of the first non-seal section in the vertical direction D2 is equal to a length L17 (see FIG. 29) of the second non-seal section 125 in the vertical direction D2. By making the length L14 and the length L17 the same, in the manufacturing process, when the adjacent pouches 10 are cut in a state in which the first non-seal section 123 of the adjacent one pouch 10 and the second non-seal section 125 of the other pouch 10 are connected, even if the cutting position between the adjacent pouches 10 is shifted due to processing accuracy, the desired shape of the first non-seal section 123 of one pouch 10 and the second non-seal section 125 of the other pouch 10 can be maintained. For this reason, the tolerance of the manufacturing error of the pouch 10 can increase, and as a result, it contributes to manufacturing the pouch 10 efficiently. As an example, the length L15 of the first non-seal section 123 in the horizontal direction D1 is set to be 3 mm or more and 15 mm or less, the length L16 of the second non-seal section 125 in the horizontal direction D1 is set to be, for example, 1 mm or more and 3 mm or less, and the length L14 of the first non-seal section in the vertical direction D2 and the length L17 of the second non-seal section 125 in the vertical direction D2 are set to be, for example, 4 mm or more and 15 mm or less.

<<Method for Manufacturing Pouch>>

Such a pouch 10 can be manufactured as follows. First, the front surface film 111, the back surface film 112, and the lower film 113 constituting the laminated body 130 are prepared. The lower film 113 is folded into two so that the base layer 131 is the inner side, and furthermore, when the pouch 10 is produced after being cut in the state in which the lower film 113 is folded into two, a location near the lower end of both edges of the lower film 113 in the horizontal direction D1 is punched out in a circular shape to form a through hole.

Then, the lower film 113 folded into two is disposed at a predetermined position between the front surface film 111 and the back surface film 112, and a region to be the peripheral seal section except for the upper seal section and the protruding seal section is heat-sealed. Note that in the through hole portion, since the lower film 113 folded into two does not exist, the front surface film 111 and the back surface film 112 are directly heat-sealed.

Then, a plurality of pouches 10 can be obtained by cutting the region heat-sealed according to the shapes of each pouch 10. When the contents are stored in the pouch 10, the contents are filled from the opening 10D formed between the front surface film 111 and the back surface film 112 of the pouch 10, and the upper portion 111A of the front surface film 111 and the upper portion 112A of the back surface film 112 are heat-sealed to form the upper seal section and seal the pouch 10.

In this manufacturing method, when the region to be the first non-seal section 123 that is not heat-sealed is formed to be equal to the dimension of the first non-seal section 123, if the cutting position between the adjacent pouches 10 due to processing accuracy is shifted, the opening 123A of the first non-seal section 123 may be closed by the heat-sealed region. In the fourth embodiment, the length of the region to be the first non-seal section 123 in the horizontal direction D1 is larger than the length of the first non-seal section 123 in the horizontal direction D1. For this reason, even if the cutting position between the adjacent pouches 10 is shifted due to the processing accuracy, it is possible to prevent the opening 123A of the first non-seal section 123 of the pouch 10 from being closed, and continuously manufacture the pouch 10.

<<<Other Pouches>>>

In the above-described pouch 10, the first non-seal section 123 is interposed between the upper side seal section 119 and the lower side seal section 120. However, As illustrated in FIG. 32, the first non-seal section of a pouch may be positioned closer to the storage space side than the first side seal section.

A bag 150 illustrated in FIG. 32 is a standing type pouch constituted by a body portion 150A and a bottom portion 150B, and has a storage space 150C that stores contents. The bag 150 is constituted by the body portion 150A and the bottom portion 150B, but specifically, similar to the above-described pouch 10, includes a front surface film 151, a back surface film 152 opposite to the front surface film 151, a lower film 153 that is disposed between the front surface film 151 and the back surface film 152, and a steam-releasing mechanism 154 that automatically releases steam in the storage space 150C during the heating. In the bag 150, peripheral portions of the front surface film 151, the back surface film 152, and the lower film 153 are heat-sealed, and a peripheral seal section 155 is formed.

The bag 150 has an opening 150D formed by the upper portion of the front surface film 151 and the upper portion of the back surface film 152. The opening 150D functions as a filling port for filling contents. After the contents are filled into the bag 150, the storage space 150C can be sealed by heat-sealing the upper portion of the front surface film 151 and the upper portion of the back surface film 152.

Also in the bag 150, a height S1 (see FIG. 33) of the bag 150 is 149 mm or less. If the height S1 of the bag 150 is 149 mm or less, the upper portion of the pouch 10 can be suppressed from being in contact with the ceiling of the inside of the microwave oven even if the inside height of the microwave oven currently on the market is the lowest. The lower limit of the height S1 of the bag 150 is preferably 145 mm or more, and the upper limit of the height S1 of the bag 150 may be 147 mm or less.

The width S2 (see FIG. 33) of the bag 150 is preferably 170 mm or less from the viewpoint of the easy steam-releasing. The lower limit of the width S2 of the bag 150 is preferably 130 mm or more, and the upper limit of the width S2 of the bag 150 may be 165 mm or less.

The S2/S1, which is the ratio of the width S2 of the pouch 10 to the height S1 of the bag 150, is 1.11 or less. If this ratio is 1.11 or less, the steam can normally be released from the steam-releasing mechanism 154 during the heating. The lower limit of the S2/S1 is preferably 0.87 or more, and furthermore, the upper limit of S2/S1 is preferably 1.10 or less.

<<Front Surface Film, Back Surface Film, and Lower Film>>

The front surface film 151, the back surface film 152, and the lower film 153 of the bag 150 are the same as the front surface film 111, the back surface film 112, and the lower film 113 of the pouch 10. Similar to the lower film 113, the lower film 153 has a folding portion 153A and a semicircular cutout 53B near the lower end on both edges in the horizontal direction D1.

<<Peripheral Seal Section>>

The peripheral seal section 155 extends circumferentially along the outer peripheral portion other than the upper portion of the front surface film 151 and other than the upper portion of the back surface film 152. The peripheral seal section 155 includes a first side seal section 156 that seals between a first side portion of the front surface film 151 and a first side portion of the back surface film 152 opposite to the first side portion of the front surface film 151, a second side seal section 157 that seals between a second side portion opposite to the first side portion of the front surface film 151 and a second side portion of the back surface film 152 opposite to the second side portion of the front surface film 151, and a lower seal section 158 that seals between the lower portion of the front surface film 151 and the lower film 153 and between the lower portion of the back surface film 152 and the lower film 153. Note that in FIG. 32, the upper portion of the bag 150 is opened, but the contents are filled into the storage space 150C and then heat-sealed, and the upper seal section is formed in the upper seal section forming region R surrounded by a two-dot chain line in FIG. 32.

<First Side Seal Section and Second Side Seal Section>

The first side seal section 156 and the second side seal section 157 are opposite to each other in the horizontal direction D1. The first side seal section 156 and the second side seal section 157 are not divided into the upper side seal sections 119 and 121 and the lower side seal sections 120 and 122 in contrast to the above-described pouch 10. The first side seal section 156 and the second side seal section 157 have a constant width and extend along the vertical direction D2 to be connected to the lower seal section 158. As an example, a width W17 (see FIG. 33) of the first side seal section 156 and a width W18 (see FIG. 33) of the second side seal section 157 are set to be, for example, 8 mm or more and 15 mm or less. Note that notches 156B and 157B, which can serve as a starting point for opening, are formed in the upper portions of the first side seal section 156 and the second side seal section 157, respectively.

<Lower Seal Section>

The lower seal section 158 is similar to the lower seal section 118 of the pouch 10. In addition, the ratio D12/D11 of the minimum distance D12 (see FIG. 33) from a lower edge 150E of the bag 150 to an inner edge 158A of the lower seal section 158 to the distance D11 (see FIG. 33) from the lower edge 150E of the bag 150 to the folding portion 153A of the lower film 153 is preferably 0.15 or more and 0.25 or less. If the D12/D11 is 0.15 or more, the lower film 153 can be suppressed from being in contact with the turntable of the microwave oven during the heating, and furthermore, if D12/D11 is 0.25 or less, the storage space having a desired volume can be obtained. The lower limit of D12/D11 is more preferably 0.20 or more, and the upper limit of D12/D11 is more preferably 0.24 or less.

<<Steam-Releasing Mechanism>>

Similar to the steam-releasing mechanism 114, the steam-releasing mechanism 154 illustrated in FIG. 32 includes a non-seal section 159 that is isolated from the storage space 150C and is not sealed, and a protruding seal section 160 that isolates the non-seal section 159 from the storage space 150C and protrudes from the first side seal section 156 toward the storage space 150C.

<Non-Seal Section>

The non-seal section 159 is positioned closer to the storage space 150C side than the first side seal section 156. In this respect, the non-seal section 159 differs from the first non-seal section 123. In addition, the non-seal section 159 has an opening 159A as a steam port penetrating through the front surface film 151 and the back surface film 152, and communicates with the outside via the opening 159A.

<Protruding Seal Section>

The protruding seal section 160 is consecutively connected to the first side seal section 156. The protruding seal section 160 illustrated in FIG. 32 has a substantially parallelogram shape in plan view of the bag 150, and both ends thereof are connected to the first side seal section 156. Similar to the protruding seal section 124, the protruding seal section 160 peels off when the pressure in the bag 150 reaches a predetermined pressure due to the heating, and as a result, the storage space 150C communicates with the non-seal section 159, and the steam in the storage space 150C is automatically discharged to the outside of the bag 150 via the non-seal section 159.

The protruding seal section 160 has a substantially parallelogram shape in plan view of the bag 150, but is not limited to the substantially parallelogram shape, and may be trapezoidal or triangular.

The D13/S2, which is the ratio of the distance D13 (see FIG. 33) from the protruding seal section 160 to an inner edge 157A of the second side seal section 157 to the width S2 of the bag 150, is preferably 0.76 or more. If the D13/S2 is 0.76 or more, even when the protruding seal section 160 is provided, the filling port is large, so that the contents can be easily filled when being filled. The lower limit of D13/S2 is more preferably 0.80 or more.

Since the protruding seal section 160 has an upper corner 160A on the opening 150D side and has a lower corner 160B on the lower seal section 158 side, the protruding seal section 160 forms a step with the first side seal section 156. Therefore, an inner edge 160C of the most protruding portion of the protruding seal section 160 in the horizontal direction D1 is positioned closer to the storage space 150C than the inner edge 156A of the first side seal section 156. By forming such a step, the pressure tends to concentrate on the protruding seal section 160. For this reason, since the area where the protruding seal section 160 can peel off and the steam can be released without increasing the pressure in the bag 150, the safety is excellent.

A length L18 (see FIG. 33) of the step between the protruding seal section 160 and the first side seal section 156 is set to be, for example, 3 mm or more and 15 mm or less, and preferably 7 mm or more and 12 mm or less. More specifically, the distance in the horizontal direction D1 between the inner edge 160C of the most protruding portion of the protruding seal section 160 and the inner edge 156A of the first side seal section 156 is 3 mm or more and 15 mm or less. By setting the step to be 3 mm or more and 15 mm or less, when the pressure in the bag 150 increases, the stress tends to concentrate on the protruding seal section 160, so the progress of the peeling off from the peripheral seal section 155 and the upper seal section can be suppressed.

The lower corner 160B of the protruding seal section 160 has a protruding end protruding toward the lower seal section 158. By making the lower corner 160B of the protruding seal section 160 the protruding end, when the pressure in the bag 150 increases due to the heating by the microwave oven, the stress tends to concentrate on the lower corner 160B.

A width W19 (see FIG. 33) of the protruding seal section 160 is smaller than the width W17 (see FIG. 33) of the first side seal section 156. By making the width W19 of the protruding seal section 160 smaller than the width W17 of the first side seal section 156, the protruding seal section 160 can be more easily peeled off than the first side seal section 156. As an example, the width W19 of the protruding seal section 160 is set to be, for example, 2.5 mm or more and 5 mm or less.

In the bag 150 having a low height, the position of the upper seal section from the center point C is close, and therefore, in order to progress the peeling off from the protruding seal section 160, the distance H2 (see FIG. 33) from the center point C positioned near the center of the bag 150 to the protruding seal section 160 is preferably shorter than the distance H1 (see FIG. 33) from the center point C to the upper seal section forming region R.

According to the present embodiment, in the pouch 10, since the height S1 of the pouch 10 is 149 mm or less, the upper portion of the pouch 10 can be suppressed from being in contact with the ceiling of the inside of the microwave oven even if the height of the inside of the microwave oven currently on the market is the lowest. Therefore, when the turntable rotates during the heating, the upper portion of the pouch 10 does not catch on the ceiling in the inside of the microwave oven, so the pouch 10 is unlikely to overturn. Also in the bag 150, for the same reason, the bag 150 is unlikely to overturn during the heating.

If the height of the pouch is low, since the storage space is narrow, it is considered to increase the width of the pouch in order to increase the storage space. However, if the width of the pouch is too wide relative to the height of the pouch, the upper seal section is opened earlier than the protruding seal section, and the steam-releasing mechanism may not work normally. This is because the internal pressure is concentrically applied from the center point of the pouch during the heating, but if the width of the pouch is too wide, the upper seal section is closer to the center point of the pouch than the steam-releasing mechanism. On the other hand, in the pouch 10 of the present embodiment, the ratio S2/S1 which is the width S2 of the pouch 10 to the height S1 of the pouch 10 is 1.11 or less, so the width S2 of the pouch 10 to the height S1 of the pouch 10 is designed to be in an appropriate range so that the steam-releasing from the steam-releasing mechanism 114 can be normally performed. Thereby, the steam can be normally released from the steam-releasing mechanism 114 during the heating. Also in the bag 150, for the same reason, the steam can be normally released from the steam-releasing mechanism 114 during the heating.

EXAMPLES

In order to describe the present embodiment in detail, examples will be described below, but the present embodiment is not limited to these descriptions.

Examples G1 to G4

In Examples G1 to G4, the standing type pouch illustrated in FIG. 26 was produced by changing the dimensions of the height S1 and the like of a pouch illustrated in FIG. 29, respectively. Specifically, first, a front surface film, a back surface film, and a lower film were prepared. The front surface film, the back surface film, and the lower film were one composed of a laminated film in which a base layer composed of a biaxially stretched polyethylene terephthalate film, a joint layer composed of a polyurethane-based adhesive, an intermediate layer composed of a biaxially stretched nylon film, a joint layer composed of a polyurethane-based adhesive, and a sealant layer composed of an unstretched polypropylene film are laminated in this order. The lower film is folded into two so that the base layer is an inner side, and furthermore, when the lower film is pouched after being cut in the state in which the lower film is folded into two, a location near a lower ends of both edge portions of a lower film in a horizontal direction when was punched out in a circular shape having a diameter of 10 mm to form a through hole.

Then, the front surface film is disposed on a front surface side of the lower film folded into two and the back surface film is disposed on a back surface side thereof so that a sealant layer of the front surface film is in contact with a sealant layer of the lower film, and a sealant layer of the back surface film is in contact with the sealant layer of the lower film, so a region to be a peripheral seal section and a protruding seal section was heat-sealed.

By cutting the heat-sealed region according to shapes of each pouch, a steam-releasing mechanism including a first non-seal section and the protruding seal section is provided, and a plurality of pouches having a structure similar to the pouch illustrated in FIG. 26 were produced. In each produced pouch, a peripheral seal section having widths W11 and W13 of 10 mm and widths W12 and W14 of 6 mm, a protruding seal section having a width W15 of 3 mm, a first non-seal section having a length L14 of 15 mm and a length L15 of 12 mm, and a second non-seal section having a length L16 of 3 mm and a length L17 of 15 mm were formed.

From an opening formed between the front surface film and the back surface film of the produced pouch, in Example G1, 200 g of water as contents was filled, and furthermore, in Example G2, 170 g of water was filled, and in Example G3, 130 g of water was filled to heat-seal an upper portion of the front surface film and an upper portion of the back surface film, so the pouch was closed. Thereby, the pouches according to Examples G1 to G4 were each produced. Dimensions of each component of the produced pouches according to Examples G1 to G4 were as illustrated in FIG. 29. Further, for each of the pouches according to Examples G1 to G4, values of a height S1, a width S2, and distances D11 to D13 illustrated in FIG. 29 were as shown in Table 1.

Example G5

In Example G5, a standing type pouch illustrated in FIG. 32 was produced. Specifically, first, a front surface film, a back surface film, and a lower film were prepared. The front surface film, the back surface film, and the lower film were one composed of a laminated film in which a base layer composed of a biaxially stretched polyethylene terephthalate film, a joint layer composed of a polyurethane-based adhesive, an intermediate layer composed of a biaxially stretched nylon film, a joint layer composed of a polyurethane-based adhesive, and a sealant layer composed of an unstretched polypropylene film are laminated in this order. The lower film is folded into two so that the base layer is an inner side, and furthermore, when the lower film is pouched after being cut in the state in which the lower film is folded into two, a location near a lower ends of both edge portions of a lower film in a horizontal direction when was punched out in a circular shape having a diameter of 10 mm to form a through hole.

Then, the front surface film is disposed on a front surface side of the lower film folded into two and the back surface film is disposed on a back surface side thereof so that a sealant layer of the front surface film is in contact with a sealant layer of the lower film, and a sealant layer of the back surface film is in contact with the sealant layer of the lower film, so a region to be a peripheral seal section and a protruding seal section was heat-sealed. Further, in a non-seal section inside a protruding seal section formed by heat sealing, an opening as a circular steam port having a diameter of 5 mm was formed so as to penetrate through a front surface film and a back surface film.

By cutting the heat-sealed region according to shapes of each pouch, a steam-releasing mechanism including a non-seal section and the protruding seal section is provided, and a plurality of pouches having a structure similar to the pouch illustrated in FIG. 32 were produced. In each of the produced pouches, a peripheral seal section having widths W17 and W18 of 10 mm, a protruding seal section having a width W19 of 3 mm, and a non-seal section having an opening inside the protruding seal section were formed.

The pouch was closed by filling 200 g of water as contents from the opening formed between the front surface film and the back surface film of the produced pouch, and heat sealing the upper portion of the front surface film and the upper portion of the back surface film. Thereby, the pouches according to Example G5 was produced. Dimensions of each component of the produced pouch according to Example G5 were as illustrated in FIG. 33. Further, for the pouch according to Example G5, values of a height S1, a width S2, and distances D11 to D13 illustrated in FIG. 33 were as shown in Table 1.

Comparative Examples G1 and G2

Pouches according to Comparative Examples G1 and G2 correspond to the form in which at least one of the dimensions of the height S1, the width S2, and the distances D11 to D13 for the pouches according to Examples G1 to G4 is changed. Therefore, the pouches according to Comparative Examples G1 and G2 were manufactured by the same manufacturing method as the pouches according to Examples G1 to G4 using the same material as the pouches according to Examples G1 to G4. For each of the pouches according to Comparative Examples G1 and G2, values of a height S1, a width S2, and distances D11 to D13 illustrated in FIG. 29 were as shown in Table 1.

<Evaluation Test>

Each pouch according to Examples G1 to G5 and Comparative Examples G1 and G2 was put in a microwave oven (model number "RE-S5C-W", manufactured by SHARP Co., Ltd.) having an inside height of 150 mm in a self-standing state, and heated for 2 minutes and 30 seconds at 600 W. In the pouch heated, it was evaluated whether or not the pouch overturns, whether or not the pouch rotates at the same time as steam was released, and whether or not the steam was automatically released from the steam-releasing mechanism, respectively. The evaluation criteria were as follows.

(Overturning and Rotation Evaluation)

great: The pouch did not overturn or rotate during heating.

good: The pouch did not overturn but rotated during heating.

bad: The pouch overturned during heating.

(Steam Releasing Evaluation)

good: Steam was normally released from the steam-releasing mechanism.

bad: Steam did not release from the steam-releasing mechanism.

Hereinafter, the evaluation results were shown in Table 1.

TABLE 1

| | Dimension (mm) | | | | | Ratio | | | Contents | Evaluation | |
|---|---|---|---|---|---|---|---|---|---|---|---|
| | H | W | D1 | D2 | D3 | W/H | D2/D1 | D3/W | | Overturning and Rotation | Steam Releasing |
| Example G1 | 147 | 160 | 46 | 10 | 135 | 1.09 | 0.22 | 0.84 | 200 g of water | great | good |
| Example G2 | 145 | 150 | 43 | 10 | 125 | 1.03 | 0.23 | 0.83 | 170 g of water | great | good |
| Example G3 | 145 | 140 | 40 | 9 | 115 | 0.97 | 0.23 | 0.82 | 130 g of water | great | good |
| Example G4 | 147 | 160 | 46 | 6 | 135 | 1.09 | 0.13 | 0.84 | 200 g of water | good | good |
| Example G5 | 147 | 160 | 46 | 10 | 125 | 1.09 | 0.22 | 0.78 | 200 g of water | great | good |
| Comparative Example G1 | 155 | 157 | 46 | 10 | 132 | 1.01 | 0.22 | 0.84 | 200 g of water | bad | — |
| Comparative Example G2 | 147 | 170 | 46 | 10 | 145 | 1.16 | 0.22 | 0.85 | 200 g of water | great | bad |

Hereinafter, the results will be described. As shown in Table 1, the pouch according to Comparative Example G1 overturned during the heating. It is considered that this is because the height of the pouch was larger than the height of the inside of the microwave oven, and therefore the turntable of the microwave oven rotated in the state in which the upper portion of the pouch was caught on the ceiling. Note that in the pouch according to Comparative Example G1, the fact that the steam releasing evaluation is "-" is that the pouch overturns before the steam was released. In addition, in the pouch according to Comparative Example G2, the pouch did not overturn during the heating, but steam was not released from the steam-releasing mechanism. It is considered that this is because the width of the pouch was too large relative to the height of the pouch, and therefore the protruding seal section was far from the center point of the pouch.

On the other hand, in the pouches according to Examples G1 to G5, the pouches did not overturn during the heating, and the steam was normally released from the steam-releasing mechanism. It is considered that this is because the height of the pouch was lower than the height of the inside of the microwave oven and the S2/S1, which is the ratio of the width of the pouch to the height of the pouch, was in an appropriate range.

The pouches according to Examples G1 to G3 and G5 did not rotate even if the steam was released during the heating. It is considered that this is because the D12/D11, which is the ratio of the minimum distance D12 from the lower edge of the pouch to the inner edge of lower seal section to the distance D11 from the lower edge of the pouch to the folding portion of the lower film, was in an appropriate range.

Fifth Embodiment

Next, a fifth embodiment of the present invention will be described. In the same manner as in each of the above-described embodiments, a pouch (bag) according to the fifth embodiment also includes a steam-releasing mechanism that automatically releases steam generated by heating in a microwave oven to an outside of the pouch.

First, a problem to be solved by the fifth embodiment will be described.

JP H10-101154 A discloses a steam-releasing mechanism that includes a swelling part that expands toward a storage section storing contents and a non-seal section that is isolated from the storage section by the swelling part and extends to reach a side edge of the pouch. In JP H10-101154 A, the swelling part and the non-seal section are positioned at a center in a vertical direction of the pouch. In this case, since a distance from a center point of the storage section of the pouch to the swelling part and the non-seal section is short, a pressure generated when the pouch is heated can be effectively applied to the swelling part. On the other hand, in the pouch disclosed in JP H10-101154 A, the swelling part is positioned at the center portion in the vertical direction of the pouch. Since contents cannot be stored at a position of the swelling part, the amount of contents is reduced in the pouch disclosed in JP H10-101154 A.

An object of the fifth embodiment provides a bag that can effectively solve such a problem.

Next, means for solving the problem will be described.

According to the fifth embodiment, there is provided a pouch in which a storage section for storing contents is defined between a front surface film and a back surface film, the pouch including: a first side seal section that is positioned at a first side portion of the pouch and joins an inner surface of the front surface film and an inner surface of the back surface film; a second side seal section that is positioned at a second side portion opposite to the first side portion of the pouch and defines the storage section between the first side seal section and the second side seal section; a lower seal section that is connected to the first side seal section and the second side seal section; and a first non-seal section that is positioned near an upper portion of the pouch, isolated from the storage section by the first side seal section, and extends to reach a first side edge of the first side portion of the pouch, in which the first side seal section includes an upper side seal part that extends along the first side portion from the first non-seal section toward the upper portion of the pouch, a lower side seal part that extends along the first side portion from the first non-seal section toward a lower portion of the pouch, and an intermediate seal part that has one end connected to the upper side seal part and the other end connected to the lower side seal part, and is positioned between the storage section and the first non-seal section, the intermediate seal part that at least includes a first portion and a second portion that are connected at a first connection part positioned near the lower side seal part and extends in different directions, the first portion extends to be displaced to a lower portion side of the pouch from the first connection part toward the first side edge of the pouch, the second portion extends from the first connection part toward the upper portion of the pouch, or extends to be displaced to the second side portion side from the first connection part toward the upper portion of the pouch, and the first non-seal section includes a first edge portion that extends along the first portion of the intermediate seal part, and a second edge portion that extends along the second portion of the intermediate seal part.

According to the fifth embodiment, there is provided a pouch in which a storage section storing contents is defined between a front surface film and a back surface film, the pouch including: a first side seal section that is positioned at a first side portion of the pouch and joins an inner surface of the front surface film and an inner surface of the back surface film; a second side seal section that is positioned at a second side portion opposite to the first side portion of the pouch and defines the storage section between the first side seal section and the second side seal section; a lower seal section that is connected to the first side seal section and the second side seal section; and a first non-seal section that is positioned near an upper portion of the pouch, isolated from the storage section by the first side seal section, and extends to reach a first side edge of the first side portion of the pouch, in which the first side seal section includes an upper side seal part that extends along the first side portion from the first non-seal section toward the upper portion of the pouch, a lower side seal part that extends along the first side portion from the first non-seal section toward a lower portion of the pouch, and an intermediate seal part that has one end connected to the upper side seal part and the other end connected to the lower side seal part, and is positioned between the storage section and the first non-seal section, the intermediate seal part at least includes a first portion and a second portion connected to form an obtuse angle at a first connection part positioned near the lower side seal part, and the first non-seal section includes a first edge portion that extends along the first portion of the intermediate seal part, and a second edge portion that extends along the second portion of the intermediate seal part.

In the pouch according to the fifth embodiment, the first edge portion and the second edge portion of the first non-seal section may extend linearly.

In the pouch according to the fifth embodiment, the first portion and the second portion of the intermediate seal part may extend linearly.

In the pouch according to the fifth embodiment, the dimension of the first non-seal section in the vertical direction may also be maximized in a portion which overlaps the first side edge of the first side portion of the pouch in the first non-seal section.

According to the fifth embodiment, a force can be effectively applied to the seal section that isolates the non-seal section from the storage section.

Hereinafter, the fifth embodiment will be described in detail. In the following description and the drawings used in the following description, parts that can be configured in the same manner as in the first embodiment described above are denoted by the same reference numerals used for corresponding parts in the above-described first embodiment, and a duplicate description thereof will be omitted. In addition, when it is clear that the action and effect obtained in the above-described first embodiment can be obtained also in the modified example, the description thereof may be omitted.

Pouch

Figure 34:
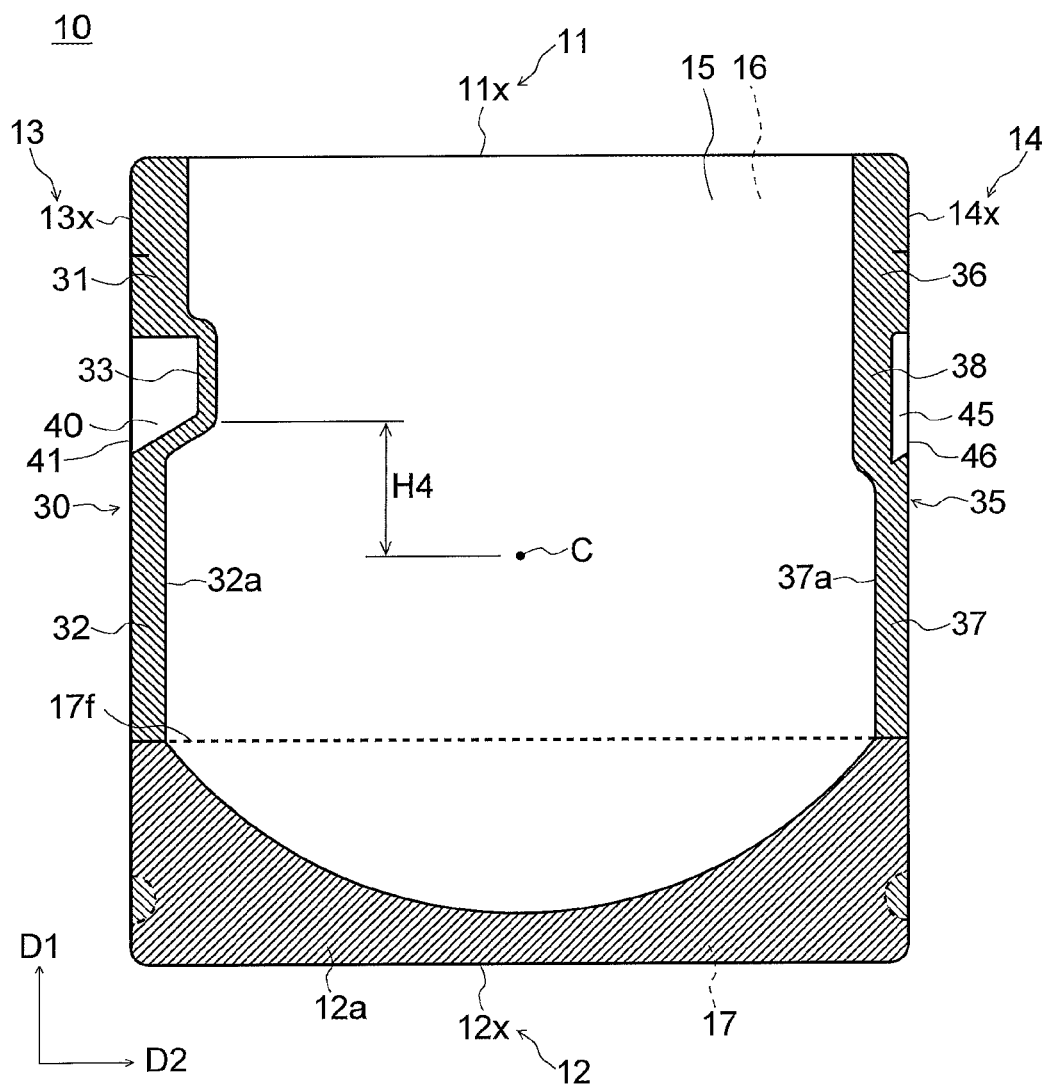
FIG. 34 is a front view illustrating a pouch according to a fifth embodiment.

FIG. 34 is a front view illustrating the pouch 10 according to the fifth embodiment as viewed from the front side. In the fifth embodiment, the pouch 10 is a bottom gusset-type pouch configured to be self-standing.

As illustrated in FIG. 34, the seal section of the pouch 10 has a first side seal section 30, a second side seal section 35, and a lower seal section 12a. The first side seal section 30 is positioned at a first side portion 13 of the pouch 10. The second side seal section 35 is positioned at a second side portion 14 opposite to the first side portion 13 of the pouch 10. The lower seal section 12a is positioned at a lower portion 12 of the pouch 10, and is consecutively connected to a first side seal section 30 and a second side seal section 35. The non-seal section surrounded by the first side seal section 30, the second side seal section 35, and the lower seal section 12a functions as a storage section 18 storing contents.

The first side seal section 30 and the second side seal section 35 join the inner surface of the front surface film 15 and the inner surface of the back surface film 16. On the other hand, the lower seal section 12a joins the inner surface of the front surface film 15 and the inner surface of the lower film 17, or the inner surface of the back surface film 16 and the inner surface of the lower film 17.

Further, in addition to the non-seal section functioning as the storage section 18, the pouch 10 further includes a first non-seal section 40 isolated from the storage section 18 by the first side seal section 30, and a second non-seal section 45 isolated from the storage section 18 by the second side seal section 35, as illustrated in FIG. 34. The non-seal section is a portion where there is a film in which the opposing inner surfaces are not joined together. The first non-seal section 40 and the second non-seal section 45 are both positioned near the upper portion 11 of the pouch 10. The expression "near the upper portion 11" means that the first non-seal section 40 and the second non-seal section 45 are positioned closer to the upper portion 11 than the center point C of the storage section 18.

As illustrated in FIG. 34, the first non-seal section 40 extends to reach a first side edge 13x of the first side portion 13 of the pouch 10. In other words, the first non-seal section 40 has an opening edge portion 41 that overlaps the first side edge 13x and is opened to the outside. Further, the second non-seal section 45 extends to reach a second side edge 14x of the second side portions 14 of the pouch 10. In other words, the second non-seal section 45 has an opening edge portion 46 that overlaps the second side edge 14x and is opened to the outside.

The first side seal section 30 and the first non-seal section 40 will be further described.

As illustrated in FIG. 34, the first side seal section 30 has an upper side seal part 31, a lower side seal part 32, and an intermediate seal part 33. The upper side seal part 31 extends along the first side portion 13 from the first non-seal section 40 toward the upper portion 11 of the pouch 10. The lower side seal part 32 extends along the first side portion 13 from the first non-seal section 40 toward the lower portion 12 of the pouch 10. The intermediate seal part 33 is positioned between the storage section 18 and the first non-seal section 40. The intermediate seal part 33 includes one end consecutively connected to the upper side seal part 31 and the other end consecutively connected to the lower side seal part 32.

When the pouch 10 is heated, if steam is generated in the storage section 18 and the pressure in the storage section 18 increases, the intermediate seal part 33 partially peels off, and the storage section 18 and the first non-seal section 40 communicate with each other. The steam that has flowed into the first non-seal section 40 from the storage section 18 is discharged from the opening edge portion 41 to the outside. Thus, the intermediate seal part 33 and the first non-seal section 40 function as the steam-releasing mechanism that discharges the steam in the storage section 18 to the outside. That is, the intermediate seal part 33 and the first non-seal section 40 correspond to the steam-releasing seal part 20a and the non-seal section 20b in the above-described first embodiment.

Figure 35:
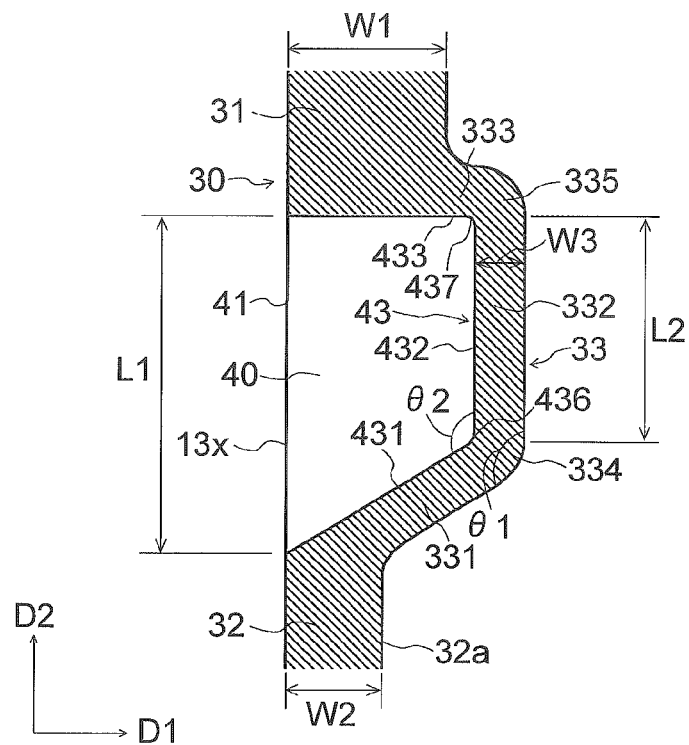
FIG. 35 is an enlarged front view of an intermediate seal part of a first side seal section and a first non-seal section of the pouch of FIG. 34.

FIG. 35 is an enlarged front view illustrating the intermediate seal part 33 and the first non-seal section 40 of the first side seal section 30 of the pouch 10. The intermediate seal part 33 includes a first portion 331, a second portion 332, and a third portion 333. The first portion 331 and the second portion 332 are connected at a first connection part 334 positioned near the lower side seal part 32. The expression "near the lower side seal part 32" means that the first connection part 334 is positioned on the lower side seal part 32 side from the center of the opening edge portion 41 in the vertical direction (second direction) D2. In addition, the second portion 332 and the third portion 333 are connected at a second connection part 335 positioned near the upper side seal part 31. The expression "near the upper side seal part 31" means that the second connection part 335 is positioned on the upper side seal part 31 side from the center of the opening edge portion 41 in the vertical direction D2.

The first portion 331 and the second portion 332 extend in directions different from each other. For example, the first portion 331 extends linearly to be displaced to the lower portion 12 from the first connection part 334 toward the first side edge 13x, and is consecutively connected to the lower side seal part 32. On the other hand, the second portion 332 extends linearly in the vertical direction D2 from the first connection part 334 toward the upper portion 11. In this case, an angle θ1 formed by the first portion 331 and the second portion 332 in the first connection part 334 is an obtuse angle. The angle θ1 is, for example, greater than 90° and 150° or less, preferably 95° or more and 140° or less, and more preferably 100° or more and 130° or less. Note that the extending directions or angles of each portion of the intermediate seal part 33 are determined based on the inner edge of the intermediate seal part 33 (the edge portion on the storage section 18 side). In the following description, the inner edge of the first portion 331 may be referred to as a first inner edge, the inner edge of the second portion 332 may be referred to as a second inner edge, the inner edge of the third portion 333 may be referred to as a third inner edge, the inner edge of the first connection part 334 may be referred to as an inner edge first connection part, and the inner edge of the second connection part 335 may be referred to as an inner edge second connection part.

The second portion 332 and the third portion 333 also extend in directions different from each other. For example, the third portion 333 extends linearly in a left-right direction (first direction) D1 from the second connection part 335 toward the first side edge 13x, and is consecutively connected to upper side seal part 31.

Next, the edge portion that defines the outer edge of the first non-seal section 40 will be described. The edge portion of the first non-seal section 40 includes an opening edge portion 41 positioned at the first side edge 13x of the first side portions 13 and an edge portion 43 on the seal section side that is defined by the lower edge of the upper side seal part 31, the lower edge of the lower side seal part 32, and the outer edge of the intermediate seal part 33. As illustrated in FIG. 35, the edge portion 43 on the seal section side includes a first edge portion 431, a second edge portion 432 connected to the first edge portion 431 in a first connection part 436, and a third edge portion 433 connected to the second edge portion 432 in a second connection part 437.

The first edge portion 431 extends along the first portion 331 of the intermediate seal part 33. That is, the first edge portion 431 extends to be displaced to the lower portion 12 from the first connection part 436 toward the first side edge 13x. In the example illustrated in FIG. 35, the first edge portion 431 extends linearly up to the first side edge 13x.

The second edge portion 432 extends in the vertical direction D2 from the first connection part 436 toward the upper portion 11 along the second portion 332 of the intermediate seal part 33. In this case, an angle θ2 formed by the first edge portion 431 and the second edge portion 432 in the first connection part 436 is an obtuse angle like the above-described angle θ1. The angle θ2 is, for example, greater than 90° and 150° or less, preferably 95° or more and 140° or less, and more preferably 100° or more and 130° or less. In the example illustrated in FIG. 35, the second edge portion 432 extends linearly from the first connection part 436 to the second connection part 437.

The third edge portion 433 extends in the left-right direction D1 from the second connection part 437 toward the first side edge 13x along the third portion 333 of the intermediate seal part 33. In the example illustrated in FIG. 35, the third edge portion 433 extends linearly up to the first side edge 13x.

Next, the dimensions of the first side seal section 30 and the first non-seal section 40 will be described.

In FIG. 35, reference signs W1, W2, and W3 each denote the width of the upper side seal part 31, the width of the lower side seal part 32, and the width of the intermediate seal part 33. The width W3 of the intermediate seal part 33 is preferably smaller than the width W1 of the upper side seal part 31 and the width W2 of the lower side seal part 32. In addition, the width W1 of the upper side seal part 31 is preferably larger than the width W2 of the lower side seal part 32. For example, the width W1 of the upper side seal part 31 is 7 mm or more and 15 mm or less, and the width W2 of the lower side seal part 32 is 4 mm or more and 10 mm or less. The width W3 of the intermediate seal part 33 may be, for example, 1 mm or more and 6 mm or less, and may be 2 mm or more and 6 mm or less.

In FIG. 35, reference sign L1 denotes the dimension of the opening edge portion 41 in the vertical direction D2, and reference sign L2 denotes the dimension of the second edge portion 432 in the vertical direction D2. Preferably, the first non-seal section 40 is configured so that the dimension of the first non-seal section 40 in the vertical direction is maximized at the portion that overlaps the first side edge 13x of the first side portions 13 of the pouch 10 in the first non-seal section 40, that is, at the opening edge portion 41. For example, the dimension L1 of the opening edge portion 41 is larger than the dimension L2 of the second edge portion 432. Thereby, the steam can be smoothly discharged from the opening edge portion 41 to the outside.

The dimension L1 of the opening edge portion 41 is, for example, 4 mm or more and 30 mm or less, and the dimension L2 of the second edge portion 432 is, for example, 3 mm or more and 25 mm or less. In addition, the difference between the dimension L1 of the opening edge portion 41 and the dimension L2 of the second edge portion 432 is, for example, 1 mm or more and 25 mm or less.

Figure 36:
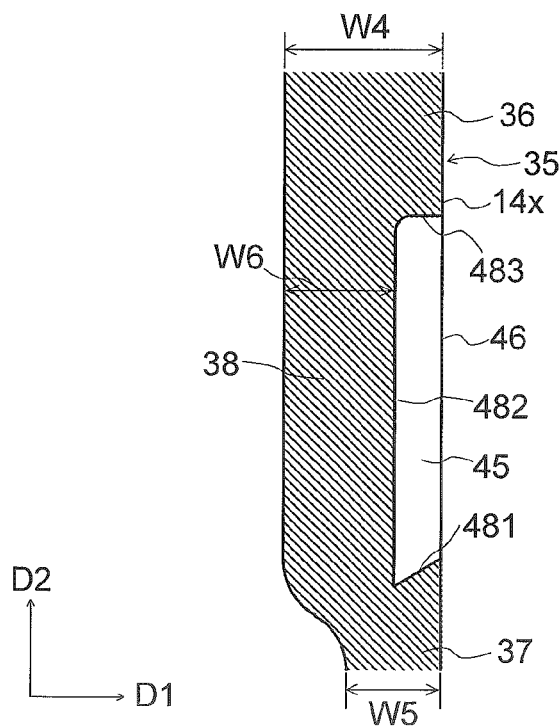
FIG. 36 is an enlarged front view of an intermediate seal part of a second side seal section and a second non-seal section of the pouch of FIG. 34.

Next, the second side seal section 35 and the second non-seal section 45 will be described in detail with reference to FIGS. 34 and 36. FIG. 36 is an enlarged front view illustrating an intermediate seal part 38 and the second non-seal section 45 of the second side seal section 35.

As illustrated in FIGS. 34 and 36, the second side seal section 35 has an upper side seal part 36, a lower side seal part 37, and the intermediate seal part 38. The upper side seal part 36 extends along the second side portion 14 from the second non-seal section 45 toward the upper portion 11 of the pouch 10. The lower side seal part 37 extends along the second side portion 14 from the second non-seal section 45 toward the lower portion 12 of the pouch 10. The intermediate seal part 38 is positioned between the storage section 18 and the second non-seal section 45. The intermediate seal part 38 includes one end consecutively connected to the upper side seal part 36 and the other end consecutively connected to the lower side seal part 37.

As illustrated in FIG. 36, the edge portion of the second non-seal section 45 includes a first edge portion 481, a second edge portion 482, a third edge portion 483, and an opening edge portion 46. The opening edge portion 46 overlaps the second side edge 14x of the second side portion 14. The second edge portion 482 includes a lower end connected to the first edge portion 481 and an upper end connected to the third edge portion 483, and extends in the vertical direction D2. The first edge portion 481 of the second non-seal section 45 extends in the same direction as the first edge portion 431 of the first non-seal section 40. In addition, the third edge portion 483 of the second non-seal section 45 extends in the same direction as the third edge portion 433 of the first non-seal section 40. The second non-seal section 45 having such a shape is formed at the same time as the first non-seal section 40 by cutting one non-seal section as disclosed in, for example, JP 2016-74457 A. For example, when the plurality of pouches 10 are manufactured by cutting the front surface film 15, the back surface film 16, and the lower film 17, which extend along the transport direction and are partially joined to each other, along the seal section and the non-seal section, one of the cut non-seal section becomes the first non-seal section 40 and the other thereof becomes the second non-seal section 45.

In FIG. 36, reference signs W4, W5, and W6 each denote the width of the upper side seal part 36, the width of the lower side seal part 37, and the width of the intermediate seal part 38. Preferably, the width W4 of the upper side seal part 36 is larger than the width W5 of the lower side seal part 37 and the width W6 of the intermediate seal part 38. In addition, the width W6 of the intermediate seal part 38 of the second side seal section 35 is larger than the width W3 of the intermediate seal part 33 of the first side seal section 30 described above. For example, the width W4 of the upper side seal part 36 is 7 mm or more and 15 mm or less, the width W5 of the lower side seal part 37 is 4 mm or more and 10 mm or less, and the width W6 of the intermediate seal part 38 is 2 mm or more and 14 mm or less.

Figure 37:
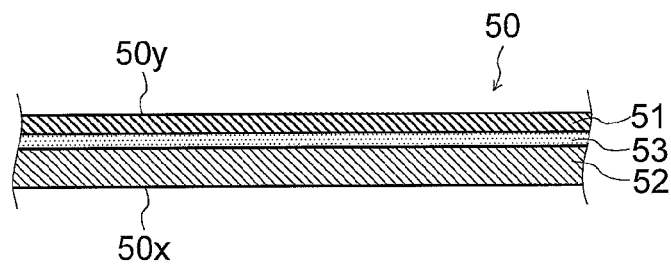
FIG. 37 is a cross-sectional view illustrating an example of a layer configuration of a laminated body constituting a pouch according to the fifth embodiment.

Next, the layer configuration of the laminated body 50 constituting the front surface film 15 and the back surface film 16 will be described. FIG. 37 is a cross-sectional view illustrating an example of the layer configuration of the laminated body 50.

The laminated body 50 includes at least a base layer 51 and a sealant layer 52. In the example illustrated in FIG. 37, the base layer 51 constitutes an outer surface 50y of the laminated body 50, and the sealant layer 52 constitutes an inner surface 50x of the laminated body 50. Further, the laminated body 50 may further include a bonding layer 53 for bonding the base layer 51 to the sealant layer 52. A thickness of the laminated body 50 is, for example, 60 μm or more, and more preferably 70 μm or more. In addition, the thickness of the laminated body 50 is, for example, 110 μm or less, and more preferably 100 μm or less.

Examples of a material forming the base layer 51 includes plastic such as a polyester such as polyethylene terephthalate or polybutylene terephthalate, a polyamide such as nylon, or polyolefin such as high density polyethylene or polypropylene. A thickness of the base layer 51 is, for example, 10 μm or more and 30 μm or less. Further, the base layer 51 may include a first plastic film 62 described in the first embodiment, the second embodiment, or the third embodiment described above, and may include a second plastic film 66, and may include the first plastic film 62 and the second plastic film 66.

Examples of a material forming the sealant layer 52 can include polyethylene such as an ethylene-methacrylic acid copolymer (EMMA), low density polyethylene (LDPE), or linear low density polyethylene (LLDPE) or polypropylene. A thickness of the sealant layer 52 is, for example, 40 μm or more, and more preferably 50 μm or more. In addition, the thickness of the sealant layer 52 is, for example, 100 μm or less, and more preferably 70 μm or less. In addition, the sealant layer 52 may include the sealant film 70 described in the first embodiment, the second embodiment, or the third embodiment described above.

The laminated body 50 may include layers other than the base layer 51, the sealant layer 52, and the bonding layer 53. For example, the laminated body 50 may further include an intermediate layer positioned between the base layer 51 and the sealant layer 52. As the intermediate layer, an appropriate layer can be selected according to the required performance such as water vapor or other gas barrier properties, light shielding properties, and various mechanical strengths. In addition, as the laminated body 50, the laminated body 50 described in the first embodiment, the second embodiment, or the third embodiment described above may be used.

Next, the layer configuration of the lower film 17 will be described. The layer configuration of the lower film 17 is arbitrary as long as the layer has an inner surface that can be joined to the inner surface of the front surface film 15 and the inner surface of the back surface film 16. For example, similar to the front surface film 15 and the back surface film 16, the above-described laminated body 50 may be used as the lower film 17. Alternatively, the inner surface is constituted by a sealant layer, and the film having a different configuration from the laminated body 50 may be used as the lower film 17.

Method for Opening Pouch

Next, a method of opening the above-described pouch 10 will be described. First, the pouch 10 is placed inside the microwave oven in a state where the pouch 10 is self-standing with the lower portion 12 facing down. Next, the contents are heated using the microwave oven. As a result, the temperature of the contents increases, and accordingly, moisture contained in the contents evaporates, and the pressure in the storage section 18 increases.

Figure 38:
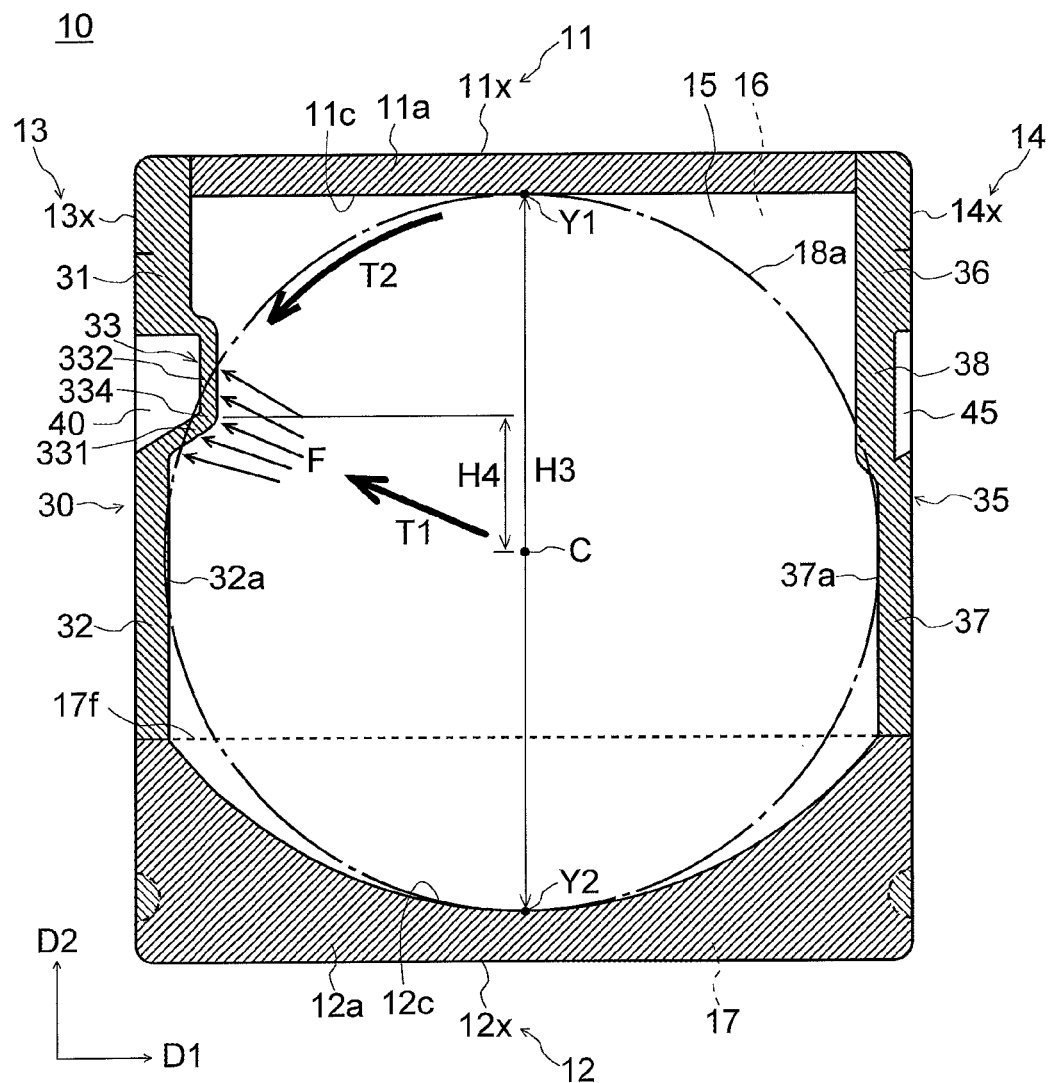
FIG. 38 is a front view illustrating an aspect in which the pouch of FIG. 34 is heated.

When the pressure in the storage section 18 increases, as illustrated by a dashed line denoted by reference numeral 18a in FIG. 38, the pouch 10 expands, for example, in a circular shape around the center point C of the storage section 18. Therefore, a force in a direction from the center point C toward the seal section is applied to each position of the seal section. The force applied to each position of the seal section increases as a distance from the center point C decreases. Here, in the fifth embodiment, the first side seal section 30 includes the intermediate seal part 33 positioned closer to the second side portion 14 side than the inner edge 32a of the lower side seal part 32. Therefore, a force F applied to the intermediate seal part 33 is greater than the force applied to the upper side seal part 31 and the lower side seal part 32.

Note that the center point C of the storage section 18 is defined as a middle point of a line connecting between a middle point Y1 of an inner edge 11c of the upper seal section 11a and a middle point Y2 of an inner edge 12c of the lower seal section 12a. In FIG. 38, reference sign H3 denotes a distance in the vertical direction D2 from the middle point Y1 of the inner edge 11c of the upper seal section 11a to the middle point Y2 of the inner edge 12c of the lower seal section 12a. In addition, reference sign H4 denotes a distance in the vertical direction D2 from the center point C of the storage section 18 to the first connection part 334 of the intermediate seal part 33. The distance H4 is, for example, 0.05×H3 or more and 0.5×H3 or less.

Figure 39:
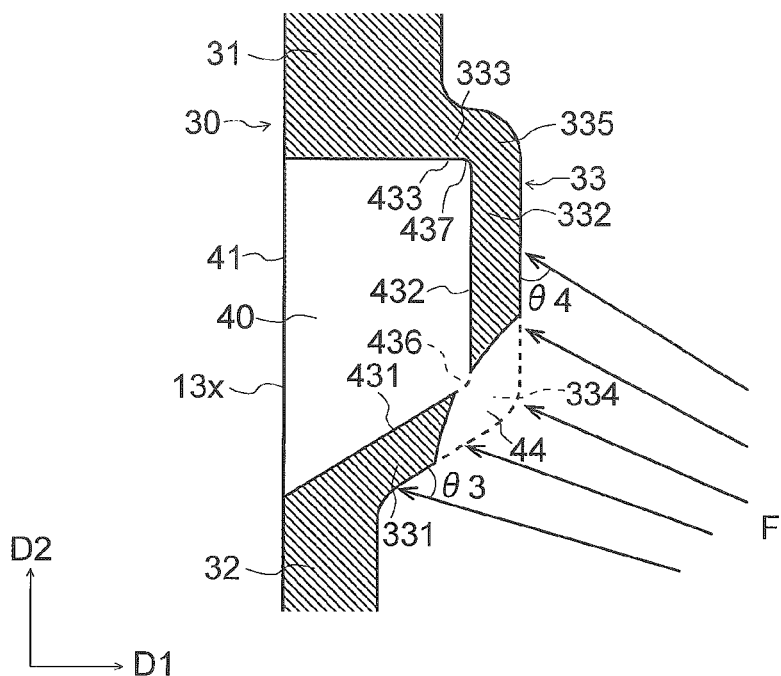
FIG. 39 is a diagram illustrating an aspect in which an intermediate seal part of a first side seal section peels off and a storage section communicates with a first non-seal section.

When the force F is applied to the intermediate seal part 33, the peeling off of the intermediate seal part 33 progresses. The peeling off of the intermediate seal part 33 first progresses in the first portion 331 and the second portion 332, for example, in the vicinity of the first connection part 334. FIG. 39 is a view illustrating an aspect in which the peeling off of the intermediate seal part 33 reaches the first connection part 436 of the first non-seal section 40 and a communication port 44 is formed.

In the state illustrated in FIG. 39, the portion where the peeling off reaches the edge portion of the first non-seal section 40 in the intermediate seal part 33 is small, and therefore, the amount of steam that can be released from the storage section 18 to the first non-seal section 40 through the peeling-off portion of the intermediate seal part 33 also decreases. In order to discharge the steam generated inside the storage section 18 to the outside earlier and reduce the pressure in the storage section 18, it is preferable to further progress the peeling off of the intermediate seal part 33.

Figure 40:
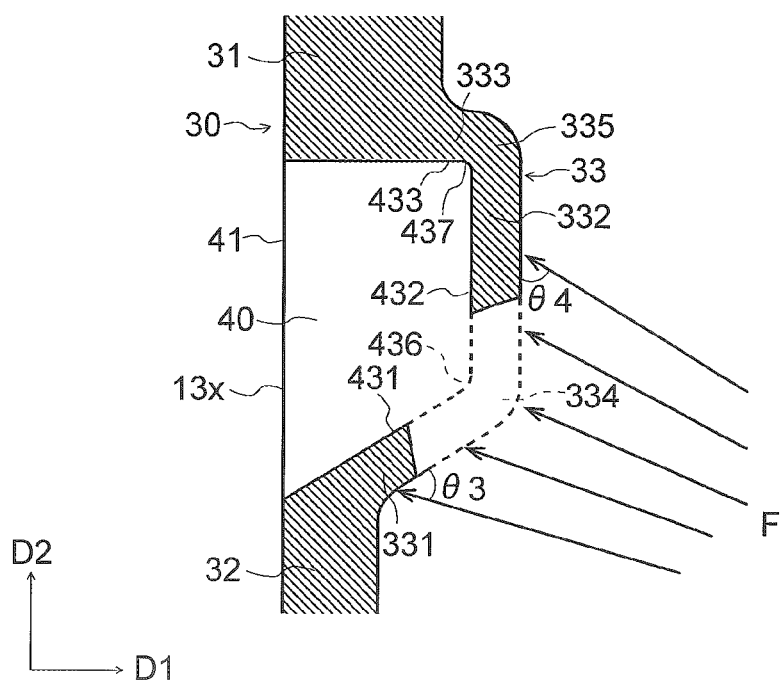
FIG. 40 is a diagram illustrating an aspect in which the peeling off of the intermediate seal part of the first side seal section further proceeds.

Here, in the fifth embodiment, the first portion 331 of the intermediate seal part 33 extends to be displaced to the lower portion 12 from the first connection part 334 toward the first side edge 13x. Therefore, compared to the case where the first portion 331 extends in the left-right direction D1, an angle θ3 formed by the direction of the force F from the center point C of the storage section 18 toward the first portion 331 and the direction in which the inner edge of the first portion 331 extends can approximate 90°. Thereby, since the force F can be effectively applied to the entire first portion 331, as illustrated in FIG. 40, the progress of the peeling off of the first portion 331 can be promoted. As a result, the dimension of the communication port 44 formed between the storage section 18 and the first non-seal section 40 due to the peeling off of the intermediate seal part 33 can become large early. As a result, the time during which the inside of the storage section 18 is maintained at a high pressure and a high temperature can be shortened, so that the front surface film 15, the back surface film 16, the lower film 17 and the like are suppressed from being damaged during the heating. The angle θ3 is, for example, 0° or more and 90° or less.

In addition, in the present embodiment, the second portion 332 of the intermediate seal part 33 extends in the vertical direction D2 from the first connection part 334 toward the upper portion 11. Therefore, compared to the case where the second portion 332 extends to be inclined to the first side portion 13, an angle θ4 formed by the direction of the force F from the center point C of the storage section 18 toward the second portion 332 and the direction in which the inner edge of the second portion 332 extends can approximate 90°. Thereby, since the force F can be effectively applied to the entire second portion 332, as in the same manner as the first portion 331, the progress of the peeling off of the second portion 332 can be promoted. The angle θ4 is, for example, 0° or more and 90° or less.

Figure 41:
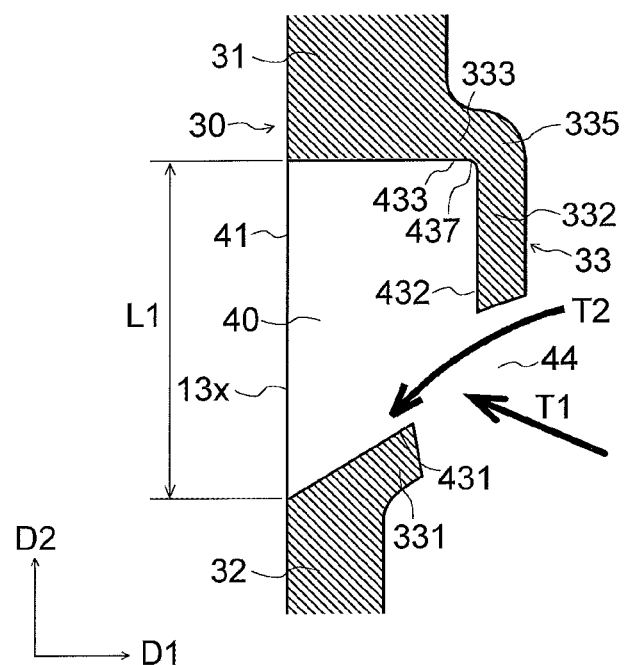
FIG. 41 is a diagram illustrating an aspect in which steam is discharged from the storage section to the first non-seal section.

FIG. 41 is a diagram illustrating an aspect in which steam passes through the communication port 44 formed between the storage section 18 and the first non-seal section 40. As illustrated in FIGS. 38 and 41, reference sign T1 denotes steam flowing from the center point C of the storage section 18 toward the seal section. In addition, reference sign T2 denotes steam that flows from the upper portion 11 side toward the first non-seal section 40 after convection inside the storage section 18.

According to the fifth embodiment, since the dimension of the communication port 44 can become large, resistance applied to steam T1 flowing from the storage section 18 into the first non-seal section 40 can decrease. In addition, the first edge portion 431 of the first non-seal section 40 extends to be displaced to the lower portion 12 from the first connection part 436 toward the first side edge 13x. For this reason, compared with the case where the first edge portion 431 extends in the left-right direction D1, the dimension L1 of the opening edge portion 41 in the vertical direction D2 can become large. Thereby, the resistance applied to the steam T1 discharged from the first non-seal section 40 to the outside of the pouch 10 through the opening edge portion 41 can decrease. Thus, it is possible to suppress the steam from staying in the first non-seal section 40 and close the opening edge portion 41.

In addition, according to the fifth embodiment, the first edge portion 431 of the first non-seal section 40 extends to be displaced to the lower portion 12 from the first connection part 436 toward the first side edge 13x. Therefore, compared to the case where the first edge portion 431 extends in the left-right direction D1, steam T2 flowing from the upper portion 11 side into the first non-seal section 40 is smoothly guided to the opening edge portion 41 along the first edge portion 431. Thus, it is possible to suppress the steam from staying in the first non-seal section 40 and close the opening edge portion 41.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

First Modified Example

Figure 42:
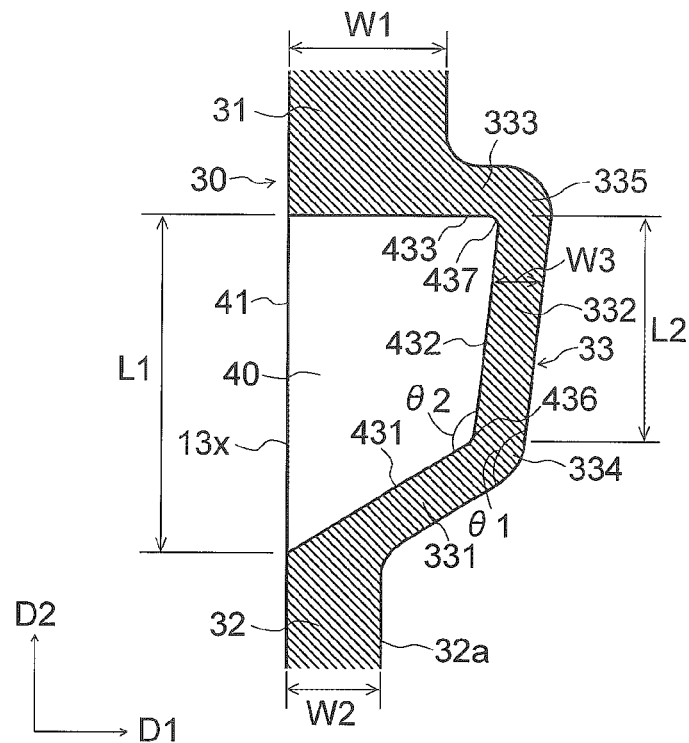
FIG. 42 is a front view of a modified example of the intermediate seal part of the first side seal section and the first non-seal section according to the fifth embodiment.

In the above-described embodiment, an example has been described in which the second portion 332 of the intermediate seal part 33 extends in the vertical direction D2 from the first connection part 334 toward the upper portion 11. However, the present embodiment is not limited thereto, and for example, as illustrated in FIG. 42, the second portion 332 of the intermediate seal part 33 may extend to be displaced to the second side portion 14 side from the first connection part 334 toward the upper portion 11. Also in this case, the angle θ1 formed by the first portion 331 and the second portion 332 in the first connection part 334 is an obtuse angle. As in the same manner of the above-described embodiment, the angle θ1 is, for example, greater than 90° and 150° or less, preferably 95° or more and 140° or less, and more preferably 100° or more and 130° or less.

Also in this modified example, a force generated by generation of steam in a storage section 18 can be effectively applied to the entire second portion 332, so the progress of peeling off of the second portion 332 can be promoted. As a result, the dimension of the communication port 44 formed between the storage section 18 and the first non-seal section 40 due to the peeling off of the intermediate seal part 33 can become large early.

Second Modified Example

Figure 43:
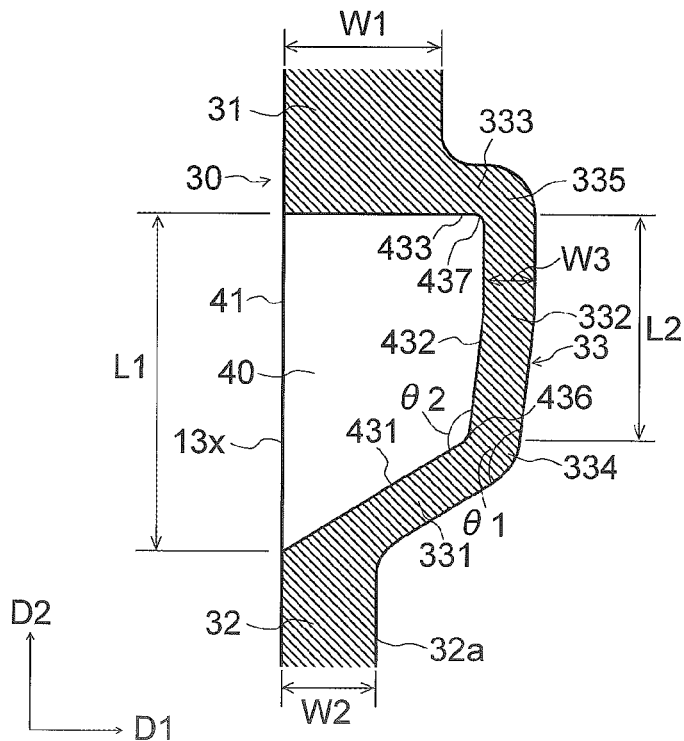
FIG. 43 is a front view of a modified example of the intermediate seal part of the first side seal section and the first non-seal section according to the fifth embodiment.

In the above-described embodiment or the first modified example, an example has been described in which the second portion 332 of the intermediate seal part 33 extends in the vertical direction D2 from the first connection part 334 toward the upper portion 11 or extends to be displaced to the second side portion 14 side from the first connection part 334 toward the upper portion 11. However, the present embodiment is not limited thereto, and for example, as illustrated in FIG. 43, the second portion 332 of the intermediate seal part 33 may include both of the portion that extends in the vertical direction D2 and the portion that extends to be displaced to the second side portion 14 side toward the upper portion 11. In the example illustrated in FIG. 43, the second portion 332 includes a portion that extends to be displaced to the second side portion 14 side from the first connection part 334 toward the upper portion 11, and a portion that extends in the vertical direction D2 from the portion to the second connection part 335.

Third Modified Example

Figure 44:
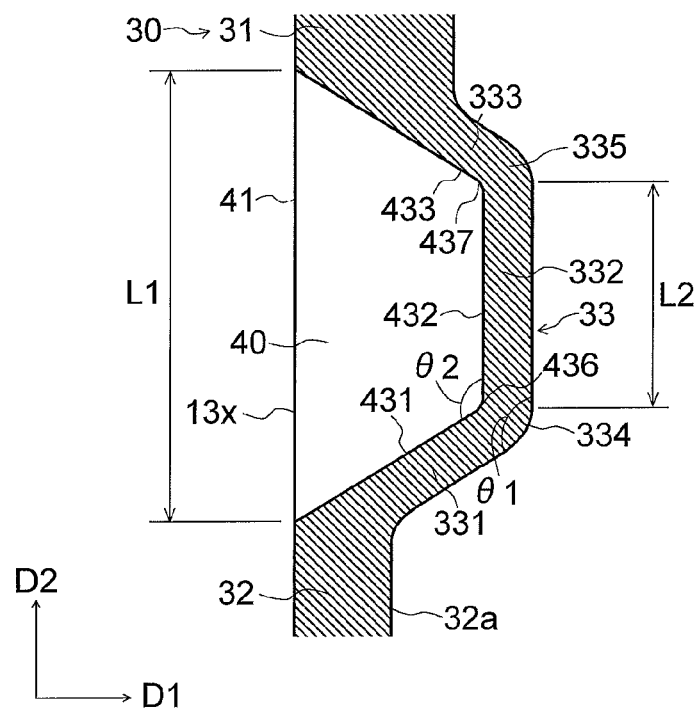
FIG. 44 is a front view of a modified example of the intermediate seal part of the first side seal section and the first non-seal section according to the fifth embodiment.

In the above-described embodiment, an example has been described in which the third portion 333 of the intermediate seal part 33 extends in the left-right direction D1 from the second connection part 335 toward the first side edge 13x. However, the present embodiment is not limited thereto, and for example, as illustrated in FIG. 44, the third portion 333 of the intermediate seal part 33 may extend to be displaced to the upper portion 11 side from the second connection part 335 toward the first side edge 13x. In this case, the third edge portion 433 of the first non-seal section 40 may also extend along the third portion 333 to be displaced to the upper portion 11 from the second connection part 437 toward the first side edge 13x.

Fourth Modified Example

Figure 45:
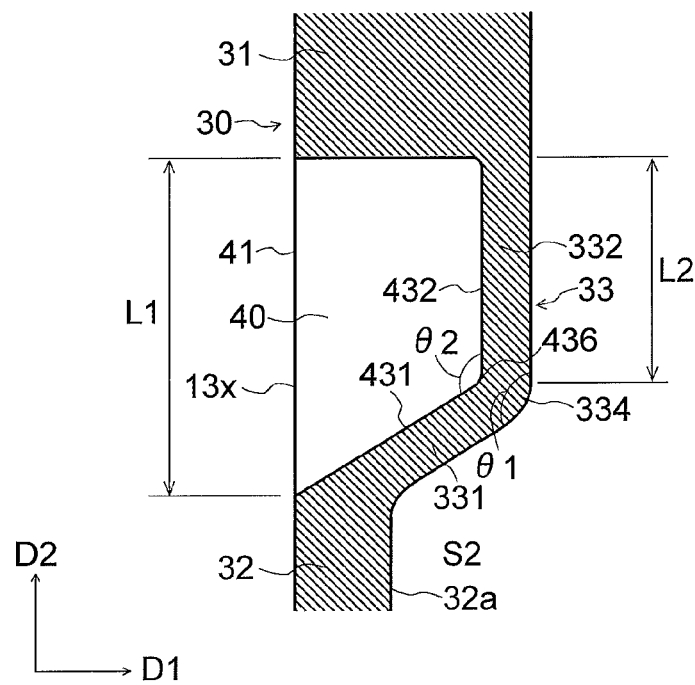
FIG. 45 is a front view of a modified example of the intermediate seal part of the first side seal section and the first non-seal section according to the fifth embodiment.

In the above-described embodiment, an example has been described in which the intermediate seal part 33 includes the third portion 333 that protrudes from the upper side seal part 31 toward the storage section 18 (the second side portion 14). However, the present embodiment is not limited thereto, and for example, as illustrated in FIG. 45, the intermediate seal part 33 may not include the third portion 333. For example, the second portion 332 that extends from the first connection part 334 toward the upper portion 11 may be connected to the upper side seal part 31.

Fifth Modified Example

In the above-described embodiment, an example has been described in which the first portion 331 of the intermediate seal part 33 extends linearly from the first connection part 334 toward the lower side seal part 32. However, as long as the first portion 331 is displaced to the lower portion 12 side from the first connection part 334 toward the first side edge 13x, the shape of the first portion 331 may be a curved shape as illustrated in FIG. 46.

Figure 46:
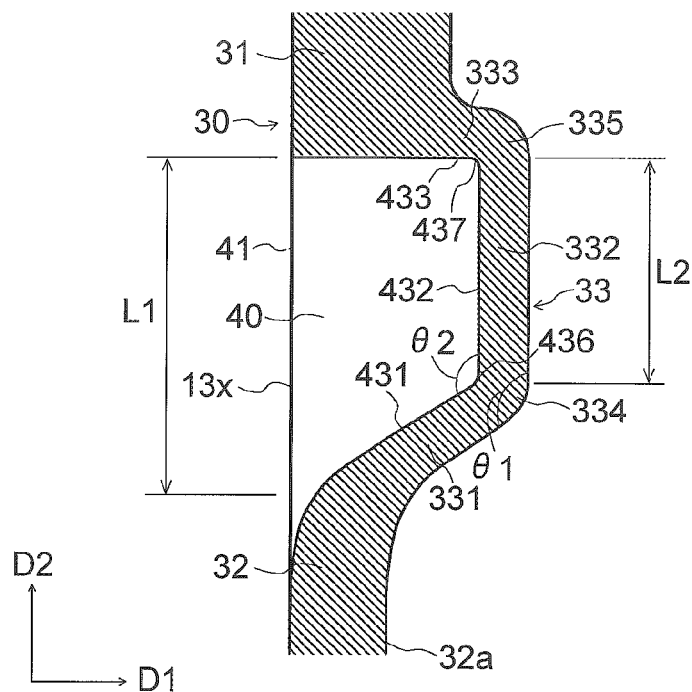
FIG. 46 is a front view of a modified example of the intermediate seal part of the first side seal section and the first non-seal section according to the fifth embodiment.

In the example illustrated in FIG. 46, the first portion 331 is curved so as to be convex toward the first non-seal section 40. Thereby, the entire first portion 331 can more effectively subjected to the force generated when the pouch 10 is heated from the center point C of the storage section 18 toward the first portion 331.

Although not illustrated, the first portion 331 may be curved to be convex toward the center point C of the storage section 18. Thereby, a force from the center point C toward the curved portion of the first portion 331 can be more effectively applied to the first portion 331. Specifically, first, a force is applied to a vertex of the curved portion of the first portion 331, and thereafter, the force is transmitted to the entire curved portion of the first portion 331, and the peeling off of the curved portion of the first portion 331 progresses. In this order, the peeling off of the first portion 331 can be realized.

Sixth Modified Example

Figure 47:
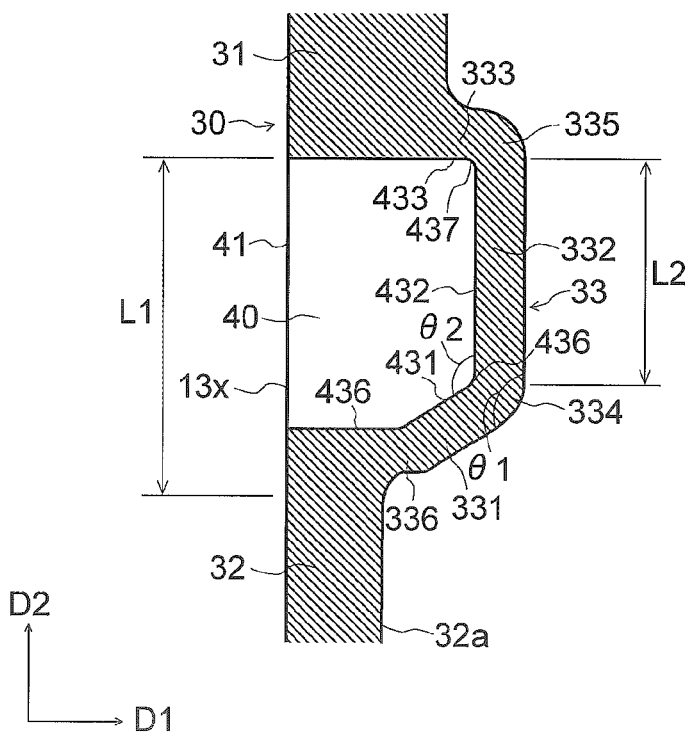
FIG. 47 is a front view of a modified example of the intermediate seal part of the first side seal section and the first non-seal section according to the fifth embodiment.

In the above-described embodiment, an example has been described in which the first portion 331 of the intermediate seal part 33 extends from the first connection part 334 toward the first side edge 13x, and is consecutively connected to the lower side seal part 32. However, the present embodiment is not limited thereto, and for example, as illustrated in FIG. 47, the intermediate seal part 33 may further include a fourth portion 336 positioned between the first portion 331 and the lower side seal part 32. In the example illustrated in FIG. 47, the fourth portion 336 extends in the left-right direction D1 from the connection part with the first portion 331 toward the first side edge 13x, and is connected to the lower side seal part 32. In this case, as illustrated in FIG. 47, the inner edge of the first non-seal section 40 may further include a fourth edge portion 434 that extends in the left-right direction D1 along the fourth portion 336 of the intermediate seal part 33 and reaches the first side edge 13x.

Seventh Modified Example

Figure 48:
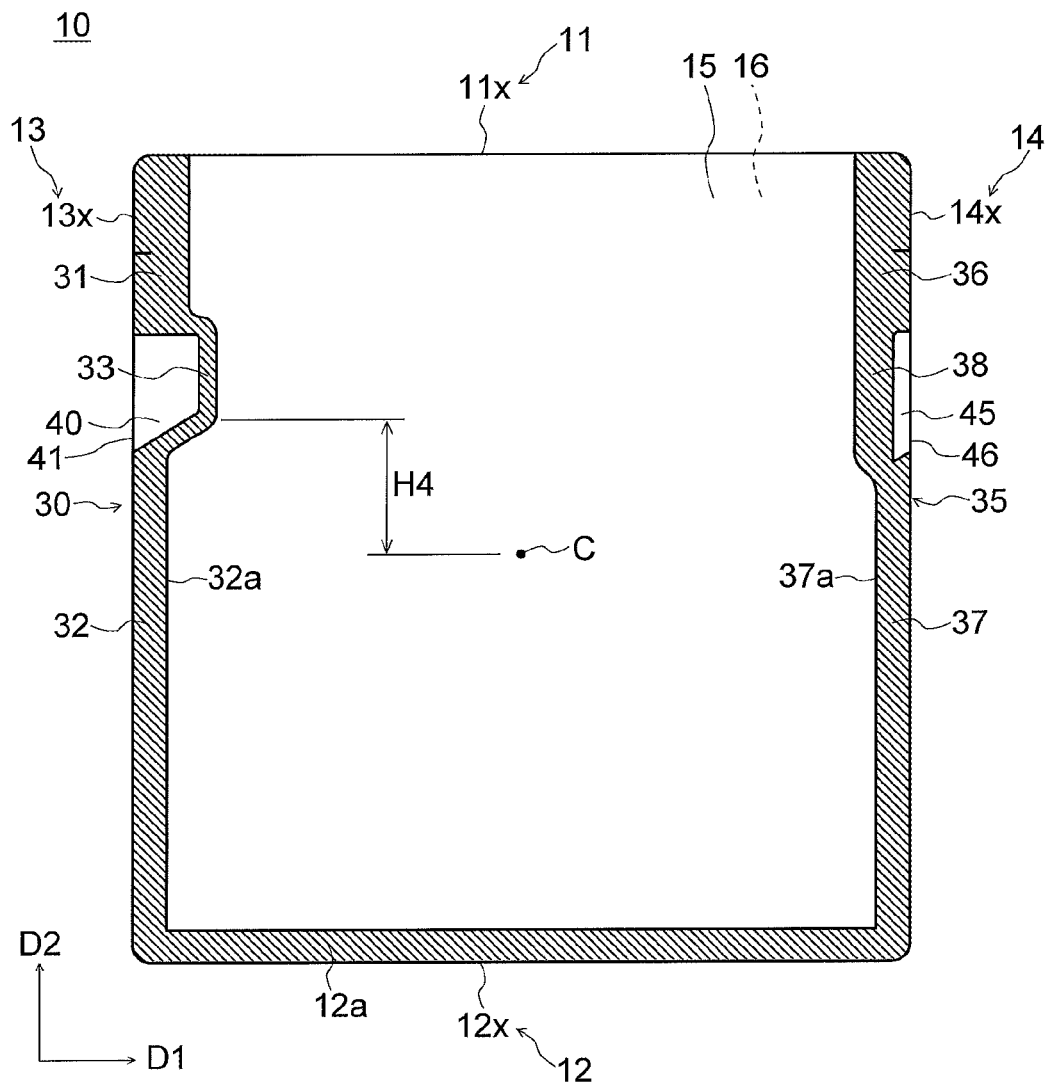
FIG. 48 is a front view illustrating a modified example of the pouch according to the fifth embodiment.

In the above-described embodiment, an example has been described in which the pouch 10 is a gusset-type pouch including the front surface film 15, the back surface film 16, and the lower film 17. However, the present embodiment is not limited thereto, and as illustrated in FIG. 48, the pouch 10 may be a so-called flat pouch including the front surface film 15 and the back surface film 16. In this case, the pouch 10 is heated by the microwave oven in the state in which the posture of the pouch 10 is maintained so that the intermediate seal part 33 is positioned above the center point C of the storage section 18 in the vertical direction. For example, when the pouch 10 is sold in a state of being stored in a paper box (not illustrated), the box can be used to maintain the pouch 10 in a predetermined posture.

Note that although some modified examples with respect to the above-described embodiment have been described, a plurality of modified examples can be appropriately combined and applied.

Sixth Embodiment

Next, a sixth embodiment of the present invention will be described. In the same manner as in each of the above-described embodiments, a pouch (bag) according to the sixth embodiment also includes a steam-releasing mechanism that automatically releases steam generated by heating in a microwave oven to an outside of the pouch.

First, a problem to be solved by the sixth embodiment will be described.

In a pouch that can be provided with the steam-releasing mechanism, if a steam-releasing seal part is excessively peeled off, contents stored in the pouch may leak to an outside of the pouch via a peeling off point of the steam-releasing seal part. An object of the sixth embodiment provides a pouch that can effectively solve such a problem.

Next, means for solving the problem will be described.

According to the sixth embodiment, there is provided a pouch in which a storage section for storing contents is defined between a front surface film and a back surface film, the pouch including: a first side seal section that is positioned at a first side portion of the pouch and joins an inner surface of the front surface film and an inner surface of the back surface film; a second side seal section that is positioned at a second side portion opposite to the first side portion of the pouch and defines the storage section between the first side seal section and the second side seal section; a lower seal section that is connected to the first side seal section and the second side seal section; and a first non-seal section that is positioned near an upper portion of the pouch, isolated from the storage section by the first side seal section, and extends to reach a first side edge of the first side portion of the pouch, in which the first side seal section includes an upper side seal part that extends along the first side portion from the first non-seal section toward the upper portion of the pouch, a lower side seal part that extends along the first side portion from the first non-seal section toward a lower portion of the pouch, and an intermediate seal part that has one end connected to the upper side seal part and the other end connected to the lower side seal part, and is positioned between the storage section and the first non-seal section, an inner edge of the intermediate seal part includes a first inner edge, a second inner edge, and an inner edge first connection part that is positioned near the lower side seal part and connects the first inner edge and the second inner edge, the first inner edge extends from the inner edge first connection part to the lower side seal part, and the second inner edge extends to be at least partially displaced to the second side portion side from the inner edge first connection part toward the upper portion of the pouch.

In the pouch according to the sixth embodiment, the inner edge of the intermediate seal part includes a third inner edge positioned closer to the upper portion of the pouch than the second inner edge and an inner edge second connection part that connects the second inner edge and the third inner edge, and the first inner edge and the second inner edge may extend linearly.

In the pouch according to the sixth embodiment, an angle formed by a straight line passing through the inner edge first connection part and a center point of the storage section and a direction in which the first inner edge extends may be smaller than an angle formed by the straight line passing through the inner edge first connection part and the center point of the storage section and a direction in which the second inner edge extends.

In the pouch according to the sixth embodiment, the third inner edge may extend to be at least partially displaced to the first side portion side from the inner edge second connection part toward the upper portion of the pouch.

In the pouch according to the sixth embodiment, a width of the portion corresponding to the third inner edge in the intermediate seal part at least partially increases from the first side portion side toward the inner edge second connection part side.

In the pouch according to the sixth embodiment, the edge portion of the first non-seal section may include a guide edge portion that is positioned near the upper side seal part, and extends to be displaced to the first side portion side toward the upper portion of the pouch.

In the pouch according to the sixth embodiment, the guide edge portion may extend to reach the first side edge of the first side portion.

In the pouch according to the sixth embodiment, the guide edge portion may extend linearly.

In the pouch according to the sixth embodiment, the guide edge portion may at least partially include a shape that is convex from the first non-seal section side toward the storage section.

In the pouch according to the sixth embodiment, the guide edge portion may be at least partially curved.

According to the sixth embodiment, it is possible to prevent the contents stored in the pouch from leaking to the outside of the pouch.

Hereinafter, the sixth embodiment will be described in detail. The pouch 10 according to the sixth embodiment is substantially the same as the pouch 10 according to the above-described fifth embodiment except for the shapes of the intermediate seal part 33 and the first non-seal section 40. In the following description and the drawings used in the following description, parts that can be configured in the same manner as in the fifth embodiment described above are denoted by the same reference numerals as those used for corresponding parts in the above-described fifth embodiment, and a duplicate description thereof will be omitted. In addition, when it is clear that the action and effect obtained in the above-described fifth embodiment can be obtained also in the modified example, the description thereof may be omitted.

Pouch

Figure 49:
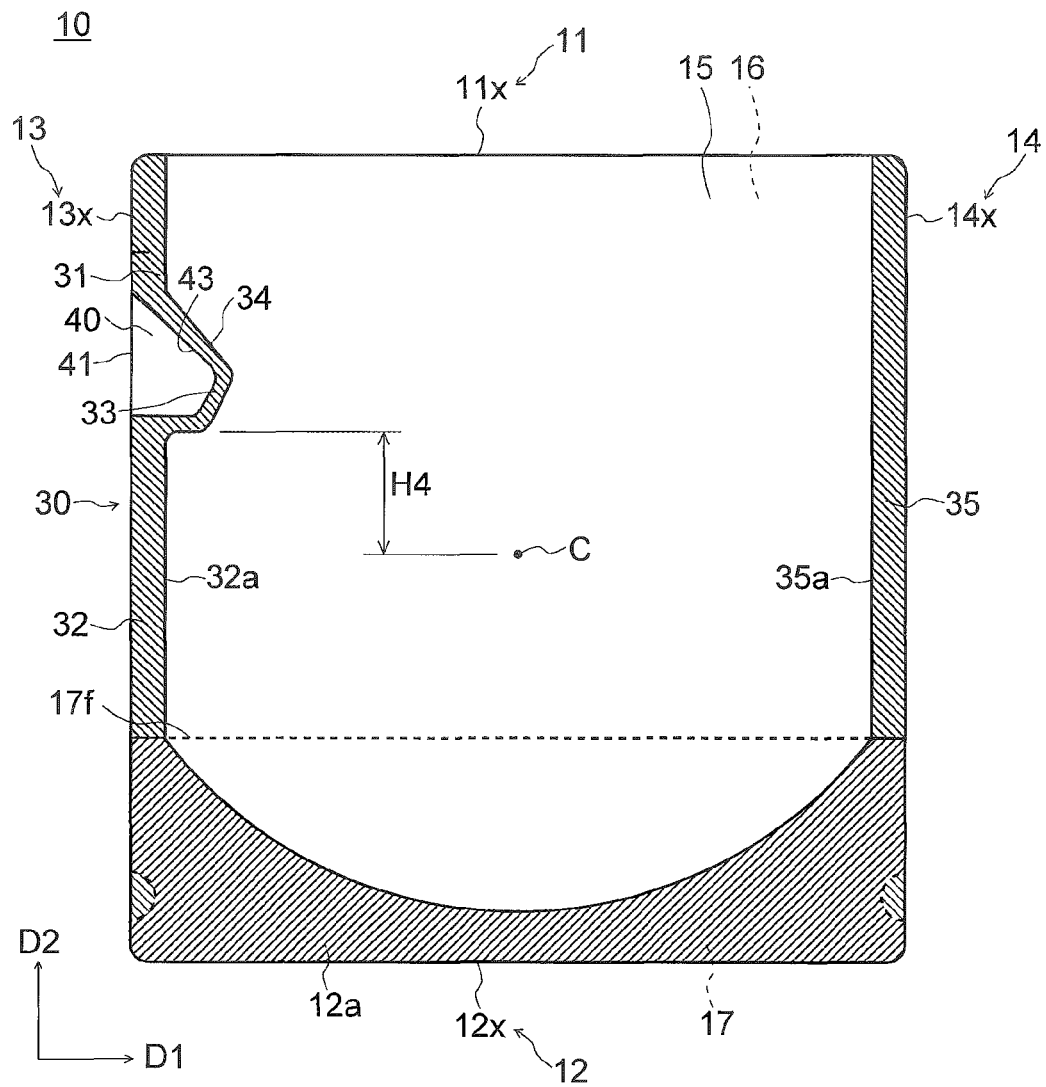
FIG. 49 is a front view illustrating a pouch according to a sixth embodiment.

FIG. 49 is a front view illustrating the pouch 10 according to the sixth embodiment as viewed from the front side. In the sixth embodiment, the pouch 10 is a bottom gusset-type pouch configured to be self-standing.

Figure 50:
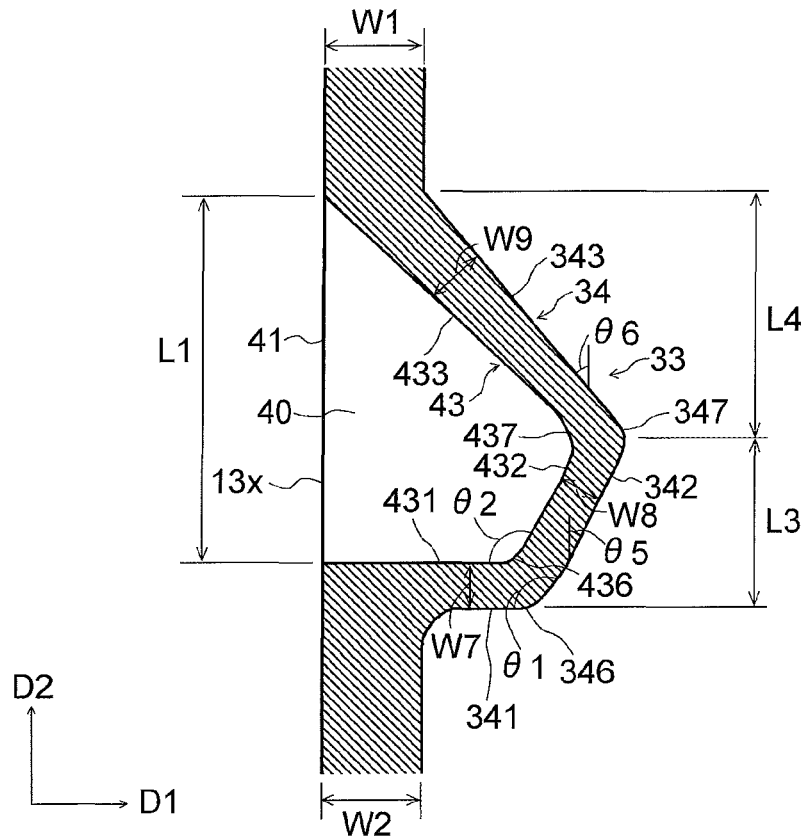
FIG. 50 is an enlarged front view of an intermediate seal part of a first side seal section and a first non-seal section of the pouch of FIG. 49.

FIG. 50 is an enlarged front view illustrating the intermediate seal part 33 and the first non-seal section 40 of the first side seal section 30 of the pouch 10. The intermediate seal part 33 includes an inner edge 34 that is an edge portion positioned on the side of the storage section 18, and an outer edge that is an edge portion positioned on the first non-seal section 40 side. The outer edge of the intermediate seal part 33 defines an outline of a portion that is positioned closer to the storage section 18 side than the upper side seal part 31 or the lower side seal part 32 in the edge portion of the first non-seal section 40.

In the sixth embodiment, the inner edge 34 of the intermediate seal part 33 includes a first inner edge 341, a second inner edge 342 and a third inner edge 343, an inner edge first connection part 346 that connects the first inner edge 341 and the second inner edge 342, and an inner edge second connection part 347 that connects the second inner edge 342 and the third inner edge 343. In the sixth embodiment, the first inner edge 341, the second inner edge 342, and the third inner edge 343 all extend linearly.

The first inner edge 341 extends from the inner edge first connection part 346 to the lower side seal part 32 side. For example, the first inner edge 341 extends in a substantially left-right direction D1 toward the lower side seal part 32. An angle formed by a direction in which the first inner edge 341 extends and the left-right direction D1 is, for example, 10° or less. As illustrated in FIG. 50, the first inner edge 341 may be connected to the inner edge of the lower side seal part 32.

The second inner edge 342 extends to be at least partially displaced to the second side portion 14 side from the inner edge first connection part 346 toward the upper portion 11 of the pouch 10. An angle θ5 formed by a direction in which the second inner edge 342 extends and a vertical direction D2 is, for example, 10° or more and 60° or less. On the other hand, the third inner edge 343 extends to be at least partially displaced to the first side portion 13 side from the inner edge second connection part 347 toward the upper portion 11 of the pouch 10. An angle θ6 formed by a direction in which the third inner edge 343 extends and the vertical direction D2 is, for example, 30° or more and 90° or less. As illustrated in FIG. 50, the third inner edge 343 may be connected to the inner edge of the upper side seal part 31.

The inner edge connection parts such as the inner edge first connection part 346 and the inner edge second connection part 347 are defined as portions where the direction in which the inner edge 34 extends changes. For example, when the first inner edge 341 and the second inner edge 342 extend linearly, the inner edge first connection part 346 is a portion that is positioned between the first inner edge 341 and the second inner edge 342, and extends in a direction different from the direction in which the first inner edge 341 extends and extends a direction different from the direction in which the second inner edge 342 extends.

Further, when the first inner edge 341 and the second inner edge 342 are partially curved, the inner edge first connection part 346 is defined as a portion including an angle change point where the amount of change in the direction in which the inner edge 34 extends is 30° or more. The same applies to other inner edge connection parts such as the inner edge second connection part 347. The connection part of the edge portion of the first non-seal section 40, such as the first connection part 436 or the second connection part 437, which will be described later, are also defined in the same manner as the inner edge connection part. Hereinafter, the angle change point will be described with reference to FIG. 51.

Figure 51:
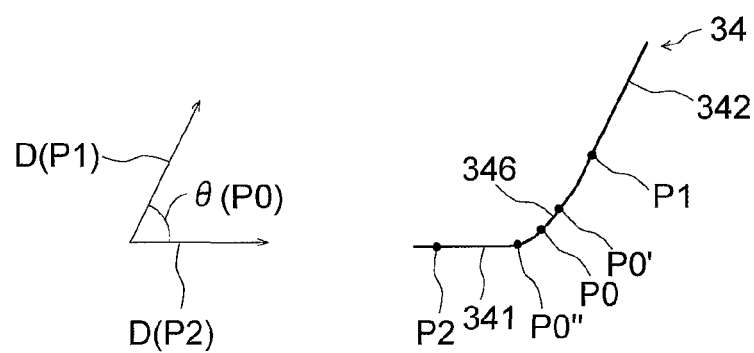
FIG. 51 is a diagram for explaining an inner edge first connection part.

FIG. 51 is an enlarged view of a part of the inner edge 34. Reference sign P0 denotes one point positioned on the inner edge 34. In the example illustrated in FIG. 51, the point P0 is positioned on the inner edge first connection part 346. Reference sign P1 denotes an upper point displaced from the point P0 toward the upper side seal part 31 by 5 mm along the inner edge 34. Reference sign P2 denotes a lower point that is displaced from the point P0 toward the lower side seal part 32 by 5 mm along the inner edge 34. Reference sign D (P1) denotes a direction in which the inner edge 34 extends at the upper point P1. Reference sign D (P2) denotes a direction in which the inner edge 34 extends at the lower point P2. Reference sign 6 (P0) denotes an angle formed by the direction D (P1) and the direction D (P2). The angle θ(P0) calculated in this manner is the amount of change in the angle of the inner edge 34 at the point P0. In addition, the point P0 at which the angle θ(P0) is 30° or more is referred to as an angle change point. As illustrated in FIG. 51, the inner edge first connection part 346 includes the angle change point P0.

Note that in the example illustrated in FIG. 51, the angle change amount is 300 or more not only at the point P0, but also at the points P0' and P0" positioned near the point P0 on the inner edge 34. In this case, the inner edge first connection part 346 is defined as a portion that includes points where the angle change amount in the inner edge 34 is 30° or more.

The inner edge first connection part 346 is positioned near the lower side seal part 32. The expression "near the lower side seal part 32" means that the inner edge first connection part 346 is positioned closer to the lower side seal part 32 side than the center of the opening edge portion 41 in the vertical direction D2. In the sixth embodiment, the inner edge first connection part 346 is also positioned near the lower side seal part 32. Note that the inner edge 34 of the intermediate seal part 33 may include an inner edge connection part positioned near the upper side seal part 31. The expression "near the upper side seal part 31" means that the inner connection part is positioned closer to the upper side seal part 31 side than the center of the opening edge portion 41 in the vertical direction D2.

The inner edge first connection part 346 is configured so that a distance from the center point C of the storage section 18 to the inner edge first connection part 346 is smaller than a distance from the center point C of the storage section 18 to the other inner edge connection part. For example, in the sixth embodiment, the distance from center point C to the inner edge first connection part 346 is smaller than the distance from the center point C to the inner edge second connection part 347. For this reason, the peeling off of the inner edge connection part that occurs when the pouch 10 is heated tends to first occur in the inner edge first connection part 346.

Figure 52:
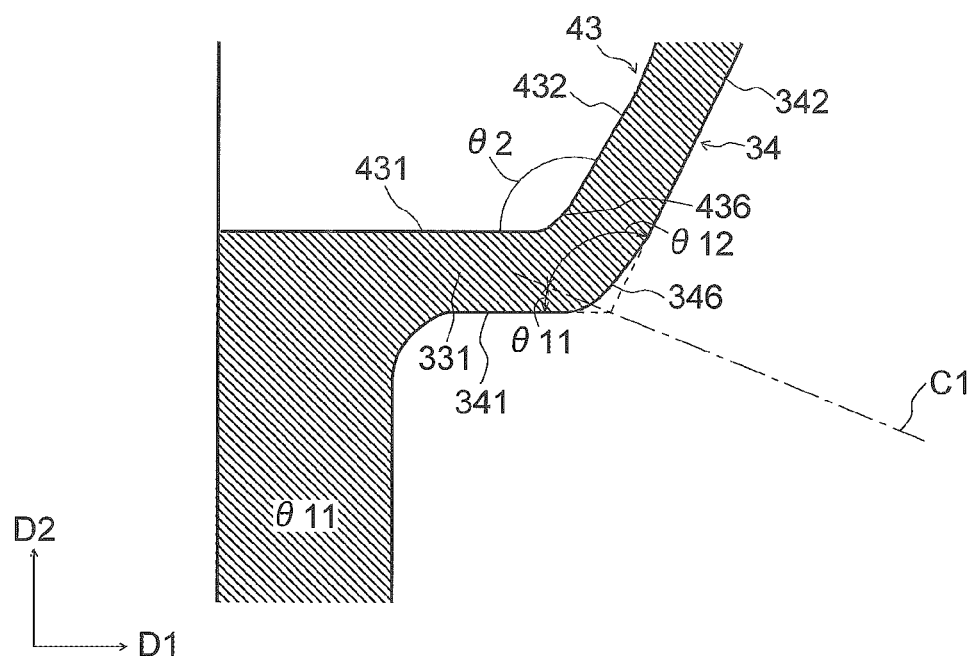
FIG. 52 is a further enlarged front view of the inner edge first connection part of the intermediate seal part of FIG. 50 and a peripheral portion thereof.

Next, the shapes of the inner edge first connection part 346 and its peripheral portion will be described in detail with reference to FIG. 52. FIG. 52 is a further enlarged plan view of the inner edge first connection part 346 of the intermediate seal part 33 of FIG. 50. In FIG. 52, reference sign 611 denotes an angle formed by a straight line C1 passing through the inner edge first connection part 346 and a center point C of the storage section 18 and a direction in which the first inner edge 341 extends. In addition, reference sign 612 denotes an angle formed by the straight line C1 and the direction in which the second inner edge 342 extends. When the first inner edge 341 and the second inner edge 342 both extend linearly, the straight line C1 passes through an intersection of an extension of the first inner edge 341 and an extension of the second inner edge 342, as illustrated in FIG. 52.

The angle θ11 formed by the straight line C1 and the direction in which the first inner edge 341 extends is smaller than the angle θ12 formed by the straight line C1 and the direction in which the second inner edge 342 extends. The difference between the angle θ11 and the angle θ12 is, for example, 30° or more. Thereby, as described later, when the intermediate seal part 33 is peeled off, the progress of the peeling off at the portion extending along the second inner edge 342 in the intermediate seal part 33 can be more suppressed than the progress of the peeling off at the portion of the intermediate seal part 33 along the first inner edge 341. Note that the angle θ1 formed by the direction in which the first inner edge 341 extends and the direction in which the second inner edge 342 extends is a sum of the angle θ11 and the angle θ12. The angle θ1 is greater than 90°. The angle θ1 is, for example, 95° or more and 170° or less.

Next, the edge portion of the first non-seal section 40 will be described. The edge portion of the first non-seal section 40 includes an opening edge portion 41 positioned at the first side edge 13x of the first side portions 13 and an edge portion 43 on the seal section side that is defined by the lower edge of the upper side seal part 31, the lower edge of the lower side seal part 32, and the outer edge of the intermediate seal part 33. In the sixth embodiment, as illustrated in FIG. 50, the edge portion 43 on the seal section side includes a first edge portion 431, a second edge portion 432 and a third edge portion 433, a first connection part 436 that connects the first edge portion 431 and the second edge portion 432, and a second connection part 437 that connects the second edge portion 432 and the third edge portion 433. In the sixth embodiment, the first edge portion 431, the second edge portion 432, and the third edge portion 433 all extend linearly. Further, the first connection part 436 is opposite to the inner edge first connection part 346, and the second connection part 437 is opposite to the inner edge second connection part 347.

The first edge portion 431 extends from the first connection part 436 toward the opening edge portion 41 side. For example, the first edge portion 431 extends in the substantially left-right direction D1 toward the opening edge portion 41. The angle formed by the direction in which the first edge portion 431 extends and the left-right direction D1 is, for example, 10° or less. In the example illustrated in FIG. 50, the first edge portion 431 extends linearly up to the opening edge portion 41.

The second edge portion 432 extends to be at least partially displaced to the second side portion 14 side from the first connection part 436 toward the upper portion 11 of the pouch 10. The angle θ2 formed by the direction in which the first edge portion 431 extends and the direction in which the second edge portion 432 extends is greater than 90°. The angle θ2 is, for example, 95° or more and 170° or less.

The third edge portion 433 extends to be at least partially displaced to the first side portion 13 side from the second connection part 437 toward the upper portion 11 of the pouch 10. In the example illustrated in FIG. 50, the third edge portion 433 extends linearly up to the opening edge portion 41.

Next, the dimensions of the first side seal section 30 and the first non-seal section 40 will be described.

In FIG. 50, reference signs W1 and W2 each denote the width of the upper side seal part 31 and the width of the lower side seal part 32. The width W1 of the upper side seal part 31 and the width W2 of the lower side seal part 32 are, for example, 4 mm or more and 15 mm or less.

In FIG. 50, reference signs W7, W8, and W9 denote a width of a portion extending along the first inner edge 341 in the intermediate seal part 33, a width of a portion extending along the second inner edge 342 in the intermediate seal part 33, and a width of a portion extending the third inner edge 343 in the intermediate seal part 33. Preferably, the width W7, the width W8, and the width W9 are smaller than the width W1 of the upper side seal part 31 and the width W2 of the lower side seal part 32. For example, the width W7, the width W8, and the width W9 may be 1 mm or more and 6 mm or less, and may also be 2 mm or more and 6 mm or less. Note that the widths of each portion of the intermediate seal part 33 are dimensions of the intermediate seal part 33 in a direction orthogonal to the direction in which the inner edge of the intermediate seal part 33 extends.

In FIG. 50, reference sign L1 denotes the dimension of the opening edge portion 41 in the vertical direction D2, and reference sign L3 denotes the dimension of the second inner edge 342 in the vertical direction D2. Preferably, the first non-seal section 40 is configured so that the dimension of the first non-seal section 40 in the vertical direction D2 is maximized at the portion that overlaps the first side edge 13x of the first side portions 13 of the pouch 10 in the first non-seal section 40, that is, at the opening edge portion 41. Thereby, the steam can be smoothly discharged from the opening edge portion 41 to the outside. The dimension L1 is, for example, 4 mm or more and 30 mm or less. In addition, the dimension L3 of the second inner edge 342 in the vertical direction D2 is set so that the peeling off of the intermediate seal part 33 does not progress from the inner edge first connection part 346 to the inner edge second connection part 347 during the heating. The dimension L3 is, for example, 4 mm or more and 12 mm or less.

In addition, in FIG. 50, reference sign L4 denotes a dimension of a portion positioned above the second connection part 437 in the inner edge 34 in the vertical direction D2. Preferably, the dimension L4 is larger than the dimension L3 of the second inner edge 342 in the vertical direction D2. Also, preferably, the second connection part 437 is positioned below a middle point of the opening edge portion 41 in the vertical direction D2.

Method for Opening Pouch

Next, a method of opening the above-described pouch 10 will be described. First, the pouch 10 is placed inside the microwave oven in a state where the pouch 10 is self-standing with the lower portion 12 facing down. Next, the contents are heated using the microwave oven. As a result, the temperature of the contents increases, and accordingly, moisture contained in the contents evaporates, and the pressure in the storage section 18 increases.

Figure 53:
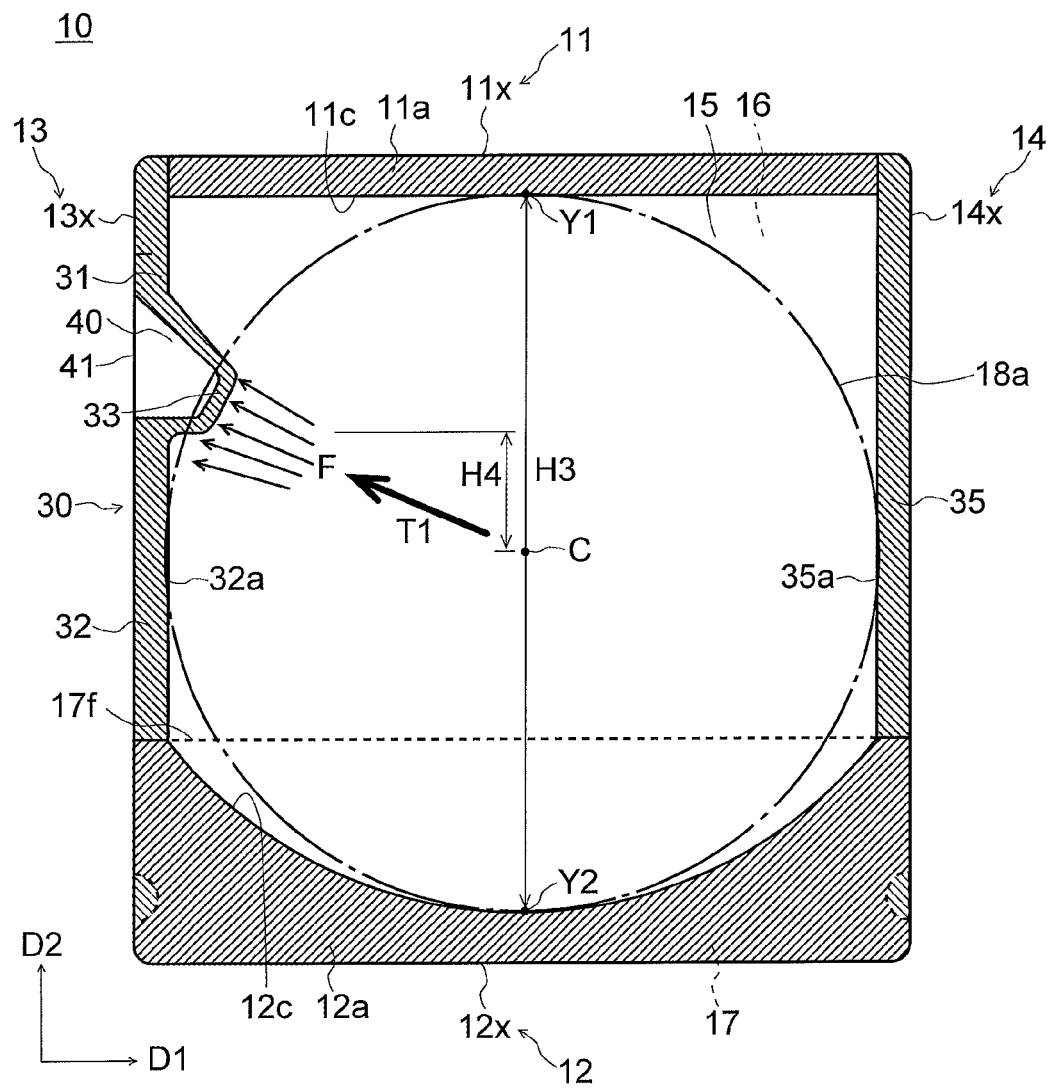
FIG. 53 is a front view illustrating an aspect in which the pouch of FIG. 49 is heated.

When the pressure in the storage section 18 increases, as illustrated by a dashed line denoted by reference numeral 18a in FIG. 53, the pouch 10 expands, for example, in a circular shape around the center point C of the storage section 18. Therefore, a force in a direction from the center point C toward the seal section is applied to each position of the seal section. The force applied to each position of the seal section increases as a distance from the center point C decreases. Here, in the sixth embodiment, the first side seal section 30 includes the intermediate seal part 33 positioned closer to the second side portion 14 side than the inner edge 32a of the lower side seal part 32. Therefore, a force F applied to the intermediate seal part 33 is greater than the force applied to the upper side seal part 31 and the lower side seal part 32. In addition, the distance from the center point C to the inner edge first connection part 346 is smaller than the distance from the center point C to the other inner edge connection part. Therefore, a larger force is applied to the inner edge first connection part 346 than to other inner edge connection parts such as the inner edge second connection part 347.

Figure 54:
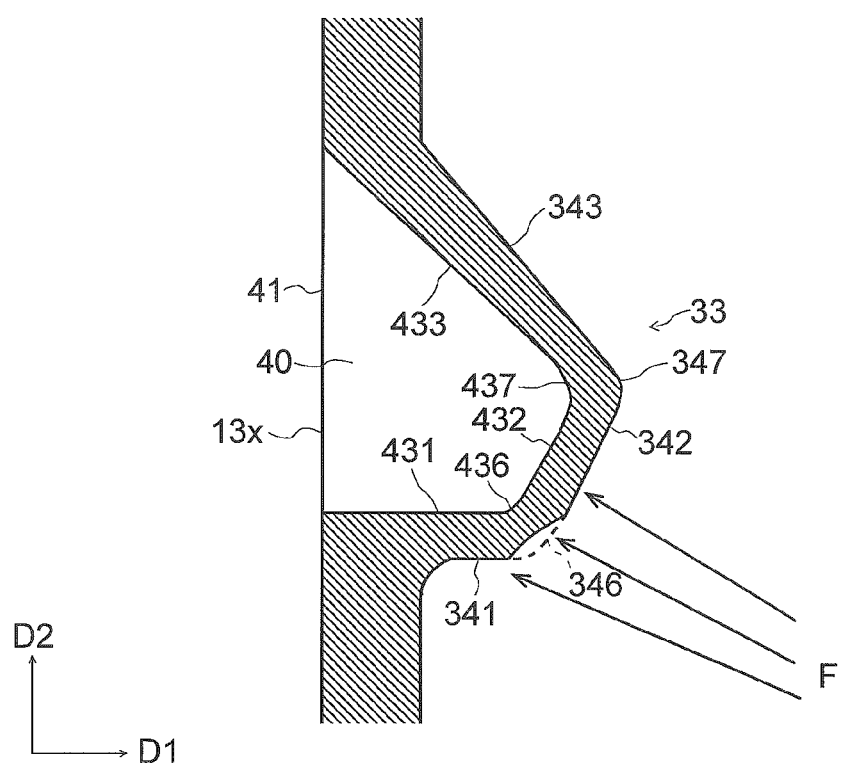
FIG. 54 is a diagram illustrating an aspect in which an intermediate seal part of the first side seal section starts to peel off at the inner edge first connection part.
Figure 55:
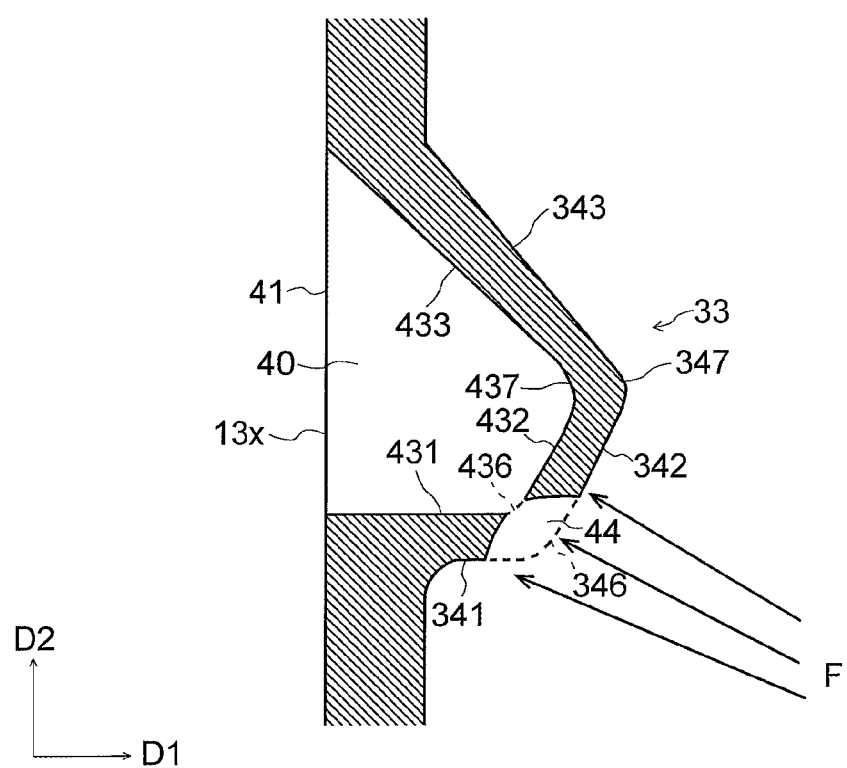
FIG. 55 is a diagram illustrating an aspect in which the peeling off of the intermediate seal part of the first side seal section further proceeds and a storage section communicates with the first non-seal section.

When the force F is applied to the intermediate seal part 33, the peeling off of the intermediate seal part 33 progresses. As illustrated in FIG. 54, the peeling off of the intermediate seal part 33 first occurs at the portion of the inner edge first connection part 346. Thereafter, when the peeling off of the intermediate seal part 33 progresses and reaches the first connection part 436, the storage section 18 can communicate with the first non-seal section 40. FIG. 55 is a diagram illustrating an aspect in which the intermediate seal part is peeled off and the communication port 44 is formed.

Figure 56:
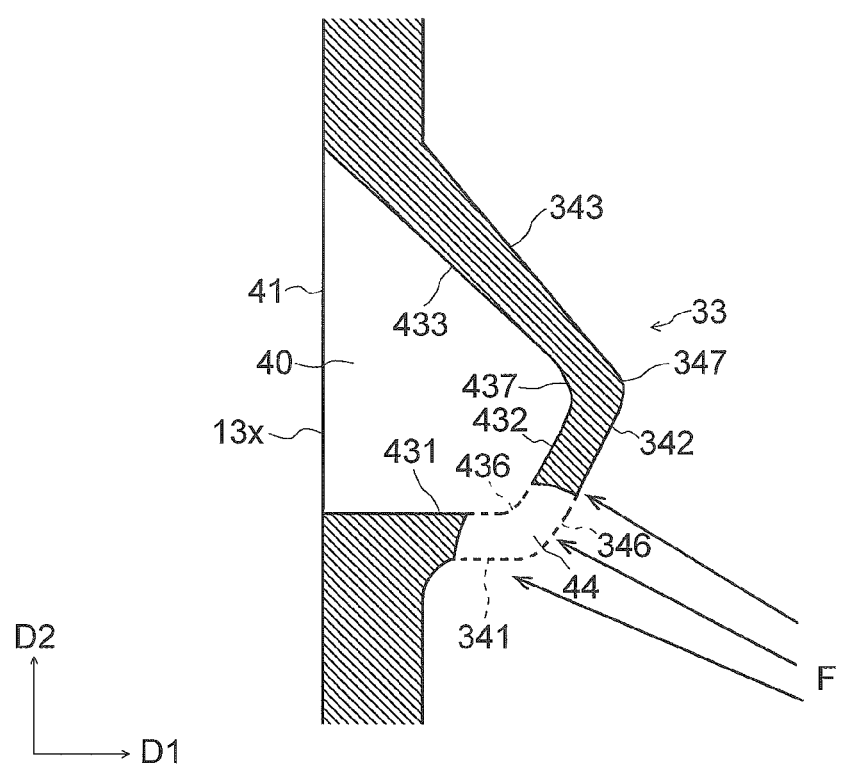
FIG. 56 is a diagram illustrating an aspect in which the peeling off of the intermediate seal part of the first side seal section further proceeds.
Figure 57:
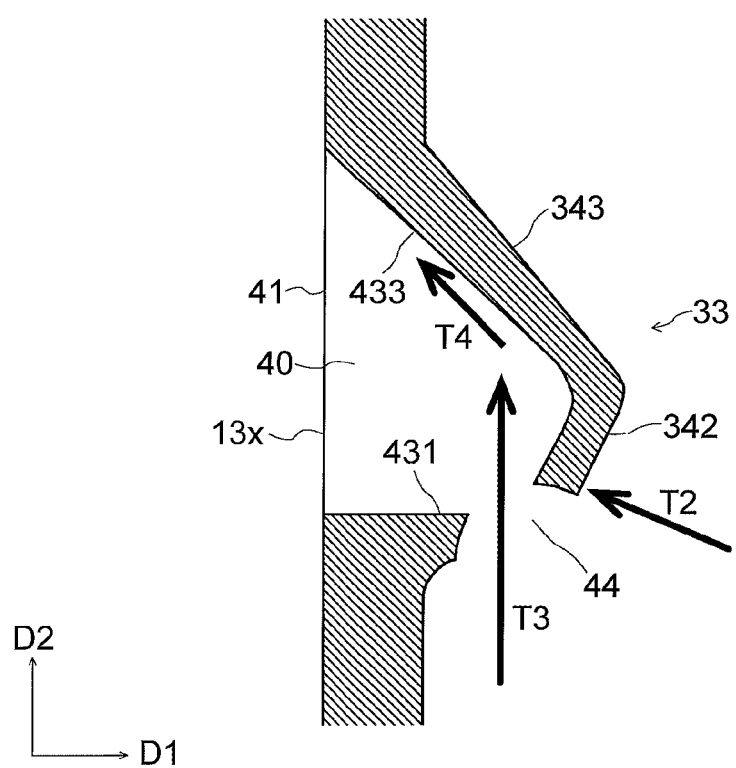
FIG. 57 is a diagram illustrating an aspect in which steam is discharged from the storage section to the first non-seal section.

It is considered that if the communication port 44 becomes too large, not only the steam in the storage section 18 but also the contents may leak to the outside of the pouch 10 through the communication port 44. Therefore, from the viewpoint of preventing the contents from leaking, it is preferable to suppress the communication port 44 from becoming too large. In the sixth embodiment, the second inner edge 342 extends to be at least partially displaced to the second side portion 14 side from the inner edge first connection part 346 toward the upper portion 11 of the pouch 10. For this reason, the angle (θ12 described above) formed by the direction from the center point C of the storage section 18 toward the inner edge first connection part 346 and the direction in which the second inner edge 342 extends is large. Thereby, the peeling off of the intermediate seal part 33 can be suppressed from progressing in the direction along the second inner edge 342. Therefore, as illustrated in FIG. 56, it is possible to suppress the communication port 44 from expanding at the portion along the second inner edge 342. As a result, as shown by the arrow T2 in FIG. 57, it is possible to suppress the contents having a velocity component in the left-right direction D1 from leaking outside through the communication port 44.

Further, in the sixth embodiment, the angle θ11 formed by the direction from the center point C of the storage section 18 toward the inner edge first connection part 346 and the direction in which the first inner edge 341 extends is smaller than the angle θ12 formed by the direction from the center point C of the storage section 18 toward the inner edge first connection part 346 and the direction in which the second inner edge 342 extends. Therefore, the peeling off of the portion extending along the first inner edge 341 in the intermediate seal part 33 is more likely to progress than the portion of the intermediate seal part 33 extending along the second inner edge 342. As a result, as illustrated in FIG. 56, the communication port 44 can be formed larger in the portion along the first inner edge 341 than in the portion along the second inner edge 342 in the intermediate seal part 33. As a result, as shown by an arrow T3 in FIG. 57, the steam that is generated in the storage section 18 and has a velocity component of the vertical direction D2 tends to easily flow into the first non-seal section 40 through the communication port 44.

In addition, in the sixth embodiment, the third edge portion 433 of the first non-seal section 40 extends to be at least partially displaced to the first side portion 13 side from the second connection part 437 toward the upper portion 11 of the pouch 10. Therefore, as shown by an arrow T4 in FIG. 57, the steam that flows into the first non-seal section 40 through the communication port 44 and has the velocity component in the vertical direction D2 is smoothly guided to the opening edge portion 41 along the third edge portion 433. In the following description, like the third edge portion 433 in the sixth embodiment, the portion that is positioned near the upper side seal part 31 in the edge portion 43 of the first non-seal section 40 and extends to be displaced to the first side portion 13 toward the upper portion 11 of the pouch 10 is referred to as the guide edge portion. The guide edge portion preferably extends to reach the first side edge 13x of the first side portion 13, that is, to reach the opening edge portion 41, like the third edge portion 433 in the present embodiment.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

First Modified Example

Figure 58:
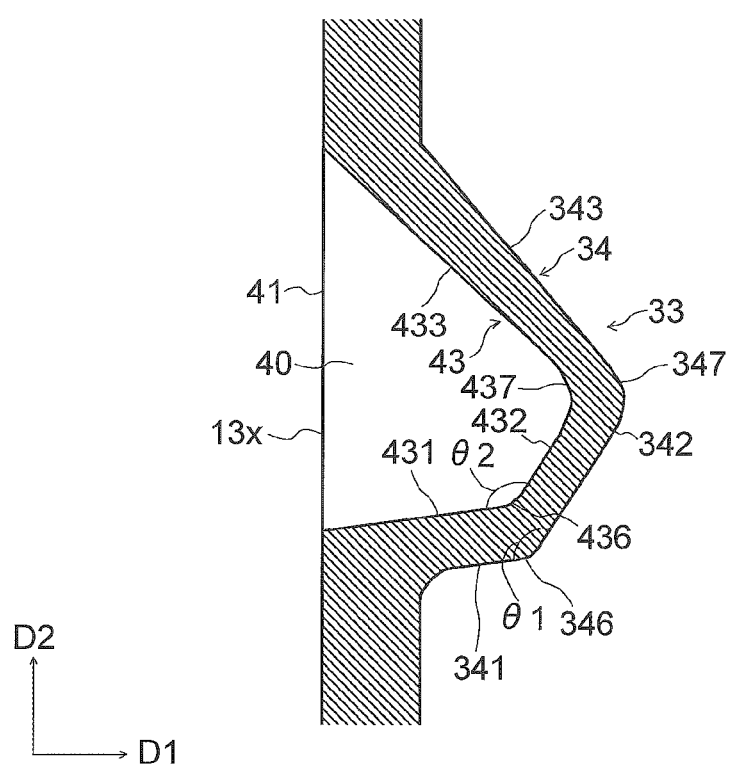
FIG. 58 is a front view of a modified example of the intermediate seal part of the first side seal section and the first non-seal section according to the sixth embodiment.

In the above-described embodiment, an example has been described in which the first inner edge 341 of the inner edge 34 of the intermediate seal part 33 extends substantially in the left-right direction D1 from the inner edge first connection part 346 toward the lower side seal part 32. However, the present invention is not limited thereto, and for example, as illustrated in FIG. 58, the first inner edge 341 may extend to be displaced to the lower portion 12 side from the inner edge first connection part 346 toward the lower side seal part 32. The angle θ1 formed by the direction in which the first inner edge 341 extends and the direction in which the second inner edge 342 extends is, for example, 95° or more and 170° or less.

Second Modified Example

Figure 59:
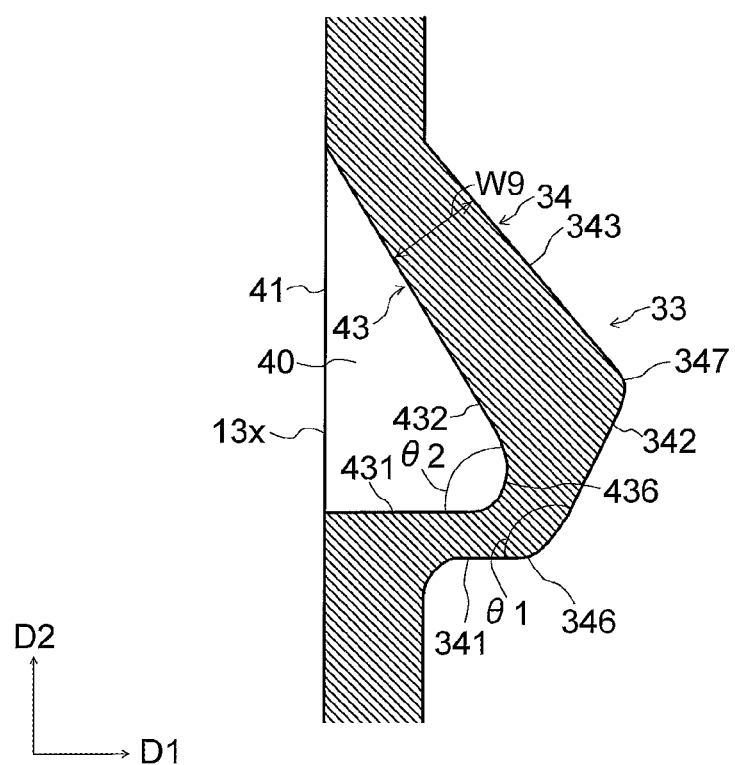
FIG. 59 is a front view of a modified example of the intermediate seal part of the first side seal section and the first non-seal section according to the sixth embodiment.

In the above-described embodiment, an example has been described in which the width of the intermediate seal part 33 is substantially the same regardless of the position. In other words, an example has been described in which the inner edge 34 of the intermediate seal part 33 and the edge portion 43 of the first non-seal section 40 extend substantially in parallel. However, the present embodiment is not limited thereto, and the width of the intermediate seal part 33 may change according to the position. For example, as illustrated in FIG. 59, the width W9 of the portion corresponding to the third inner edge 343 in the intermediate seal part 33 at least partially increases from the first side portion 13 side toward the inner edge second connection part 347 side. Thereby, the progress of the peeling off of the intermediate seal part 33 between the inner edge first connection part 346 and the upper side seal part 31 can be suppressed. Note that in the example illustrated in FIG. 59, the second edge portion 432 of the edge portion 43 of the first non-seal section 40 extends linearly to be displaced to the first side portion 13 from the first connection part 436 toward the upper portion 11 of the pouch 10, and reaches the opening edge portion 41.

Third Modified Example

Figure 60:
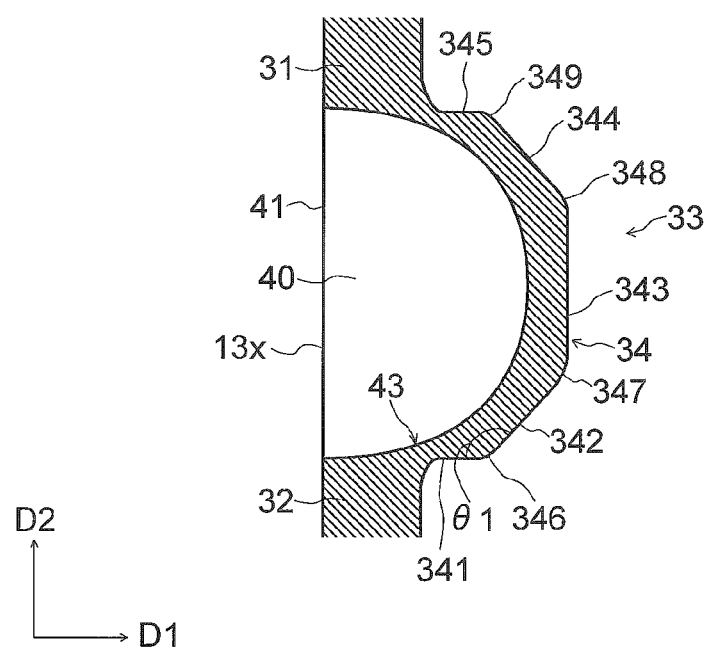
FIG. 60 is a front view of a modified example of the intermediate seal part of the first side seal section and the first non-seal section according to the sixth embodiment.

In the example illustrated in FIG. 60, the inner edge 34 of the intermediate seal part 33 includes a first inner edge 341, a second inner edge 342, a third inner edge 343, a fourth inner edge 344, a fifth inner edge 345, an inner edge first connection part 346 that connects the first inner edge 341 and the second inner edge 342, an inner edge second connection part 347 that connects the second inner edge 342 and the third inner edge 343, an inner edge third connection part 348 that connects the third inner edge 343 and the fourth inner edge 344, and an inner edge fourth connection part 349 that connects the fourth inner edge 344 and the fifth inner edge 345. As in the same manner as in the sixth embodiment and each modified example, the second inner edge 342 extends to be at least partially displaced to the second side portion 14 side from the inner edge first connection part 346 toward the upper portion 11 of the pouch 10. Thereby, the progress of the peeling off of the intermediate seal part 33 between the inner edge first connection part 346 and the upper side seal part 31 can be suppressed.

In the example illustrated in FIG. 60, the third inner edge 343 extends linearly in the substantially vertical direction D2 from the inner edge second connection part 347 toward the upper portion 11 of the pouch 10. The fourth inner edge 344 extends linearly to be displaced to the first side portion 13 side from the inner edge third connection part 348 toward the upper portion 11 of the pouch 10. The fifth inner edge 345 extends linearly in the substantially left-right direction D1 from the inner edge fourth connection part 349 toward the upper side seal part 31.

In the example illustrated in FIG. 60, the edge portion 43 of the first non-seal section 40 has a curved shape, for example, a semicircular shape. In this case, the upper portion of the edge portion 43 can function as the guide edge portion for guiding the steam flowing into the first non-seal section 40 to the opening edge portion 41.

Fourth Modified Example

Figure 61:
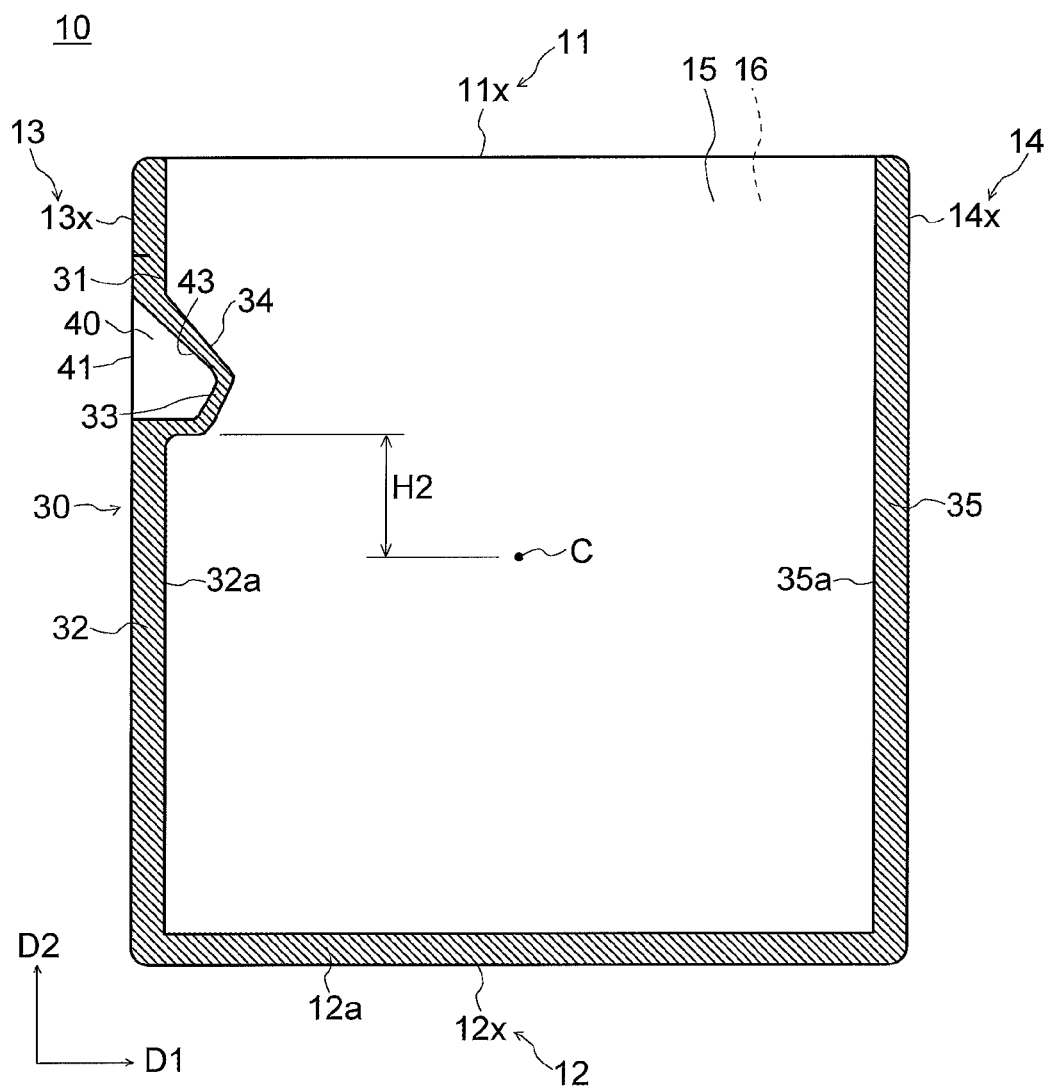
FIG. 61 is a front view illustrating a modified example of the pouch according to the sixth embodiment.

In the above-described embodiment, an example has been described in which the pouch 10 is a gusset-type pouch including the front surface film 15, the back surface film 16, and the lower film 17. However, the present embodiment is not limited thereto, and as illustrated in FIG. 61, the pouch 10 may be a so-called flat pouch including the front surface film 15 and the back surface film 16. In this case, the pouch 10 is heated by the microwave oven in the state in which the posture of the pouch 10 is maintained so that the intermediate seal part 33 is positioned above the center point C of the storage section 18 in the vertical direction. For example, when the pouch 10 is sold in a state of being stored in a paper box (not illustrated), the box can be used to maintain the pouch 10 in a predetermined posture.

Note that although some modified examples with respect to the above-described embodiment have been described, a plurality of modified examples can be appropriately combined and applied.

Seventh Embodiment

Next, a seventh embodiment of the present invention will be described. In the same manner as in each of the above-described embodiments, a pouch (bag) according to the seventh embodiment also includes a steam-releasing mechanism that automatically releases steam generated by heating in a microwave oven to an outside of the pouch.

First, a problem to be solved by the seventh embodiment will be described.

In a pouch of a type in which steam is discharged to the outside from the opening of the side edge of the pouch, if the steam stays in the non-seal section, the opening may be closed. An object of the seventh embodiment provides a pouch that can effectively solve such a problem.

Next, means for solving the problem will be described.

According to the seventh embodiment, a pouch in which a storage section storing contents is defined between a front surface film and a back surface film includes: a first side seal section that is positioned on a first side portion of the pouch and joins an inner surface of the front surface film and an inner surface of the back surface film; a second side seal section that is positioned at a second side portion opposite to the first side portion of the pouch and defines the storage section between the first side seal section and the second side seal section; a lower seal section that is connected to the first side seal section and the second side seal section; and a first non-seal section that is positioned near an upper portion of the pouch, isolated from the storage section by the first side seal section, and extends to reach a first side edge of the first side portion of the pouch, in which the first side seal section includes an upper side seal part that extends along the first side portion from the first non-seal section toward the upper portion of the pouch, a lower side seal part that extends along the first side portion from the first non-seal section toward a lower portion of the pouch, and an intermediate seal part that has one end connected to the upper side seal part and the other end connected to the lower side seal part, and is positioned between the storage section and the first non-seal section, the inner edge of the intermediate seal part includes a first inner edge, a second inner edge, and an inner edge first connection part that is positioned near the lower side seal part and connects the first inner edge and the second inner edge, the first inner edge extends from the inner edge first connection part to the lower side seal part side, the second inner edge extends from the inner edge first connection part to an upper portion side of the pouch, and the edge portion of the first non-seal section includes a first connection part that is positioned to be opposite to the inner edge first connection part and a guide edge portion that is positioned closer to the upper portion side of the pouch than the first connection part and extends to be at least partially displaced to the first side portion side toward the upper portion of the pouch.

In the pouch according to the seventh embodiment, the guide edge portion may extend to reach the first side edge of the first side portion.

In the pouch according to the seventh embodiment, the guide edge portion may extend linearly.

In the pouch according to the seventh embodiment, the guide edge portion may at least partially include a shape that is convex from the first non-seal section side toward the storage section.

In the pouch according to the seventh embodiment, the guide edge portion may be at least partially curved.

In the pouch according to the seventh embodiment, the edge portion of the first non-seal section includes a first edge portion and a second edge portion connected by the first connection part, the first edge portion extends from the first connection part to the first side edge, the second edge portion extends to be at least partially displaced to the first side portion side from the first connection part toward the upper portion of the pouch, and may function as the guide edge portion.

According to the seventh embodiment, it is possible to prevent the steam flowing from the storage section into the non-seal section from staying.

Hereinafter, the seventh embodiment will be described in detail. The pouch 10 according to the seventh embodiment is substantially the same as the pouch 10 according to the above-described sixth embodiment except for the shapes of the intermediate seal part 33 and the first non-seal section 40. In the following description and the drawings used in the following description, parts that can be configured in the same manner as in the sixth embodiment described above are denoted by the same reference numerals used for corresponding parts in the above-described sixth embodiment, and a duplicate description thereof will be omitted. In addition, when it is clear that the action and effect obtained in the above-described sixth embodiment can be obtained also in the modified example, the description thereof may be omitted.

Pouch

Figure 62:
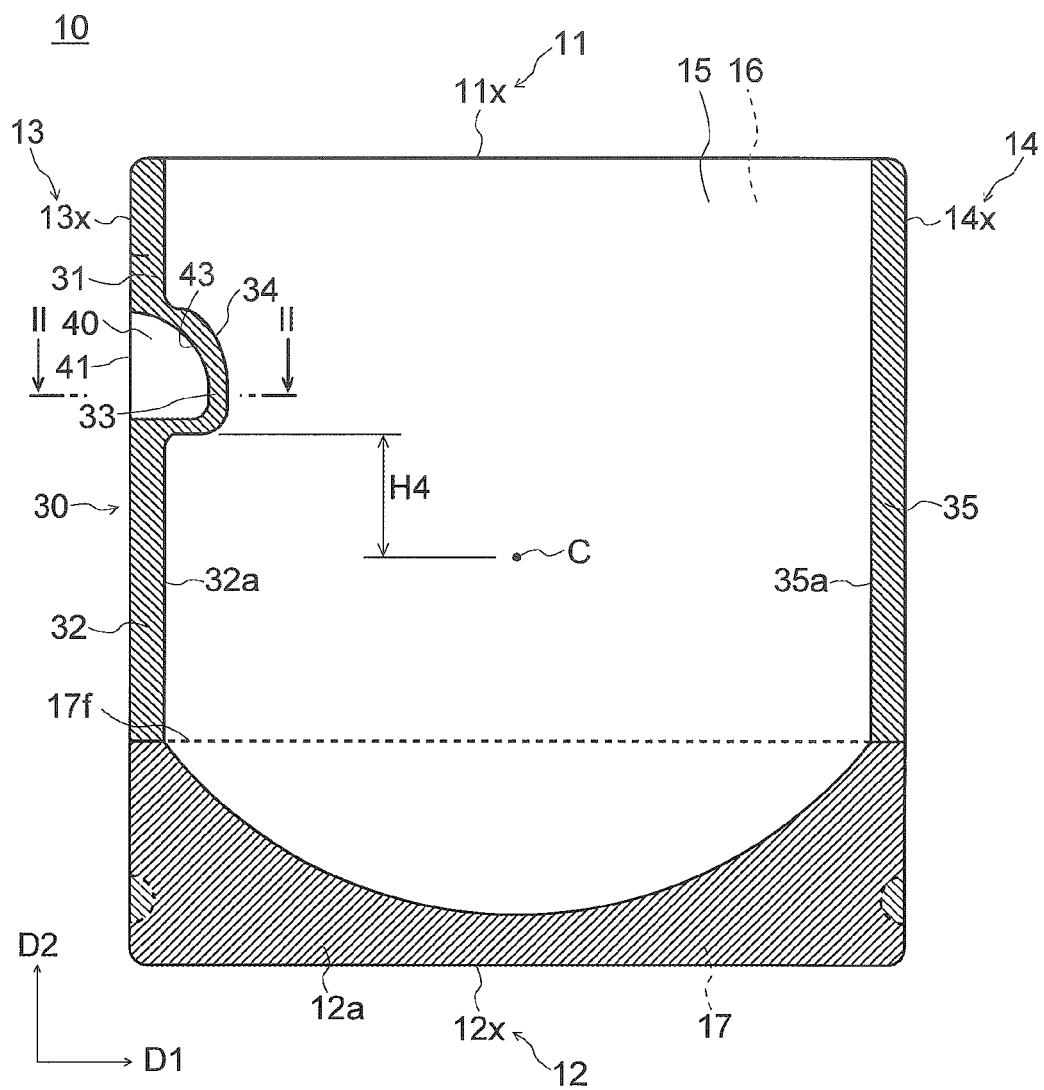
FIG. 62 is a front view illustrating a pouch according to a seventh embodiment.

FIG. 62 is a front view illustrating the pouch 10 according to the seventh embodiment as viewed from the front side. In the seventh embodiment, the pouch 10 is a bottom gusset-type pouch configured to be self-standing.

Figure 63:
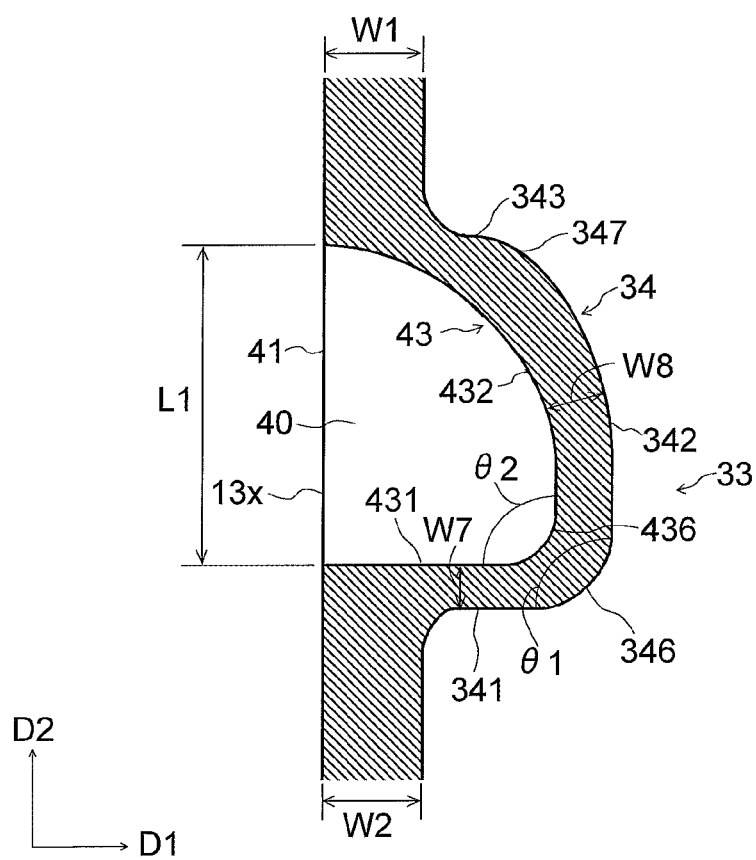
FIG. 63 is an enlarged front view of an intermediate seal part of a first side seal section and a first non-seal section of the pouch of FIG. 62.
Figure 64:
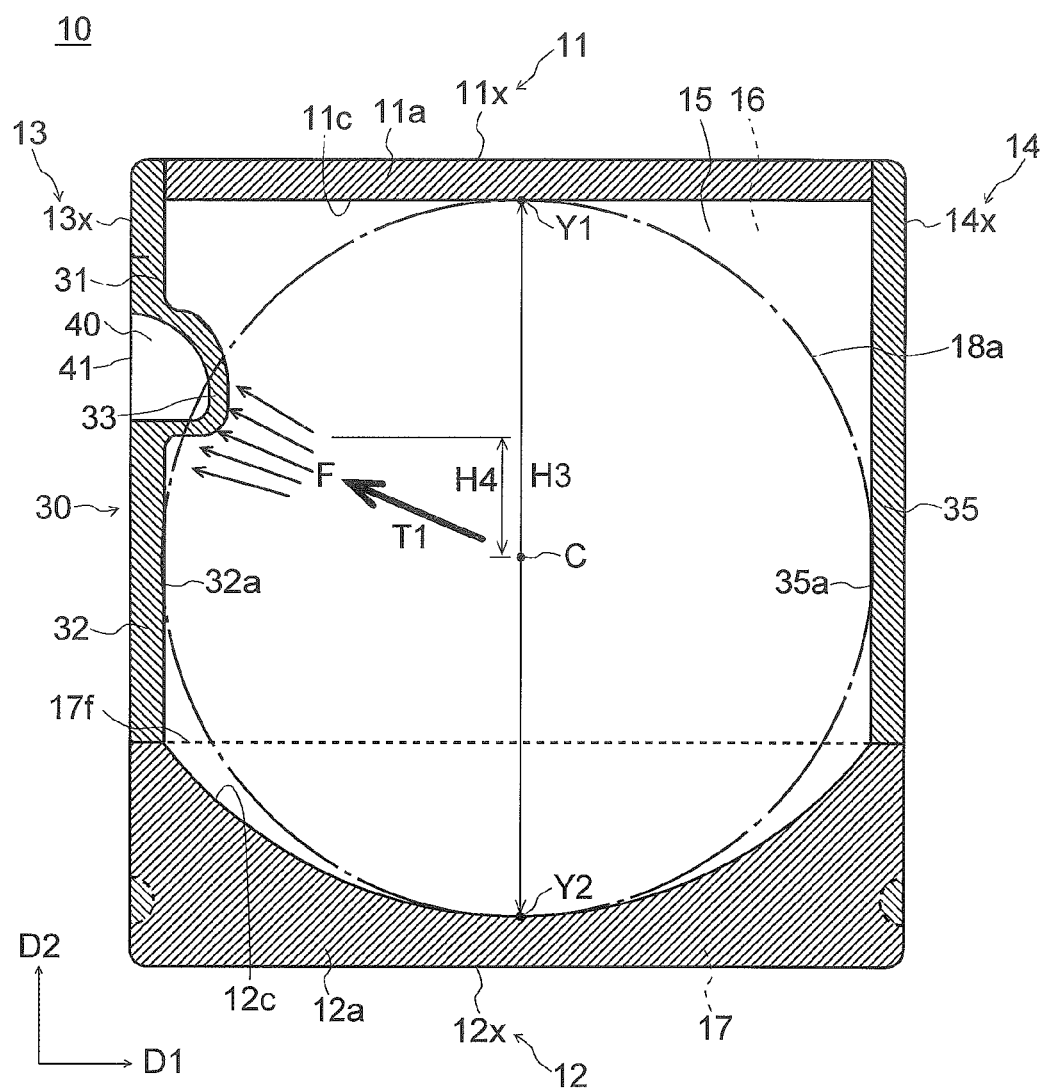
FIG. 64 is a front view illustrating an aspect in which the pouch of FIG. 62 is heated.

FIG. 63 is an enlarged front view illustrating the intermediate seal part 33 and the first non-seal section 40 of the first side seal section 30 of the pouch 10. In the seventh embodiment, the inner edge 34 of the intermediate seal part 33 includes a first inner edge 341, a second inner edge 342 and a third inner edge 343, an inner edge first connection part 346 that connects the first inner edge 341 and the second inner edge 342, and an inner edge second connection part 347 that connects the second inner edge 342 and the third inner edge 343.

The first inner edge 341 extends from the inner edge first connection part 346 to the lower side seal part 32 side. The first inner edge 341 may extend linearly as illustrated in FIG. 63. For example, the first inner edge 341 extends in a substantially left-right direction D1 toward the lower side seal part 32. An angle formed by a direction in which the first inner edge 341 extends and the left-right direction D1 is, for example, 10° or less. As illustrated in FIG. 63, the first inner edge 341 may be connected to the inner edge of the lower side seal part 32.

The second inner edge 342 extends to be at least partially displaced to the second side portion 14 side from the inner edge first connection part 346 toward the upper portion 11 of the pouch 10. An angle θ1 formed by the direction in which the first inner edge 341 in the inner edge first connection part 346 extends and the direction in which the second inner edge 342 in the inner edge first connection part 346 extends is, for example, 30° or more and 120° or less.

The second inner edge 342 may at least partially include a shape that is convex from the first non-seal section 40 side toward the storage section 18. In the example illustrated in FIG. 63, the second inner edge 342 includes a shape that is entirely convex from the first non-seal section 40 side toward the storage section 18 side. In addition, the second inner edge 342 may be at least partially curved as illustrated in FIG. 63.

A third inner edge 343 extends from the inner edge second connection part 347 to the upper side seal part 31 side. The third inner edge 343 may extend linearly as illustrated in FIG. 63. For example, the third inner edge 343 extends in a substantially left-right direction D1 toward the upper side seal part 31. An angle formed by a direction in which the third inner edge 343 extends and the left-right direction D1 is, for example, 10° or less. As illustrated in FIG. 63, the first inner edge 341 may also be connected to the inner edge of the upper side seal part 31.

As in the same manner as the sixth embodiment, the inner edge connection parts such as the inner edge first connection part 346 and the inner edge second connection part 347 are defined as portions where the direction in which the inner edge 34 extends changes.

The inner edge first connection part 346 is positioned near the lower side seal part 32. In addition, the inner edge first connection part 346 is configured so that a distance from the center point C of the storage section 18 to the inner edge first connection part 346 is smaller than a distance from the center point C of the storage section 18 to the other inner edge connection part. For example, in the seventh embodiment, the distance from center point C to the inner edge first connection part 346 is smaller than the distance from the center point C to the inner edge second connection part 347. For this reason, the peeling off of the inner edge connection part that occurs when the pouch 10 is heated tends to first occur in the inner edge first connection part 346.

Next, the edge portion of the first non-seal section 40 will be described. The edge portion of the first non-seal section 40 includes an opening edge portion 41 positioned at the first side edge 13x of the first side portions 13 and an edge portion 43 on the seal section side that is defined by the lower edge of the upper side seal part 31, the lower edge of the lower side seal part 32, and the outer edge of the intermediate seal part 33. In the present embodiment, as illustrated in FIG. 63, the edge portion 43 on the seal section side includes a first edge portion 431 and a second edge portion 432, and a first connection part 436 connecting the first edge portion 431 and the second edge portion 432. The first connection part 436 is opposite to the inner edge first connection part 346.

The first edge portion 431 extends from the first connection part 436 toward the opening edge portion 41 side. For example, the first edge portion 431 extends in the substantially left-right direction D1 toward the opening edge portion 41. The angle formed by the direction in which the first edge portion 431 extends and the left-right direction D1 is, for example, 10° or less. In the example illustrated in FIG. 63, the first edge portion 431 extends linearly up to the opening edge portion 41.

The second edge portion 432 is connected to the first connection part 436 so that the second edge portion 432 is positioned on the upper portion 11 side of the first connection part 436. In addition, the second edge portion 432 extends to be at least partially displaced to the first side portion 13 from the first connection part 436 toward the upper portion 11 of the pouch 10. Therefore, the second edge portion 432 can function as the guide edge portion for guiding the steam flowing into the first non-seal section 40 to the opening edge portion 41. An angle θ2 formed by the direction in which the first edge portion 431 in the first connection part 436 extends and the direction in which the second edge portion 432 in the first connection part 436 extends is, for example, 30° or more and 120° or less.

The second edge portion 432 may at least partially include a shape that is convex from the first non-seal section 40 side toward the storage section 18. In the example illustrated in FIG. 63, the second edge portion 432 includes a shape that is entirely convex from the first non-seal section 40 side toward the storage section 18 side.

In addition, the second edge portion 432 may be at least partially curved. In the example illustrated in FIG. 63, the second edge portion 432 extends so that the curved portion reaches the opening edge portion 41. An angle θ20 (see FIG. 63) formed by a direction D21 in which the second edge portion 432 extends at the end portion on the first connection part 436 side of the second edge portion 432 and a direction D22 in which the second edge portion 432 extends at the end portion on the opening edge portion 41 side of the second edge portion 432 is, for example, 10° or more and 90° or less. A progressing direction of the steam flowing into the first non-seal section 40 and flowing along the second edge portion 432 can be changed by the angle θ20 by the second edge portion 432.

Next, the dimensions of the first side seal section 30 and the first non-seal section 40 will be described.

In FIG. 63, reference signs W1 and W2 each denote the width of the upper side seal part 31 and the width of the lower side seal part 32. The width W1 of the upper side seal part 31 and the width W2 of the lower side seal part 32 are, for example, 4 mm or more and 15 mm or less.

In FIG. 63, reference signs W7 and W8 each represent the width of the portion extending along the first inner edge 341 in the intermediate seal part 33 and the width of the portion extending along the second inner edge 342 in the intermediate seal part 33. Preferably, the width W7 and the width W8 are smaller than the width W1 of the upper side seal part 31 and the width W2 of the lower side seal part 32. For example, the width W7 and the width W8 may be 1 mm or more and 6 mm or less, and may also be 2 mm or more and 6 mm or less. Note that the widths of each portion of the intermediate seal part 33 are dimensions of the intermediate seal part 33 in a direction orthogonal to the direction in which the inner edge 34 of the intermediate seal part 33 extends.

In FIG. 63, reference sign L1 denotes the dimension of the opening edge portion 41 in the vertical direction D2. Preferably, the first non-seal section 40 is configured so that the dimension of the first non-seal section 40 in the vertical direction D2 is maximized at the portion that overlaps the first side edge 13x of the first side portions 13 of the pouch 10 in the first non-seal section 40, that is, at the opening edge portion 41. Thereby, the steam can be smoothly discharged from the opening edge portion 41 to the outside. The dimension L1 is, for example, 4 mm or more and 30 mm or less.

Method for Opening Pouch

Next, a method of opening the above-described pouch 10 will be described. First, the pouch 10 is placed inside the microwave oven in a state where the pouch 10 is self-standing with the lower portion 12 facing down. Next, the contents are heated using the microwave oven. As a result, the temperature of the contents increases, and accordingly, moisture contained in the contents evaporates, and the pressure in the storage section 18 increases.

Figure 65:
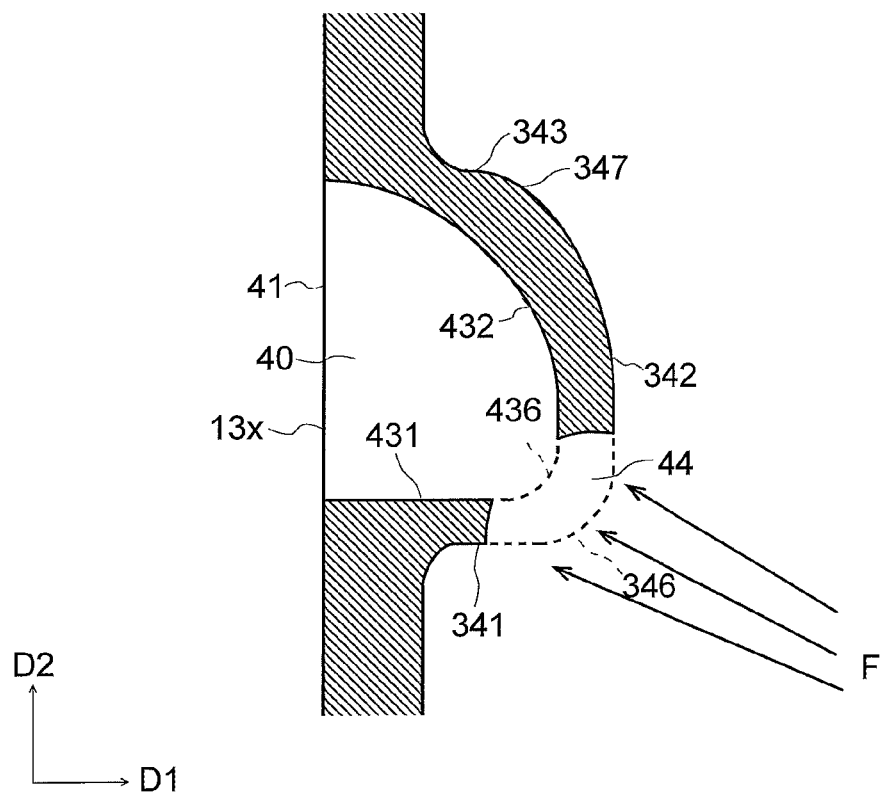
FIG. 65 is a diagram illustrating an aspect in which an intermediate seal part of a first side seal section peels off at an inner edge first connection part and a storage section communicates with a first non-seal section.

When the pressure in the storage section 18 increases, as illustrated by a dashed line denoted by reference numeral 18a in FIG. 65, the pouch 10 expands, for example, in a circular shape around the center point C of the storage section 18. Therefore, a force in a direction from the center point C toward the seal section is applied to each position of the seal section. The force applied to each position of the seal section increases as a distance from the center point C decreases. Here, in the seventh embodiment, the first side seal section 30 includes the intermediate seal part 33 positioned closer to the second side portion 14 side than the inner edge 32a of the lower side seal part 32. Therefore, a force F applied to the intermediate seal part 33 is greater than the force applied to the upper side seal part 31 and the lower side seal part 32. In addition, the distance from the center point C to the inner edge first connection part 346 is smaller than the distance from the center point C to the other inner edge connection part. Therefore, a larger force is applied to the inner edge first connection part 346 than to other inner edge connection parts such as the inner edge second connection part 347.

When the force F is applied to the intermediate seal part 33, the peeling off of the intermediate seal part 33 progresses. The peeling off of the intermediate seal part 33 first occurs at the portion of the inner edge first connection part 346. Thereafter, when the peeling off of the intermediate seal part 33 progresses to reach the first connection part 436, as illustrated in FIG. 65, a communication port 44 through which the storage section 18 communicates with the first non-seal section 40 is formed in the intermediate seal part 33.

Figure 66:
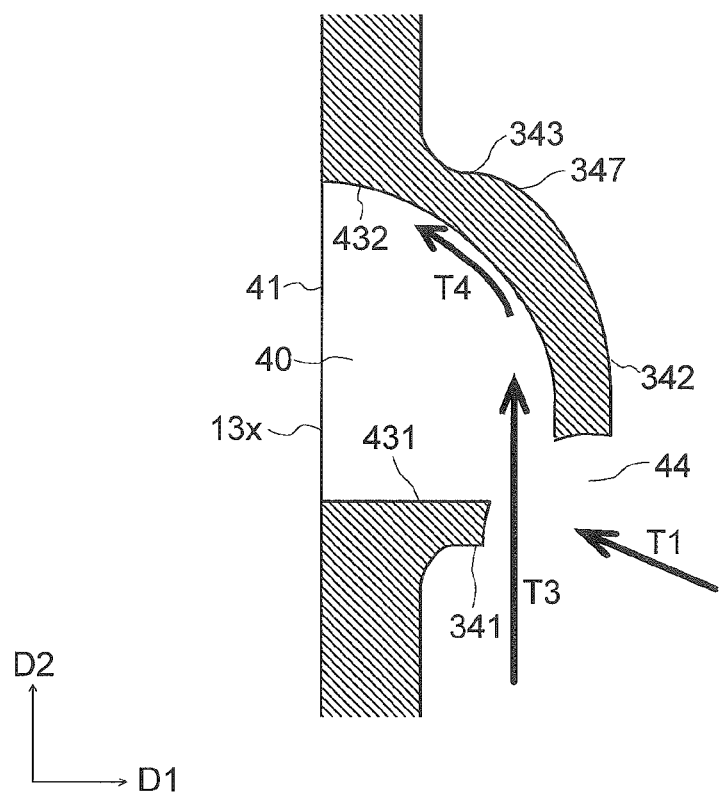
FIG. 66 is a diagram illustrating an aspect in which steam is discharged from the storage section to the first non-seal section.

When the communication port 44 is formed in the intermediate seal part 33, as illustrated in FIG. 66, the steam in the storage section 18 flows into the first non-seal section 40 via the communication port 44. In FIG. 66, reference sign T1 denotes steam flowing from the center point C of the storage section 18 toward the intermediate seal part 33. The steam T1 that has flowed into the first non-seal section 40 is discharged from the opening edge portion 41 to the outside.

The steam flowing from the storage section 18 into the first non-seal section 40 includes steam T3 flowing into the vertical direction D2 as illustrated in FIG. 66, in addition to the above-described steam T1 flowing from the center point C of the storage section 18 toward the intermediate seal part 33. After flowing into the first non-seal section 40 via the communication port 44, the steam T3 reaches the second edge portion 432 of the first non-seal section 40. In the seventh embodiment, the second edge portion 432 extends to be at least partially displaced to the first side portion 13 side from the first connection part 436 toward the upper portion 11 of the pouch 10. Therefore, as illustrated by an arrow T4 in FIG. 66, steam T4 can be smoothly guided to the opening edge portion 41 along the second edge portion 432. For this reason, it is possible to suppress the steam from staying in the first non-seal section 40, and thus to prevent the opening edge portion 41 from being closed.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

First Modified Example

Figure 67:
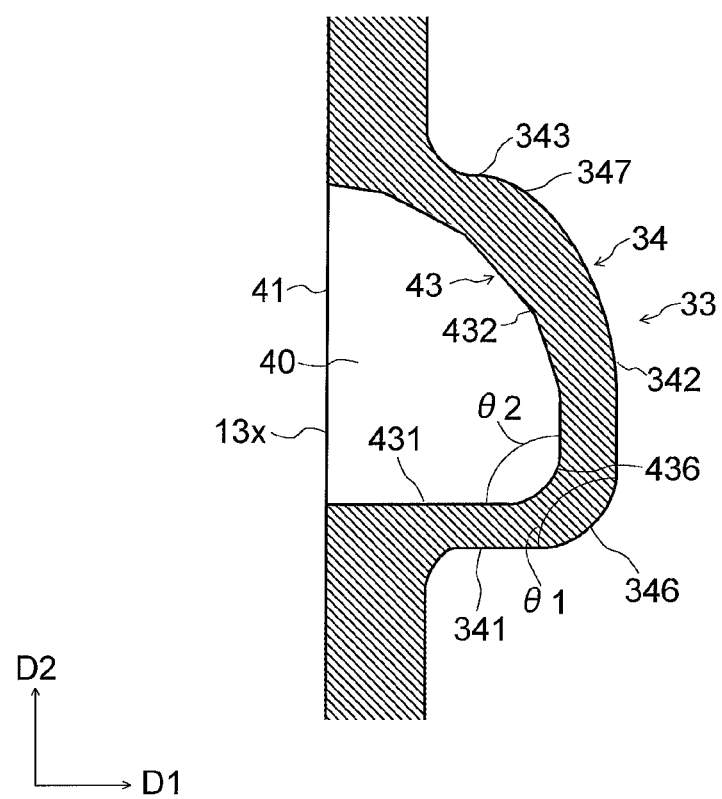
FIG. 67 is a front view of a modified example of the intermediate seal part of the first side seal section and the first non-seal section according to the seventh embodiment.

In the above-described seventh embodiment, an example has been described in which the second edge portion 432 functioning as the guide edge portion in the edge portion 43 of the first non-seal section 40 has a curved shape that is convex from the first non-seal section 40 side toward the storage section 18 side. However, the shape that is convex from the first non-seal section 40 side toward the storage section 18 side is not limited to the curved shape. For example, as illustrated in FIG. 67, the second edge portion 432 may be configured by consecutively connecting a plurality of linear segments so as to be convex from the first non-seal section 40 side toward the storage section 18 side. The second edge portion 432 illustrated in FIG. 67 can also guide the steam flowing into the first non-seal section 40 to the opening edge portion 41 along the second edge portion 432.

Note that, in the second edge portion 432 illustrated in FIG. 67, an angle formed by the two continuous line segments is less than 45°. Therefore, the second edge portion 432 does not include the above-described angle change point.

Second Modified Example

Figure 68:
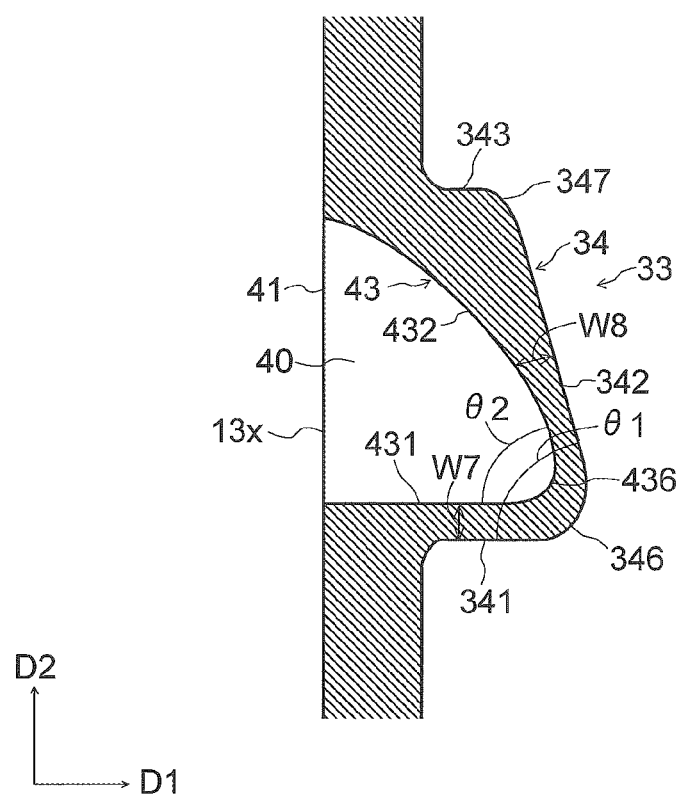
FIG. 68 is a front view of a modified example of the intermediate seal part of the first side seal section and the first non-seal section according to the seventh embodiment.

In the above-described embodiment, an example has been described in which the width of the intermediate seal part 33 is substantially the same regardless of the position. In other words, an example has been described in which the inner edge 34 of the intermediate seal part 33 and the edge portion 43 of the first non-seal section 40 extend substantially in parallel. However, the present embodiment is not limited thereto, and the width of the intermediate seal part 33 may change according to the position. For example, as illustrated in FIG. 68, a width W8 of the portion corresponding to the second inner edge 342 in the intermediate seal part 33 may at least partially increase from the inner edge first connection part 346 side toward the upper portion 11. Thereby, the progress of the peeling off of the intermediate seal part 33 between the inner edge first connection part 346 and the upper side seal part 31 can be suppressed.

Third Modified Example

Figure 69:
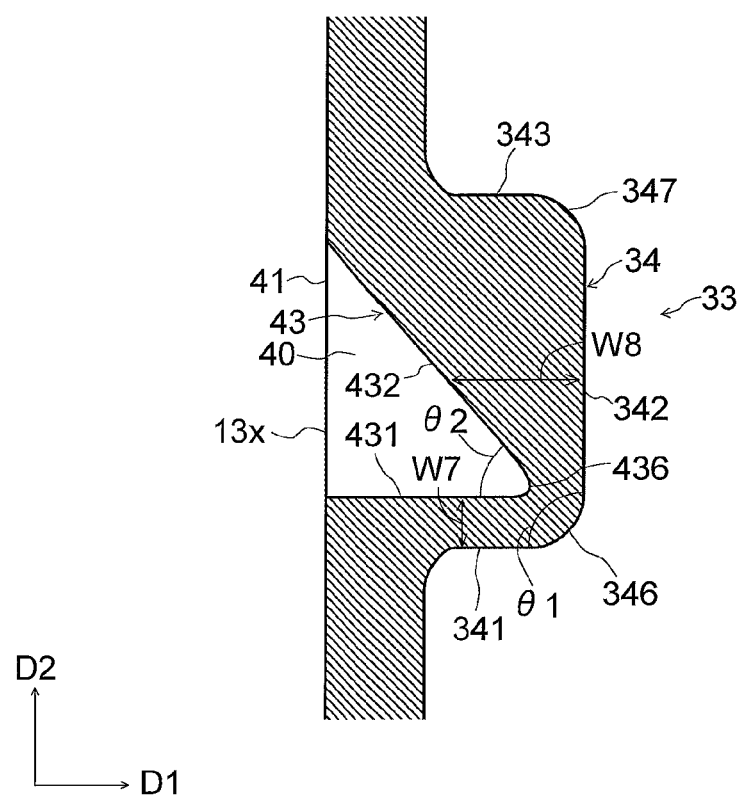
FIG. 69 is a front view of a modified example of the intermediate seal part of the first side seal section and the first non-seal section according to the seventh embodiment.

In the above-described seventh embodiment and each modified example, an example has been described in which the second edge portion 432 functioning as the guide edge portion at the edge portion 43 of the first non-seal section 40 has a curved shape that is convex from the first non-seal section 40 side toward the storage section 18 side. However, the present embodiment is not limited thereto, and illustrated in FIG. 69, the second edge portion 432 functioning as the guide edge portion linearly extends to be displaced to the first side portion 13 from the first connection part 436 toward the upper portion 11 of the pouch 10. Even in this case, the second edge portion 432 can also guide the steam flowing into the first non-seal section 40 to the opening edge portion 41 along the second edge portion 432. As illustrated in FIG. 69, the second edge portion 432 may extend linearly up to the opening edge portion 41.

Even in the modified example, in the same manner as in the above-mentioned modified example illustrated in FIG. 68, a width W8 of the portion corresponding to the second inner edge 342 in the intermediate seal part 33 may at least partially increase from the inner edge first connection part 346 side toward the upper portion 11. In the example shown in FIG. 69, the second inner edge 342 extends from the inner edge first connection part 346 toward the upper portion 11 in the substantially vertical direction D2. An angle formed by a direction in which the second inner edge 342 extends and the vertical direction D2 is, for example, 50 or less.

Fourth Modified Example

Figure 70:
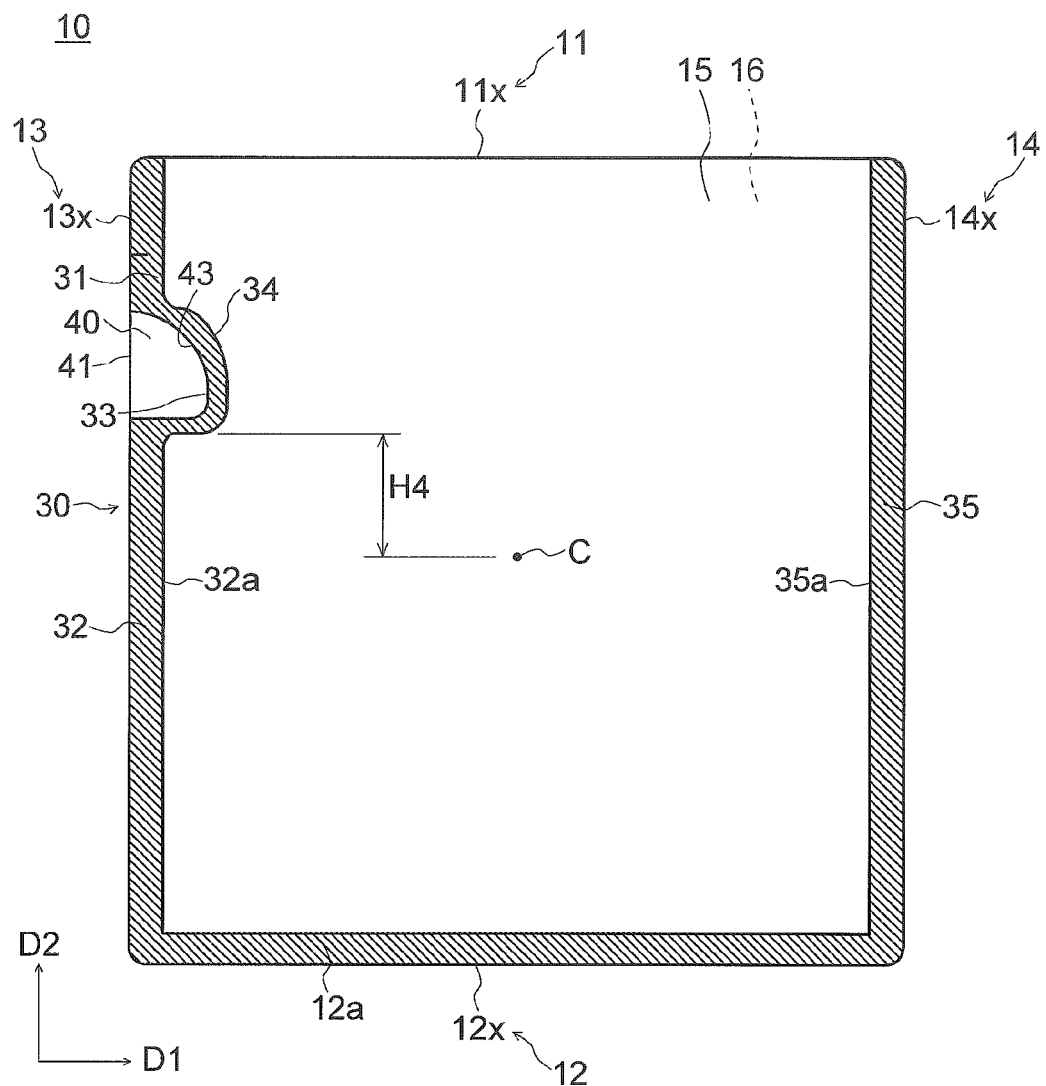
FIG. 70 is a front view illustrating a modified example of the pouch according to the seventh embodiment.

In the above-described embodiment, an example has been described in which the pouch 10 is a gusset-type pouch including the front surface film 15, the back surface film 16, and the lower film 17. However, the present embodiment is not limited thereto, and as illustrated in FIG. 70, the pouch 10 may be a so-called flat pouch including the front surface film 15 and the back surface film 16. In this case, the pouch 10 is heated by the microwave oven in the state in which the posture of the pouch 10 is maintained so that the intermediate seal part 33 is positioned above the center point C of the storage section 18 in the vertical direction. For example, when the pouch 10 is sold in a state of being stored in a paper box (not illustrated), the box can be used to maintain the pouch 10 in a predetermined posture.

Note that although some modified examples with respect to the above-described embodiment have been described, a plurality of modified examples can be appropriately combined and applied.

Eighth Embodiment

Next, an eighth embodiment of the present invention will be described. The eighth embodiment relates to a bottom gusset type bag provided with a steam-releasing mechanism.

First, a problem to be solved by the eighth embodiment will be described.

When using a bag with the steam-releasing mechanism, the consumer heats the contents stored in the bag with the microwave oven, and then opens the upper portion of the bag to take out the contents from the opening. However, when the bottom gusset type bag is heated in the microwave oven, the width of the gusset part in the lower portion of the bag may extend as the pressure in the storage section of the bag increases. When the width of the lower portion of the bag increases, the front surface film and the back surface film connected to the lower portion of the bag are inclined with respect to the vertical direction accordingly, and a spacing is narrow between the front surface film and the back surface film in the upper portion of the bag, thereby making it difficult to take out contents from opening. An object of the eighth embodiment provides a bag that can effectively solve such a problem.

Next, means for solving the problem will be described.

According to the eighth embodiment, there is provided a bag having a steam-releasing mechanism and storing contents, the bag including: a front surface film and a back surface film; a lower film that is positioned between the front surface film and the back surface film and constitutes a lower portion of the bag; a first half-cut line that is formed on the front surface film to be at least partially positioned below the steam-releasing mechanism and at least partially has a shape that is convex downward, and a second half-cut line that is formed on the back surface film to at least partially overlap with the first half-cut line.

In the bag according to the eighth embodiment, at least one of one end and the other end of the first half-cut line may overlap with at least one of one end and the other end of the second half-cut line.

In the bag according to the eighth invention, the first half-cut line may be positioned at least partially below the second half-cut line.

In the bag according to the eighth embodiment, the first half-cut line and the second half-cut line may not overlap with each other over the entire area.

In the bag according to the eighth embodiment, one end of the first half-cut line and one end of the second half-cut line may be positioned at the first side portion of the bag below the steam-releasing mechanism, and the other end of the first half-cut line and the other end of the second half-cut line may be positioned at the second side portion opposite to the first side portion of the bag below the steam-releasing mechanism.

In the bag according to the eighth embodiment, one end of the first half-cut line and one end of the second half-cut line may be positioned at the first side portion of the bag above the steam-releasing mechanism, and the other end of the first half-cut line and the other end of the second half-cut line may be positioned at the second side portion opposite to the first side portion of the bag above the steam-releasing mechanism.

In the bag according to the eighth embodiment, the steam-releasing mechanism may be positioned at the first side portion of the bag, one end of the first half-cut line and one end of the second half-cut line may be positioned at the first side portion of the bag below the steam-releasing mechanism, and the other end of the first half-cut line and the other end of the second half-cut line may also be positioned at the second side portion opposite to the first side portion of the bag above the steam-releasing mechanism.

In the bag according to the eighth embodiment, the steam-releasing mechanism may be positioned at the first side portion of the bag, one end of the first half-cut line and one end of the second half-cut line may be positioned at the first side portion of the bag below the steam-releasing mechanism, and the other end of the first half-cut line and the other end of the second half-cut line may also be positioned at the upper portion of the bag.

The bag according to the eighth embodiment may further include a chuck tape provided on the inner surface of the front surface film and the inner surface of the back surface film so that the bag is reached from the first side portion of the bag to the second side portion opposite to the first side portion above the steam-releasing mechanism.

According to the eighth embodiment, it is possible to improve the ease of taking out the contents.

Hereinafter, the eighth embodiment will be described in detail. In the following description and the drawings used in the following description, parts that can be configured in the same manner as in the above-described first embodiment will be denoted by the same reference numerals as those used for corresponding parts in the above-described embodiment, and a duplicate description thereof will be omitted. In addition, when it is clear that the action and effect obtained in the above-described first embodiment can be obtained also in the modified example, the description thereof may be omitted.

Figure 71:
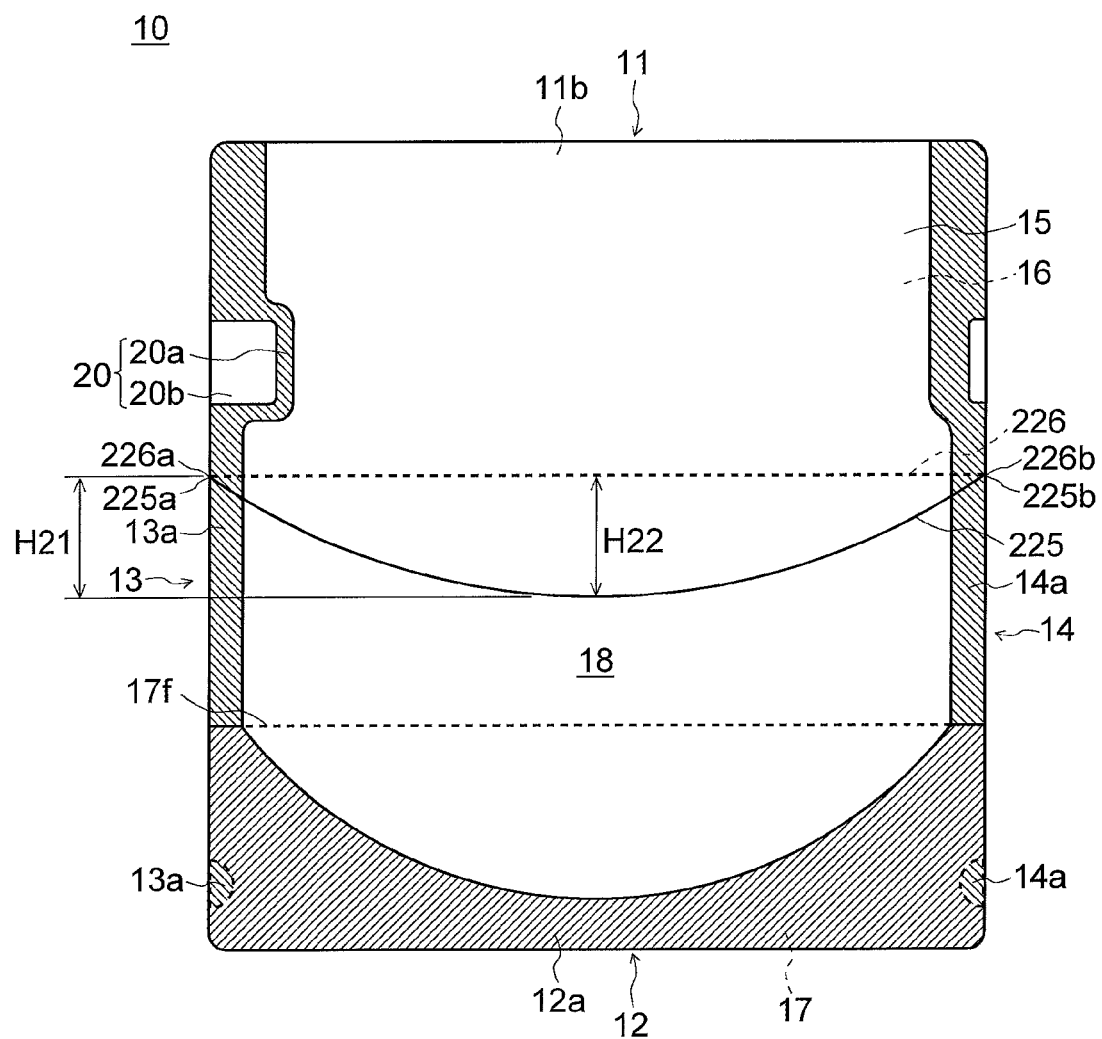
FIG. 71 is a front view illustrating a bag according to an eighth embodiment.
Figure 72:
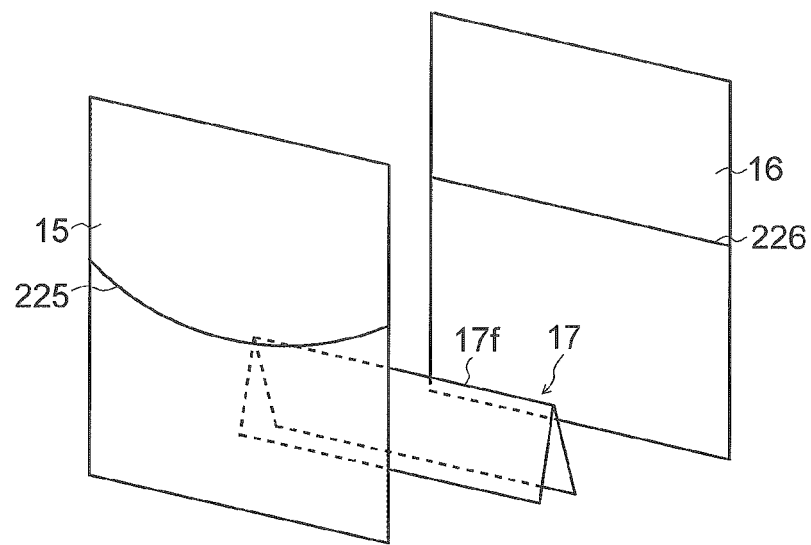
FIG. 72 is an exploded view illustrating a film constituting the bag illustrated in FIG. 71.

FIG. 71 is a front view illustrating a bag 10 according to the eighth embodiment as viewed from the front side. In addition, FIG. 72 is an exploded view illustrating a film constituting the bag illustrated in FIG. 71. The bag 10 has a storage section 18 that stores contents. Note that FIG. 71 illustrates the bag 10 in a state before the contents are stored.

As illustrated in FIG. 71, the bag 10 according to the eighth embodiment includes a steam-releasing mechanism 20, a first half-cut line 225, and a second half-cut line 226.

The steam-releasing mechanism 20 is a mechanism for releasing steam generated during the heating of the contents stored in the bag 10 to the outside. When the pressure of steam reaches a predetermined value or greater, the steam-releasing mechanism 20 is configured to allow the inside and the outside of the bag 10 to communicate with each other to release the steam, and suppress the steam from being released from locations other than the steam-releasing mechanism 20.

The first half-cut line 225 and the second half-cut line 226 are configured so that the film constituting the bag 10 is easily broken along the first half-cut line 225 and the second half-cut line 226. The first half-cut line 225 and the second half-cut line 226 are used when a consumer opens the bag 10 after heating the contents of the bag 10 using the microwave oven.

First Half-Cut Line and Second Half-Cut Line

Next, the first half-cut line 225 and the second half-cut line 226 will be described. The first half-cut line 225 is formed on the front surface film 15, and the second half-cut line 226 is formed on the back surface film 16.

As illustrated in FIG. 71, the first half-cut line 225 includes one end 225a that is positioned at the first side portion 13 below the steam-releasing mechanism 20, and the other end 225b that is positioned at the second side portion 14 below the steam-releasing mechanism 20, and extends from the first side portions 13 to the second side portions 14. In addition, the first half-cut line 225 has a shape curved to be convex downward over the entire area.

In FIG. 71, reference sign H21 denotes a distance in the vertical direction between one end 225a or the other end 225b of the first half-cut line 225 and a lowermost portion of the first half-cut line 225. A distance H21 is, for example, 3 mm or more, and preferably 10 mm or more. In addition, a distance H21 is, for example, 50 mm or less and preferably 20 mm or less.

The second half-cut line 226 is a half-cut line formed on the back surface film 16 to at least partially overlap with the first half-cut line 225. In the example illustrated in FIG. 71, the second half-cut line 226 has one end 226a overlapping with the one end 225a of the first half-cut line 225, and the other end 226b overlapping with the other end 225b of the first half-cut line 225. In addition, the second half-cut line 226 extends linearly from the first side portion 13 to the second side portion 14. In the example illustrated in FIG. 71, the direction in which the second half-cut line 226 extends is parallel to the horizontal direction. For this reason, the second half-cut line 226 is positioned above the first half-cut line 225 in a portion other than the one end 226a and the other end 226b. In other words, the first half-cut line 225 is positioned below the second half-cut line 226 in a portion other than the one end 225a and the other end 225b. Further, it can also be expressed that the first half-cut line 225 and the second half-cut line 226 are at least partially separated in the vertical direction. Although not illustrated, the second half-cut line 226 may extend in a direction inclined with respect to the horizontal direction.

In FIG. 71, reference sign H22 denotes a maximum distance between the first half-cut line 225 and the second half-cut line 226 in the vertical direction. The maximum distance H22 is, for example, 3 mm or more and more preferably 10 mm or more. In addition, the maximum distance H22 is, for example, 50 mm or less, and more preferably 20 mm or less. When the second half-cut line 226 extends linearly in the horizontal direction, the maximum distance H22 is equal to the distance H21 described above.

Figure 73:
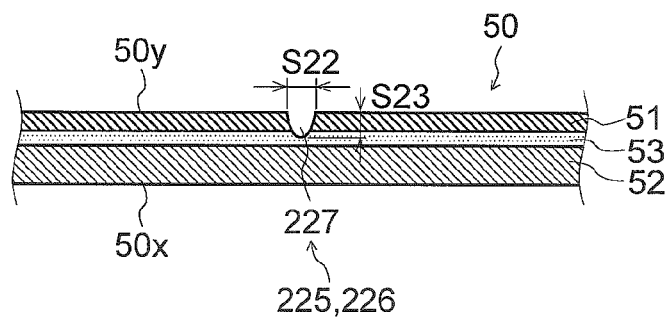
FIG. 73 is a cross-sectional view illustrating an example of a layer configuration of a laminated body constituting the bag according to the eighth embodiment.

Next, the structures of the first half-cut line 225 and the second half-cut line 226 formed on the front surface film 15 and the back surface film 16 will be described with reference to FIG. 73. A laminated body 50 includes a base layer 51, a sealant layer 52, a bonding layer 53, and the like in the same manner as in the fifth embodiment described above. The configurations, thicknesses, and the like of each layer are the same as in the fifth embodiment, and a description thereof will be omitted. Further, the base layer 51 may include a first plastic film 62 described in the first embodiment, the second embodiment, or the third embodiment described above, and may include a second plastic film 66, and may include the first plastic film 62 and the second plastic film 66. In addition, the sealant layer 52 may include the sealant film 70 described in the first embodiment, the second embodiment, or the third embodiment described above. In addition, as the laminated body 50, the laminated body 50 described in the first embodiment, the second embodiment, or the third embodiment described above may be used.

Next, the structures of the first half-cut line 225 and the second half-cut line 226 will be described. As illustrated in FIG. 73, the first half-cut line 225 and the second half-cut line 226 include a non-through hole 227 formed in the outer surface 50y of the laminated body 50. In the example illustrated in FIG. 73, the non-through holes 227 are configured to penetrate through the base layer 51 and reach the bonding layer 53. Although not illustrated, the non-through hole 227 may be configured not to penetrate through the base layer 51.

A width S22 and a depth S23 of the non-through hole 227 of the first half-cut line 225 and the second half-cut line 226 are set so that the first half-cut line 225 and the second half-cut line 226 are broken when the user applies an appropriate force to the bag 10. For example, the width S22 of the non-through hole 227 is 10 μm or more and 1 mm or less. Further, the depth S23 of the non-through hole 227 is, for example, 5 μm or more and 10 μm or less. Such a non-through hole 227 can be formed, for example, by processing the laminated body 50 by irradiating laser light from the outer surface 50y side to the laminated body 50. In addition, the non-through hole 227 may be formed by processing the laminated body 50 from the outer surface 50y side using a cutting blade or the like.

Method for Opening Bag

Figure 74:
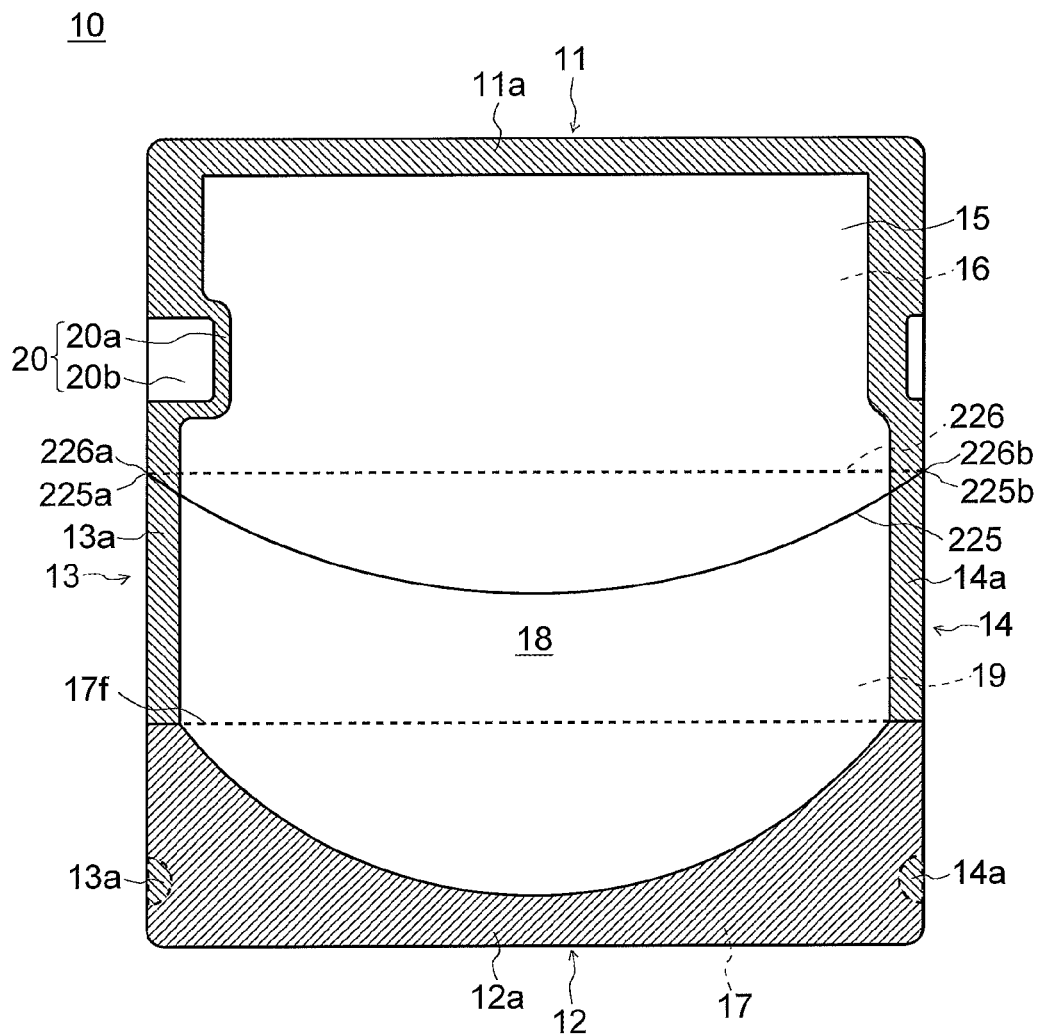
FIG. 74 is a front view illustrating the bag in a state in which an upper portion is sealed, in the eighth embodiment.

Next, as illustrated in FIG. 74, a method for opening a sealed bag 10 in which contents 19 are stored will be described. First, the bag 10 is put inside the microwave oven in the state in which the lower portion 12 faces down and the bag 10 is self-standing. Next, the contents are heated using the microwave oven. As a result, the temperature of the contents 19 increases, so the moisture contained in the contents 19 evaporates, and the pressure in the storage section 18 increases. When the pressure in the storage section 18 increases, the front surface film 15 and the back surface film 16 expand outward, a force is applied to the steam-releasing seal part 20a of the steam-releasing mechanism 20, and the steam-releasing seal part 20a peels off. Thereby, the steam in the storage section 18 can be released to the outside via the non-seal section 20b of the steam-releasing mechanism 20.

Figure 75:
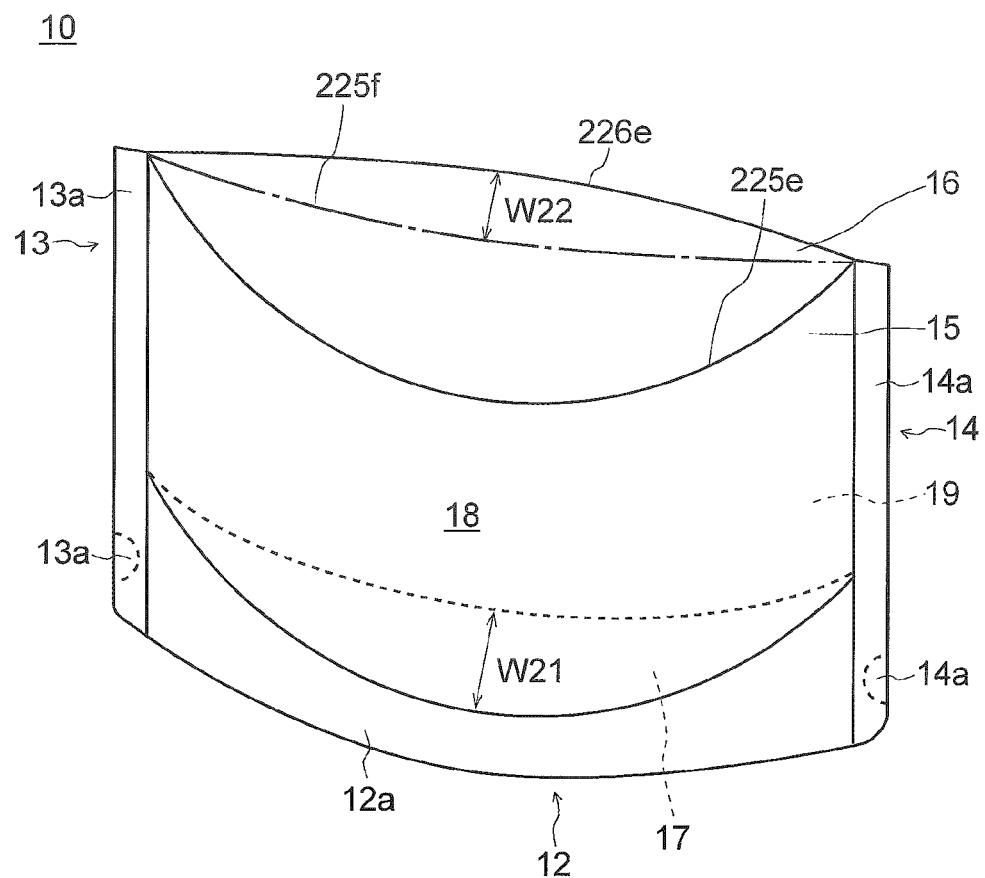
FIG. 75 is a perspective view illustrating a state in which the bag is opened in the eighth embodiment.

Subsequently, the bag 10 is torn from one of the first side portions 13 or the second side portions 14 to the other thereof along the first half-cut line 225 and the second half-cut line 226. As a result, as illustrated in FIG. 75, the bag 10 can be opened to form an opening in the upper portion. As illustrated in FIG. 75, a portion torn along the first half-cut line 225 in the front surface film 15 becomes a first opening edge 225e of the opening, and a portion torn along the second half-cut line 226 in the back surface film 16 becomes a second opening edge 226e of the opening.

When the bottom gusset type bag 10 is heated by the microwave oven, as illustrated in FIG. 75, a width W21 of the gusset part of the lower portion 12 of the bag 10 may increase as the pressure in the storage section 18 of the bag 10 increases. When the width W21 of the lower portion 12 of the bag 10 increases, the front surface film 15 and the back surface film 16 connected to the lower portion of the bag 10 are inclined with respect to the vertical direction, and the spacing between the front surface film 15 and the back surface film 16 at the opened upper portion of the bag 10 becomes narrow. In FIG. 75, reference sign W22 denotes a width of the opening when the half-cut line formed on the front surface film 15 is a horizontal half-cut line 225f extending linearly in the horizontal direction similarly to the second half-cut line 226. In this case, the width W22 of the opening is smaller than the width W21 of the lower portion 12 of the bag 10, so that it is difficult to take out the contents from the opening.

On the other hand, in the eighth embodiment, the first half-cut line 225 formed on the front surface film 15 has a shape that is convex downward. For this reason, compared to the case where the horizontal half-cut line 225f extending linearly in the horizontal direction is formed on the front surface film 15, the width of the opening of the bag 10 can increase. Thereby, it is possible to improve the ease of taking out the contents. Thus, for example, it is possible to eat the contents stored in the bag 10 using a spoon or the like without transferring the contents to another container such as a dish. Of course, the contents stored in the bag 10 may be taken out to another container such as a dish. Also in this case, the width of the opening of the bag 10 increases, so the contents can be easily taken out.

In addition, in the eighth embodiment, the first half-cut line 225 is positioned below the second half-cut line 226 in a portion other than the one end 225a and the other end 225b. The spacing between the front surface film 15 and the back surface film 16 increases toward the lower portion 12. For this reason, by positioning the first opening edge 225e of the opening lower, the width of the opening can increase, and the ease of taking out the contents can be improved. In addition, since the second opening edge 226e of the back surface film 16 is positioned above the first opening edge 225e of the front surface film 15, a method for taking out contents from an opening while pressing the contents on the inner surface of the back surface film 16 can be possible. Also in this regard, it is possible to improve the ease of taking out the contents.

In addition, in the eighth embodiment, one end 225a of the first half-cut line 225 and one end 226a of the second half-cut line 226 that are positioned at the first side portion 13 are positioned below the steam-releasing mechanism 20. For this reason, by tearing the bag 10 along the first half-cut line 225 and the second half-cut line 226, as illustrated in FIG. 75, the steam-releasing mechanism 20 cannot remain in the opened bag 10.

Since the steam-releasing seal part 20a of the steam-releasing mechanism 20 protrudes inward, if the steam-releasing mechanism 20 remains in the bag 10, there is a possibility that the contents may be hindered from being taken out. Therefore, by removing the steam-releasing mechanism 20 when tearing the bag 10, the ease of taking out the contents can be improved.

In addition, if the steam-releasing mechanism 20 remains in the bag 10, the contents may leak to the outside through the non-seal section 20b when the contents are taken out. Therefore, by removing the steam-releasing mechanism 20 when tearing the bag 10, the occurrence of such leakage can be suppressed.

Note that various changes can be made to the above-described embodiment. Hereinafter, modified examples will be described with reference to the drawings as necessary. In the following description and the drawings used in the following description, parts that can be configured in the same manner as in the above-described embodiment will be denoted by the same reference numerals as those used for corresponding parts in the above-described embodiment, and a duplicate description thereof will be omitted. In addition, when it is clear that the actions and effects obtained in the above-described embodiment can be obtained in the modified example, the description thereof may be omitted.

(First Modified Example of First Half-Cut Line and Second Half-Cut Line)

Figure 76:
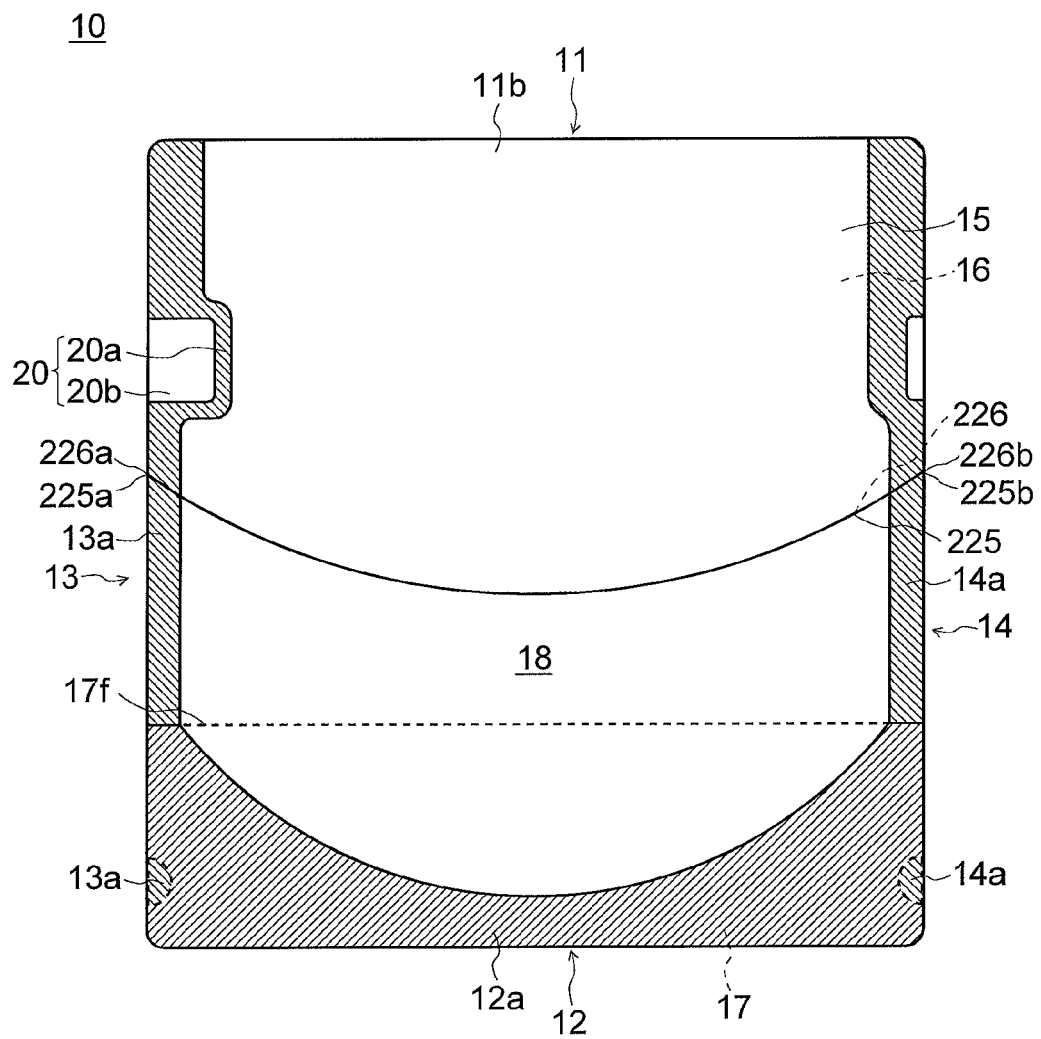
FIG. 76 is a front view illustrating a modified example of the bag in the eighth embodiment.

In the above-described embodiment, an example has been described in which the first half-cut line 225 is positioned partially below the second half-cut line 226. However, the present embodiment is not limited thereto, and as illustrated in FIG. 76, the first half-cut line 225 and the second half-cut line 226 may overlap with each other over the entire area.

(Second Modified Example of First Half-Cut Line and Second Half-Cut Line)

Figure 77:
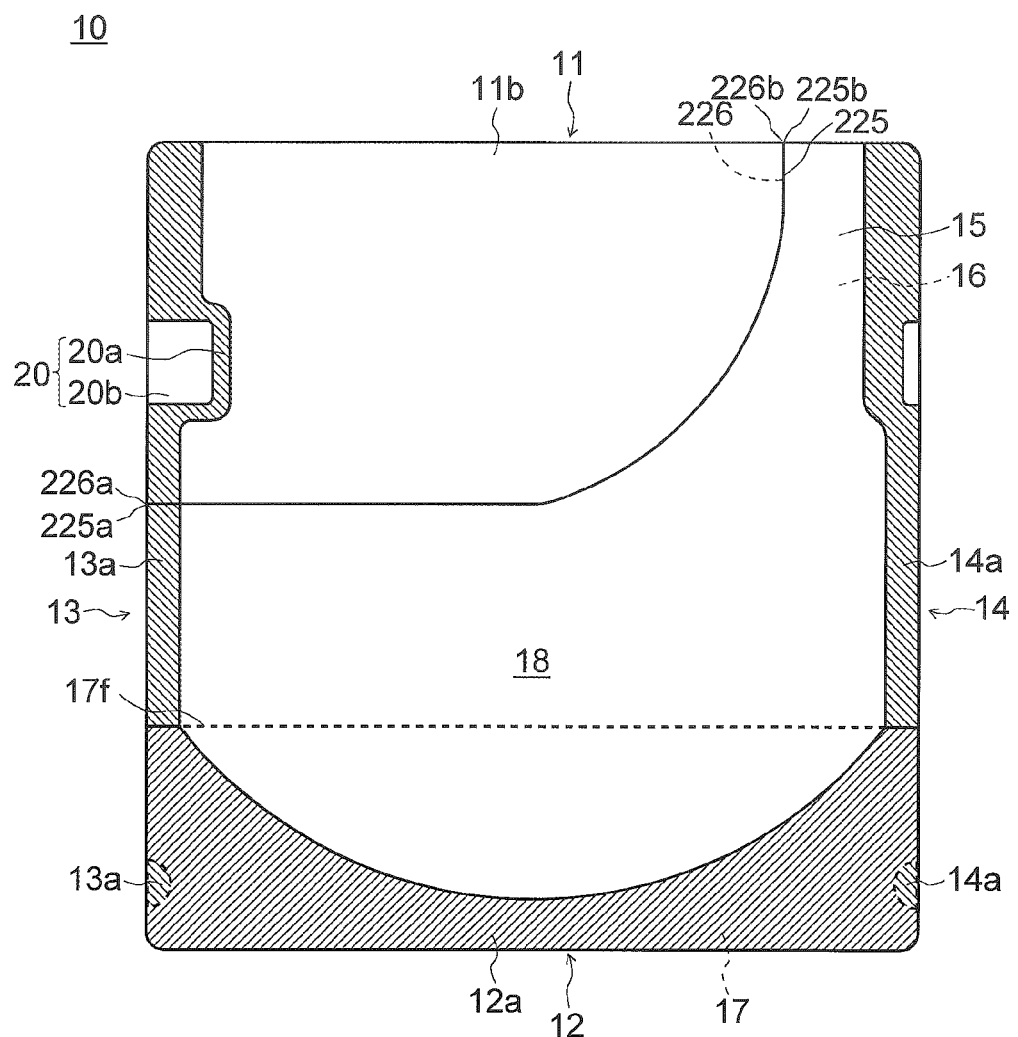
FIG. 77 is a front view illustrating a modified example of the bag in the eighth embodiment.

In addition, in the above-described embodiment, an example has been described in which one end 225a of the first half-cut line 225 and one end 226a of the second half-cut line 226 are positioned at the first side portion 13 below the steam-releasing mechanism 20, and the other end 225b of the half-cut line 225 and the other end 226b of the second half-cut line 226 are positioned at the second side portion 14 below the steam-releasing mechanism 20. However, the present embodiment is not limited thereto, and as illustrated in FIG. 77, one end 225a of the first half-cut line 225 and one end 226a of the second half-cut line 226 may be positioned at the first side portion 13 below the steam-releasing mechanism 20, and the other end 225b of the first half-cut line 225 and the other end 226b of the second half-cut line 226 may be positioned at the upper portion 11 of the bag 10. In this case, in the opened bag 10, since there are a lot of portions on the second side portion 14 side, a consumer can hold the portion on the second side portion 14 side by hand or the like. Thereby, the posture of the bag 10 is easily controlled, so the ease of taking out the contents can be improved.

Also in the example illustrated in FIG. 77, although not illustrated, the first half-cut line 225 and the second half-cut line 226 may be at least partially separated in the vertical direction.

(Third Modified Example of First Half-Cut Line and Second Half-Cut Line)

Figure 78:
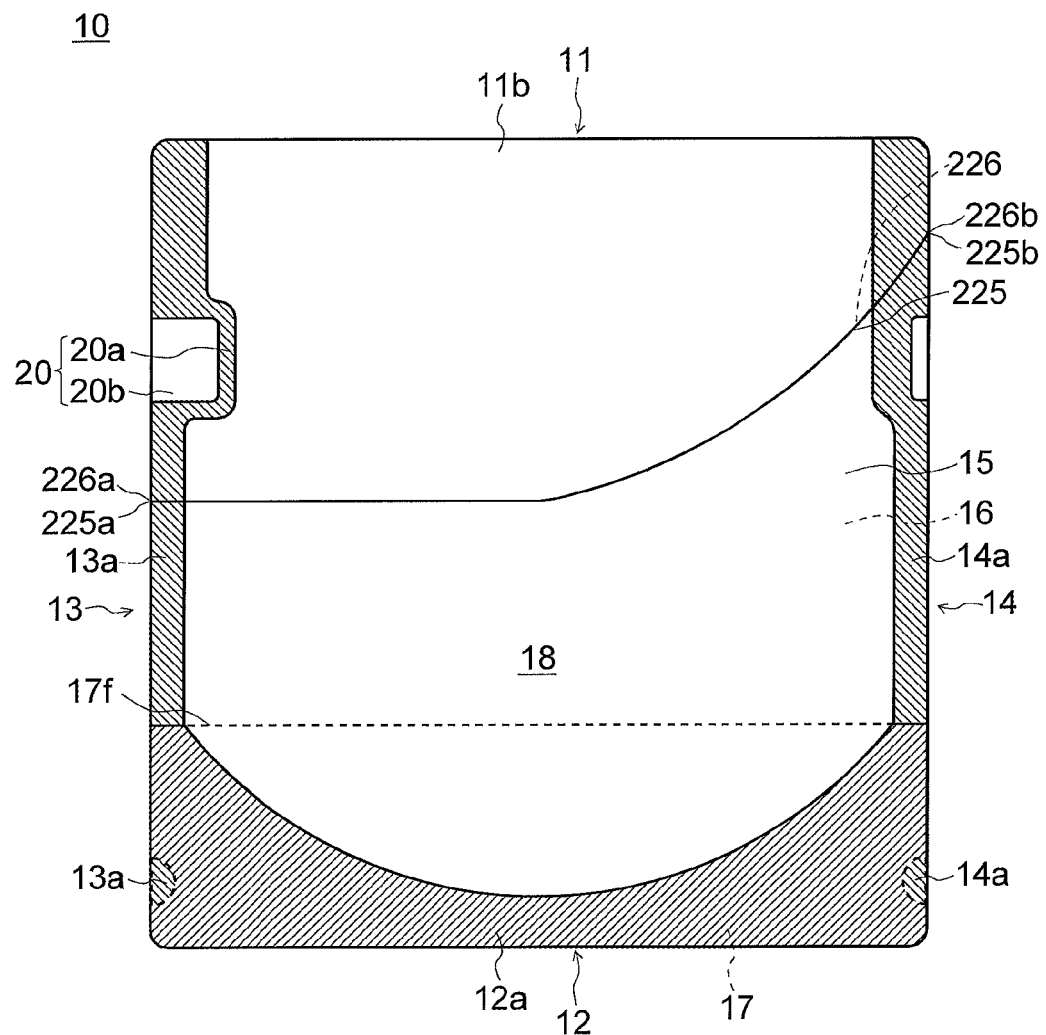
FIG. 78 is a front view illustrating a modified example of the bag in the eighth embodiment.

As illustrated in FIG. 78, one end 225a of the first half-cut line 225 and one end 226a of the second half-cut line 226 may be positioned at the first side portion 13 below the steam-releasing mechanism 20, and the other end 225b of the half-cut line 225 and the other end 226b of the second half-cut line 226 may be positioned at the second side portion 14 above the steam-releasing mechanism 20. Even in the example illustrated in FIG. 78, in the same manner as in the example illustrated in FIG. 77, in the opened bag 10, there are a lot of portions on the second side portion 14 side, so a consumer can hold the portion on the second side portion 14 side by hand or the like. Thereby, the posture of the bag 10 is easily controlled, so the ease of taking out the contents can be improved.

Also in the example illustrated in FIG. 78, although not illustrated, the first half-cut line 225 and the second half-cut line 226 may be at least partially separated in the vertical direction.

(Fourth Modified Example of First Half-Cut Line and Second Half-Cut Line)

Figure 79:
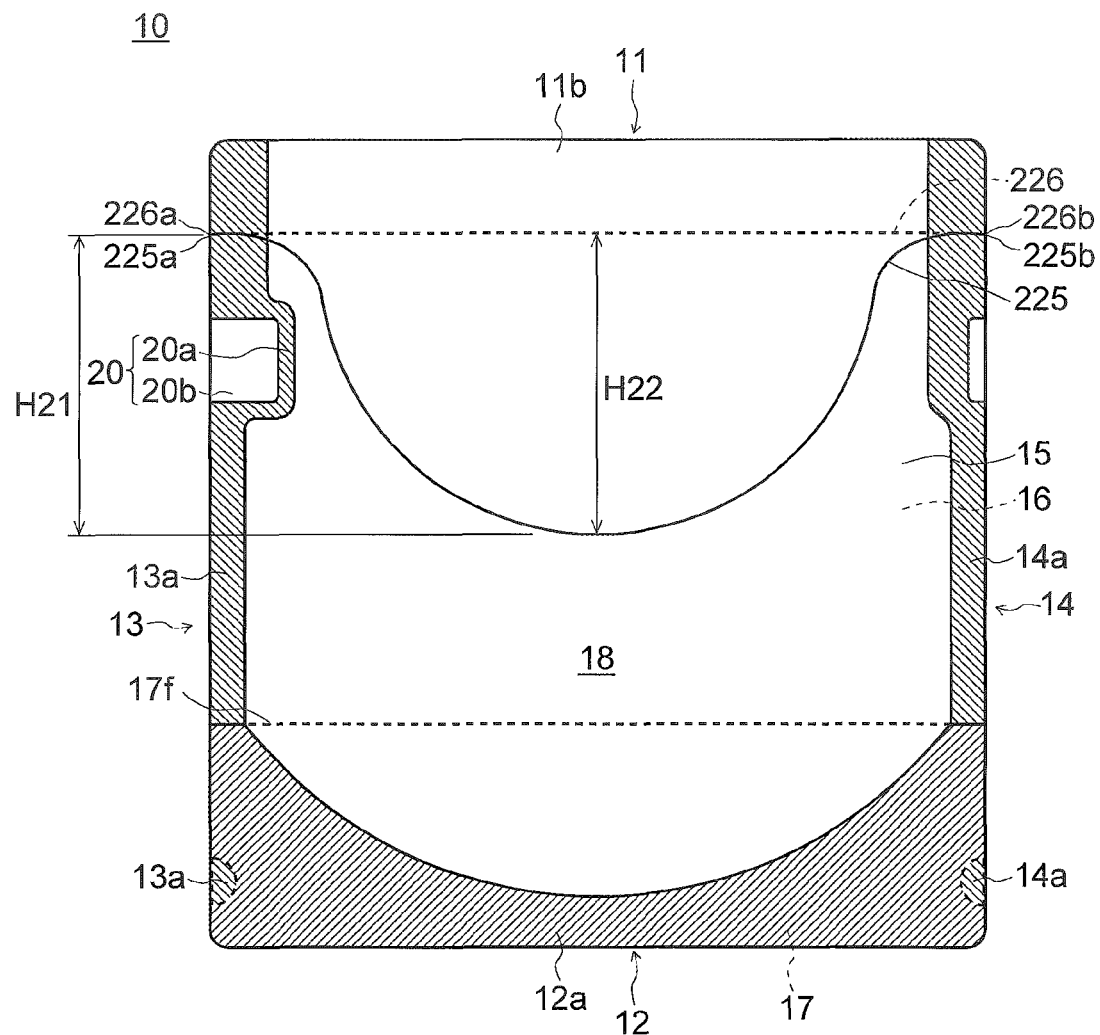
FIG. 79 is a front view illustrating a modified example of the bag in the eighth embodiment.

In addition, in the eighth embodiment and each modified example described above, an example has been described in which one end 225a of the first half-cut line 225 and one end 226a of the second half-cut line 226 are positioned at the first side portion 13 below the steam-releasing mechanism 20. However, the present embodiment is not limited thereto, and as illustrated in FIG. 79, one end 225a of the first half-cut line 225 and one end 226a of the second half-cut line 226 may be positioned at the first side portion 13 above the steam-releasing mechanism 20, and the other end 225b of the first half-cut line 225 and the other end 226b of the second half-cut line 226 may be positioned at the second side portion 14 above the steam-releasing mechanism 20. In this case, as illustrated in FIG. 79, the first half-cut line 225 has a curved shape that is convex downward to be partially positioned below the steam-releasing mechanism 20.

In an example illustrated in FIG. 79, the distance H21 in the vertical direction between one end 225a or the other end 225b of the first half-cut line 225 and the lowermost part of the first half-cut line 225 is, for example, 20 mm or more and preferably 30 mm or more. In addition, the distance H21 is, for example, 70 mm or less and preferably 50 mm or less.

As illustrated in FIG. 79, the second half-cut line 226 may extend linearly in the horizontal direction from the first side portion 13 to the second side portions 14. In this case, the maximum distance H22 between the first half-cut line 225 and the second half-cut line 226 in the vertical direction is, for example, 20 mm or more and more preferably 30 mm or more. In addition, the maximum distance H22 is, for example, 70 mm or less and more preferably 50 mm or less.

Although not illustrated, the second half-cut line 226 may also have a curved shape that is convex downward to be partially positioned below the steam-releasing mechanism 20, similarly to the first half-cut line 225. Further, the second half-cut line 226 may overlap with the first half-cut line 225 over the entire area.

(Other Modified Examples of First Half-Cut Line and Second Half-Cut Line)

In the embodiment and each modified example described above, an example has been described in which one end 225a of the first half-cut line 225 overlaps with one end 226a of the second half-cut line 226, and the other end 225b of the first half-cut line 225 overlaps with the other end 226b of the second half-cut line 226. However, the present embodiment is not limited thereto. It would be possible as long as just one of one end 225a and the other end 225b of the first half-cut line 225 and just one of one end 226a and the other end 226b of the second half-cut line 226 overlap with each other.

(Example in which Chuck Tape is Provided)

Figure 80:
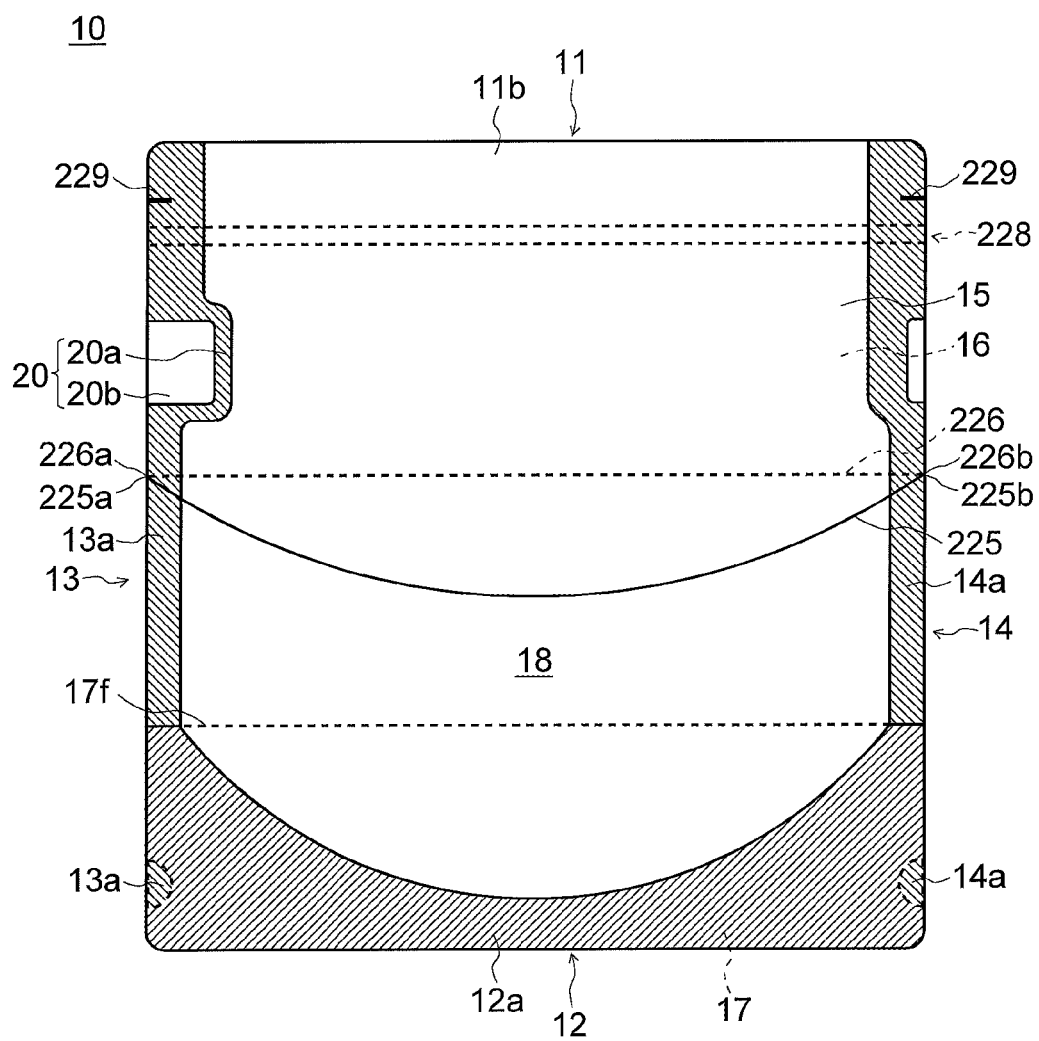
FIG. 80 is a front view illustrating a modified example of the bag in the eighth embodiment.

As illustrated in FIG. 80, the bag 10 may further include a chuck tape 228 extending from the first side portions 13 to the second side portions 14. Although not illustrated, the chuck tape 228 has a first member that is provided on the inner surface of the front surface film 15 and a second member that is provided on the inner surface of the back surface film 16 and can be fitted with the first member. By providing the chuck tape 228 in the bag 10, the bag 10 before being heated can be freely opened or sealed.

As illustrated in FIG. 80, an opening start part 229 that is a trigger for tearing the bag 10 may be formed in the first side seal section 13a or the second side seal section 14a above the steam-releasing mechanism 20. The opening start part 229 is, for example, a notch or a dent.

An example of a method for using a bag 10 illustrated in FIG. 80 will be described. First, the bag 10 is opened by tearing the bag 10 starting from the opening start part 229. Subsequently, one of the first member and the second member of the chuck tape 228 is detached from the other thereof, and a seasoning or the like is put into the storage section 18 via the opening of the chuck tape 228. Thereafter, one of the first member and the second member of the chuck tape 228 is fitted with the other thereof, the bag 10 is sealed, and in this state, the contents are heated using the microwave oven. When the pressure in the storage section 18 increases, a force is applied to the steam-releasing seal part 20a of the steam-releasing mechanism 20, and the steam-releasing seal part 20a peels off. Subsequently, in the same manner as in the above-described embodiment, the bag 10 is torn from one of the first side portion 13 or the second side portion 14 to the other thereof along the first half-cut line 225 and the second half-cut line 226.

According to this modified example, by providing the chuck tape 228 in the bag 10, the bag 10 is opened before the contents are heated using the microwave oven and a predetermined material such as a seasoning is put into the storage section 18. Therefore, the degree of freedom of use of the bag 10 can increase.

(First Modified Example of Steam-Releasing Mechanism)

Figure 81:
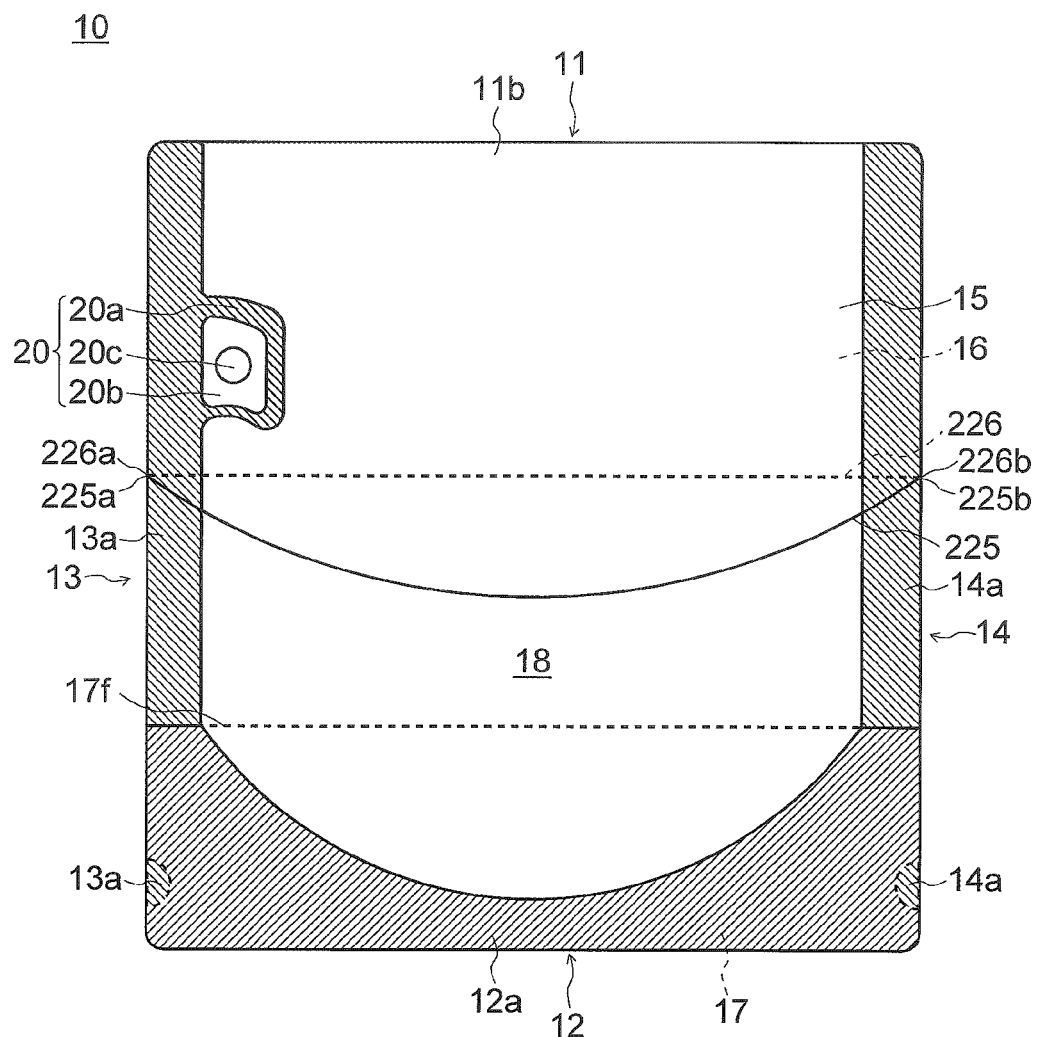
FIG. 81 is a front view illustrating a modified example of the bag in the eighth embodiment.

In the above-described embodiment, an example has been described in which the non-seal section 20b of the steam-releasing mechanism 20 communicates with the outside of the bag 10. However, the present embodiment is not limited thereto, and as illustrated in FIG. 81, the non-seal section 20b may be surrounded by the first side seal section 13a and the steam-releasing seal part 20a connected to the first side seal section 13a. That is, the non-seal section 20b may not communicate with the outside of the bag 10. In this case, the steam-releasing mechanism 20 further has a through hole 20c formed on at least one of the front surface film 15 and the back surface film 16 in the non-seal section 20b.

In the bag 10 illustrated in FIG. 81, when the pressure in the storage section 18 increases, a force is applied to the steam-releasing seal part 20a of the steam-releasing mechanism 20, and the steam-releasing seal part 20a peels off. The steam that has flowed into the non-seal section 20b via the peeling-off portion of the steam-releasing seal part 20a is discharged to the outside via the through hole 20c. Thereby, it is possible to suppress the pressure in the storage section 18 from becoming excessively high.

(Second Modified Example of Steam-Releasing Mechanism)

Figure 82:
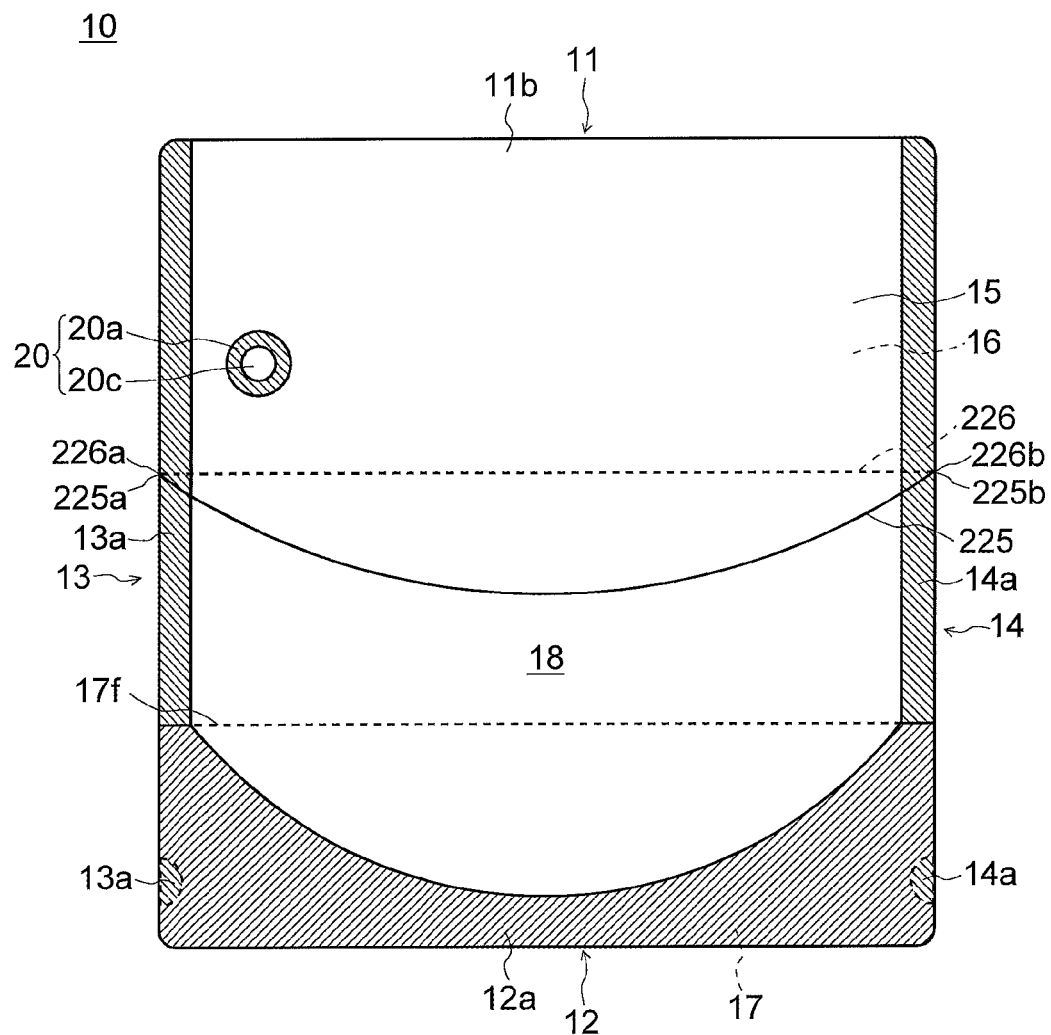
FIG. 82 is a front view illustrating a modified example of the bag in the eighth embodiment.

In the embodiment and each modified example described above, an example has been described in which the steam-releasing seal part 20a of the steam-releasing mechanism 20 is connected to the first side seal section 13a. However, the present embodiment is not limited thereto, and as illustrated in FIG. 82, the steam-releasing seal part 20a is not connected to the seal section of the outer edge of the bag 10 such as the first side seal section 13a or the second side seal section 14a. In this case, the steam-releasing mechanism 20 further has a through hole 20c positioned in an area surrounded by the steam-releasing seal part 20a.

Also in the bag 10 illustrated in FIG. 82, when the pressure in the storage section 18 increases, a force is applied to the steam-releasing seal part 20a of the steam-releasing mechanism 20, and the steam-releasing seal part 20a peels off, so the steam can be released to the outside via the through hole 20c inside the steam-releasing seal part 20a.

(Third Modified Example of Steam-Releasing Mechanism)

Figure 83:
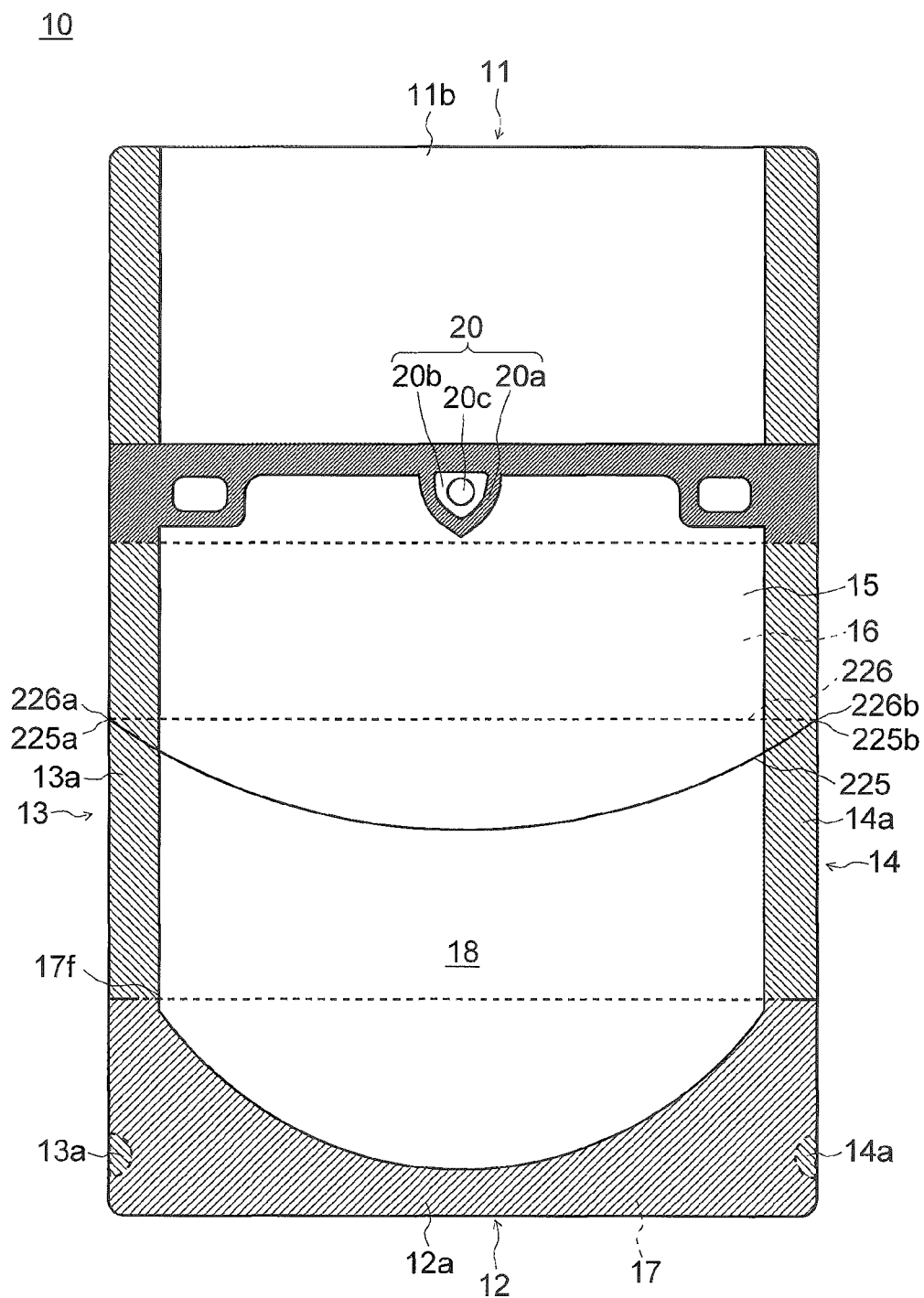
FIG. 83 is a front view illustrating a modified example of the bag in the eighth embodiment.

In the embodiment and each modified example described above, an example has been described in which the steam-releasing seal part 20a of the steam-releasing mechanism 20 is a seal section formed by joining the inner surface of the front surface film 15 and the inner surface of the back surface film 16. However, the present embodiment is not limited thereto, and the steam-releasing seal part 20a may be a seal section formed by joining the inner surfaces of the front surface film 15 positioned on the front side together. For example, as illustrated in FIG. 83, the steam-releasing seal part 20a is formed by joining the inner surfaces of the front surface film 15 together at the overlap part where a part of the front surface film 15 on the upper portion 11 side overlaps with a part of the front surface film 15 on the lower portion 12 side. In this case, as illustrated in FIG. 83, the steam-releasing seal part 20a may be formed between the first side portions 13 and the second side portions 14.

As illustrated in FIG. 83, the steam-releasing mechanism 20 further has the non-seal section 20b surrounded by the steam-releasing seal part 20a and the through hole 20c formed on at least one of the front surface film 15 or the back surface film 16 in the non-seal section 20b. Also in the bag 10 illustrated in FIG. 83, when the pressure in the storage section 18 increases, a force is applied to the steam-releasing seal part 20a of the steam-releasing mechanism 20, and the steam-releasing seal part 20a peels off, so the steam can be released to the outside via the through hole 20c inside the steam-releasing seal part 20a.

Note that although some modified examples with respect to the above-described embodiment have been described, a plurality of modified examples can be appropriately combined and applied.

Further, the form of the bag having the steam-releasing mechanism has been described in the above-described first to eighth embodiments, but naturally, the features of the plurality of embodiments can be appropriately combined and applied.

REFERENCE SIGNS LIST

10 Bag (pouch)
11 Upper portion
11a Upper seal section
12 Lower portion
12a Lower seal section
13, 14 Side portion
13a, 14a Side seal section
15 Front surface film
16 Back surface film
17 Lower film
18 Storage section
19 Contents
20 Steam-releasing Mechanism
20a Steam-releasing seal part
25 Easy opening means
26 Notch
50 Laminated body
62 First plastic film (first stretched plastic film)
64 First adhesive layer
66 Second plastic film (second stretched plastic film)
68 Second adhesive layer
70 Sealant film
81 Sensor

The invention claimed is:
1. A bag having a storage section, comprising:
laminated bodies that include a sealant film positioned on an inner surface of the bag and at least one plastic film positioned on an outer surface side of the sealant film; and
a seal section where inner surfaces of one pair of laminated bodies are joined together,
wherein the seal section has an outer edge seal part that is positioned along an outer edge of the bag, and a steam-releasing seal part that is positioned closer to a center point side of the storage section than the outer edge seal part and that peels off due to an increase in pressure in the storage section,
wherein the outer edge seal part includes an upper seal section that extends along an upper portion of the bag, a lower seal section that extends over a lower portion of the bag, a first side seal section that extends along a first side portion of the bag, and a second side seal section that extends along a second side portion of the bag,
wherein the steam-releasing seal part has a shape that protrudes from the first side seal section toward the inside of the bag,
wherein the bag comprises a non-seal section that is isolated from the storage section by the steam-releasing seal part and extends to the outer edge of the first side portion,
wherein the sealant film comprises polyethylene and 51% by mass or more of propylene/ethylene block copolymer,
wherein a thickness of the sealant film is 100 µm or less,
wherein a product of the tensile elongation (%) of the sealant film in the machine direction and a thickness (µm) of the sealant film is 45,000 or more,
wherein a product of the tensile elongation (%) of the sealant film in the transverse direction and the thickness (µm) of the sealant film is 53,000 or more, and
wherein a ratio of a distance H1 to a distance H2 is 1.04 or more and 1.12 or less,
wherein the distance H1 is a distance from the upper seal section to a center point of the storage section, and
wherein the distance of H2 is a shortest distance from the steam-releasing seal part to the center point of the storage system.

2. A bag having a storage section, comprising:
laminated bodies that include a sealant film positioned on an inner surface of the bag and at least one plastic film positioned on an outer surface side of the sealant film; and
a seal section where inner surfaces of one pair of laminated bodies are joined together,
wherein the seal section has an outer edge seal part that is positioned along an outer edge of the bag, and a steam-releasing seal part that is positioned closer to a center point side of the storage section than the outer edge seal part and that peels off due to an increase in pressure in the storage section,
wherein the outer edge seal part includes an upper seal section that extends along an upper portion of the bag, a lower seal section that extends over a lower portion of the bag, a first side seal section that extends along a first side portion of the bag, and a second side seal section that extends along a second side portion of the bag,
wherein the steam-releasing seal part has a shape that protrudes from the first side seal section toward the inside of the bag,
wherein the bag comprises a non-seal section that is isolated from the storage section by the steam-releasing seal part and extends to the outer edge of the first side portion,
wherein the sealant film comprises polyethylene and 51% by mass or more of propylene/ethylene block copolymer,
wherein a tensile elongation (%) of the sealant film in a machine direction is 800% or more,
wherein a tensile elongation (%) of the sealant film in a transverse direction is 1,050% or more,
wherein a product of the tensile elongation (%) of the sealant film in the machine direction and a thickness (μm) of the sealant film is 45,000 or more,
wherein a product of the tensile elongation (%) of the sealant film in the transverse direction and the thickness (μm) of the sealant film is 53,000 or more, and
wherein a ratio of a distance H1 to a distance H2 is 1.04 or more and 1.12 or less,
  wherein the distance H1 is a distance from the upper seal section to a center point of the storage section, and
  wherein the distance H2 is a shortest distance from the steam-releasing seal part to the center point of the storage section.

3. The bag according to claim 1, wherein the sealant film further comprises an elastomer.

4. The bag according to claim 1, wherein
a tensile elongation (%) of the sealant film in a machine direction is 800% or more, and
a tensile elongation (%) of the sealant film in a transverse direction is 1,050% or more.

5. The bag according to claim 1, wherein the steam-releasing seal part peels off when the pressure in the storage section is 130 kPa or lower.

6. The bag according to claim 2, wherein the steam-releasing seal part peels off when the pressure in the storage section is 130 kPa or lower.

7. The bag according to claim 1, wherein
the seal section has a seal strength of 40 N or more and 65 N or less at a width of 15 mm at 25° C., and
the seal section has a seal strength of 5 N or more and 15 N or less at a width of 15 mm at 100° C.

8. The bag according to claim 2, wherein
the seal section has a seal strength of 50 N or more and 65 N or less at a width of 15 mm at 25° C., and
the seal section has a seal strength of 5 N or more and 15 N or less at a width of 15 mm at 100° C.

9. The bag according to claim 1, wherein
the content of the propylene/ethylene block copolymer in the sealant film is 90% by mass or more.

10. The bag according to claim 2, wherein
the content of the propylene/ethylene block copolymer in the sealant film is 90% by mass or more.

11. The bag according to claim 1, wherein
the steam-releasing seal part includes a lower corner where a direction in which the steam-releasing seal part extends change.

12. The bag according to claim 2, wherein
the steam-releasing seal part includes a lower corner where a direction in which the steam-releasing seal part extends changes.

13. The bag according to claim 11, wherein
a distance from the lower corner to a center point of the storage section is the shortest distance from the steam-releasing seal part to the center point.

14. The bag according to claim 12, wherein
a distance from the lower corner to a center point of the storage section is the shortest distance from the steam-releasing seal part to the center point.

* * * * *